US012634392B2

(12) United States Patent
Xu et al.

(10) Patent No.: US 12,634,392 B2
(45) Date of Patent: May 19, 2026

(54) CONTROL METHOD APPLIED TO ELECTRONIC DEVICE AND ELECTRONIC DEVICE

(71) Applicant: Huawei Technologies Co., Ltd., Shenzhen (CN)

(72) Inventors: Jie Xu, Shanghai (CN); Jiayu Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 713 days.

(21) Appl. No.: 17/999,831

(22) PCT Filed: May 25, 2021

(86) PCT No.: PCT/CN2021/095855
§ 371 (c)(1),
(2) Date: Nov. 23, 2022

(87) PCT Pub. No.: WO2021/238933
PCT Pub. Date: Dec. 2, 2021

(65) Prior Publication Data
US 2023/0291826 A1     Sep. 14, 2023

(30) Foreign Application Priority Data

May 27, 2020    (CN) .......................... 202010458414.4
Aug. 5, 2020    (CN) .......................... 202010779662.9
(Continued)

(51) Int. Cl.
H04M 1/72454    (2021.01)
H04M 1/72457    (2021.01)
H04M 1/72469    (2021.01)

(52) U.S. Cl.
CPC ... *H04M 1/72454* (2021.01); *H04M 1/72457* (2021.01); *H04M 1/72469* (2021.01)

(58) Field of Classification Search
CPC ......... H04M 1/72454; H04M 1/72457; H04M 1/72469; H04M 1/72412; H04M 2250/22;
(Continued)

(56) References Cited

U.S. PATENT DOCUMENTS 10,939,156 B1 *    3/2021    Subramanian ..... H04N 21/4147
2007/0264968 A1 *    11/2007    Frank .................... G06Q 30/02
455/404.2
(Continued)

FOREIGN PATENT DOCUMENTS

CN    102681958 A    9/2012
CN    102932412 A    2/2013
(Continued)

*Primary Examiner* — Marisol Figueroa
(74) *Attorney, Agent, or Firm* — Slater Matsil, LLP

(57)    ABSTRACT

This application discloses a control method applied to an electronic device, including: An electronic device may detect a user operation. The electronic device determines a target device based on the user operation. When the user operation is that a user pushes the electronic device in a direction close to the target device, the electronic device sends content displayed in the electronic device to the target device. When the user operation is that the user pulls the electronic device in a direction away from the target device, the electronic device sends a request to the target device. After receiving the request, the target device sends, to the electronic device, related information of a task currently being executed by the target device or a control instruction of the task being executed.

18 Claims, 176 Drawing Sheets

(30) Foreign Application Priority Data

| | | | |
|---|---|---|---|
| Aug. 5, 2020 | (CN) | .......................... | 202010779814.5 |
| Aug. 5, 2020 | (CN) | .......................... | 202010780257.9 |
| Aug. 5, 2020 | (CN) | .......................... | 202010780353.3 |
| Oct. 29, 2020 | (CN) | .......................... | 202011174741.3 |

(58) Field of Classification Search
    CPC .............. H04M 2250/64; G06F 1/1626; G06F
                1/1698; G06F 3/04845; G06F 3/04847;
                    G06F 3/017; G06F 3/0486; G06F
                    3/04883; G06F 2203/04806; G06F
                1/1694; H04L 12/2805; H04N 21/43615
    See application file for complete search history.

(56) References Cited

U.S. PATENT DOCUMENTS

2009/0177810 A1 * 7/2009 Kweon ................. H04L 67/303
                                                710/33

2012/0198353 A1      8/2012 Lee et al.
2014/0380187 A1 * 12/2014 Gardenfors ........... G06F 3/0488
                                                715/748

FOREIGN PATENT DOCUMENTS

| CN | 103368617 A | 10/2013 | | |
|----|-------------|---------|---|---|
| CN | 103974190 A | 8/2014 | | |
| CN | 106375931 A | 2/2017 | | |
| CN | 110719584 A | 1/2020 | | |
| EP | 2790390 A1 | 10/2014 | | |
| EP | 2891952 A1 * | 7/2015 | ............ | G06F 3/017 |
| EP | 2891952 B1 * | 8/2018 | ........ | H04N 21/4122 |
| JP | 2012114560 A | 6/2012 | | |
| JP | 2014229164 A | 12/2014 | | |
| JP | 2015130172 A | 7/2015 | | |

* cited by examiner

Multi-device scenario 100A

Multi-device scenario 100B

Top of the mobile phone

Bottom of the mobile phone

Mobile phone 111

Mobile phone 111

Mobile phone 111

Mobile phone 111

Mobile phone 111

Mobile phone 111

Mobile phone 111

Mobile phone 111

Mobile phone 111

Mobile phone 111

Tablet computer 116

Multi-device scenario 100A

1200

Television 113

Mobile phone 111

Multi-device scenario 100A

FIG. 5A

Mobile phone 111

Mobile phone 111

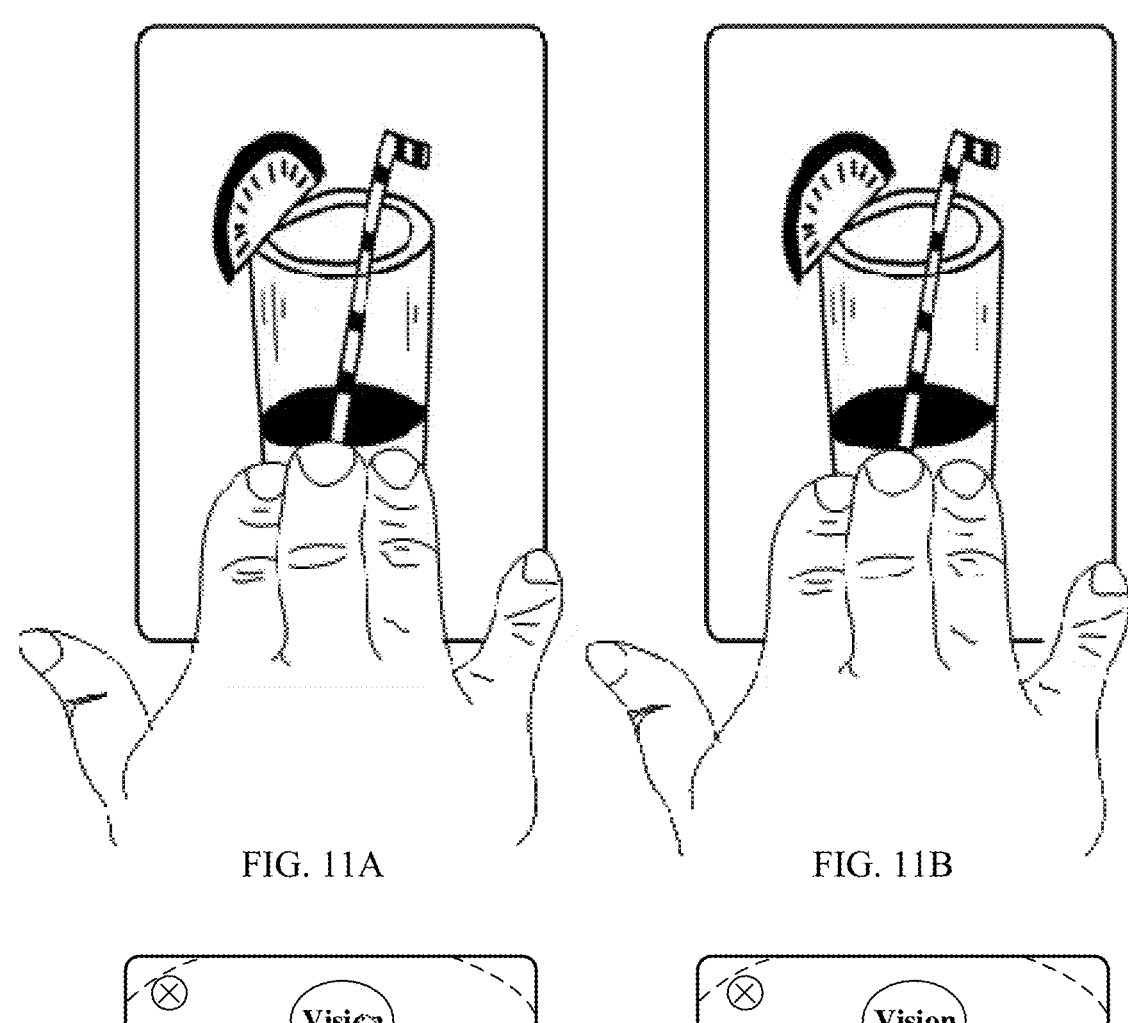
FIG. 11A    FIG. 11B
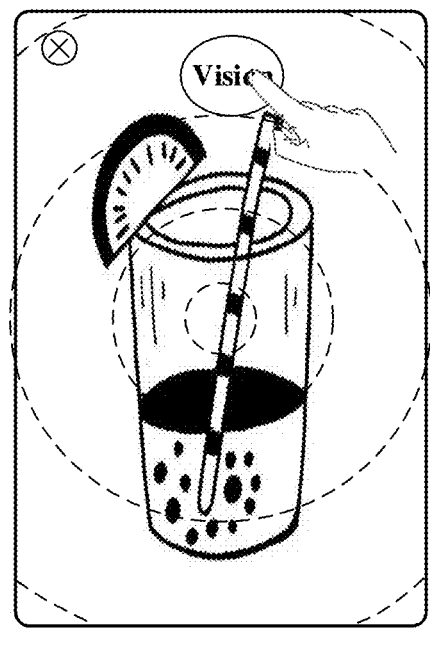
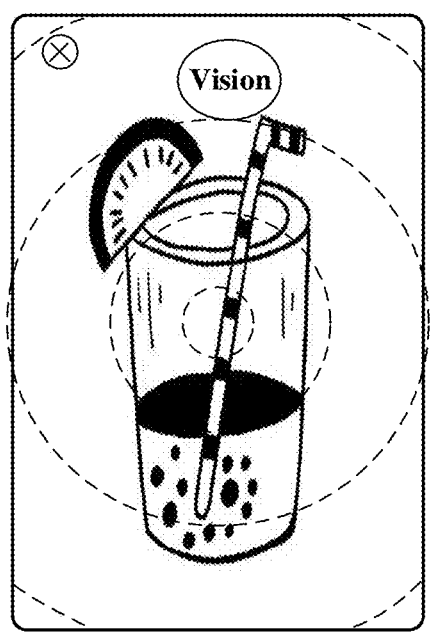
FIG. 11D    FIG. 11C

Multi-device scenario 100A

Mobile phone 111

>Video name: XXX    901

900

Television 113

Mobile phone 111

Mobile phone 111

4100

Mobile phone 111

Mobile phone 111

Mobile phone 111

Mobile phone 111

(a)

(b)

3800

4010a

4011e

4210

4524

4821

4821

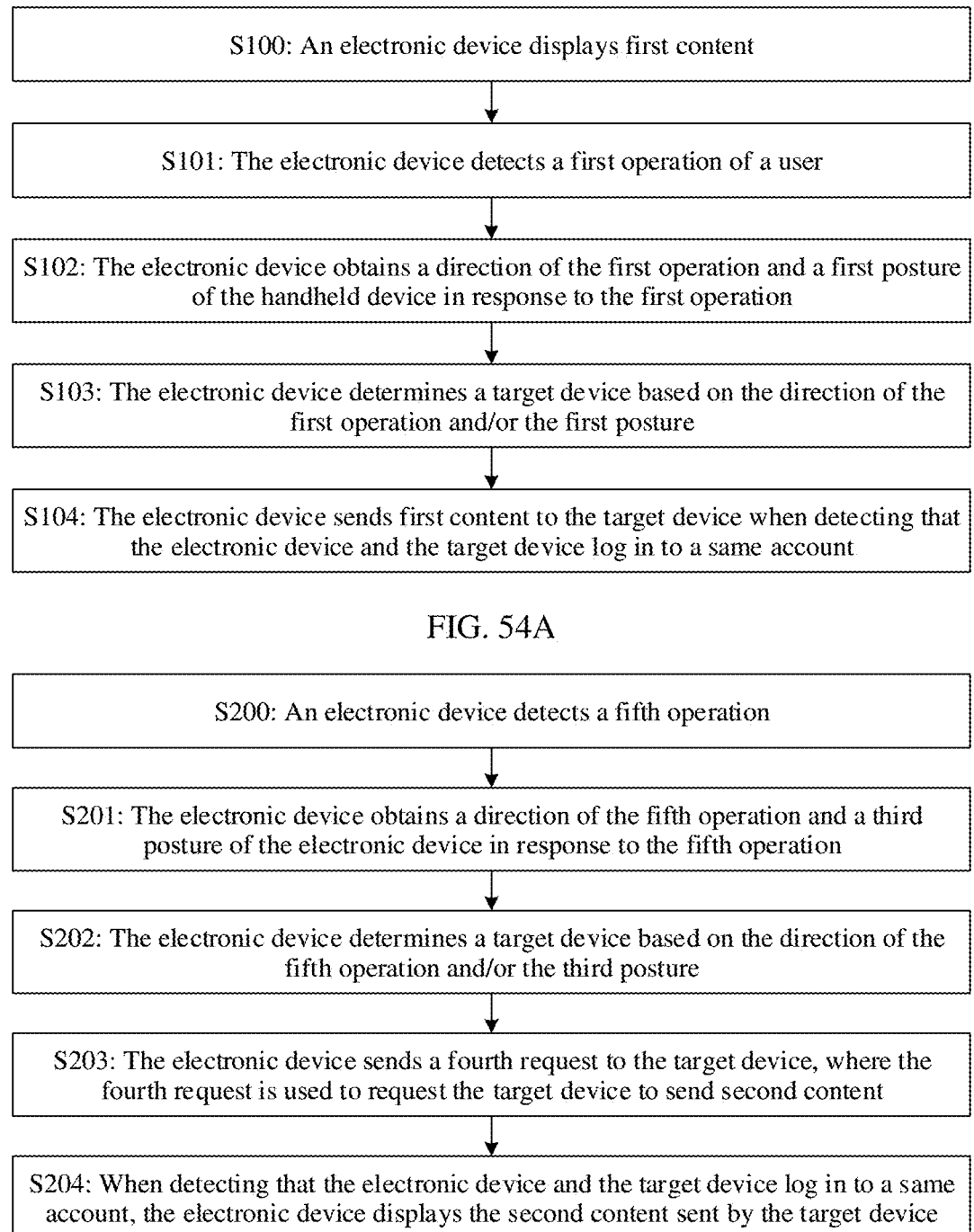

S100: An electronic device displays first content

S101: The electronic device detects a first operation of a user

S102: The electronic device obtains a direction of the first operation and a first posture of the handheld device in response to the first operation S103: The electronic device determines a target device based on the direction of the first operation and/or the first posture S104: The electronic device sends first content to the target device when detecting that the electronic device and the target device log in to a same account

FIG. 54A

S200: An electronic device detects a fifth operation

S201: The electronic device obtains a direction of the fifth operation and a third posture of the electronic device in response to the fifth operation S202: The electronic device determines a target device based on the direction of the fifth operation and/or the third posture S203: The electronic device sends a fourth request to the target device, where the fourth request is used to request the target device to send second content S204: When detecting that the electronic device and the target device log in to a same account, the electronic device displays the second content sent by the target device

FIG. 54B

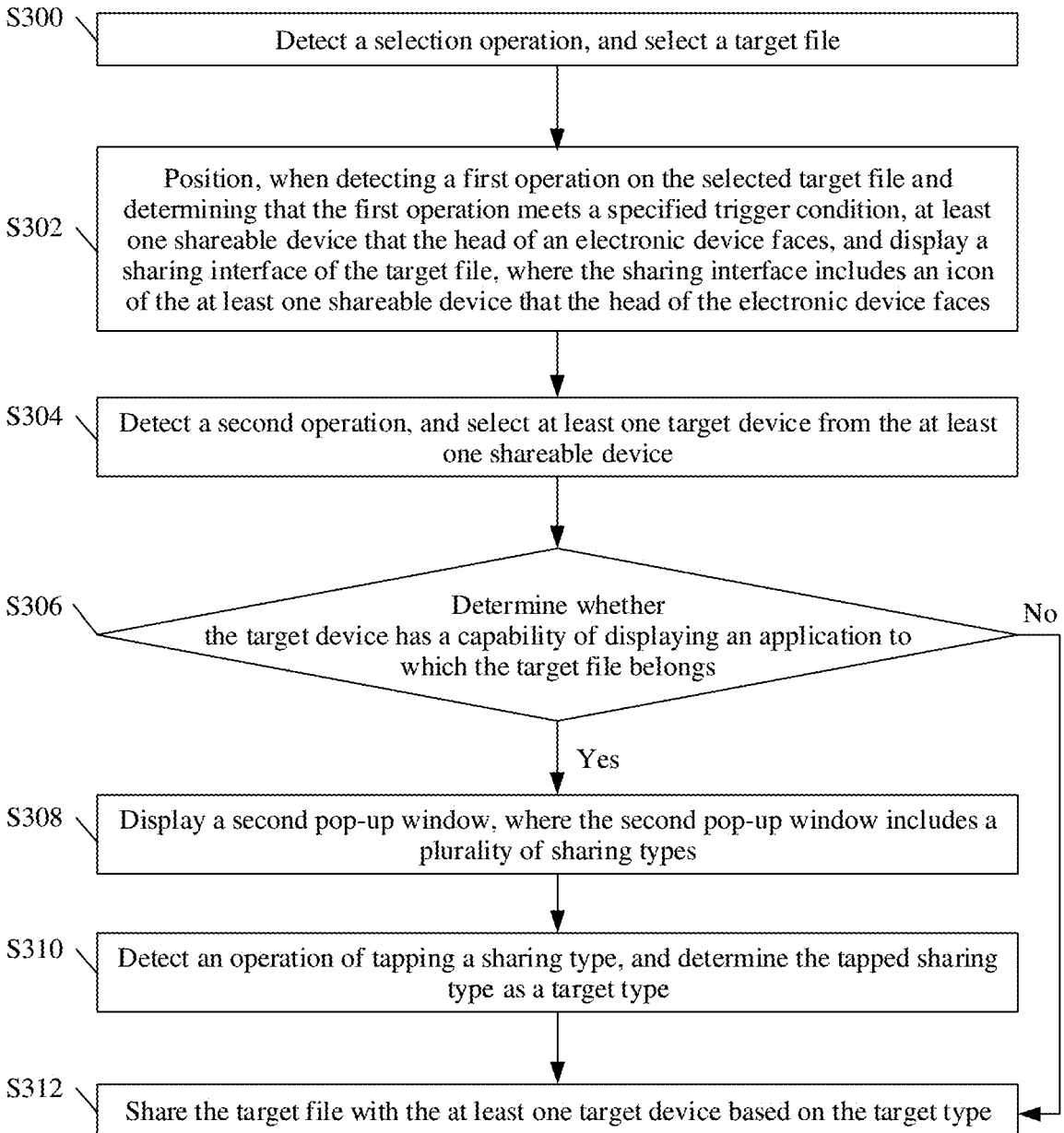

S300 Detect a selection operation, and select a target file

S302 Position, when detecting a first operation on the selected target file and determining that the first operation meets a specified trigger condition, at least one shareable device that the head of an electronic device faces, and display a sharing interface of the target file, where the sharing interface includes an icon of the at least one shareable device that the head of the electronic device faces S304 Detect a second operation, and select at least one target device from the at least one shareable device S306 Determine whether the target device has a capability of displaying an application to which the target file belongs No Yes S308 Display a second pop-up window, where the second pop-up window includes a plurality of sharing types S310 Detect an operation of tapping a sharing type, and determine the tapped sharing type as a target type S312 Share the target file with the at least one target device based on the target type

FIG. 54C

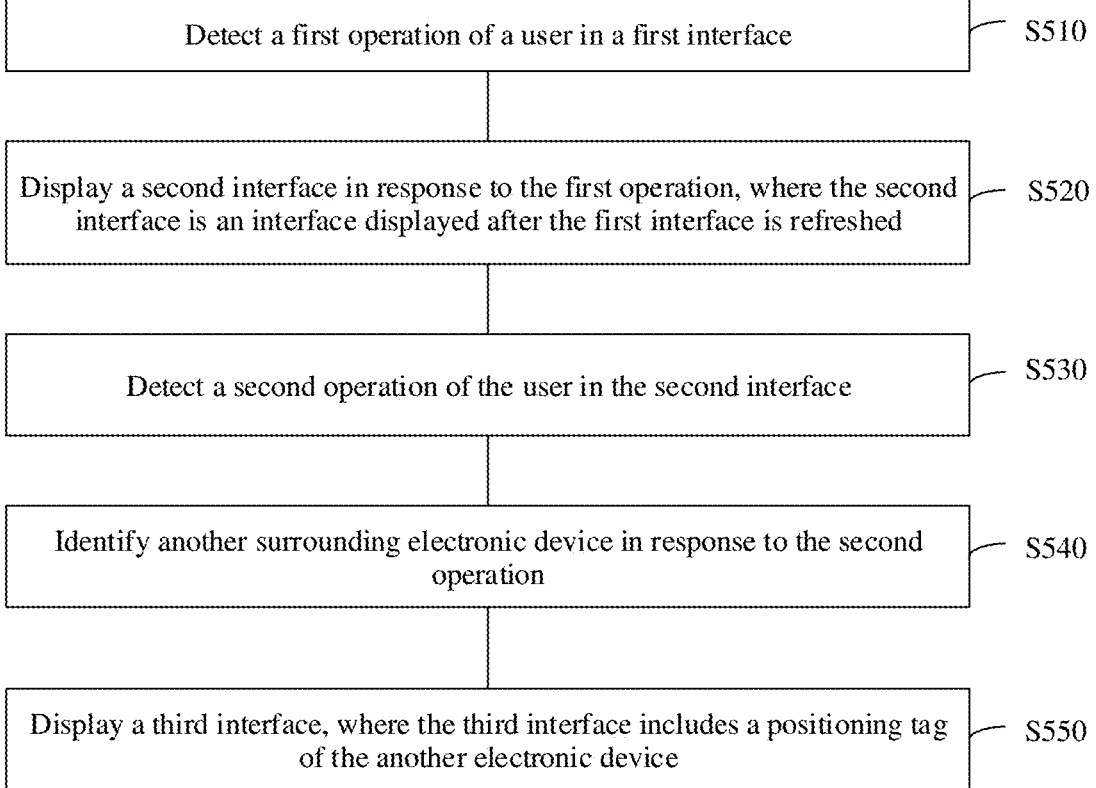

Detect a first operation of a user in a first interface ⸺ S510

Display a second interface in response to the first operation, where the second interface is an interface displayed after the first interface is refreshed ⸺ S520

Detect a second operation of the user in the second interface ⸺ S530

Identify another surrounding electronic device in response to the second operation ⸺ S540

Display a third interface, where the third interface includes a positioning tag of the another electronic device ⸺ S550

FIG. 54F

CONTROL METHOD APPLIED TO ELECTRONIC DEVICE AND ELECTRONIC DEVICE

CROSS-REFERENCE TO RELATED APPLICATIONS

This application is a national stage of International Application No. PCT/CN2021/095855, filed on May 25, 2021, which claims priority to Chinese Patent Application No. 202011174741.3, filed on Oct. 29, 2020, and Chinese Patent No. Application No. 202010780353.3, filed on Aug. 5, 2020, and Chinese Patent Application No. 202010780257.9, filed on Aug. 5, 2020, and Chinese Patent Application No. 202010779662.9, filed on Aug. 5, 2020, and Chinese Patent Application No. 202010779814.5, filed on Aug. 5, 2020, and Chinese Patent Application No. 202010458414.4, filed on May 27, 2020. All of the aforementioned applications are hereby incorporated by reference in their entireties.

TECHNICAL FIELD

This application relates to the field of electronic technologies, and in particular, to a control method applied to an electronic device and an electronic device.

BACKGROUND

With continuous development of internet technologies, increasingly more electronic devices may interact with other electronic devices (for example, data transmission, control, and projection). For example, content on a mobile phone can be projected onto a smart television. An audio in the mobile phone can be sent to a smart speaker for playback. A file on the mobile phone can be transferred to another mobile phone or another electronic device such as a tablet computer or a computer. Usually, when an electronic device A interacts with an electronic device B, a user needs to perform an operation on the electronic device A to establish a connection between the electronic device A and the electronic device B. Then, the user finds, in the electronic device A, data that needs to be sent, and sends the data to the electronic device B. In this process, the user operation is complex.

Therefore, how to perform interaction between electronic devices more conveniently is a problem to be urgently resolved.

SUMMARY

Embodiments of this application provide a control method applied to an electronic device. According to the method, a user can control, based on an operation of pushing the electronic device toward a target, the electronic device to send first content to the target device. Alternatively, the user obtains, based on an operation of pulling the electronic device in a direction away from the target device, first information and/or a first control instruction of a task being executed by the target device. In this way, based on the simple user operation, the electronic device and the target device can conveniently interact with each other.

According to a first aspect, a control method applied to an electronic device is provided. The method may include: The electronic device displays first content; detects a first operation of a user; obtains a direction of the first operation and a first posture of the electronic device in response to the first operation; determines a target device based on the direction of the first operation and/or the first posture; and sends the first content to the target device when detecting that the electronic device and the target device log in to a same account.

The first content may include any one of a picture, a video, an audio, a text, a food preparation parameter, and a motion parameter.

The first operation is moving the electronic device in the first posture in a direction close to the target device, and the first posture is that the top of the electronic device is upward and a display of the electronic device faces the target device. The direction of the first operation is a direction in which a center of gravity of the electronic device moves during the first operation, or a direction in which a user gesture moves during the first operation.

According to the method provided in this embodiment of this application, the user can control, based on the first operation, the electronic device to send data to the target device. For example, the user can send, based on an operation of pushing a mobile phone toward a television, a video played in the mobile phone to the television. In this way, the user can watch the video through the television. Therefore, the user operation is simple, and user experience can be improved.

With reference to the first aspect, in a possible implementation, after the step of determining a target device based on the direction of the first operation and/or the first posture, the method further includes: The electronic device sends a first request to the target device when detecting that the electronic device and the target device do not log in to a same account, where the first request is used to request the target device to receive first content; receives a first response, where the first response is used to indicate the electronic device to send the first content; and sends the first content to the target device. When the electronic device and the target device do not log in to the same account, the electronic device needs to first send a request to the target device. This can avoid impact on normal task execution of the target device.

With reference to the first aspect, in a possible implementation, the determining a target device based on the direction of the first operation and/or the first posture specifically includes: sending a second request to one or more intelligent devices, where the second request is used to indicate the one or more intelligent devices to send location information to the electronic device; and determining a first intelligent device as the target device based on the location information sent by the one or more intelligent devices, where a location of the first intelligent device is in the direction of the first operation, and the first intelligent device includes one or more intelligent devices in the one or more intelligent devices. In this way, the electronic device may obtain an intelligent device in the direction of the first operation through calculation based on the location information of the plurality of intelligent devices, to determine the target device with which the user expects the electronic device to exchange data.

Optionally, the determining a target device based on the direction of the first operation and/or the first posture specifically includes: sending a third request to a positioning server, where the third request is used to indicate the positioning server to send location information of one or more intelligent devices, and the positioning server is configured to store the location information of the one or more intelligent devices; and determining a first intelligent device as the target device based on the location information of the one or more intelligent devices, where a location of the first intelligent device is in the direction of the first operation, and the first intelligent device includes one or more intelligent devices in the one or more intelligent devices. In this way, when the intelligent device does not have a positioning function, the electronic device can also obtain the location information of the intelligent device. In addition, the electronic device may obtain an intelligent device in the direction of the first operation through calculation based on the location information of the plurality of intelligent devices, to determine the target device with which the user expects the electronic device to exchange data.

With reference to the first aspect, in a possible implementation, the determining a first intelligent device as the target device based on the location information sent by the one or more intelligent devices specifically includes: displaying a first list in a first user interface when the first intelligent device includes a plurality of intelligent devices, where the first list is used to display icons of the plurality of intelligent devices; and in response to a second operation of the user, determining, as the target device, an intelligent device that is in the first intelligent device and whose icon is selected from the first list based on the second operation. In this way, the electronic device may determine the target device based on the user operation.

Optionally, the determining a first intelligent device as the target device based on the location information sent by the one or more intelligent devices specifically includes: When the first intelligent device includes a plurality of intelligent devices, the electronic device uses, as the target device, an intelligent device that is in the first intelligent device and that is closest to the electronic device.

With reference to the first aspect, in a possible implementation, an arrangement sequence of the icons that are of the plurality of intelligent devices and that are displayed in the first list is determined based on distances between the electronic device and the plurality of intelligent devices.

With reference to the first aspect, in a possible implementation, after the determining, as the target device, an intelligent device that is in the first intelligent device and whose icon is selected from the first list based on the second operation, the method further includes: performing a first preset action, where the first preset action includes one or more of vibration, ringing, or displaying a prompt box in a user interface. In this way, the user can learn, by using a prompt, that the electronic device has determined the target device.

According to a second aspect, a control method applied to an electronic device is provided. The method includes: detecting a fifth operation; obtaining a direction of the fifth operation and a third posture of the electronic device in response to the fifth operation; determining a target device based on the direction of the fifth operation and/or the third posture; sending a fourth request to the target device, where the fourth request is used to request the target device to send second content; and when detecting that the electronic device and the target device log in to a same account, displaying the second content sent by the target device.

The fifth operation is moving the electronic device in the third posture in a direction away from the target device, and the direction of the fifth operation is the direction away from the target device.

According to the method provided in this embodiment of this application, a user can control, based on the fifth operation, the electronic device to obtain the second content from the target device. For example, the user may pull a mobile phone in a direction away from a television. Then, in response to the user operation, the mobile phone detects that the mobile phone and the television log in to a same account.

In this way, the mobile phone can obtain second content sent by the television. If the television is playing a television, the second content may include a name, a cast list, and a download address of the television series played by the television, and an instruction for controlling the television series to stop playback, pause playback, start playback, adjust volume, and the like. In this way, the user operation is simple, and user experience can be improved.

With reference to the second aspect, in a possible implementation, after the step of sending a fourth request to the target device, the method further includes: When detecting that the electronic device and the target device do not log in to a same account, the electronic device displays third content sent by the target device, where the third content is different from the second content.

The second content includes first information of a first task currently being executed by the target device and/or a first control instruction of the first task, and the third content is used to indicate a current working status of the target device.

In this way, when the electronic device and the target device do not log in to the same account, the user can obtain only the working status of the target device, for example, busy or idle.

With reference to the second aspect, in a possible implementation, when the first task is playing a first audio, the first information includes one or more of a name, singer information, a download link, and lyrics of the first audio, and the first control instruction includes one or more of a pause instruction, a stop instruction, a play instruction, and a next instruction.

Optionally, when the first task is preparing first food, the first information includes one or more of a preparation process, preparation duration, a preparation temperature, and preparation humidity of the first food, and the first control instruction includes one or more of a pause instruction, a stop instruction, a start instruction, a preparation duration adjustment instruction, a preparation temperature adjustment instruction, and a preparation humidity adjustment instruction.

Optionally, when the first task is playing a first video, the first information includes one or more of a name, actor information, a download link, and an episode quantity of the first video, and the first control instruction includes one or more of a pause instruction, a stop instruction, a play instruction, and a next-episode instruction.

With reference to the second aspect, in a possible implementation, the determining a target device based on the direction of the fifth operation and/or the third posture specifically includes: sending a fifth request to one or more intelligent devices, where the fifth request is used to indicate the one or more intelligent devices to send location information to the electronic device; and determining a first intelligent device as the target device based on the location information sent by the one or more intelligent devices, where a location of the first intelligent device is in the direction of the fifth operation, and the first intelligent device includes one or more intelligent devices in the one or more intelligent devices. In this way, the electronic device may obtain an intelligent device in the direction of the first operation through calculation based on the location information of the plurality of intelligent devices, to determine the target device with which the user expects the electronic device to exchange data.

With reference to the second aspect, in a possible implementation, the determining a target device based on the direction of the fifth operation and/or the third posture specifically includes: sending a sixth request to a positioning server, where the sixth request is used to indicate the positioning server to send location information of one or more intelligent devices, and the positioning server is configured to store the location information of the one or more intelligent devices; and determining a first intelligent device as the target device based on the location information of the one or more intelligent devices, where a location of the first intelligent device is in the direction of the fifth operation, and the first intelligent device includes one or more intelligent devices in the one or more intelligent devices. In this way, when the intelligent device does not have a positioning function, the electronic device can also obtain the location information of the intelligent device. In addition, the electronic device may obtain an intelligent device in the direction of the first operation through calculation based on the location information of the plurality of intelligent devices, to determine the target device with which the user expects the electronic device to exchange data.

With reference to the second aspect, in a possible implementation, the determining a first intelligent device as the target device based on the location information sent by the one or more intelligent devices specifically includes: displaying a first list in a first user interface when the first intelligent device includes a plurality of intelligent devices, where the first list is used to display icons of the plurality of intelligent devices; and in response to a sixth operation of the user, determining, as the target device, an intelligent device that is in the first intelligent device and whose icon is selected from the first list based on the sixth operation. In this way, the electronic device may determine the target device based on the user operation.

Optionally, the determining a first intelligent device as the target device based on the location information sent by the one or more intelligent devices specifically includes: When the first intelligent device includes a plurality of intelligent devices, the electronic device uses, as the target device, an intelligent device that is in the first intelligent device and that is closest to the electronic device.

With reference to the second aspect, in a possible implementation, an arrangement sequence of the icons that are of the plurality of intelligent devices and that are displayed in the first list is determined based on distances between the electronic device and the plurality of intelligent devices.

With reference to the second aspect, in a possible implementation, after the determining, as the target device, an intelligent device that is in the first intelligent device and whose icon is selected from the first list based on the sixth operation, the method further includes: performing a first preset action, where the first preset action includes one or more of vibration, ringing, or displaying a prompt box in a user interface.

According to a third aspect, an electronic device is provided, and includes a memory and one or more processors. The memory is configured to store computer instructions, and when the computer instructions are executed by the one or more processors, the electronic device is enabled to perform the following steps: displaying first content; detecting a first operation of a user; obtaining a direction of the first operation and a first posture of the electronic device in response to the first operation; determining a target device based on the direction of the first operation and/or the first posture; and sending the first content to the target device when detecting that the electronic device and the target device log in to a same account.

With reference to the third aspect, in a possible implementation, after the step of determining a target device based on the direction of the first operation and/or the first posture, the electronic device further performs the following steps: sending a first request to the target device when detecting that the electronic device and the target device do not log in to a same account, where the first request is used to request the target device to receive first content; receiving a first response, where the first response is used to indicate the electronic device to send the first content; and sending the first content to the target device.

With reference to the third aspect, in a possible implementation, the direction of the first operation is a direction in which a center of gravity of the electronic device moves during the first operation, or a direction in which a user gesture moves during the first operation.

With reference to the third aspect, in a possible implementation, in the step of determining a target device based on the direction of the first operation and/or the first posture, the electronic device specifically performs the following steps: sending a second request to one or more intelligent devices, where the second request is used to indicate the one or more intelligent devices to send location information to the electronic device; and determining a first intelligent device as the target device based on the location information sent by the one or more intelligent devices, where a location of the first intelligent device is in the direction of the first operation, and the first intelligent device includes one or more intelligent devices in the one or more intelligent devices.

With reference to the third aspect, in a possible implementation, in the step of determining a target device based on the direction of the first operation and/or the first posture, the electronic device specifically performs the following steps: sending a third request to a positioning server, where the third request is used to indicate the positioning server to send location information of one or more intelligent devices, and the positioning server is configured to store the location information of the one or more intelligent devices; and determining a first intelligent device as the target device based on the location information of the one or more intelligent devices, where a location of the first intelligent device is in the direction of the first operation, and the first intelligent device includes one or more intelligent devices in the one or more intelligent devices.

With reference to the third aspect, in a possible implementation, in the step of determining a first intelligent device as the target device based on the location information sent by the one or more intelligent devices, the electronic device specifically performs the following steps: displaying a first list in a first user interface when the first intelligent device includes a plurality of intelligent devices, where the first list is used to display icons of the plurality of intelligent devices; and in response to a second operation of the user, determining, as the target device, an intelligent device that is in the first intelligent device and whose icon is selected from the first list based on the second operation.

With reference to the third aspect, in a possible implementation, an arrangement sequence of the icons that are of the plurality of intelligent devices and that are displayed in the first list is determined based on distances between the electronic device and the plurality of intelligent devices.

With reference to the third aspect, in a possible implementation, after determining, as the target device, the intelligent device that is in the first intelligent device and whose icon is selected from the first list based on the second operation, the electronic device further performs a first preset action, where the first preset action includes one or more of vibration, ringing, or displaying a prompt box in a user interface.

With reference to the third aspect, in a possible implementation, the first operation is moving the electronic device in the first posture in a direction close to the target device, and the first posture is that the top of the electronic device is upward and a display of the electronic device faces the target device.

With reference to the third aspect, in a possible implementation, the first operation includes a third operation and a fourth operation; in the step of detecting a first operation of a user, the electronic device specifically performs the following step: detecting a third operation of the user; in the step of obtaining a direction of the first operation and a first posture of the electronic device in response to the first operation, the electronic device specifically performs the following step: obtaining a direction of the third operation and the first posture of the electronic device in response to the third operation; in the step of determining a target device based on the direction of the first operation and/or the first posture, the electronic device specifically performs the following step: determining the target device based on the direction of the third operation and/or the first posture; and in the step of sending the first content to the target device when detecting that the electronic device and the target device log in to a same account, the electronic device specifically performs the following steps: obtaining the fourth operation, where the fourth operation is changing the electronic device from the first posture to a second posture; and in response to the fourth operation, sending the first content to the target device when detecting that the electronic device and the target device log in to the same account.

With reference to the third aspect, in a possible implementation, the third operation is moving the electronic device in the first posture in a direction close to the target device, and the first posture is that the top of the electronic device faces the target device; and the fourth operation is changing the first posture of the electronic device to the second posture, and the second posture is that the top of the electronic device is upward and a display of the electronic device faces the target device.

Beneficial effects in the third aspect are the same as the beneficial effects described in the first aspect. Details are not described again.

According to a fourth aspect, an electronic device is provided, and includes a memory and one or more processors. The memory is configured to store computer instructions, and when the computer instructions are executed by the one or more processors, the electronic device is enabled to perform the following steps: detecting a fifth operation; obtaining a direction of the fifth operation and a third posture of the electronic device in response to the fifth operation; determining a target device based on the direction of the fifth operation and/or the third posture; sending a fourth request to the target device, where the fourth request is used to request the target device to send second content; when detecting that the electronic device and the target device log in to a same account, displaying the second content sent by the target device.

With reference to the fourth aspect, in a possible implementation, after the step of sending a fourth request to the target device, the electronic device further performs the following step: when detecting that the electronic device and the target device do not log in to a same account, displaying third content sent by the target device, where the third content is different from the second content.

With reference to the fourth aspect, in a possible implementation, the second content includes first information of a first task currently being executed by the target device and/or a first control instruction of the first task, and the third content is used to indicate a current working status of the target device.

With reference to the fourth aspect, in a possible implementation, when the first task is playing a first audio, the first information includes one or more of a name, singer information, a download link, and lyrics of the first audio, and the first control instruction includes one or more of a pause instruction, a stop instruction, a play instruction, and a next instruction; or when the first task is preparing first food, the first information includes one or more of a preparation process, preparation duration, a preparation temperature, and preparation humidity of the first food, and the first control instruction includes one or more of a pause instruction, a stop instruction, a start instruction, a preparation duration adjustment instruction, a preparation temperature adjustment instruction, and a preparation humidity adjustment instruction.

With reference to the fourth aspect, in a possible implementation, the fifth operation is moving the electronic device in the third posture in a direction away from the target device, and the direction of the fifth operation is the direction away from the target device.

With reference to the fourth aspect, in a possible implementation, in the step of determining a target device based on the direction of the fifth operation and/or the third posture, the electronic device specifically performs the following steps: sending a fifth request to one or more intelligent devices, where the fifth request is used to indicate the one or more intelligent devices to send location information to the electronic device; and determining a first intelligent device as the target device based on the location information sent by the one or more intelligent devices, where a location of the first intelligent device is in the direction of the fifth operation, and the first intelligent device includes one or more intelligent devices in the one or more intelligent devices.

With reference to the fourth aspect, in a possible implementation, in the step of determining a target device based on the direction of the fifth operation and/or the third posture, the electronic device specifically performs the following steps: sending a sixth request to a positioning server, where the sixth request is used to indicate the positioning server to send location information of one or more intelligent devices, and the positioning server is configured to store the location information of the one or more intelligent devices; and determining a first intelligent device as the target device based on the location information of the one or more intelligent devices, where a location of the first intelligent device is in the direction of the fifth operation, and the first intelligent device includes one or more intelligent devices in the one or more intelligent devices.

With reference to the fourth aspect, in a possible implementation, in the step of determining a first intelligent device as the target device based on the location information sent by the one or more intelligent devices, the electronic device specifically performs the following steps: displaying a first list in a first user interface when the first intelligent device includes a plurality of intelligent devices, where the first list is used to display icons of the plurality of intelligent devices; and in response to a sixth operation of the user, determining, as the target device, an intelligent device that is in the first intelligent device and whose icon is selected from the first list based on the sixth operation.

With reference to the fourth aspect, in a possible implementation, an arrangement sequence of the icons that are of the plurality of intelligent devices and that are displayed in the first list is determined based on distances between the electronic device and the plurality of intelligent devices.

With reference to the fourth aspect, in a possible implementation, after determining, as the target device, the intelligent device that is in the first intelligent device and whose icon is selected from the first list based on the sixth operation, the electronic device further performs a first preset action, where the first preset action includes one or more of vibration, ringing, or displaying a prompt box in a user interface.

Beneficial effects in the fourth aspect are the same as the beneficial effects described in the second aspect. Details are not described again.

According to a fifth aspect, a computer-readable storage medium is provided, and includes instructions. When the instructions are run on an electronic device, the electronic device is enabled to perform the method according to any possible implementation of the first aspect and the method according to any possible implementation of the second aspect.

According to a sixth aspect, a computer product is provided. When the computer program product runs on a computer, the computer is enabled to perform the method according to any possible implementation of the first aspect and the method according to any possible implementation of the second aspect.

According to a seventh aspect, an embodiment of the present invention provides a target file sharing method, including:

positioning, when detecting a first operation on a selected target file and determining that the first operation meets a specified trigger condition, at least one shareable device that the head of the electronic device faces, and displaying a sharing interface of the target file, where the sharing interface includes an icon of the at least one shareable device that the head of the electronic device faces;

detecting a second operation, and selecting at least one target device from the at least one shareable device; and sharing the target file with the at least one target device based on a determined target type. In a possible implementation, the first operation includes a first slide operation and a first press operation, and the trigger condition includes a first trigger condition corresponding to the first slide operation and a second trigger condition corresponding to the first press operation.

The first trigger condition includes that sliding is performed in a specified display area, and a sliding direction includes a first specified direction.

The second trigger condition includes that press duration is greater than or equal to first specified duration.

In a possible implementation, the first operation includes a second slide operation, and the trigger condition includes a third trigger condition corresponding to the second slide operation.

The third trigger condition includes that sliding is performed in a specified display area, a sliding direction includes a second specified direction, and a sliding distance is greater than or equal to a specified distance.

In a possible implementation, the first operation includes a second press operation, and the trigger condition includes a fourth trigger condition corresponding to the second press operation.

The fourth trigger condition includes that a multi-finger press operation is performed, and press duration is greater than or equal to second specified duration.

In a possible implementation, before the positioning, when detecting a first operation on a selected target file and determining that the first operation meets a specified trigger condition, at least one shareable device that the head of the electronic device faces, the method further includes:

detecting a selection operation, and selecting the target file, where the selection operation includes an operation of tapping the target file.

In a possible implementation, the second operation includes an operation of dragging the target file to an icon of the target device.

In a possible implementation, the second operation includes an operation of dragging the target file in a direction in which the icon of the target device is located and then releasing the target file, so that the target file is moved to the icon of the target device.

In a possible implementation, the second operation includes an operation of releasing the first operation and tapping icons of one or more shareable devices.

In a possible implementation, the second operation includes an operation of dragging the target file in a direction in which the icon of the target device is located and then releasing the target file, and tapping a device name and/or an icon of the at least one shareable device from device names and/or icons of a plurality of shareable devices.

The detecting a second operation, and selecting at least one target device from the at least one shareable device includes:

when there are a plurality of shareable devices, detecting an operation of dragging the target file in a direction in which the icon of the target device is located and then releasing the target file, and displaying a first pop-up window, where the first pop-up window includes device names and/or icons of a plurality of shareable devices; and detecting an operation of tapping a device name and/or an icon of the at least one shareable device from device names of the plurality of shareable devices, and determining, as the at least one target device, the at least one shareable device identified by the tapped device name and/or the tapped icon of the at least one shareable device.

In a possible implementation, the second operation includes an operation of releasing the first operation and tapping icons of one or more shareable devices.

The detecting a second operation, and selecting at least one target device from the at least one shareable device includes:

detecting an operation of releasing the first operation, and displaying an icon of a shareable device that the head of the electronic device faces; and detecting an operation of tapping icons of one or more shareable devices, and determining, as the target device, a shareable device identified by a tapped icon of the shareable device.

In a possible implementation, before the sharing the target file with the at least one target device based on a determined target type, the method further includes:

determining whether the target device has a capability of displaying an application to which the target file belongs;

if it is determined that the target device has the capability of displaying the application to which the target file belongs, displaying a second pop-up window, where the second pop-up window includes a plurality of sharing types; and detecting an operation of tapping a sharing type, and determining the tapped sharing type as the target type.

In a possible implementation, the plurality of sharing types include an application type and a file type.

In a possible implementation, the method further includes:

if it is determined that the target device does not have the capability of displaying the application to which the target file belongs, determining the file type as the target type.

In a possible implementation, the icon of the shareable device has different shapes, the icon of the shareable device includes a plurality of sub-icons, each sub-icon corresponds to one sharing type, different sub-icons have different patterns, and the different patterns represent different sharing types.

In a possible implementation, the target file includes a picture, a video, an audio, a web page, a text, or a file.

According to an eighth aspect, an embodiment of the present invention provides an electronic device. The device includes:

a display, one or more processors, a memory, a plurality of applications, and one or more computer programs, where the one or more computer programs are stored in the memory, the one or more computer programs include instructions, and when the instructions are executed by the device, the device is enabled to perform the following steps:

positioning, when detecting a first operation on a selected target file and determining that the first operation meets a specified trigger condition, at least one shareable device that the head of the electronic device faces, and displaying a sharing interface of the target file, where the sharing interface includes an icon of the at least one shareable device that the head of the electronic device faces;

detecting a second operation, and selecting at least one target device from the at least one shareable device; and sharing the target file with the at least one target device based on a determined target type. In an optional implementation, when the instructions are executed by the device, the device is enabled to specifically perform the following steps:

detecting a selection operation, and selecting the target file, where the selection operation includes an operation of tapping the target file.

In an optional implementation, the second operation includes an operation of dragging the target file in a direction in which an icon of the target device is located and then releasing the target file, and tapping a device name and/or an icon of the at least one shareable device from device names and/or icons of a plurality of shareable devices. When the instructions are executed by the device, the device is enabled to specifically perform the following steps:

when there are a plurality of shareable devices, detecting an operation of dragging the target file in a direction in which the icon of the target device is located and then releasing the target file, and displaying a first pop-up window, where the first pop-up window includes device names and/or icons of a plurality of shareable devices; and detecting an operation of tapping a device name and/or an icon of the at least one shareable device from device names of the plurality of shareable devices, and determining, as the at least one target device, the at least one shareable device identified by the tapped device name and/or the tapped icon of the at least one shareable device.

In an optional implementation, the second operation includes an operation of releasing the first operation and tapping icons of one or more shareable devices. When the instructions are executed by the device, the device is enabled to specifically perform the following steps:

detecting an operation of releasing the first operation, and displaying an icon of a shareable device that the head of the electronic device faces; and detecting an operation of tapping icons of one or more shareable devices, and determining, as the target device, a shareable device identified by a tapped icon of the shareable device.

In an optional implementation, when the instructions are executed by the device, the device is enabled to specifically perform the following steps:

determining whether the target device has a capability of displaying an application to which the target file belongs;

if it is determined that the target device has the capability of displaying the application to which the target file belongs, displaying a second pop-up window, where the second pop-up window includes a plurality of sharing types; and detecting an operation of tapping a sharing type, and determining the tapped sharing type as the target type.

In an optional implementation, the plurality of sharing types include an application type and a file type. When the instructions are executed by the device, the device is enabled to specifically perform the following step:

When the instructions are executed by the device, the device is enabled to specifically perform the following step:

if it is determined that the target device does not have the capability of displaying the application to which the target file belongs, determining the file type as the target type.

According to a ninth aspect, an embodiment of the present invention provides a computer-readable storage medium. The computer-readable storage medium stores program code to be executed by a device. The program code includes instructions for performing the method according to any one of the seventh aspect or the possible implementations of the seventh aspect.

According to a tenth aspect, a smart home device control method is provided. The method is applied to a portable device, and the method includes: The portable device determines a first smart home device, where the first smart home device is a smart home device on which a user has an operation intention. The portable device sets a control object of a button of the portable device as the first smart home device. The portable device controls, in response to a first operation performed by the user on the button of the portable device, the first smart home device to make a first response.

According to the antenna provided in the first aspect, when determining the operation intention of the user, that is, when determining the smart home device that expects to be controlled by the user, the portable device may switch the control object of the button of the portable device to the smart home device, to directly control the smart home device based on the operation on the button of the portable device. According to the method, a problem of poor user experience caused by a complex and time-consuming control process of the smart home device in the conventional technology can be resolved.

In a possible implementation, that the portable device determines a first smart home device includes: When the portable device detects that a moving track of the portable device meets a preset moving track, and/or the portable device moves to a preset spatial posture, the portable device determines, based on relative locations that are between the smart home device and one or more smart home devices and that are detected by the portable device, that a smart home device to which the portable device points is the first smart home device. This solution supports detection of the moving track and/or the spatial posture of the portable device, to determine whether the user has an intention of controlling the smart home device.

In a possible implementation, the smart home device to which the portable device points is a smart home device through which a perpendicular line of a plane on which the portable device is located passes; or the smart home device to which the portable device points is a smart home device through which an extension line in a long side direction of the portable device passes. The smart home device through which the perpendicular line of the plane on which the portable device is located passes or the smart home device through which the extension line in the long side direction of the portable device passes is detected, to determine the smart home device on which the user has the operation intention.

In a possible implementation, the portable device detects, by using a Bluetooth module or an ultra-wideband UWB module, the relative locations between the smart home device and the one or more smart home devices around the portable device.

In a possible implementation, the portable device measures motion data of the portable device by using one or more motion sensors, to obtain a moving track or a spatial posture of the portable device.

In a possible implementation, that the portable device determines a first smart home device includes: The portable device determines the first smart home device based on an operation of selecting a virtual "card" of the smart home device by the user in a smart home application interface. This solution supports detection of the selection operation performed by the user in the smart home application interface, to determine whether the user has an intention of controlling the smart home device.

In a possible implementation, the button of the portable device includes a physical button and/or a virtual button, and the physical button includes one or more of a power button, a volume up button, a volume down button, and a fingerprint button. This solution supports use of the physical button or the virtual button of the portable device to directly control the smart home device.

In a possible implementation, the first operation is a press operation performed by the user on a power button when the first smart home device is in an on state, and the first response is power-off; or the first operation is a press operation performed by the user on the power button when the first smart home device is in an off state, and the first response is power-on.

In a possible implementation, the first operation is a press operation performed by the user on the volume up button when the first smart home device is in an on state, and the first response is any one of the following: increasing a wind speed, increasing volume, increasing brightness, increasing a temperature, increasing a rotational speed, increasing intensity, ascending, or opening; or the first operation is a press operation performed by the user on the volume down button when the first smart home device is in an on state, and the first response is any one of the following: decreasing a wind speed, decreasing volume, decreasing brightness, decreasing a temperature, decreasing a rotational speed, decreasing intensity, descending, or closing.

In a possible implementation, the first operation is a press operation performed by the user on the fingerprint button when the first smart home device is in an on state, and the first response is verifying fingerprint information entered by the user by using the fingerprint button.

According to an eleventh aspect, a portable device is provided. The portable device includes: a processing unit, configured to: determine a first smart home device; and set a control object of a button of the portable device as the first smart home device, where the first smart home device is a smart home device on which a user has an operation intention; and a control unit, configured to control, in response to a first operation performed by the user on the button of the portable device, the first smart home device to make a first response.

According to the antenna provided in the eleventh aspect, when determining the operation intention of the user, that is, when determining the smart home device that expects to be controlled by the user, the portable device may switch the control object of the button of the portable device to the smart home device, to directly control the smart home device based on the operation on the button of the portable device. According to this solution, a problem of poor user experience caused by a complex and time-consuming control process of the smart home device in the conventional technology can be resolved.

In a possible implementation, that the processing unit determines a first smart home device specifically includes: When detecting that a moving track of the portable device meets a preset moving track, and/or the portable device moves to a preset spatial posture, the processing unit determines, based on detected relative locations between the smart home device and one or more smart home devices, that a smart home device to which the portable device points is the first smart home device. This solution supports detection of the moving track and/or the spatial posture of the portable device, to determine whether the user has an intention of controlling the smart home device.

In a possible implementation, the portable device further includes a sensor unit, configured to measure motion data of the portable device, to obtain a moving track or a spatial posture of the portable device; and the sensor unit includes one or more motion sensors.

In a possible implementation, the transceiver unit is further configured to detect signals from one or more smart home devices around the portable device, to obtain relative locations between the smart home device and the one or more smart home devices.

In a possible implementation, the transceiver unit includes a Bluetooth module and/or an ultra-wideband UWB module.

In a possible implementation, the portable device further includes a sensor unit, configured to receive a touch operation of the user; and the sensor unit includes a touch sensor. That the processing unit determines a first smart home device specifically includes: The processing unit determines the first smart home device based on an operation that is received by the sensor unit and that is of selecting a virtual "card" of the smart home device by the user in a smart home application interface. This solution supports detection of the selection operation performed by the user in the smart home application interface, to determine whether the user has an intention of controlling the smart home device.

In a possible implementation, the button of the portable device includes a physical button and/or a virtual button, and the physical button includes one or more of a power button, a volume up button, a volume down button, and a fingerprint button.

According to a twelfth aspect, a portable device is provided. The portable device includes: a memory, configured to store computer program code, where the computer program code includes instructions; a radio frequency circuit, configured to: send and receive a wireless signal; and a processor, configured to execute the instructions, so that the portable device determines a first smart home device; sets a control object of a button of the portable device as the first smart home device; and controls, in response to a first operation performed by a user on the button of the portable device, the first smart home device to make a first response, where the first smart home device is a smart home device on which the user has an operation intention.

According to the method provided in the twelfth aspect, when determining the operation intention of the user, that is, when determining the smart home device that expects to be controlled by the user, the portable device may switch the control object of the button of the portable device to the smart home device, to directly control the smart home device based on the operation on the button of the portable device. According to this solution, a problem of poor user experience caused by a complex and time-consuming control process of the smart home device in the conventional technology can be resolved.

In a possible implementation, that the processor determines a first smart home device specifically includes: The processor executes the instructions, so that when detecting that a moving track of the portable device meets a preset moving track, and/or the portable device moves to a preset spatial posture, the portable device determines, based on detected relative locations between the smart home device and one or more smart home devices, that a smart home device to which the portable device points is the first smart home device. This solution supports detection of the moving track and/or the spatial posture of the portable device, to determine whether the user has an intention of controlling the smart home device.

In a possible implementation, the portable device further includes one or more motion sensors, and the one or more motion sensors are configured to measure motion data of the portable device, to obtain a moving track or a spatial posture of the portable device.

In a possible implementation, the radio frequency circuit is further configured to detect signals from one or more smart home devices around the portable device, to obtain relative locations between the smart home device and the one or more smart home devices.

In a possible implementation, the radio frequency circuit includes a Bluetooth module and/or an ultra-wideband UWB module.

In a possible implementation, the portable device further includes a touch sensor, and the touch sensor is configured to receive a touch operation of the user. That the processor determines a first smart home device specifically includes: The processor executes the instructions, so that the portable device determines the first smart home device based on an operation that is received by the sensor unit and that is of selecting a virtual "card" of the smart home device by the user in a smart home application interface. This solution supports detection of the selection operation performed by the user in the smart home application interface, to determine whether the user has an intention of controlling the smart home device.

In a possible implementation, the button of the portable device includes a physical button and/or a virtual button, and the physical button includes one or more of a power button, a volume up button, a volume down button, and a fingerprint button.

According to a thirteenth aspect, a computer-readable storage medium is provided. The computer-readable storage medium stores computer executable instructions, and when the computer executable instructions are executed by a processor, the method according to any possible implementation of the tenth aspect is implemented.

According to a fourteenth aspect, a chip system is provided. The chip system includes a processor and a memory, and the memory stores instructions. When the instructions are executed by the processor, the method according to any possible implementation of the tenth aspect is implemented. The chip system may include a chip, or may include a chip and another discrete component.

According to a fifteenth aspect, a computer program product is provided. When the computer program product runs on a computer, the method according to any possible implementation of the tenth aspect is implemented.

According to a sixteenth aspect, a directional search interaction method is provided. The method is applied to an electronic device, and the method includes: The electronic device detects a first operation of a user in a first interface. The electronic device displays a first search interface in response to the first operation, where the first search interface includes a search box and first content, and the first content is related to content locally stored in the electronic device. The electronic device displays the first interface in response to a second operation of the user. The electronic device detects a third operation of the user in the first interface. In response to the third operation, the electronic device detects that a pointing direction of the electronic device includes a target electronic device, and obtains a status of the target device. The electronic device displays a second search interface based on the status of the target device, where the second search interface includes a search box and second content, and the second content is related to the status of the target device.

According to this embodiment of this application, when the electronic device determines that a device in the pointing direction of the electronic device is another electronic device, the electronic device displays a search interface in response to an operation of entering search content by the user, where a search result of the search interface is related to a status of the another electronic device. For example, when the user points the electronic device to a smart television for search, a search result that expects to be obtained by the user may be a video. Therefore, in this technical solution, the search result expected by the user can be obtained, to improve user experience.

With reference to the sixteenth aspect, in some implementations of the sixteenth aspect, the third operation is entering a keyword, and when the electronic device determines that the status of the another electronic device is playing first task content of the keyword, the second content includes a plurality of task content cards that are related to the first task content and that have priorities, where the plurality of task content cards are related to a capability of the target electronic device.

According to this embodiment of this application, when the another electronic device is playing the task content of the keyword entered by the user, the search interface may include the plurality of task content cards related to the content of the keyword, and the plurality of task content cards have the priorities, to facilitate user selection.

With reference to the sixteenth aspect, in some implementations of the sixteenth aspect, a first task content card in the plurality of task content cards is used to display the first task content.

According to this embodiment of this application, a first display result in the search result is the task content currently played by the another electronic device. This helps the user understand detailed information about the currently played task content, and perform episode selection playback and the like.

With reference to the sixteenth aspect, in some implementations of the sixteenth aspect, when the electronic device determines that the status of the target electronic device is an off state, the second content includes a control card of the target electronic device. The method further includes: The electronic device displays a third search interface after detecting an operation of tapping an on control in the control card by the user, where the third search interface includes a search box and a plurality of task content cards, and the plurality of task content cards are related to a capability of the target electronic device.

According to this embodiment of this application, the user controls the another electronic device in a current display interface of the electronic device, to improve cross-device control experience of the user.

With reference to the sixteenth aspect, in some implementations of the sixteenth aspect, when the electronic device determines that the status of the target electronic device is an on state and task content is not played, the second content includes a plurality of task content cards, and the plurality of task content cards are related to a capability of the target electronic device.

With reference to the sixteenth aspect, in some implementations of the sixteenth aspect, when the target electronic device is a smart television, the plurality of task content cards are video content cards; or when the target electronic device is a smart speaker, the plurality of task content cards are audio content cards.

With reference to the sixteenth aspect, in some implementations of the sixteenth aspect, the method further includes: When detecting that the user taps one of the plurality of task content cards, the electronic device pops up a prompt box that can be selected by the user for playback on a specified electronic device.

According to this embodiment of this application, the user may choose, based on a willingness, to play the task content on the electronic device or another electronic device.

According to a seventeenth aspect, a directional search interaction method is provided. The method is applied to an electronic device, and the method includes: The electronic device detects a first operation of a user in a first interface. The electronic device displays a second interface in response to the first operation, where the second interface is an interface displayed after the first interface is refreshed. The electronic device detects a second operation of the user in the second interface. The electronic device identifies another surrounding electronic device in response to the second operation.

operation. The electronic device displays a third interface, where the third interface includes a positioning tag of the another electronic device.

According to this embodiment of this application, in response to a user operation, the electronic device may identify a plurality of surrounding other electronic devices, and display positioning tags of the plurality of other electronic devices in an interface of the mobile phone, so that the user can control the plurality of electronic devices by using the positioning tags.

With reference to the seventeenth aspect, in some implementations of the seventeenth aspect, the second operation is that the user picks up the electronic device and holds the electronic device in a vertical state. That the electronic device displays a third interface includes: The electronic device invokes a camera to obtain the third interface displayed in an angle of view of the camera.

According to this embodiment of this application, when the user picks up the electronic device and holds the electronic device in the vertical state, the electronic device may open the camera, and obtain positioning tags of other electronic devices in the angle of view of the camera, so that the user can control the plurality of electronic devices by using the positioning tags.

With reference to the seventeenth aspect, in some implementations of the seventeenth aspect, the method further includes: The electronic device displays a fourth interface after detecting, in the third interface, an operation of tapping the positioning tag by the user, where the fourth interface includes a display interface card of an electronic device corresponding to the positioning tag, and content of the display interface card is consistent with content of a display of the electronic device corresponding to the positioning tag, or the display interface card is used to control the electronic device corresponding to the positioning tag.

According to this embodiment of this application, the user taps the positioning tag, so that the display interface card of the electronic device corresponding to the positioning tag can be displayed on the screen of the electronic device, to improve user experience.

With reference to the seventeenth aspect, in some implementations of the seventeenth aspect, the method further includes: The electronic device displays a fourth interface after detecting, in the third interface, an operation of tapping the positioning tag by the user, where the fourth interface includes a control card of an electronic device corresponding to the positioning tag. The electronic device displays a fifth interface after detecting an operation of tapping an on control in the control card by the user, where the fifth interface includes a display interface card of the electronic device corresponding to the positioning tag, and content of the display interface card is consistent with content of a display of the electronic device corresponding to the positioning tag, or the display interface card is used to control the electronic device corresponding to the positioning tag.

According to this embodiment of this application, the user can control another electronic device in a display interface of the electronic device, to improve cross-device control experience of the user.

With reference to the seventeenth aspect, in some implementations of the seventeenth aspect, the method further includes: The electronic device detects an operation of a preset gesture in the third interface. The electronic device determines, in response to the operation of the preset gesture, that a device in the pointing direction of the electronic device is a target electronic device. The electronic device displays a fourth interface, where the fourth interface includes a display interface card of the target electronic device, and content of the display interface card is consistent with content of a display of the target electronic device, or the display interface card is used to control the target electronic device.

According to this embodiment of this application, the user performs the preset gesture, so that a display interface card of another electronic device in the pointing direction of the electronic device can be displayed in the electronic device. Therefore, the electronic device and the another intelligent device simply and quickly interact with each other, to help improve user experience.

According to an eighteenth aspect, a directional search interaction method is provided. The method includes: An electronic device detects a first operation of a user in a first interface. The electronic device displays a second interface in response to the first operation, where the second interface is an interface displayed after the first interface is refreshed. The electronic device detects a second operation of the user in the second interface. The electronic device displays a third interface in response to the second operation when determining that a device in a pointing direction of the electronic device is a target electronic device, where the third interface includes a display interface card of the target electronic device.

According to this embodiment of this application, the user performs a preset gesture in the second interface, so that a control card or a display interface card of an intelligent device in the pointing direction of the electronic device can be displayed in an interface of the electronic device, to help the user control the intelligent device.

According to a nineteenth aspect, an electronic device is provided, and includes one or more processors and one or more memories. The one or more memories store one or more computer programs, the one or more computer programs include instructions, and when the instructions are executed by the one or more processors, the electronic device is enabled to perform the following steps: detecting a first operation of a user in a first interface; displaying a first search interface in response to the first operation, where the first search interface includes a search box and first content, and the first content is related to content locally stored in the electronic device; displaying the first interface in response to a second operation of the user; detecting a third operation of the user in the first interface; in response to the third operation, detecting that a pointing direction of the electronic device includes a target electronic device, and obtaining a status of the target device; and displaying a second search interface based on the status of the target device, where the second search interface includes a search box and second content, and the second content is related to the status of the target device.

With reference to the nineteenth aspect, in some implementations of the nineteenth aspect, the third operation is entering a keyword, and when the electronic device determines that the status of the another electronic device is playing first task content of the keyword, the second content includes a plurality of task content cards that are related to the first task content and that have priorities, where the plurality of task content cards are related to a capability of the target electronic device.

With reference to the nineteenth aspect, in some implementations of the nineteenth aspect, a first task content card in the plurality of task content cards is used to display the first task content.

With reference to the nineteenth aspect, in some implementations of the nineteenth aspect, when the electronic device determines that the status of the target electronic device is an off state, the second content includes a control card of the target electronic device. When the instructions are executed by the one or more processors, the electronic device is enabled to perform the following steps:

displaying a third search interface after the electronic device detects an operation of tapping an on control in the control card by the user, where the third search interface includes a search box and a plurality of task content cards, and the plurality of task content cards are related to a capability of the target electronic device.

With reference to the nineteenth aspect, in some implementations of the nineteenth aspect, when the electronic device determines that the status of the target electronic device is an on state and task content is not played, the second content includes a plurality of task content cards, and the plurality of task content cards are related to a capability of the target electronic device.

With reference to the nineteenth aspect, in some implementations of the nineteenth aspect, when the target electronic device is a smart television, the plurality of task content cards are video content cards; or when the target electronic device is a smart speaker, the plurality of task content cards are audio content cards.

With reference to the nineteenth aspect, in some implementations of the nineteenth aspect, when the instructions are executed by the one or more processors, the electronic device is enabled to perform the following step: when the electronic device detects that the user taps one of the plurality of task content cards, popping up a prompt box that can be selected by the user for playback on a specified electronic device.

According to a twentieth aspect, an electronic device is provided, and includes one or more processors and one or more memories. The one or more memories store one or more computer programs, the one or more computer programs include instructions, and when the instructions are executed by the one or more processors, the electronic device is enabled to perform the following steps: detecting a first operation of a user in a first interface; displaying a second interface in response to the first operation, where the second interface is an interface displayed after the first interface is refreshed; detecting a second operation of the user in the second interface; identifying another surrounding electronic device in response to the second operation; and displaying a third interface, where the third interface includes a positioning tag of the another electronic device.

With reference to the twentieth aspect, in some implementations of the twentieth aspect, the second operation is that the user picks up the electronic device and holds the electronic device in a vertical state. The electronic device is specifically configured to invoke a camera to obtain the third interface displayed in an angle of view of the camera.

With reference to the twentieth aspect, in some implementations of the twentieth aspect, when the instructions are executed by the one or more processors, the electronic device is enabled to perform the following step: displaying a fourth interface after the electronic device detects, in the third interface, an operation of tapping the positioning tag by the user, where the fourth interface includes a display interface card of an electronic device corresponding to the positioning tag, and content of the display interface card is consistent with content of a display of the electronic device corresponding to the positioning tag, or the display interface card is used to control the electronic device corresponding to the positioning tag.

With reference to the twentieth aspect, in some implementations of the twentieth aspect, when the instructions are executed by the one or more processors, the electronic device is enabled to perform the following steps: displaying a fourth interface after the electronic device detects, in the third interface, an operation of tapping the positioning tag by the user, where the fourth interface includes a control card of an electronic device corresponding to the positioning tag; and displaying a fifth interface after the electronic device detects an operation of tapping an on control in the control card by the user, where the fifth interface includes a display interface card of the electronic device corresponding to the positioning tag, and content of the display interface card is consistent with content of a display of the electronic device corresponding to the positioning tag, or the display interface card is used to control the electronic device corresponding to the positioning tag.

With reference to the twentieth aspect, in some implementations of the twentieth aspect, when the instructions are executed by the one or more processors, the electronic device is enabled to perform the following steps: detecting, by the electronic device, an operation of a preset gesture in the third interface; determining, by the electronic device in response to the operation of the preset gesture, that a device in the pointing direction of the electronic device is a target electronic device; and displaying, by the electronic device, a fourth interface, where the fourth interface includes a display interface card of the target electronic device, and content of the display interface card is consistent with content of a display of the target electronic device, or the display interface card is used to control the target electronic device.

According to a twenty-first aspect, a computer storage medium is provided, and includes computer instructions. When the computer instructions are run on an electronic device, the electronic device is enabled to perform the directional search interaction method according to any one of the sixteenth aspect to the eighteenth aspect.

According to a twenty-second aspect, a computer program product is provided, and includes computer instructions. When the computer instructions are run on an electronic device, the electronic device is enabled to perform the directional search interaction method according to any one of the sixteenth aspect to the eighteenth aspect.

According to a twenty-third aspect, an electronic device is provided, and includes one or more processors and one or more memories. The one or more memories store one or more computer programs, the one or more computer programs include instructions, and when the instructions are executed by the one or more processors, the electronic device is enabled to perform the method according to any one of the first aspect, the second aspect, the seventh aspect, the ninth aspect, and the sixteenth aspect to the eighteenth aspect.

According to a twenty-fourth aspect, a computer storage medium is provided, and includes computer instructions. When the computer instructions are run on an electronic device, the electronic device is enabled to perform the method according to any one of the first aspect, the second aspect, the seventh aspect, the ninth aspect, and the sixteenth aspect to the eighteenth aspect.

According to a twenty-fifth aspect, a computer program product is provided, and includes computer instructions. When the computer instructions are run on an electronic device, the electronic device is enabled to perform the method according to any one of the first aspect, the second aspect, the seventh aspect, the ninth aspect, and the sixteenth aspect to the eighteenth aspect.

BRIEF DESCRIPTION OF THE DRAWINGS

FIG. 5A is a schematic diagram of selecting a target device in a multi-device scenario according to an embodiment of this application;

FIG. 11A to FIG. 11D are another schematic diagram of an operation of sharing a target file to a target device according to an embodiment of the present invention;

FIG. 36A to FIG. 3D are a schematic diagram of a group of GUIs according to an embodiment of this application;

FIG. 54A is a schematic flowchart of a control method applied to an electronic device according to an embodiment of this application;

FIG. 54B is a schematic flowchart of a control method applied to an electronic device according to an embodiment of this application;

FIG. 54C is a flowchart of a target file sharing method according to an embodiment of the present invention;

FIG. 54F is a schematic flowchart of another directional search interaction method according to an embodiment of this application;

DETAILED DESCRIPTION OF ILLUSTRATIVE EMBODIMENTS

Figure 1A:
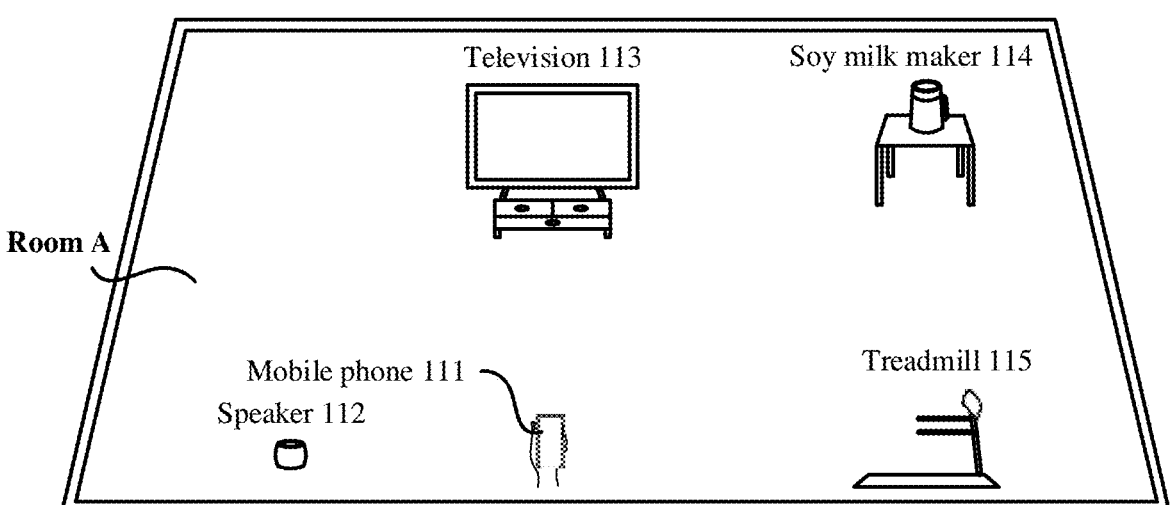
FIG. 1A and FIG. 1B each are a schematic diagram of a multi-device scenario according to an embodiment of this application.

The following clearly describes technical solutions in embodiments of this application in detail with reference to the accompanying drawings. In the descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

In the following descriptions, the terms "first" and "second" are merely intended for the purpose of description, and shall not be understood as an implication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

In embodiments of this application, an electronic device and a target device have a positioning module. The electronic device may perform directional interaction with another device by using the positioning module. To be specific, when the electronic device points to a target device, the electronic device may send a file (or referred to as a shared file) to the target device. When the electronic device points to the target device, the electronic device may further obtain information about a task being executed by the target device. For example, when the target device is a television, the electronic device may obtain information (a video name, a video episode quantity, a video cast list, and the like) about a video being played by the television. Alternatively, the electronic device may control the target device, and may not only control the target device (for example, turn on or turn off the target device, or adjust volume of the target device) in a user interface of the electronic device, but also control the target device by using a physical button of the electronic device.

In embodiments of this application, the electronic device may be referred to as a portable device. Both a smart home device and a shareable device may be referred to as target devices in embodiments of this application. First content may be referred to as a target file. The positioning module may be referred to as a positioning chip, and the positioning chip may be a UWB chip or a Bluetooth chip. The electronic device may calculate a distance between the electronic device and the shareable device and a location of the shareable device by using the positioning chip.

First, an embodiment of this application describes, with reference to the accompanying drawings, a control method applied to an electronic device. According to the method, when the electronic device points to a target device, or when the electronic device points to the target device and moves in a direction close to the target device, the electronic device may send first content to the target device. The first content may include a picture, a video, an audio, a document, a food preparation parameter, a motion parameter, and the like. In this way, a user only needs to perform a simple operation, so that the electronic device can determine the target device and exchange data. The electronic device does not need to identify a user operation for a plurality of times, so that efficiency of exchanging data with the target device can be improved. Therefore, the user operation is simple, and user experience is improved.

FIG. 1a shows a multi-device scenario. As shown in FIG. 1A, the multi-device scenario 100A may include a mobile phone 111, a speaker 112, a television 113, a soy milk maker 114, and a treadmill 115. The mobile phone 111 may perform data transmission with other devices (for example, the speaker 112, the television 113, the soy milk maker, and the treadmill 115) in the multi-device scenario 100A. Alternatively, a user may control the other devices in the multi-device scenario 100A by using the mobile phone 111.

It may be understood that the multi-device scenario 100A may include more or fewer electronic devices. A quantity of electronic devices in the multi-device scenario is not limited in this embodiment of this application.

Optionally, the multi-device scenario may further include an electronic device such as a tablet computer, a computer, or a projector.

Figure 1B:
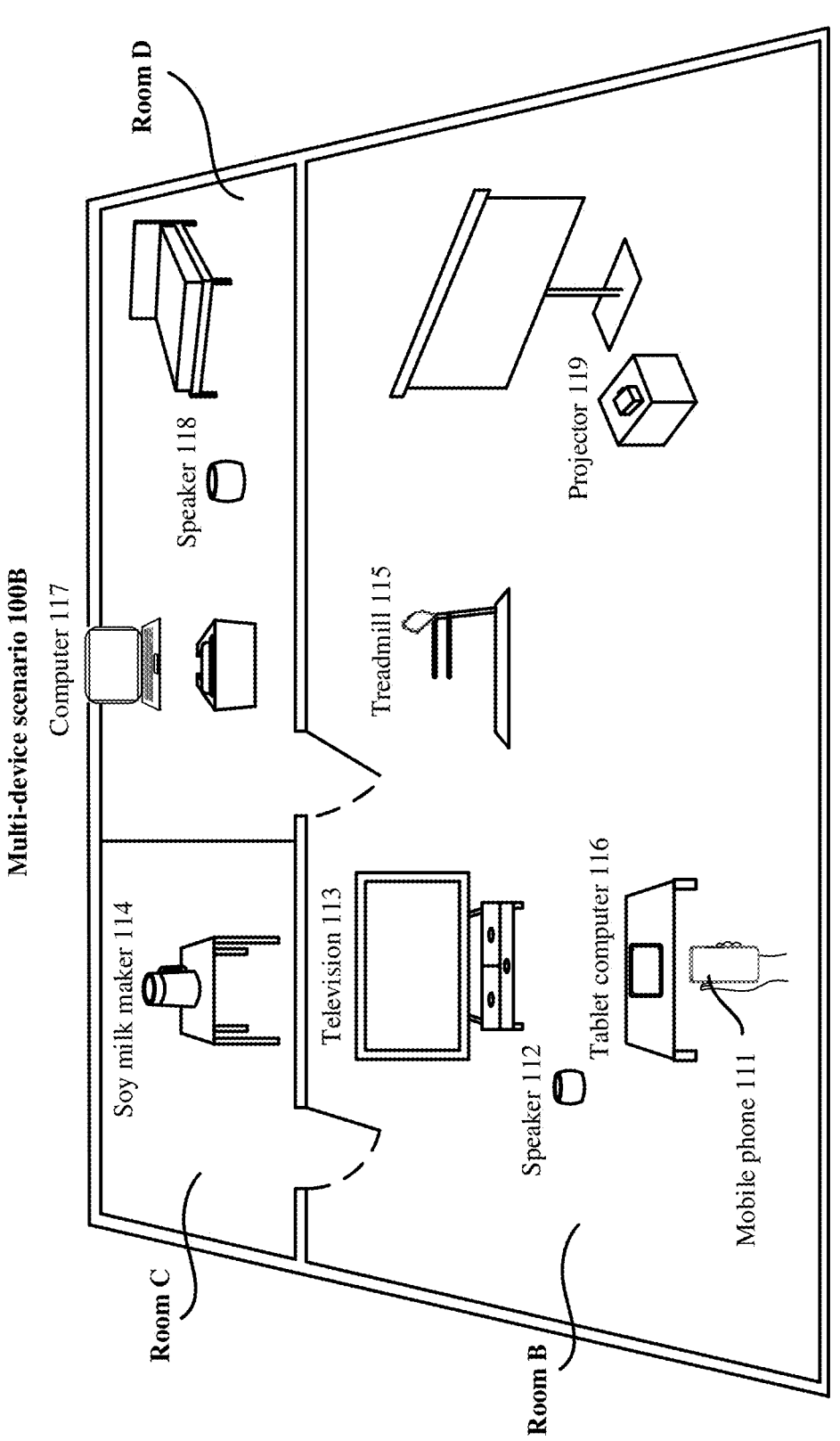

FIG. 1B shows another multi-device scenario according to an embodiment of this application. As shown in FIG. 1B, the multi-device scenario 100B may include electronic devices such as a mobile phone 111, a speaker 112, a television 113, a soy milk maker 114, a treadmill 115, a tablet computer 116, a computer 117, a speaker 118, and a projector 119. A user may control other devices in the multi-device scenario 100B by using an electronic device (for example, the mobile phone 111 or the tablet computer 116). Alternatively, the user may transmit data in the electronic device to another electronic device. For example, the user may project a video in the electronic device onto the television 113. The user may further send an audio in the electronic device to the speaker 112 for playback.

FIG. 2A to FIG. 2I are schematic diagrams of selecting an electronic device in a multi-device scenario 100B to receive data transmitted by an electronic device in the conventional technology. In the multi-device scenario 100B, an example in which a user selects a target device on a mobile phone 111 to send a picture is used to describe the conventional technology.

Figure 2A:
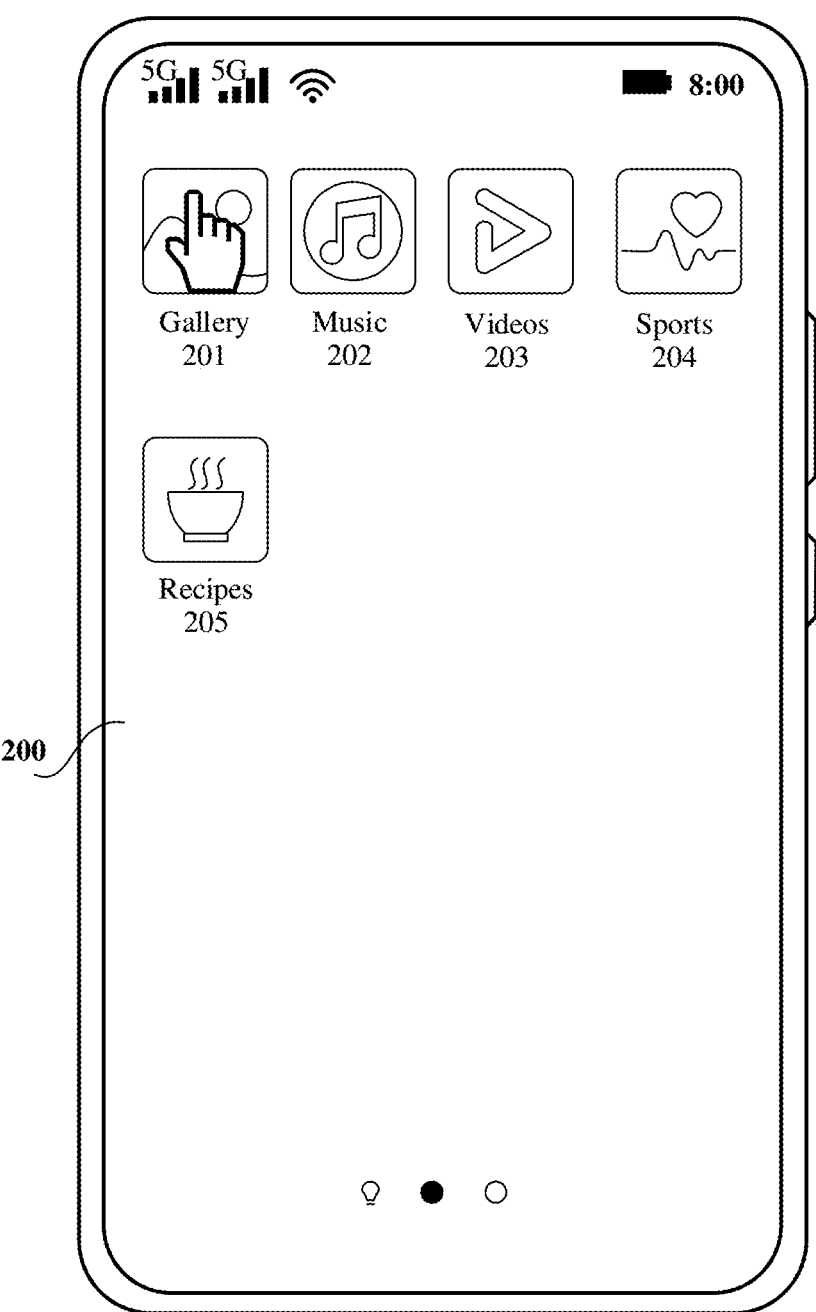
FIG. 2A to FIG. 2I are schematic diagrams of user interfaces in a process of data transmission between a group of a plurality of devices according to an embodiment of this application.

FIG. 2A shows a user interface 200 of the mobile phone 111. The user interface 200 may include some application icons, for example, a Gallery icon 201, a Music icon 202, a Videos icon 203, a Sports icon 204, and a Recipes icon 205. The user may tap the Gallery icon 201, and the mobile phone 111 may display a user interface 30A in response to the user operation.

Figure 2B:
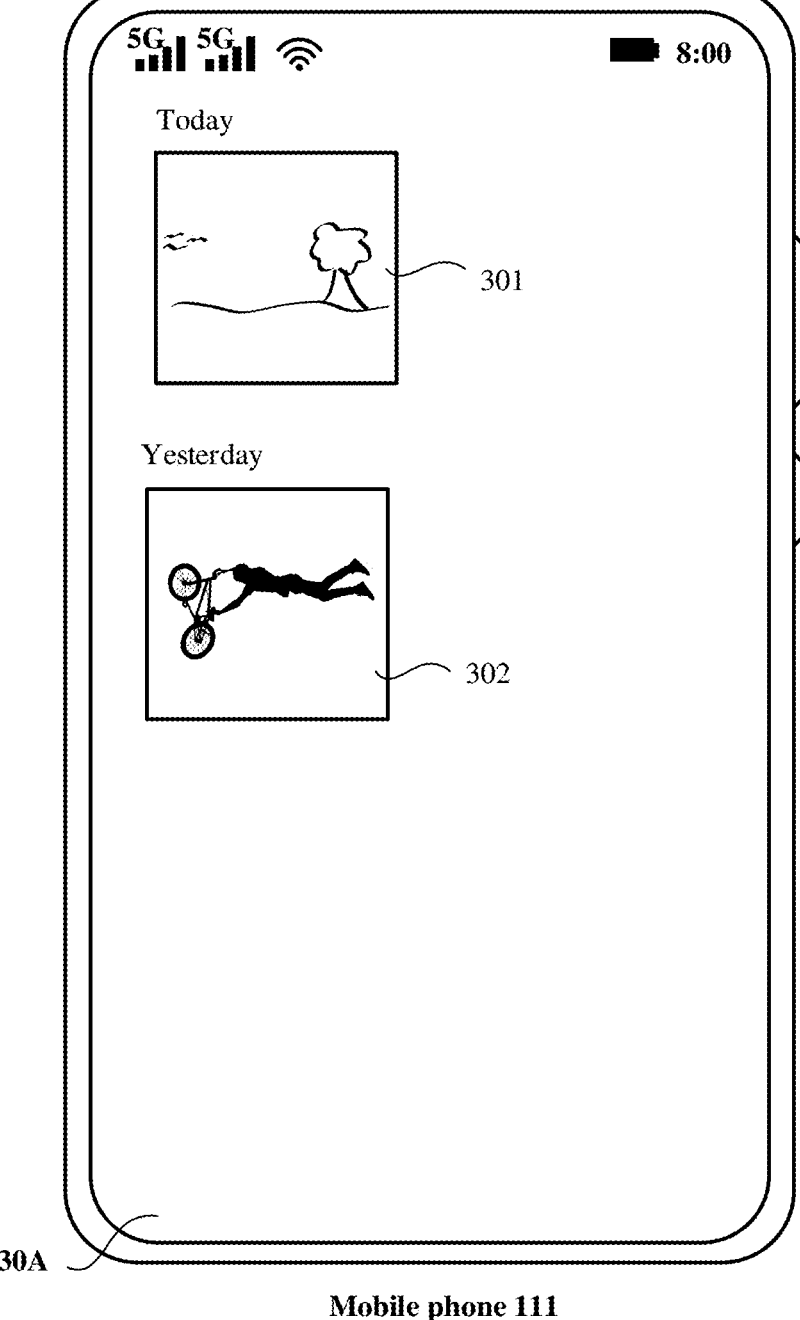

FIG. 2B shows the user interface 30A of the mobile phone 111. The user interface 30A may include a picture 301 and a picture 302. The user interface 30A may further display time points at which the mobile phone 111 stores the picture 301 and the picture 302. For example, a time point at which the mobile phone 111 stores the picture 301 may be "today".

Figure 2C:
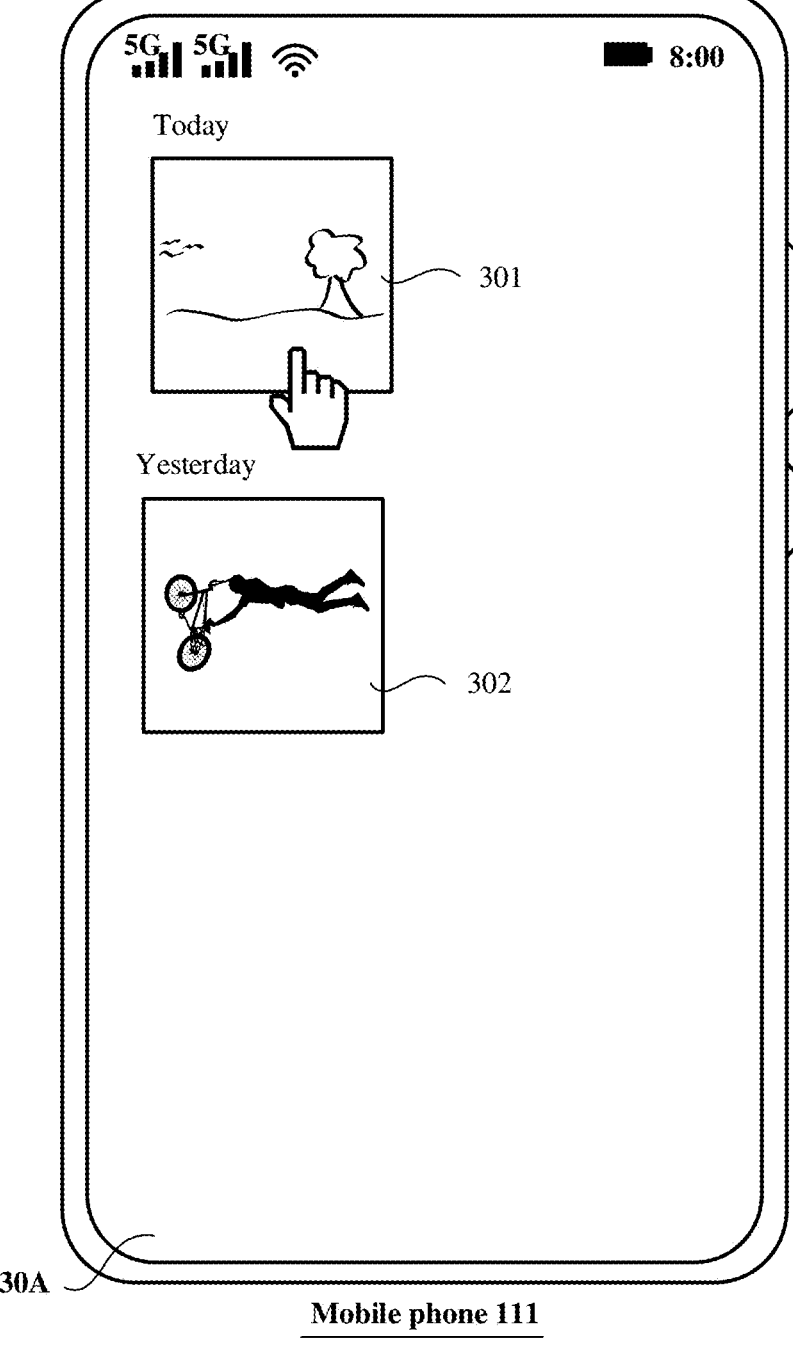

As shown in FIG. 2C, the user may touch and hold the picture 301 in the user interface 30A, and the mobile phone 111 may display a user interface 30B in response to the user operation.

Figure 2D:
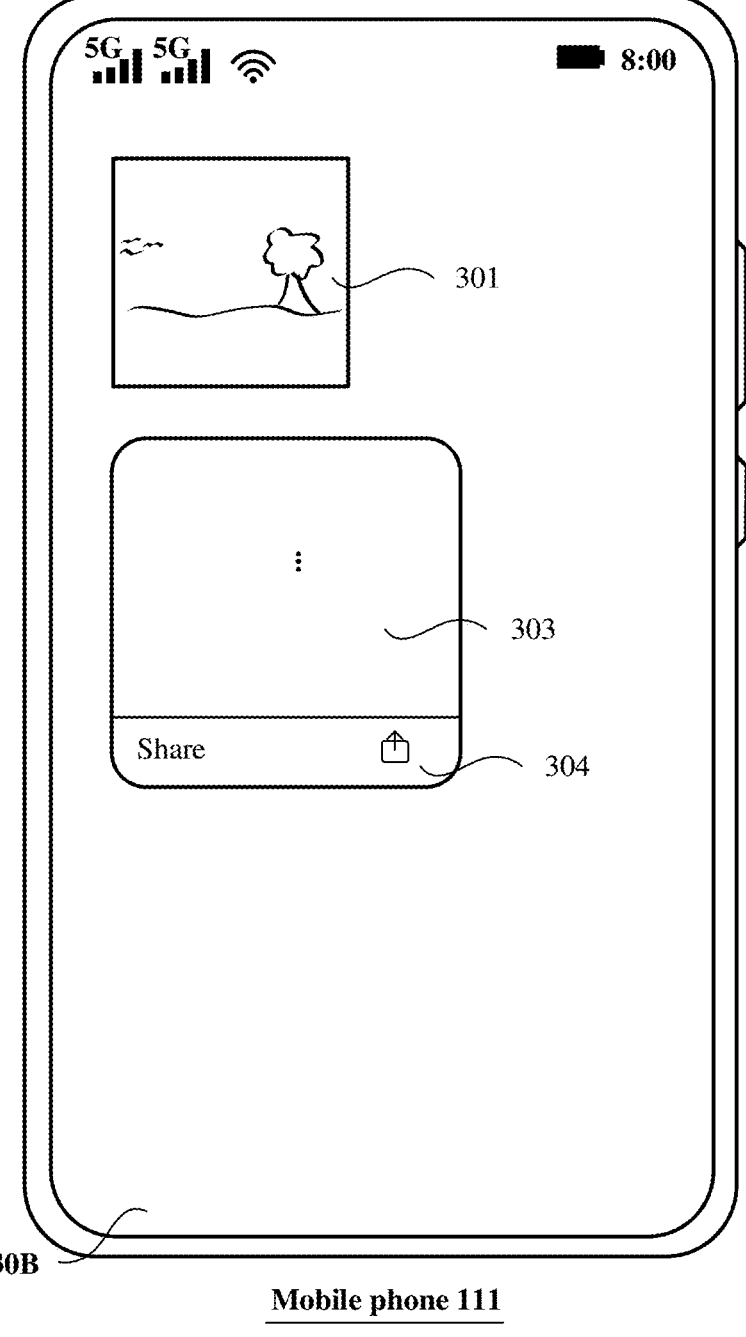

FIG. 2D shows the user interface 30B of the mobile phone 111. The user interface 30B may include the picture 301 and a menu 303. The menu 303 may include a control 304. The control 304 is used to select a manner of sharing the picture 301. The menu 303 may further display an attribute (not shown in the figure), a size (not shown in the figure), and the like of the picture 301.

Figure 2E:
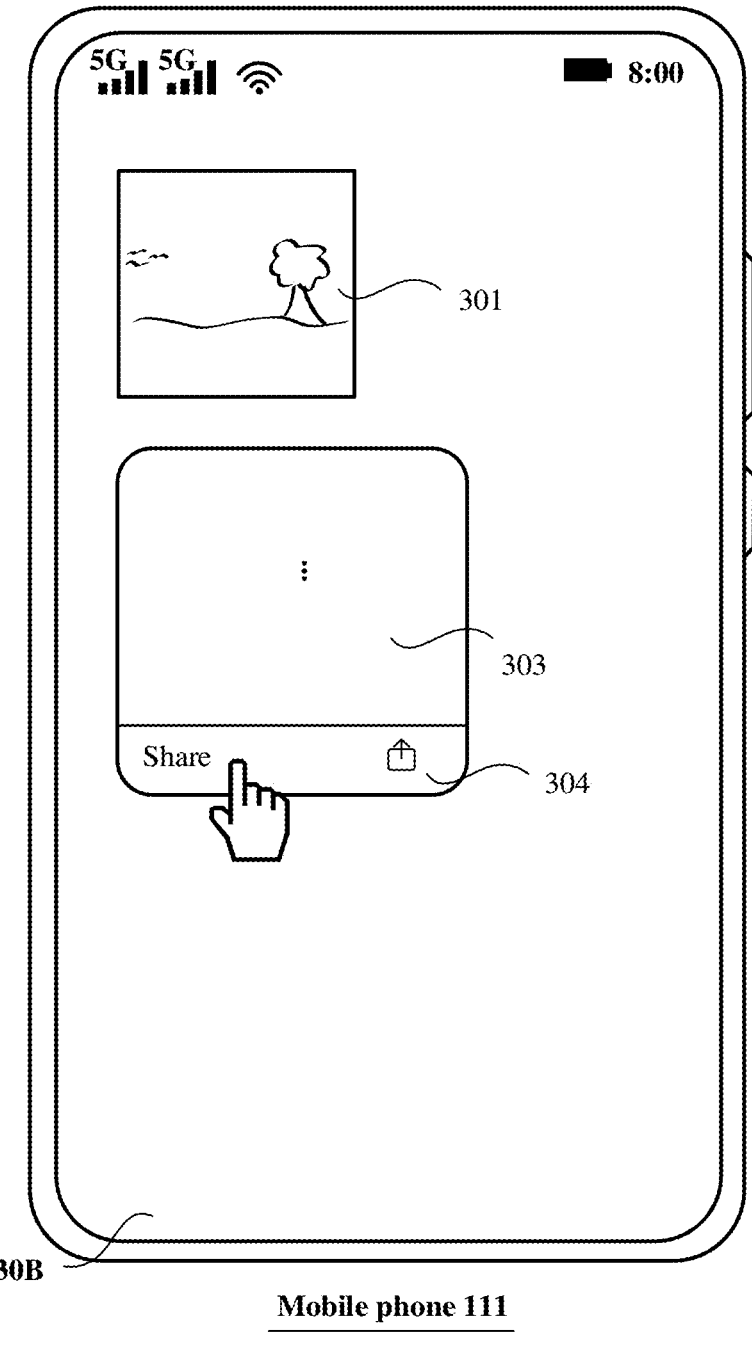

As shown in FIG. 2E, the user may tap the control 304 in the user interface 30B, and the mobile phone 111 may display a user interface 30C in response to the user operation.

Figure 2F:
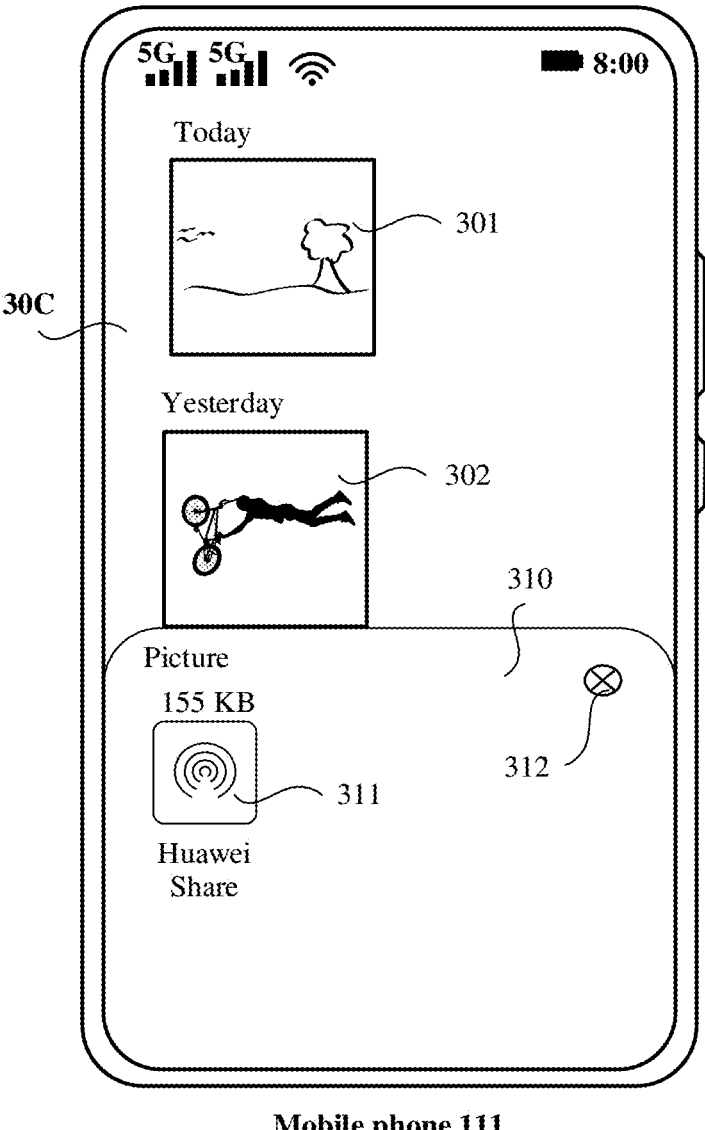

FIG. 2F shows the user interface 30C of the mobile phone 111. The user interface 30C may include the picture 301, the picture 302, and an option box 310. The option box 310 may include a control 311 and a control 312. The control 311 is used to select a target device to share the picture 301. The control 312 is used to close the option box 310.

Figure 2G:
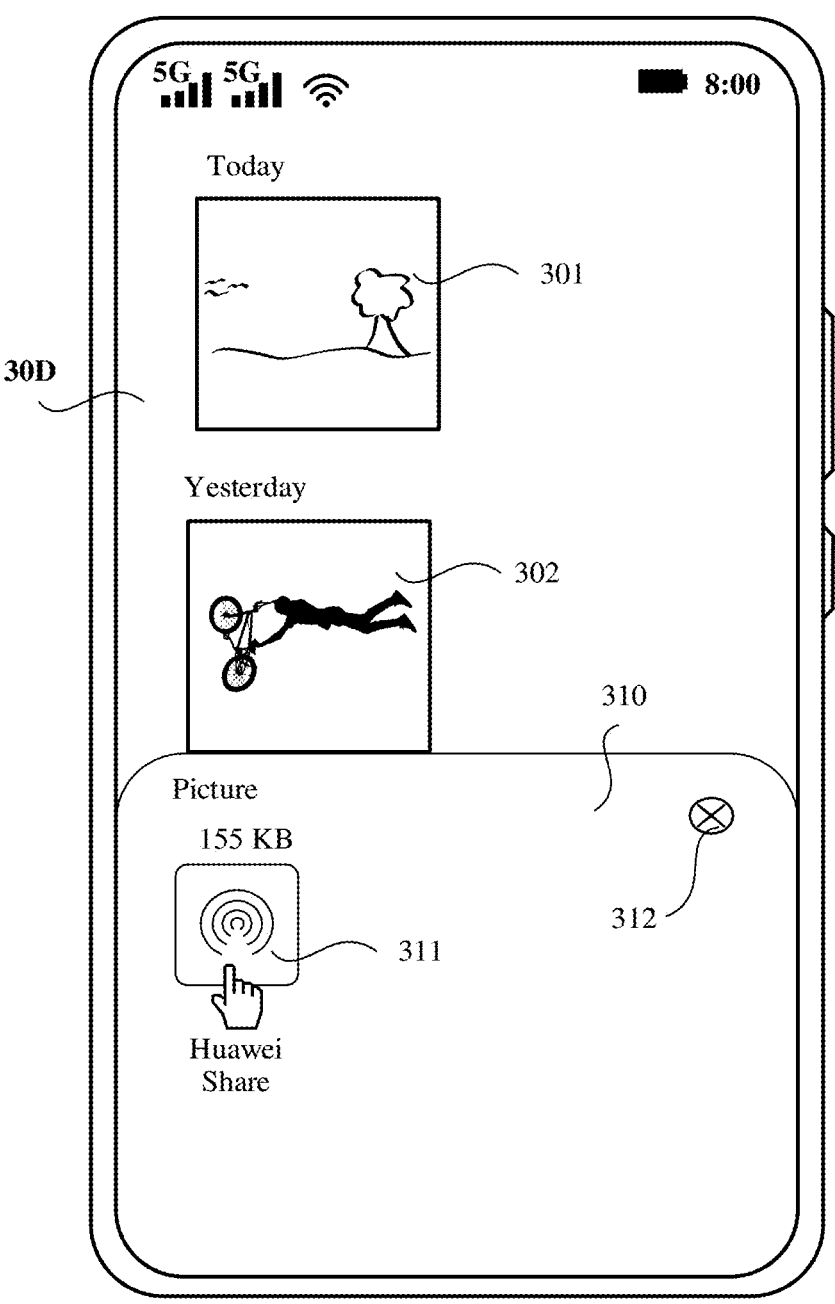

As shown in FIG. 2G, the user may tap the control 311 in the user interface 30C, and the mobile phone 111 may display a user interface 400 in response to the user operation.

Figure 2H:
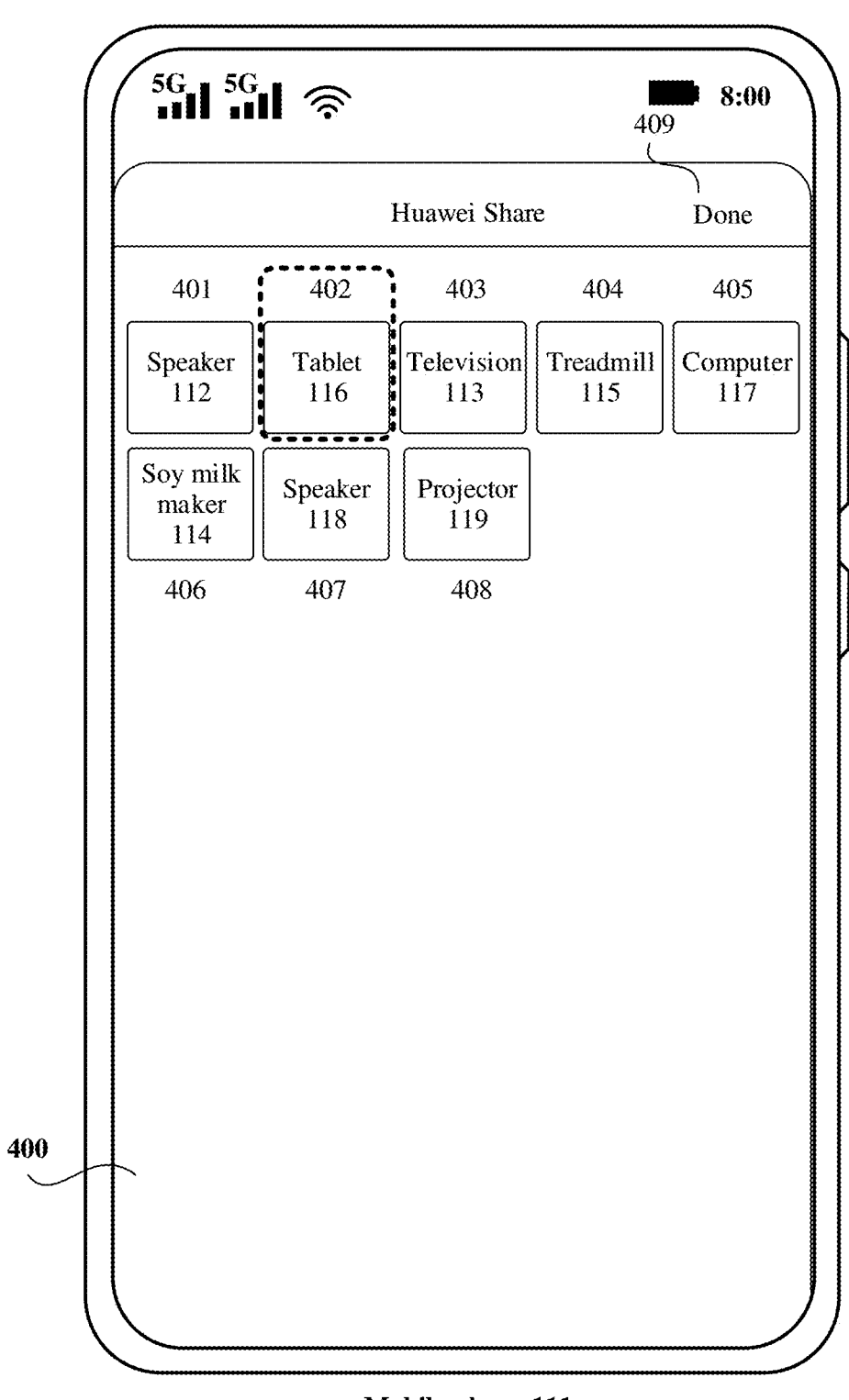

FIG. 2H shows the user interface 400 of the mobile phone 111. The user interface 400 may display icons of a plurality of devices between which sharing can be performed, for example, an icon 401 of the speaker 112, an icon 402 of the tablet 116, an icon 403 of the television 113, an icon 404 of the treadmill 115, an icon 405 of the computer 117, an icon 406 of the soy milk maker 114, an icon 407 of the speaker 118, and an icon 408 of the projector 119. A display sequence of the icons 401 to 408 in the user interface 400 may be determined based on signal strength at which a corresponding electronic device receives a Wi-Fi network, a 4G network, or a 5G network. Stronger signal strength indicates a higher display location of an icon corresponding to the electronic device in the user interface 400. After the signal strength changes, a location of the icon corresponding to the electronic device in the user interface 400 also changes, for example, the icon 402 of the tablet 116 that is shown in the user interface 400. When signal strength at which the tablet 116 receives a Wi-Fi network, a 4G network, or a 5G network becomes weak, a location of the icon 402 of the tablet 116 in the user interface 400 changes.

When the user taps the icon 402 of the tablet 116 in the user interface 400 of the mobile phone 111, if the location of the icon of the tablet 116 changes, the user may select an incorrect electronic device with which the picture is shared.

Figure 2I:
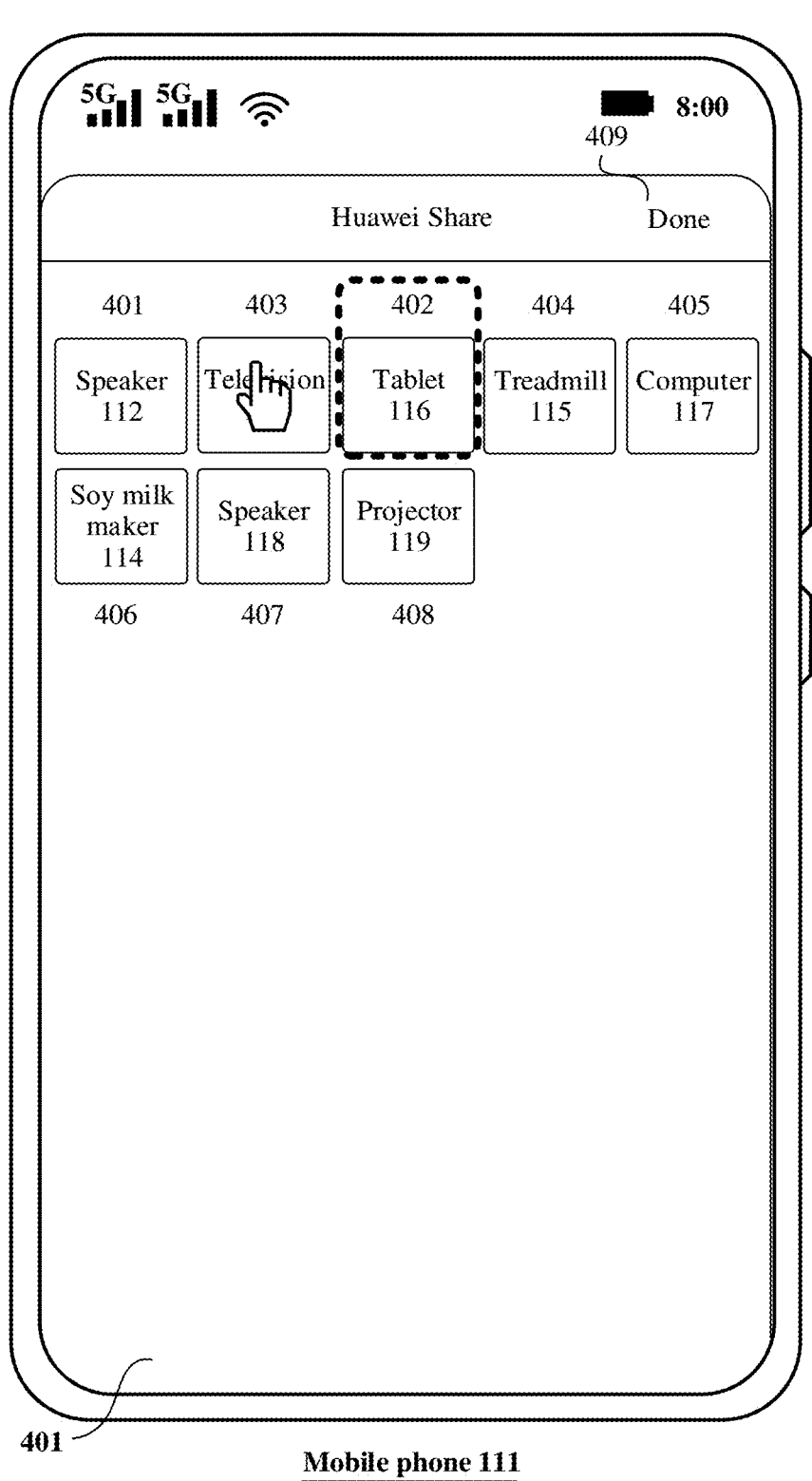

As shown in FIG. 2I, the user originally expects to select the tablet 116 to share the picture 301. However, when the user performs tapping, the location of the icon 402 of the tablet 116 in the user interface 400 changes. As a result, the user taps the icon 403 of the television 113, and the picture 301 is shared with the television 113.

In the foregoing method for controlling an electronic device to select a device for interaction in the conventional technology, when the user expects to select an electronic device to share the picture 301 on the mobile phone 111, an operation process is very complex. In addition, if the signal strength at which the electronic device receives the Wi-Fi network, the 4G network, or the 5G network changes, or a location between the electronic device and the mobile phone 111 changes, the location of the icon that corresponds to the electronic device and that is displayed in the user interface of the mobile phone 111 changes. As a result, the user selects an incorrect electronic device with which sharing expects to be performed. The user may send, to an electronic device B, a picture or other content that expects to be shared with an electronic device A. Consequently, user experience is poor.

To resolve a problem in the conventional technology, an embodiment of this application provides a control method applied to an electronic device. The method includes: The electronic device (for example, a mobile phone or a tablet computer) may detect a first operation of a user. The electronic device obtains a direction of the first operation and a first posture of the electronic device in response to the first operation. The electronic device determines a target device (for example, a mobile phone, a tablet computer, a computer, a television, a soy milk maker, or a treadmill) based on the direction of the first operation and/or the first posture. The electronic device sends first content to the target device when detecting that the electronic device and the target device log in to a same account. The first content may include a picture, a video, an audio, a document, a food preparation parameter, a motion parameter, and the like. In this way, the user only needs to perform a simple operation, so that the electronic device can determine the target device and exchange data. The electronic device does not need to identify a user operation for a plurality of times, so that efficiency of exchanging data with the target device can be improved. Therefore, the user operation is simple, and user experience is improved.

In this embodiment of this application, the direction of the first operation may be a moving direction of the first operation, or may be a direction to which the top of the electronic device points when the user performs the first operation. The electronic device may determine an electronic device in the moving direction of the first operation as the target device. Alternatively, the electronic device may determine, as the target device, an electronic device in the direction to which the top of the electronic device points.

In this embodiment of this application, a user interface of the electronic device has a default display direction. In this embodiment of this application, a frame above the user interface in the default display direction of the electronic device is referred to as the top of the electronic device, and a frame below the user interface in the default display direction is referred to as the bottom of the electronic device. As shown in FIG. 2A, a display direction of the user interface 200 is a default display direction. A frame above the user interface 200 is referred to as the top of the mobile phone 111, and a frame below the user interface 200 is referred to as the bottom of the mobile phone 111.

The following describes, in detail with reference to the accompanying drawings, a control method applied to an electronic device according to an embodiment of this application. The method provided in embodiments of this application may be applied to the multi-device scenario 100A shown in FIG. 1A and the multi-device scenario 100B shown in FIG. 1B.

First, the following describes, with reference to FIG. 3a to FIG. 3m, that the mobile phone 111 determines the target device as the tablet computer 116 in the multi-device scenario 100B, and sends a picture to the tablet computer 116. In the embodiments shown in FIG. 3A to FIG. 3L, there are a plurality of electronic devices in a direction of a first directional operation of a user.

In embodiments of this application, a first operation may include the first directional operation.

Figure 3A:
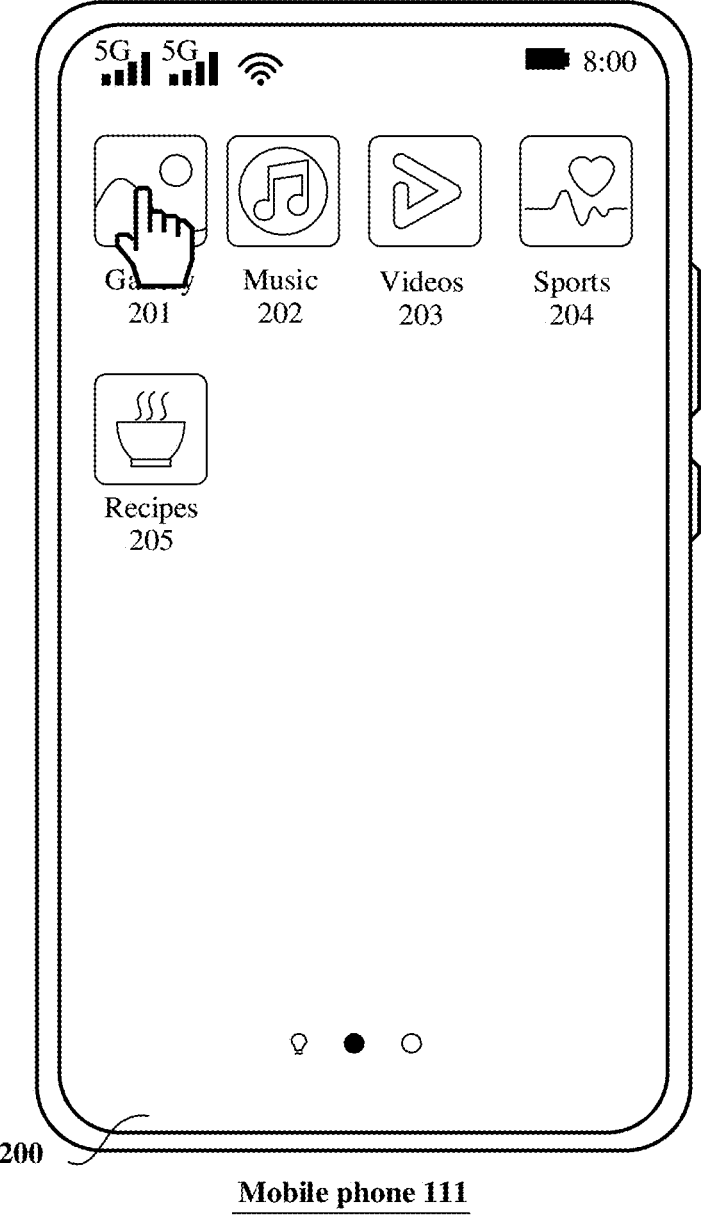
FIG. 3A to FIG. 3C are schematic diagrams of a group of user interfaces of a mobile phone 111 according to an embodiment of this application.

FIG. 3A shows a user interface 200 of the mobile phone 111. The user interface 300 may include some application icons, for example, a Gallery icon 201, a Music icon 202, a Videos icon 203, a Sports icon 204, and a Recipes icon 205. The user may tap the Gallery icon 201, and the mobile phone 111 may display a user interface 30A in response to the user operation.

Figure 3B:
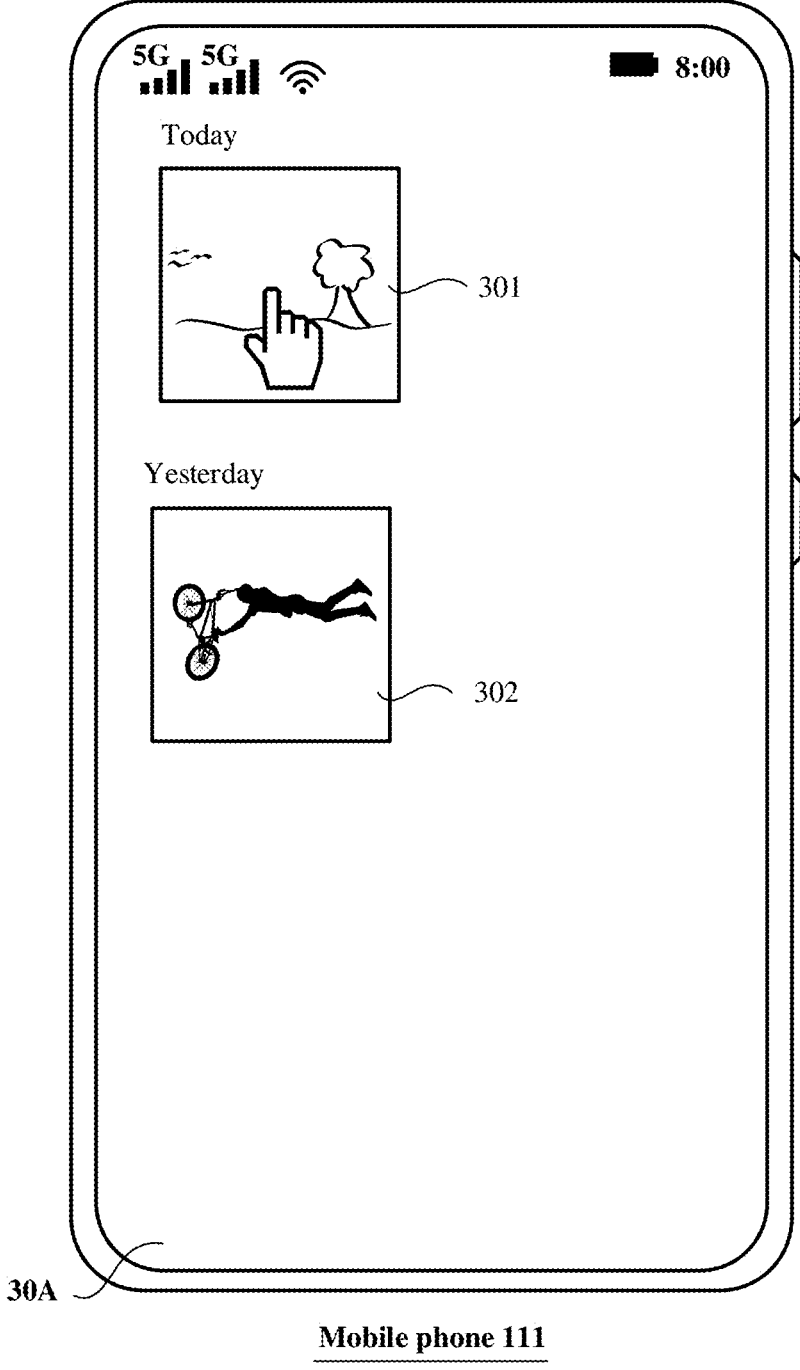

FIG. 3B shows the user interface 30A of the mobile phone 111. The user interface 30A may include a picture 301 and a picture 302. For details herein, refer to the foregoing descriptions in FIG. 2B. The details are not described herein again. The user may tap the picture 301, and the mobile phone 111 may display a user interface 500 in response to the user operation.

Figure 3C:
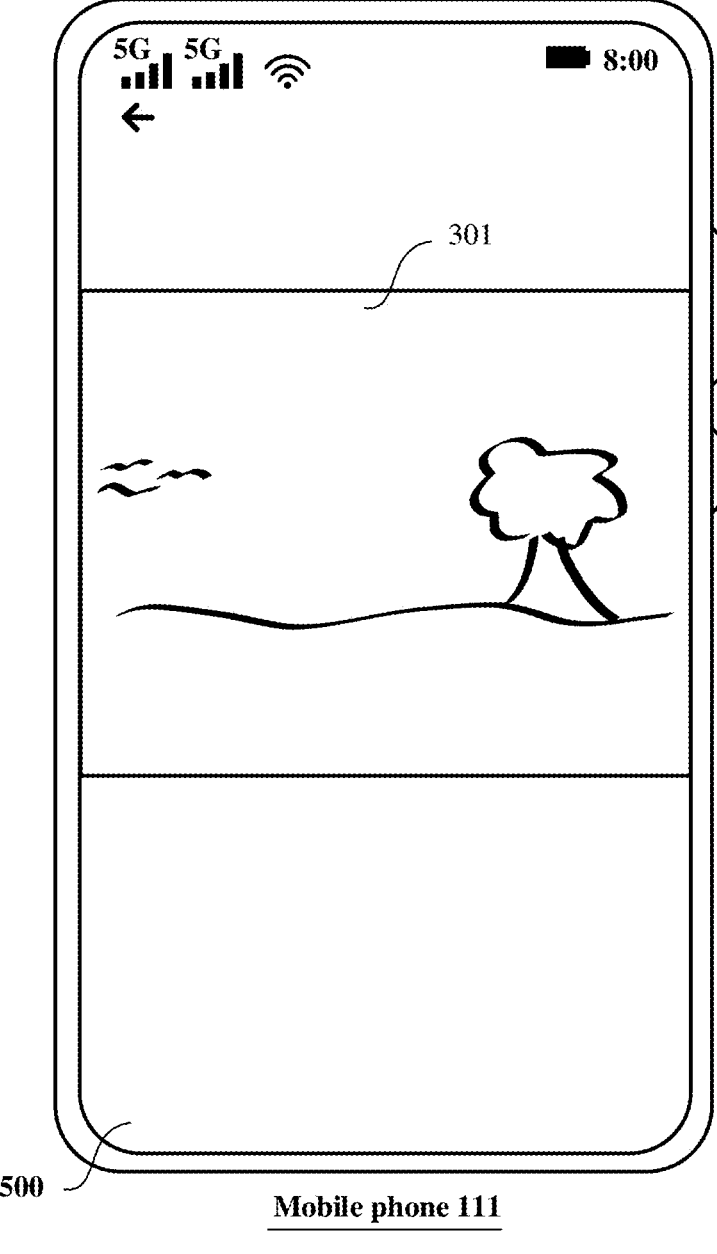

FIG. 3C shows the user interface 500 of the mobile phone 111. The picture 301 may be displayed in the user interface 500. The user may determine the target device based on the first directional operation in the multi-device scenario 100B. The mobile phone 111 may send the picture 301 to the target device.

Figure 3D:
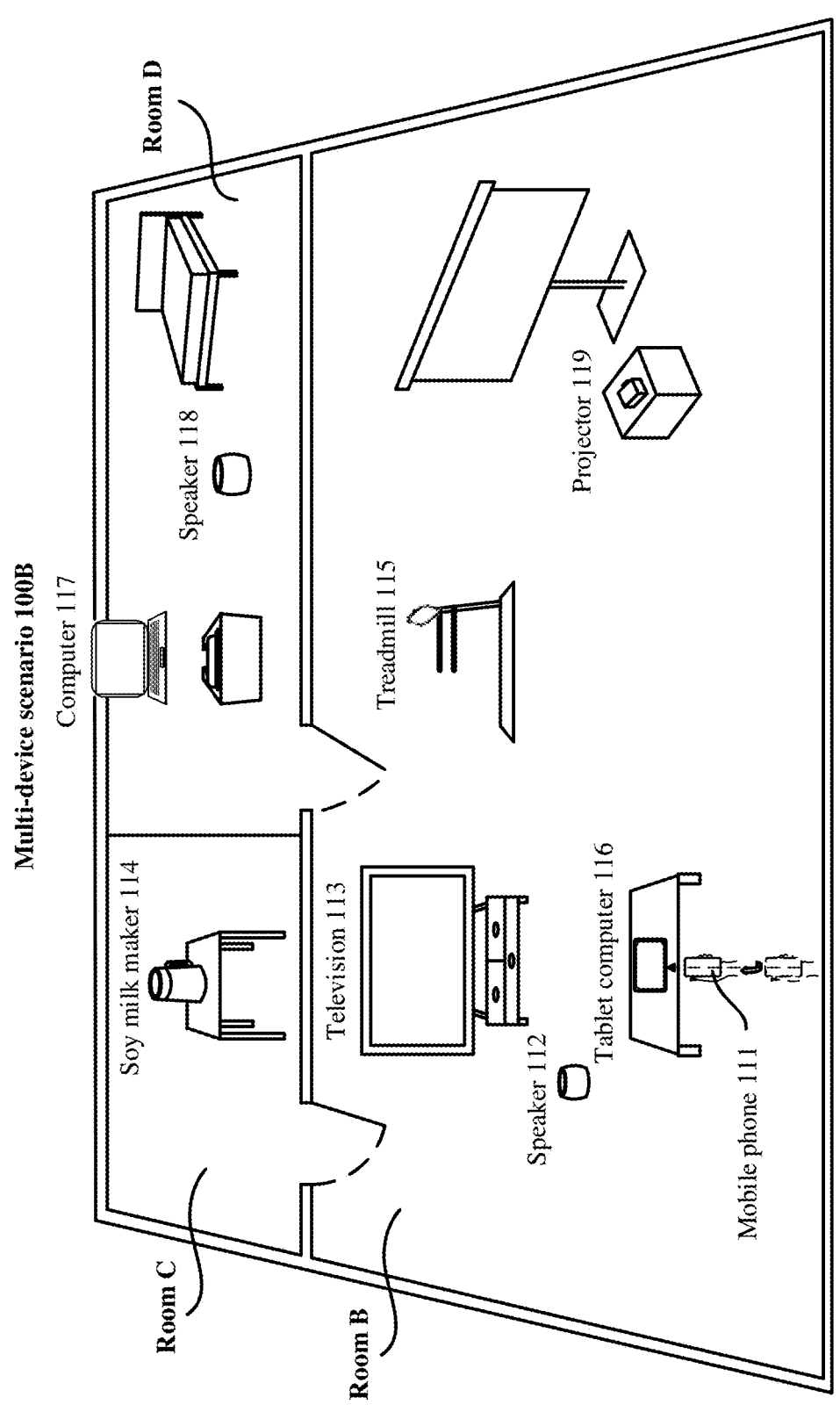
FIG. 3D is a schematic diagram of selecting a target device in a multi-device scenario according to an embodiment of this application.

FIG. 3D shows a multi-device scenario 100B. As shown in FIG. 3D, the user performs a first directional operation on the mobile phone 111, that is, points the mobile phone to a target device to which the picture 301 expects to be sent.

Figure 3E:
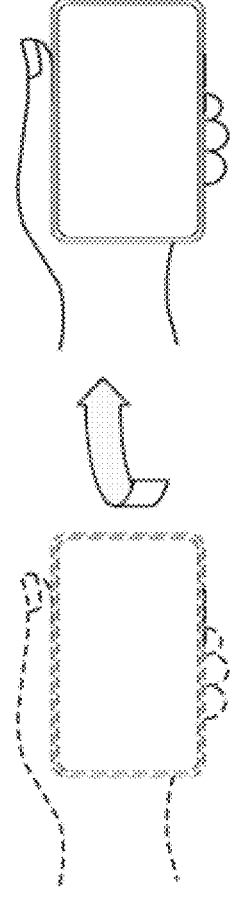
FIG. 3E is a schematic diagram of a user operation according to an embodiment of this application.

In a possible implementation, the first directional operation may be that the user moves the mobile phone 111 toward a location of the target device (for example, the tablet computer 116). For example, as shown in FIG. 3E, the user pushes the mobile phone 111 forward toward the location of the target device. When the user moves the mobile phone 111 toward the location of the target device, the mobile phone 111 may detect the user operation.

Figure 3F:
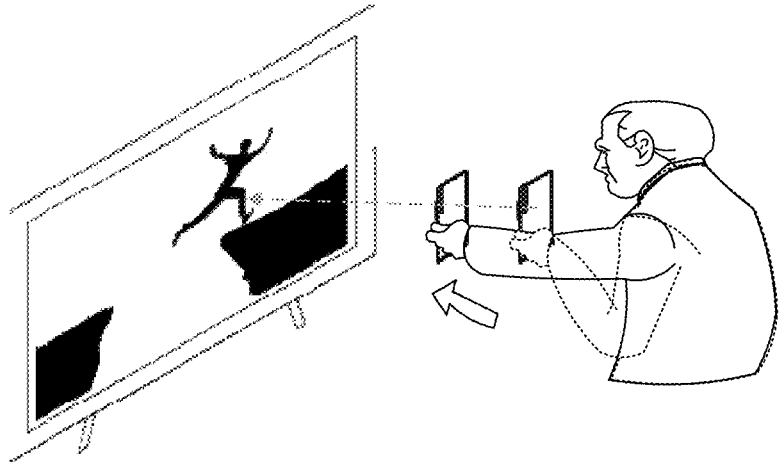
FIG. 3F is a schematic diagram of another user operation according to an embodiment of this application.

Optionally, the first directional operation may be that when the top of the electronic device is upward and a display faces the target device, the user pushes the electronic device in a direction close to the target device. As shown in FIG. 3F, the top of the mobile phone 111 is upward, a display faces the television 113, and the user pushes the mobile phone 111 in a direction close to the television 113.

Further, the mobile phone 111 may detect the first directional operation of the user based on acceleration collected by an acceleration sensor. For example, when the acceleration collected by the acceleration sensor of the mobile phone 111 is greater than or equal to a first threshold, the mobile phone 111 determines that the user is performing the first directional operation. The first threshold may be configured by a system of the mobile phone 111.

Optionally, the mobile phone 111 may detect the first directional operation of the user based on the acceleration collected by the acceleration sensor and an angular velocity collected by a gyro sensor. For example, when the acceleration collected by the acceleration sensor of the mobile phone 111 is greater than or equal to the first threshold, and the angular velocity collected by the gyro sensor is a second threshold, the mobile phone 111 determines that the user is performing the first directional operation. The second threshold may be configured by the system of the mobile phone 111.

Optionally, the mobile phone 111 may detect the first directional operation of the user based on the acceleration sensor and a touch sensor. For example, when the acceleration collected by the acceleration sensor of the mobile phone 111 is greater than or equal to the first threshold, and the touch sensor does not detect a touch operation of the user within a preset time period, the mobile phone 111 determines that the user is performing the first directional operation. The preset time period may be configured by the system of the mobile phone 111.

Optionally, acceleration collected by the acceleration sensor of the mobile phone 111 in first duration is the first threshold. Then, in second duration after the first duration, acceleration collected by the acceleration sensor of the mobile phone 111 is 0, that is, the mobile phone does not move. In this way, the mobile phone 111 determines that the user is performing the first directional operation. How the electronic device specifically detects the first directional operation of the user is not limited in this embodiment of this application.

Figure 3G:
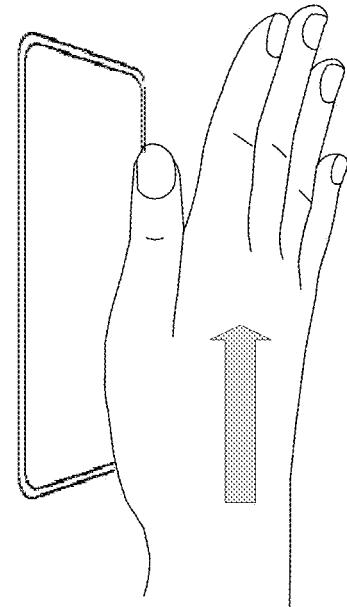
FIG. 3G is a schematic diagram of another user operation according to an embodiment of this application.

In a possible implementation, the first directional operation may be that when the user places the top of the mobile phone 111 in a direction close to the target device (for example, the tablet computer 116), the user moves a hand in a first direction in an air manner above a display of the mobile phone 111. For example, as shown in FIG. 3G, the user places the top of the mobile phone 111 in a direction close to the target device, and slides a hand from the bottom of the mobile phone 111 to the top in an air manner above the display of the mobile phone 111. The mobile phone 111 may detect an orientation of the top of the mobile phone 111 by using an acceleration sensor and a gyro sensor. The mobile phone 111 may detect, by using a camera, that the user slides the hand from the bottom of the mobile phone 111 to the top in an air manner above the display of the mobile phone in.

Figure 3H:
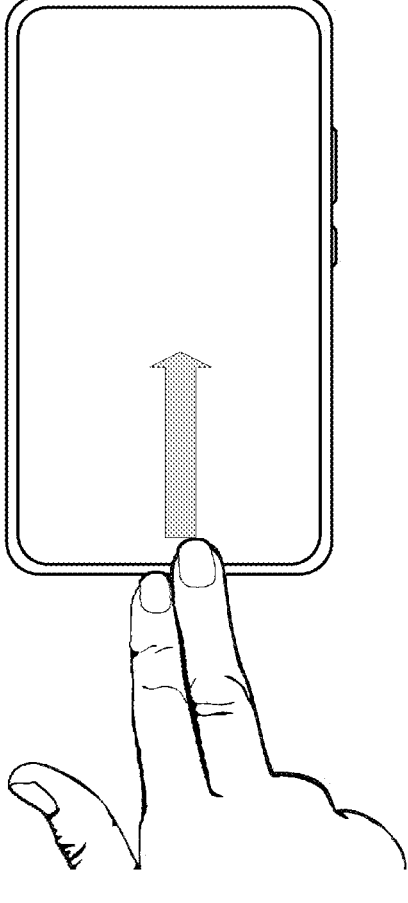
FIG. 3H is a schematic diagram of another user operation according to an embodiment of this application.

In a possible implementation, the first directional operation may be that when the user places the top of the mobile phone 111 in a direction close to the target device (for example, the tablet computer 116), a hand of the user slides in a first direction on the display of the mobile phone 111. For example, as shown in FIG. 3H, the user places the mobile phone 111 in a direction close to the target device, and a hand of the user slides from bottom to top on the display of the mobile phone 111. The mobile phone 111 may detect an orientation of the top of the mobile phone 111 by using an acceleration sensor and a gyro sensor. The mobile phone nil may detect, by using a touch sensor, that the hand of the user slides from bottom to top on the display of the mobile phone 111.

When the mobile phone 111 detects the first directional operation of the user, the mobile phone 111 may obtain location information of another electronic device (for example, the tablet computer 116, the television 113, the soy milk maker 114, the speaker 112, the computer 117, the speaker 118, the projector 119, or the treadmill 115) (for example, three-dimensional coordinates of a location of the electronic device) in the multi-device scenario 100B, and determine an electronic device in the direction of the first directional operation.

In a possible implementation, all the electronic devices in the multi-device scenario 100B have a positioning function. When the mobile phone 111 detects the first directional operation of the user, the mobile phone 111 may send a location obtaining request to another device. After receiving the location obtaining request sent by the mobile phone 111, the another electronic device sends location information of the another electronic device to the mobile phone 111. After receiving the location information, the mobile phone 111 determines an electronic device in the direction of the first directional operation.

Optionally, the multi-device scenario 100B may include a positioning system including three or more positioning sensors. The positioning system may position all the electronic devices in the multi-device scenario 100B, and store locations of all the electronic devices in a positioning server corresponding to the positioning system. When detecting the first directional operation of the user, the mobile phone 111 may send a location obtaining request to the positioning server. In response to the request from the mobile phone 111, the positioning server may send location information of another electronic device in the multi-device scenario 100B to the mobile phone 111.

Optionally, in a possible implementation, the mobile phone 111 obtains only location information of an electronic device in a preset distance. To be specific, the mobile phone searches for only the electronic device in the preset distance, and may send a request to the electronic device in the preset distance, to obtain the location information of the electronic device in the preset distance.

Figure 3I:
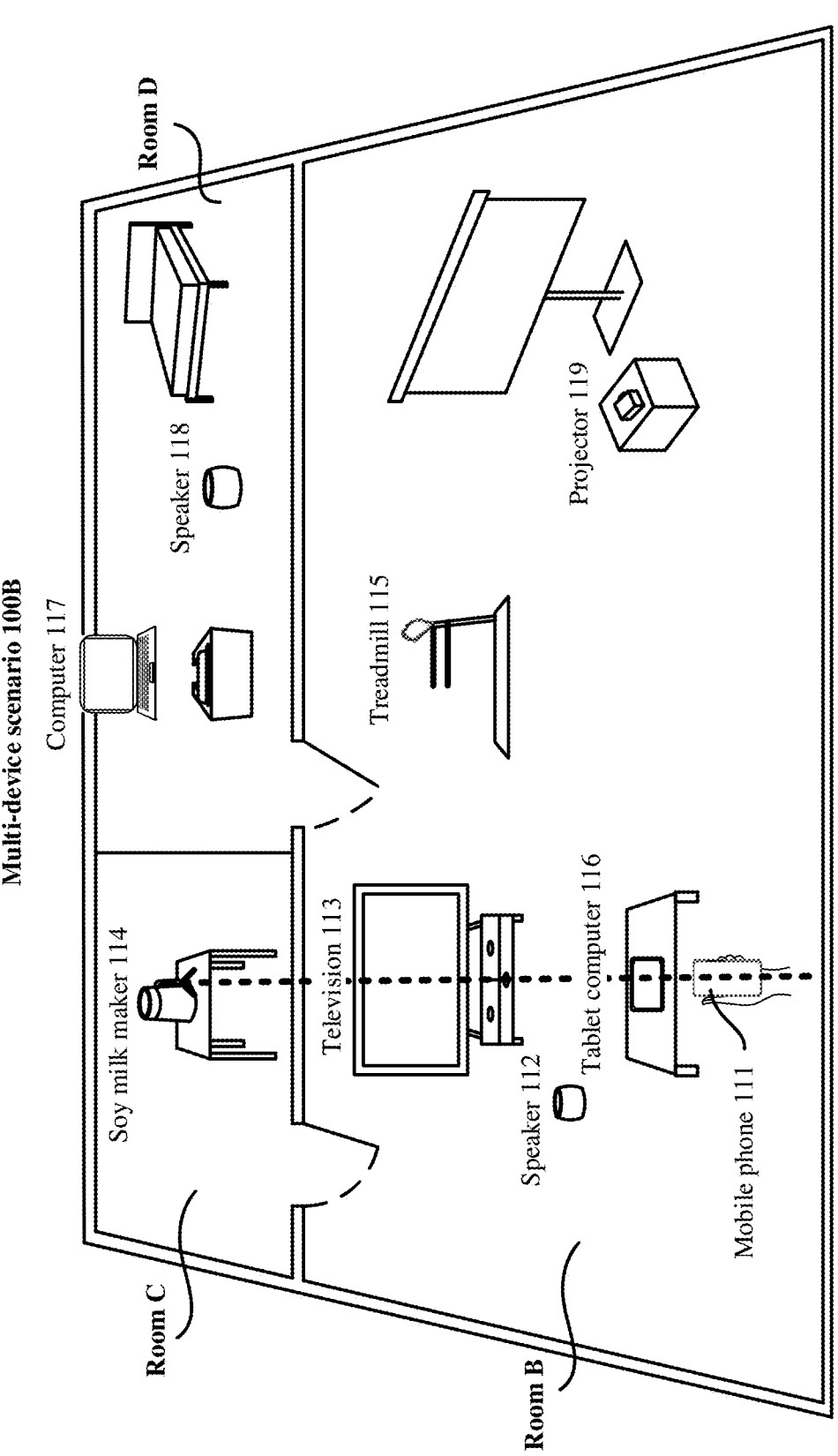
FIG. 3I is a schematic diagram of selecting a target device in a multi-device scenario according to an embodiment of this application.

Further, the mobile phone 111 may determine, as the target device, an electronic device existing on a straight line in which a first point of the mobile phone 111 is located in the direction of the first directional operation. As shown in FIG. 3I, the mobile phone 111 may determine, as target devices (for example, a tablet computer 116, a television 113, and a soy milk maker 114 shown in FIG. 3I), electronic devices existing on a straight line in which a center of gravity point of the mobile phone 111 is located in the direction of the first directional operation.

Still further, when there are a plurality of target devices, the mobile phone 111 may determine a target device closest to the mobile phone 111 as a target device to which a picture is finally to be sent. For example, in FIG. 3H, the mobile phone 111 may determine the tablet computer 116 closest to the mobile phone 111 as the target device to which the picture is finally to be sent.

Figure 3J:
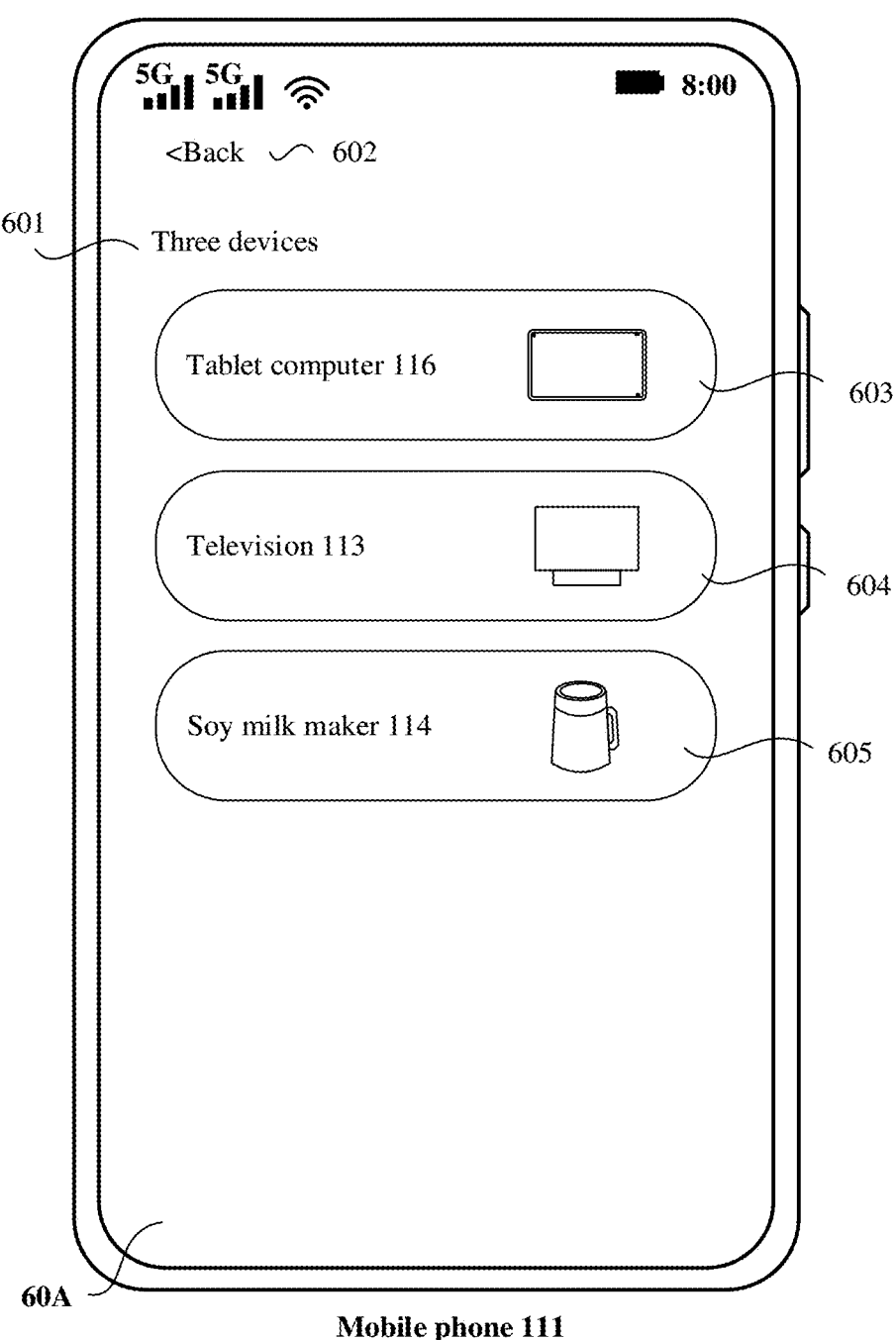
FIG. 3J is a schematic diagram of a user interface of a mobile phone 111 according to an embodiment of this application.

Optionally, when there are a plurality of target devices, the mobile phone 111 may display icons (for example, names and device IDs) corresponding to the plurality of target devices in a user interface of the mobile phone 111, for example, a user interface 600 of the mobile phone 111 that is shown in FIG. 3J. The user interface 60A may include a text 601 and a control 602 to a control 605. The text 601 is used to prompt that a quantity of target devices determined by the mobile phone 111 is 3. The control 602 is used to back to an upper-level interface. The control 603 to the control 605 are used by the user to select a final target device. For example, the user may tap the control 603, and the mobile phone 111 determines the tablet computer 116 as the final target device in response to the user operation.

Figure 3K:
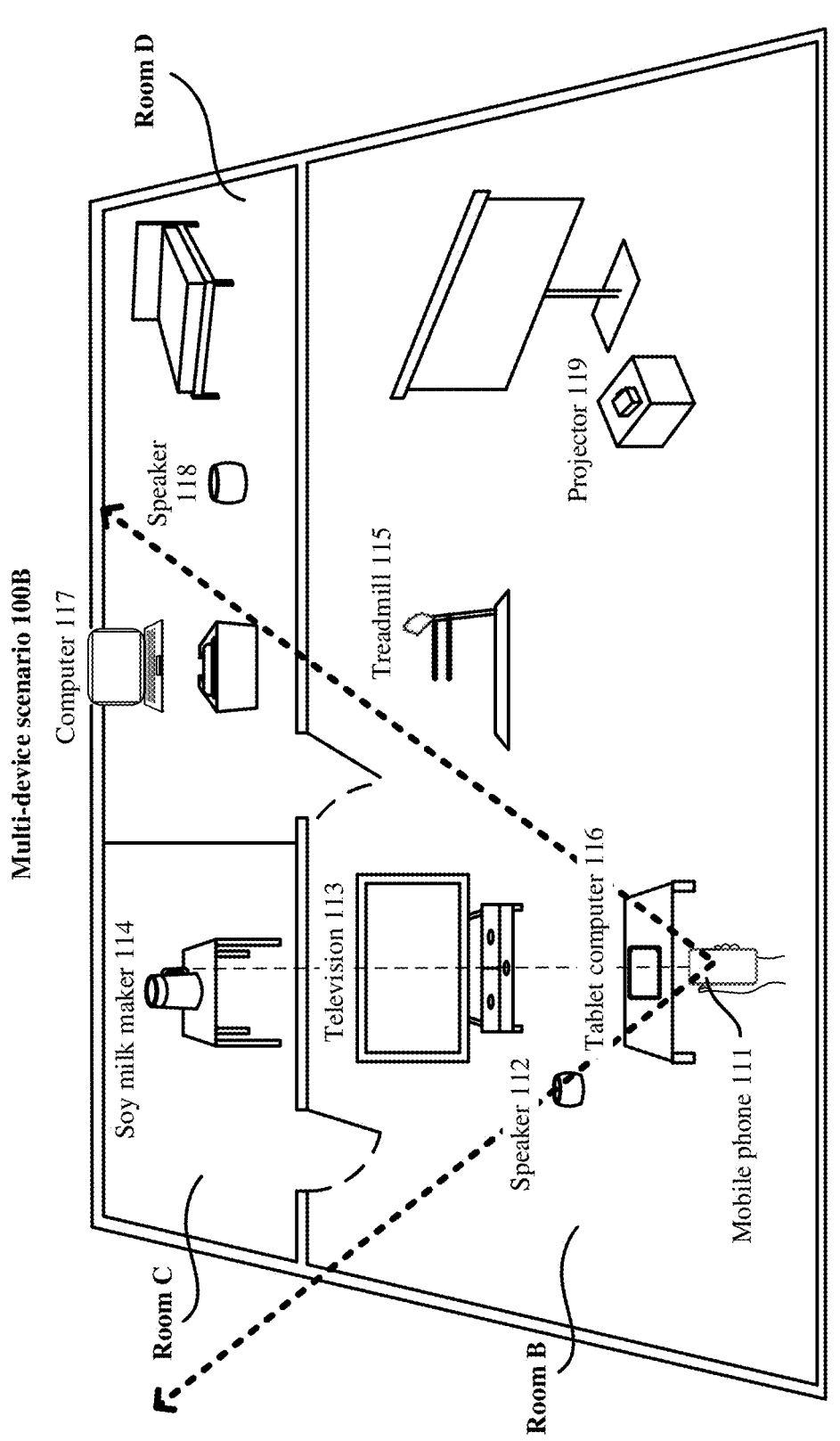
FIG. 3K is another schematic diagram of selecting a target device in a multi-device scenario according to an embodiment of this application.

In another possible implementation, the mobile phone 111 may determine, as the target device, an electronic device in a preset range of a first point of the mobile phone 111 in the direction of the first directional operation. For example, as shown in FIG. 3K, the mobile phone 111 determines, as target devices, electronic devices in a preset range of a center of gravity point of the mobile phone 111 in the direction of the first directional operation. The target devices determined by the mobile phone 111 may include the tablet computer 116, the speaker 112, the television 113, the soy milk maker 114, and the computer 117.

Figure 3L:
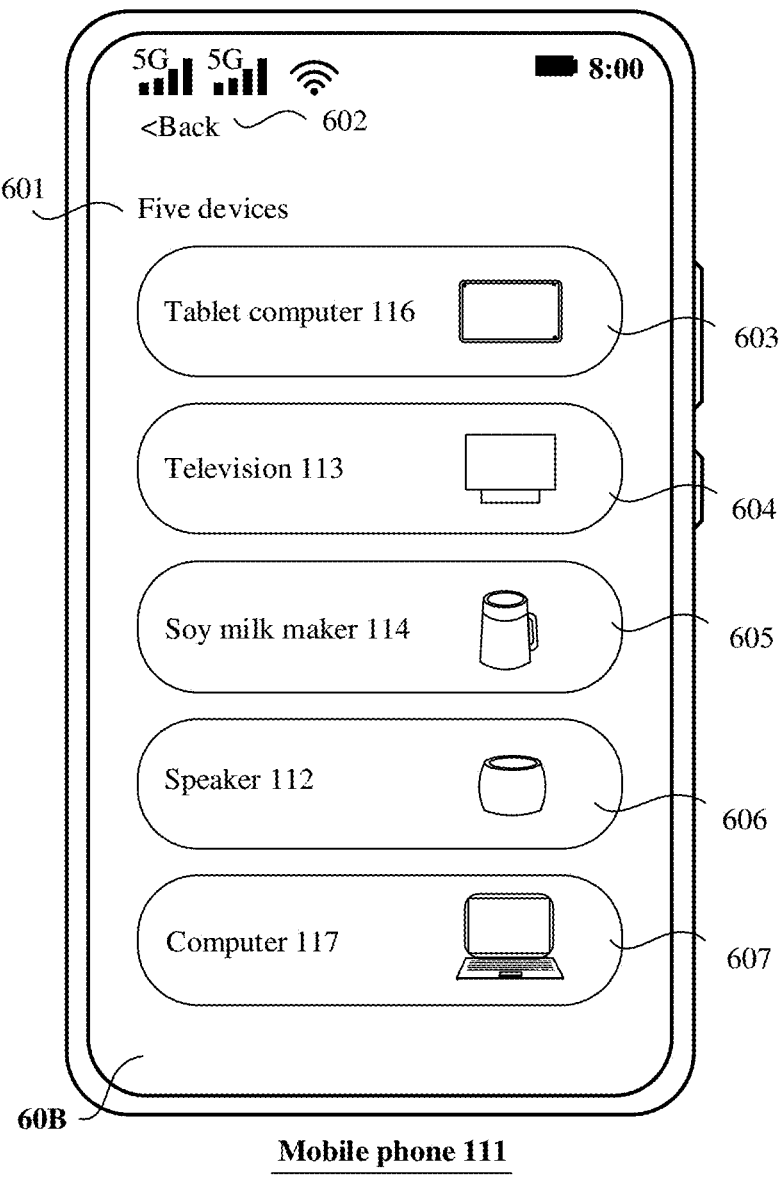
FIG. 3L and FIG. 3M are schematic diagrams of a group of user interfaces of a mobile phone 111 according to an embodiment of this application.

As shown in FIG. 3L, icons of five target devices that may be determined by the mobile phone 111 are displayed in a user interface 60B. The user interface 60A may include a text 601 and a control 602 to a control 607. The text 601 is used to prompt that a quantity of target devices determined by the mobile phone 111 is 5. The control 602 is used to back to an upper-level interface. The control 603 to the control 607 are used by the user to select a final target device. For example, the user may tap the control 603, and the mobile phone 111 determines the tablet computer 116 as the final target device in response to the user operation.

In a possible implementation, an arrangement sequence of icons that correspond to a plurality of target devices and that are displayed in a user interface of the mobile phone 111 may be determined based on distances between the mobile phone 111 and the plurality of target devices. A shorter distance between the target device and the mobile phone 111 indicates a higher location of an icon corresponding to the target device in the user interface of the mobile phone 111. For example, in the multi-device scenario 100B shown in FIG. 3I, the tablet computer 116, the television 113, and the soy milk maker 114 are all in the direction of the first directional operation. The tablet computer 116 is closest to the mobile phone 111. In this case, in a list of icons that are of the target devices and that are displayed in the user interface of the mobile phone 111, for example, in the user interface 60A shown in FIG. 3J, an icon corresponding to the tablet computer 116 is arranged at the top.

Optionally, the user interface 60B of the mobile phone 111 displays only an icon of a target device in a preset distance and in a specific included angle range of the first directional operation.

Optionally, when the mobile phone 111 determines that there are a plurality of target devices in a preset distance and in a specific included angle range of the first directional operation, an arrangement sequence of icons that are of the plurality of target devices and that are displayed in the mobile phone 111 is determined based on distances between the mobile phone 111 and the plurality of target devices and the direction of the first directional operation. For example, in the multi-device scenario 100B shown in FIG. 3K, in the plurality of target devices determined by the mobile phone 111, the tablet computer 116, the television 113, and the soy milk maker 114 are in the direction of the first directional operation, and are on a center line of the mobile phone 111, where the tablet computer 116 is closest to the mobile phone 111, and the speaker 112 and the computer 117 are in a preset range of the center line of the mobile phone 111. In this way, in a list of icons that are of the plurality of target devices and that are displayed in the mobile phone 111, for example, in the user interface 60B shown in FIG. 3L, an icon of the tablet computer is arranged at the top, and then an icon of the television 111, an icon of the soy milk maker 114, an icon of the speaker 112, and an icon of the computer 117 are sequentially arranged.

Optionally, when two target devices are at a same location from the mobile phone, in a list of icons that are of the target devices and that are displayed in the mobile phone 111, an icon of a target device on the left side of the mobile phone 111 may be arranged before an icon of a target device on the right side of the mobile phone 111.

Optionally, an icon of the target device on the center line of the mobile phone 111 and in the direction of the first directional operation may be larger than an icon of another target device. For example, in the multi-device scenario 100B shown in FIG. 3J, icons corresponding to the tablet computer 116, the television 113, and the soy milk maker 114 are larger than icons corresponding to the speaker 112 and the computer 117.

In a possible implementation, the mobile phone 111 may select a target device based on a type of sent data. For example, when the type of the data sent by the mobile phone is a picture, the mobile phone 111 may learn whether another device supports a picture. The mobile phone 111 uses an electronic device that can support a picture as the target device. For example, in the user interface 60B shown in FIG.

3L, if the speaker 112 and the soy milk maker 114 do not support a picture, icons corresponding to the speaker 112 and the soy milk maker 114 may not be displayed in the user interface of the mobile phone 111.

In a possible implementation, when the mobile phone 111 determines a final target device, the mobile phone 111 may prompt the user, for example, the mobile phone 111 vibrates or rings to prompt the user, or the display is turned on for a plurality of times to prompt the user with a fact that the final target device is determined.

After the mobile phone 111 determines that the final target device is the tablet computer 116, the mobile phone 111 sends the picture 301 to the tablet computer 116.

In a possible implementation, the mobile phone 111 sends the picture 301 to the tablet computer 116 when the mobile phone 111 determines that the mobile phone 111 and the tablet computer 116 log in to a same account.

Optionally, the mobile phone 111 sends a first request to the tablet computer 116 when the mobile phone 111 determines that the mobile phone 111 and the tablet computer 116 do not log in to a same account, where the first request is used to request the tablet computer 116 to receive the picture 301. The mobile phone 111 receives a first response sent by the tablet computer 116. The mobile phone 111 sends the picture 301 to the tablet computer 116 in response to the first response.

To be specific, the mobile phone 111 may directly send the picture 301 to the tablet computer 116 when the mobile phone 111 and the tablet computer 116 log in to the same account. The mobile phone 111 needs to first send a request to the tablet computer 116 when the mobile phone 111 and the tablet computer 116 do not log in to the same account. If the tablet computer 116 accepts the request, the mobile phone 111 may send the picture 301 to the tablet computer 116. If the tablet computer 116 rejects the request, the mobile phone 111 does not send the picture 301 to the tablet computer 116.

Figure 3M:
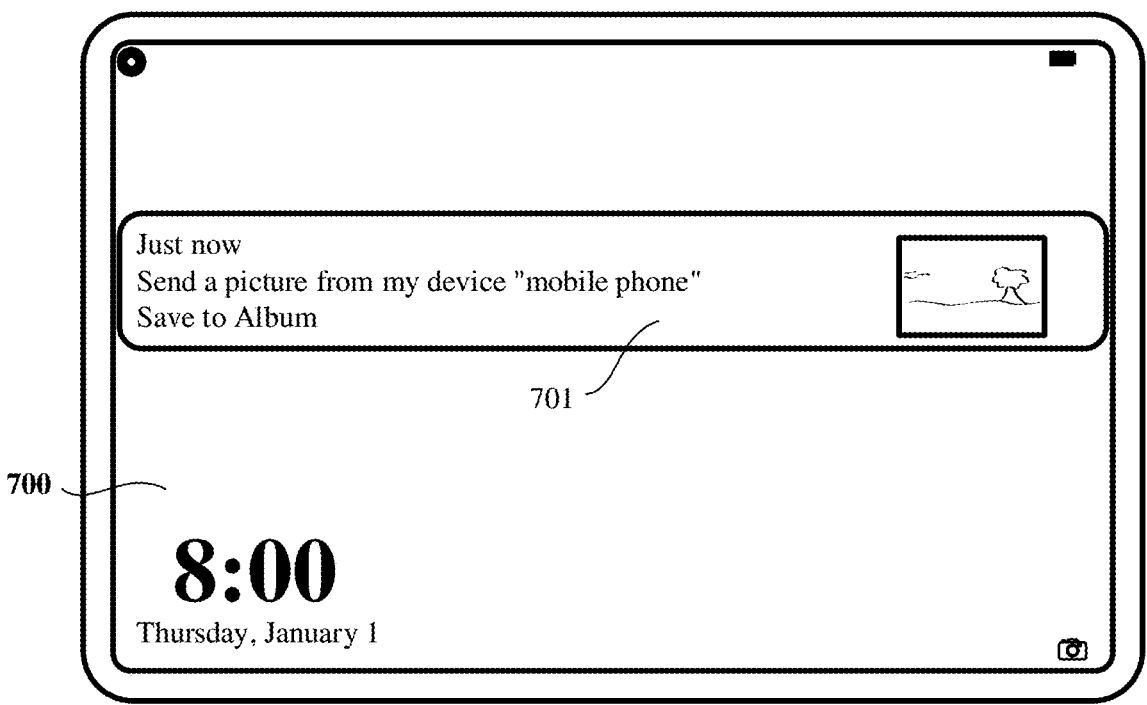

After receiving the picture, the tablet computer 116 may directly store the picture in an album of the tablet computer 116. For example, FIG. 3M shows a user interface 700 of the tablet computer 116. The user interface 700 may include a prompt box 701. The prompt box 701 is used to prompt a user of the tablet computer 116 with a fact that a picture is received from the mobile phone 111 and is stored an album.

In this way, the user can send the picture to the tablet device by performing fewer operations. Therefore, the operations are simple, and user experience can be improved.

The following describes, with reference to FIG. 4A to FIG. 4L, that the mobile phone 11 determines the target device as the tablet computer 116 in the multi-device scenario 100A, and sends a picture to the tablet computer 116. In the embodiments shown in FIG. 4a to FIG. 4l, there is only one electronic device in a direction of a first directional operation of a user.

Figure 4A:
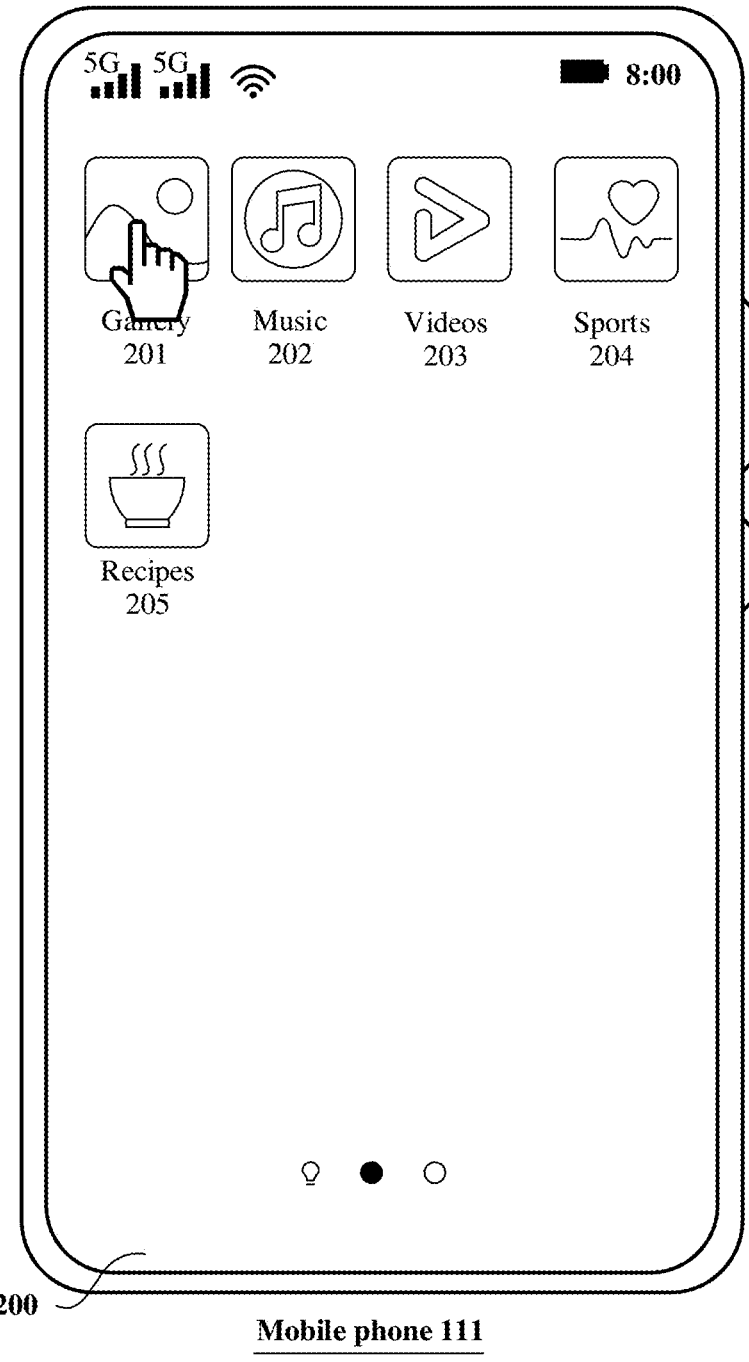
FIG. 4A to FIG. 4C are schematic diagrams of a group of user interfaces of a mobile phone 111 according to an embodiment of this application.
Figure 4B:
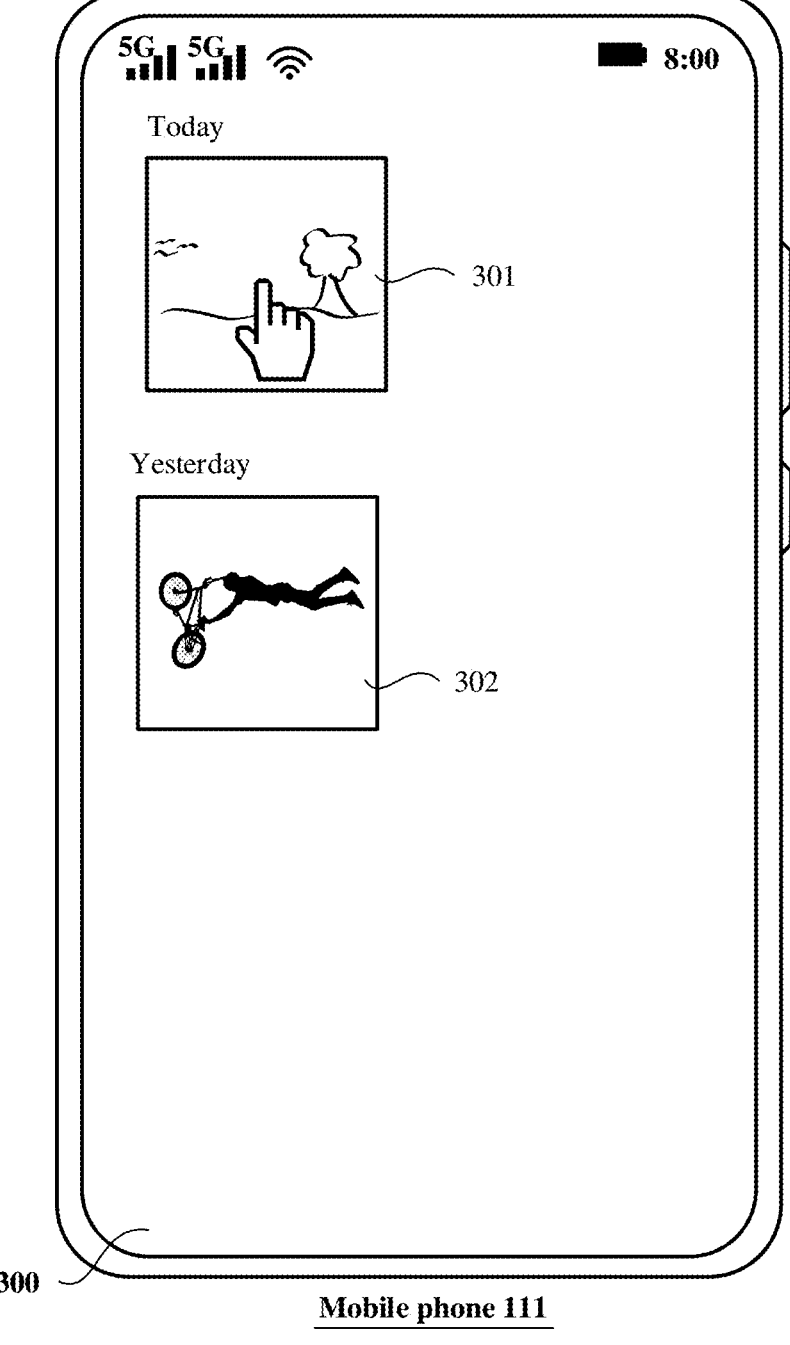
Figure 4C:
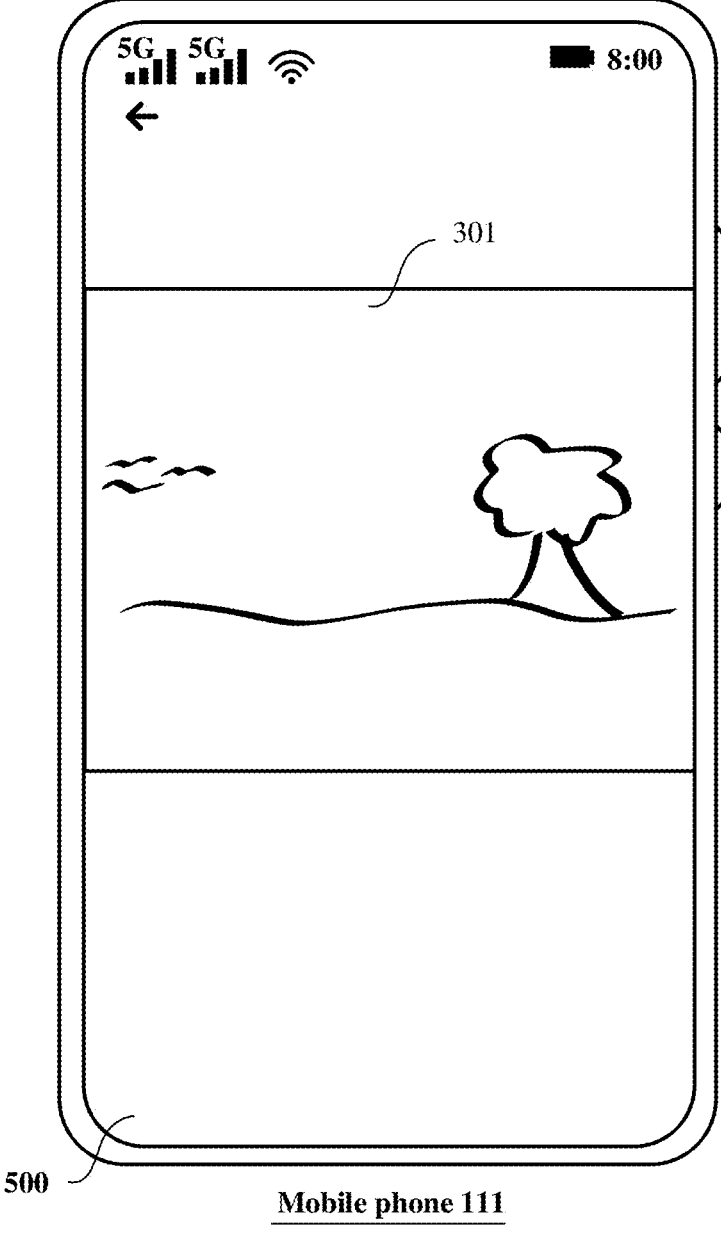

FIG. 4A, FIG. 4B, and FIG. 4C show a specific operation process in which the user selects, from a gallery of a mobile phone 111, a picture that expects to be sent to the target device. For FIG. 4A to FIG. 4C, refer to the foregoing descriptions in FIG. 3A to FIG. 3C. Details are not described herein again.

Figure 4D:
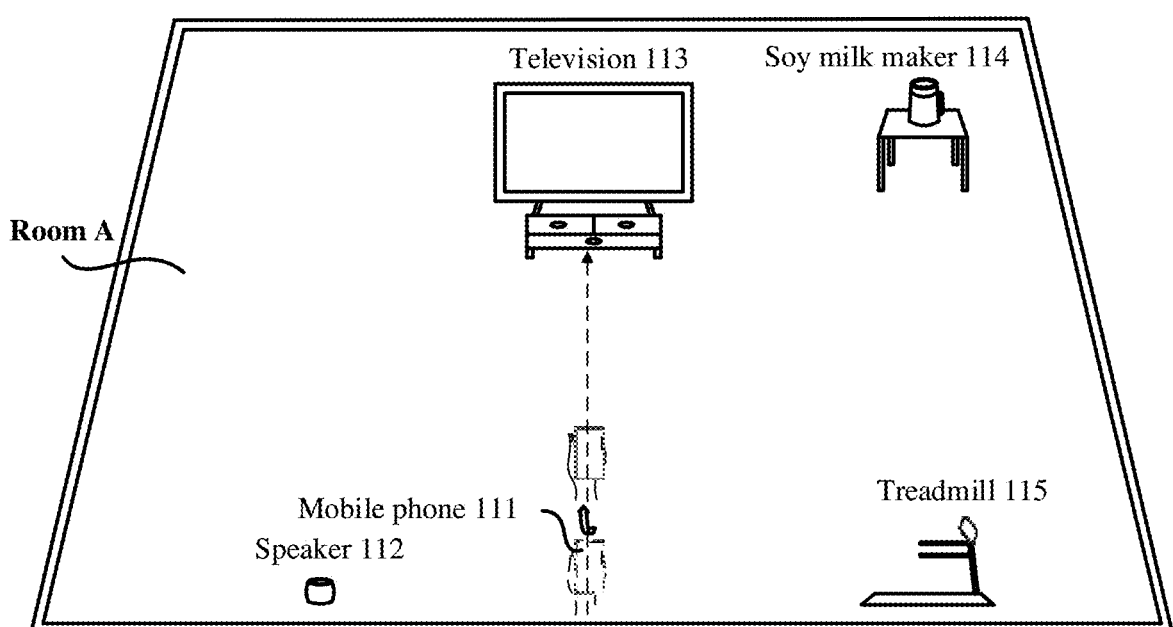
FIG. 4D is a schematic diagram of selecting a target device in a multi-device scenario according to an embodiment of this application.

FIG. 4D shows that the user performs a first directional operation in the multi-device scenario 100A. That is, the user performs the first directional operation on the mobile phone 111 in a direction of a television 113. In the scenario shown in FIG. 4D, there is only one electronic device, that is, the television 113, in the direction of the first directional operation of the user. For details about the first directional operation, refer to the descriptions in FIG. 3E to FIG. 3G. The details are not described herein again. The mobile phone 111 may determine the television 113 as the target device in response to the user operation. In this case, the mobile phone 111 may prompt the user with a fact that the target device has been determined. For a specific prompt manner, refer to the foregoing descriptions. Details are not described herein again. Optionally, the television 113 may also prompt the user with a fact that the television 113 has been determined as the target device. For example, the television 113 may make an alert tone, for example, "Di" or "Dingdong". A specific form of the alert tone is not limited. The television 113 may further prompt the user by changing brightness of a display or alternately turning on and off the screen. A manner of prompting the user is not limited herein.

When the mobile phone 111 determines only one target device, the mobile phone may directly send, to the target device after determining the target device, content selected by the user (that is, a picture 301 shown in FIG. 4C).

Figure 4E:
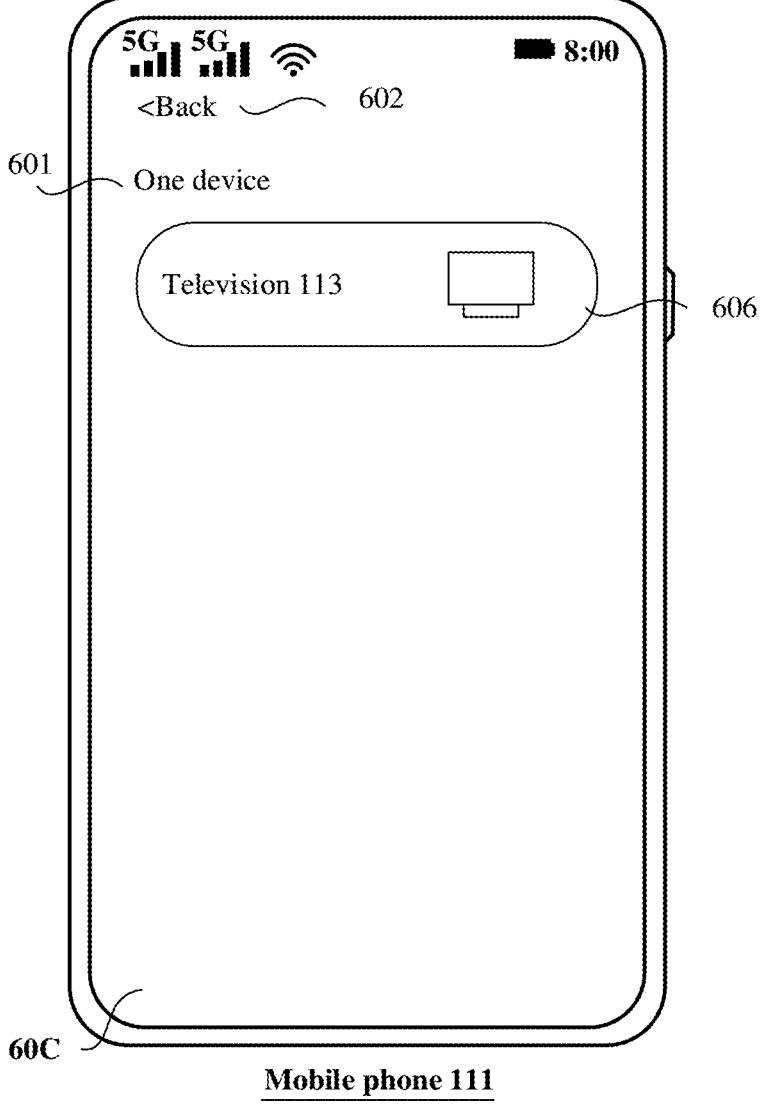
FIG. 4E and FIG. 4F are schematic diagrams of a group of user interfaces of a mobile phone 111 according to an embodiment of this application.

Optionally, the mobile phone 111 may display an icon of the determined target device in a user interface. In this way, the user can see the icon of the target device in the user interface of the mobile phone 111. Therefore, the user may confirm again whether the target device determined by the mobile phone 111 is correct. For example, FIG. 4E shows a user interface 60C of the mobile phone 111. The user interface 60C may include a text 601, a control 602, and a control 606. For the user interface 60C, refer to the descriptions of the user interface 60B. Details are not described herein again.

Figure 4F:
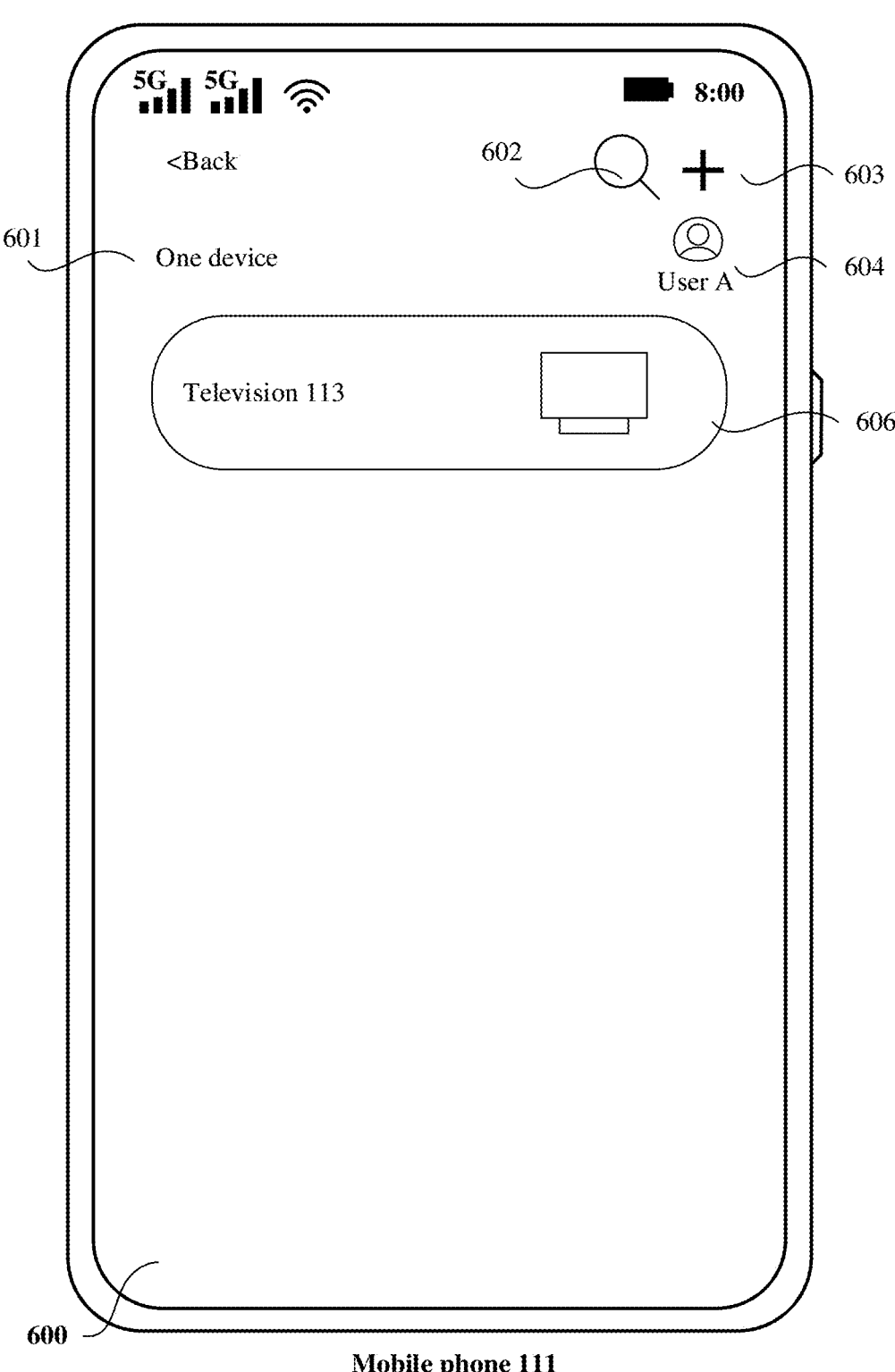

Optionally, for example, as shown in FIG. 4F, the user may tap a control 606 in the user interface 60C, to determine to send a picture in the mobile phone 111 to the television 113.

Figure 4G:
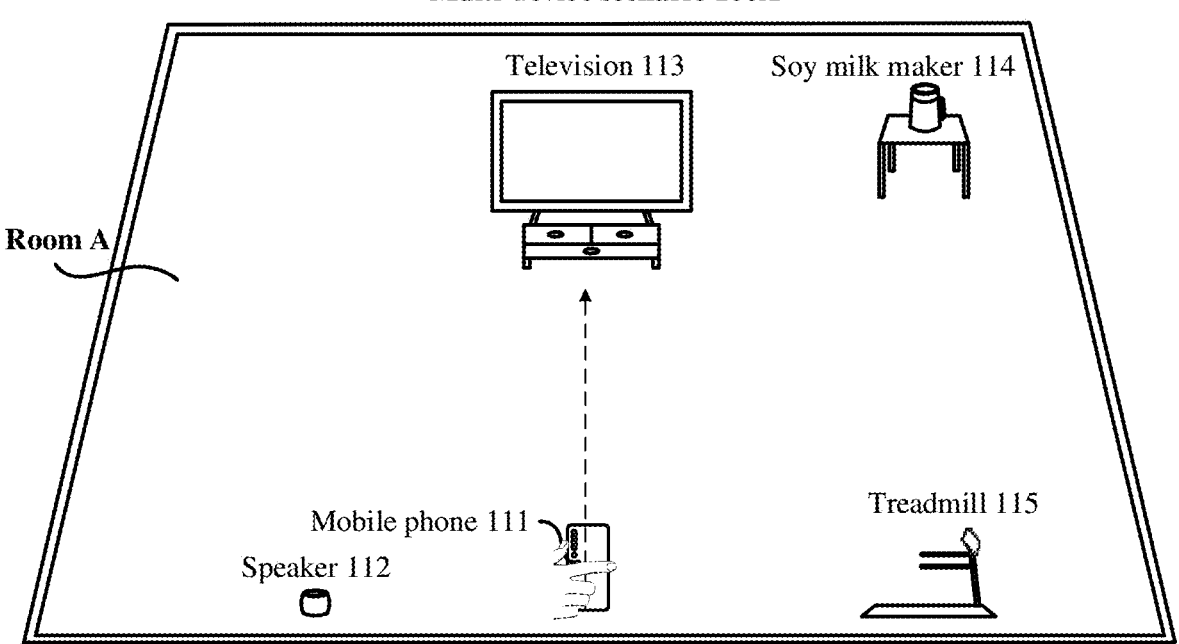
FIG. 4G is a schematic diagram of selecting a target device in a multi-device scenario according to an embodiment of this application.

Optionally, as shown in FIG. 4G, the mobile phone 111 determines the target device based on the first directional operation. After the mobile phone 111 determines the target device, the user flips the mobile phone 111, that is, makes the display of the mobile phone 111 face the target device. The mobile phone 111 sends the picture 301 to the television 113 in response to the user operation.

It may be understood that the first directional operation may be a combination of two operations. For example, the user points the top of the mobile phone 111 to the target device and moves toward the target device. After the mobile phone 111 determines the target device, the user makes the display of the mobile phone 111 face the target device (in this case, the top of the mobile phone 111 may face the sky). To be specific, the first directional operation may be first moving the mobile phone 111 in a direction close to the target device, and then making the display of the mobile phone 111 face the target device.

Optionally, the first directional operation may alternatively be that the user first moves the mobile phone 111 in a direction close to the target device, and then slides a hand from the bottom of the mobile phone 111 to the top in an air manner above the display of the mobile phone 111.

Optionally, the first directional operation may alternatively be first moving the mobile phone 111 in a direction close to the target device, and sliding from bottom to top on the display of the mobile phone 111.

Figure 4H:
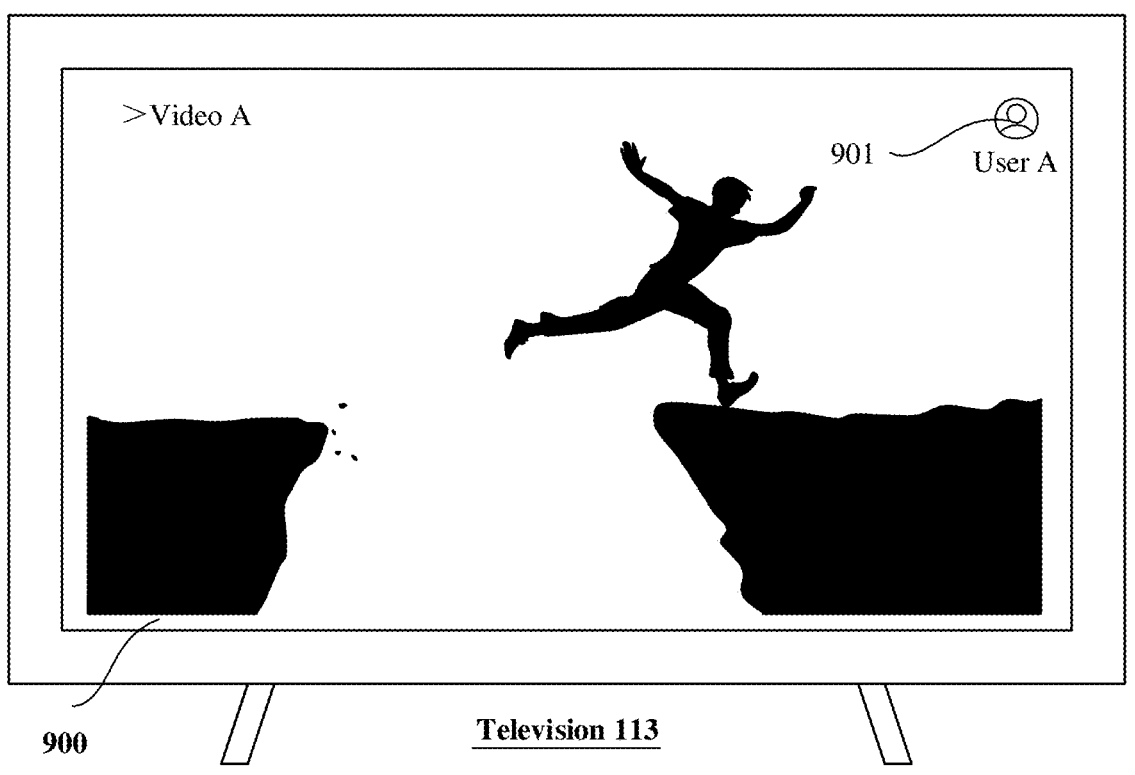
FIG. 4H to FIG. 4K are schematic diagrams of a group of user interfaces of a television 113 according to an embodiment of this application.

FIG. 4H shows a user interface 900 of the television 113. The user interface 900 may be a video currently being played by the television 113.

Figure 4I:
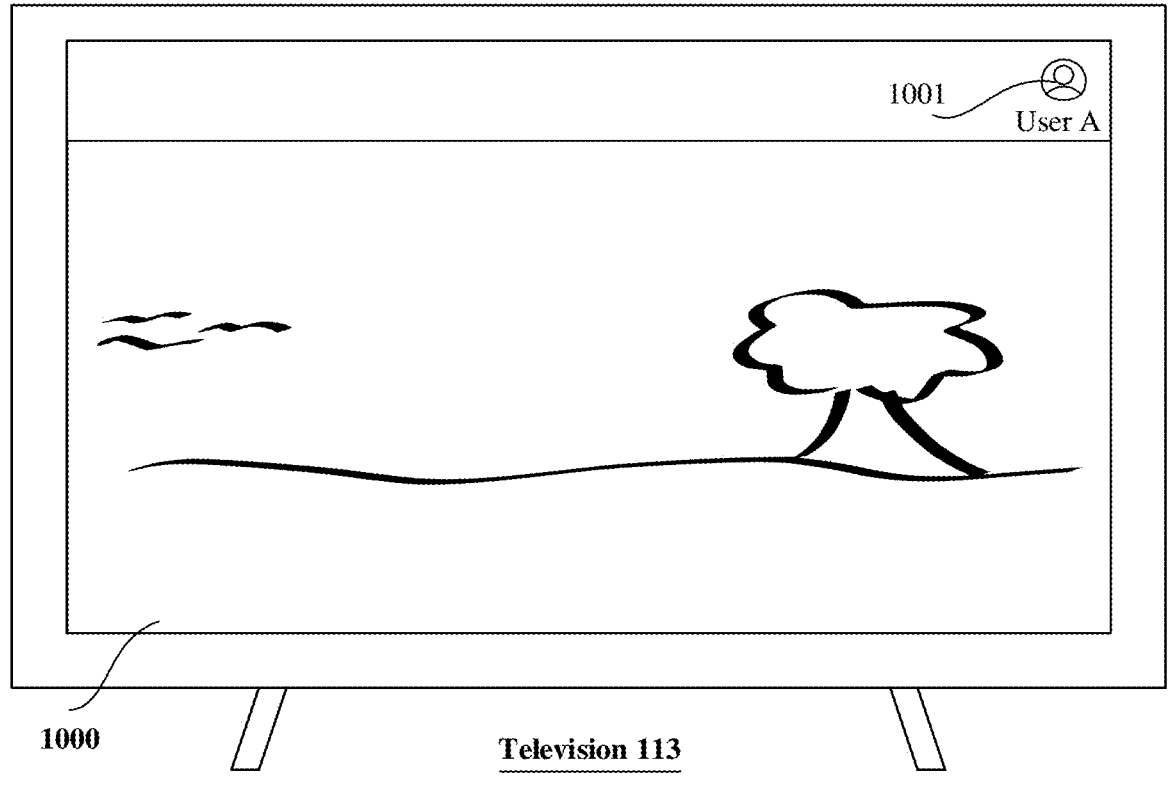

In a possible implementation, if login accounts of the mobile phone 111 and the television 113 are the same, the television 113 may display the picture 301 after receiving the picture 301 sent by the mobile phone 111. As shown in FIG. 4I, the picture 301 may be displayed in a user interface 1000 of the television 113. Both the television 113 and the mobile phone 111 log in to an account of a user A.

Figure 4J:
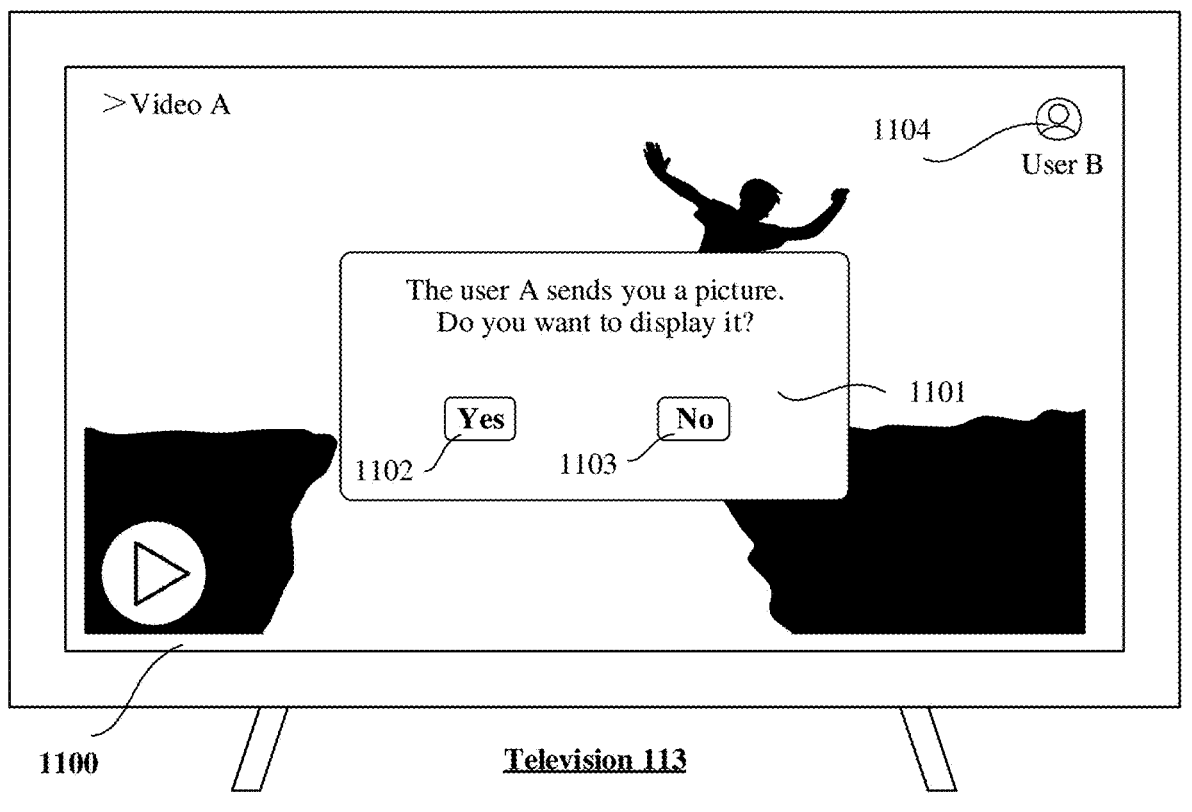
Figure 4K:
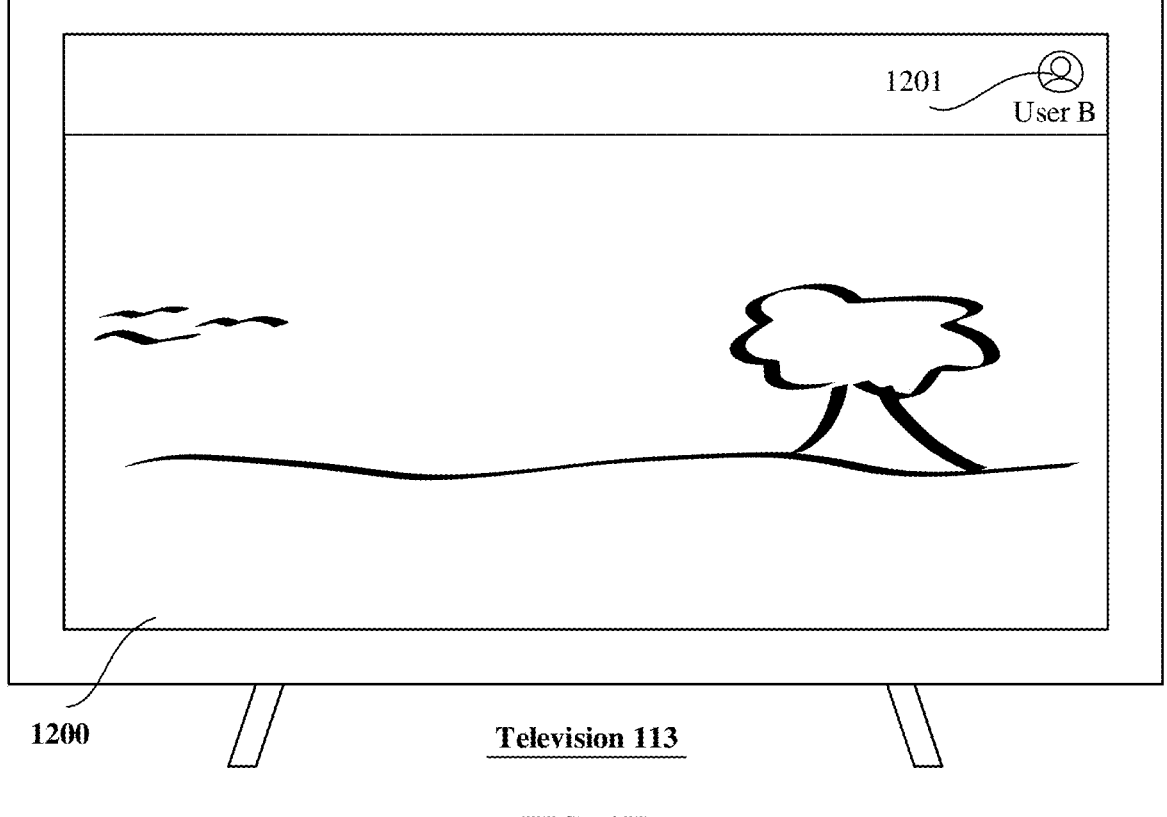
Figure 4L:
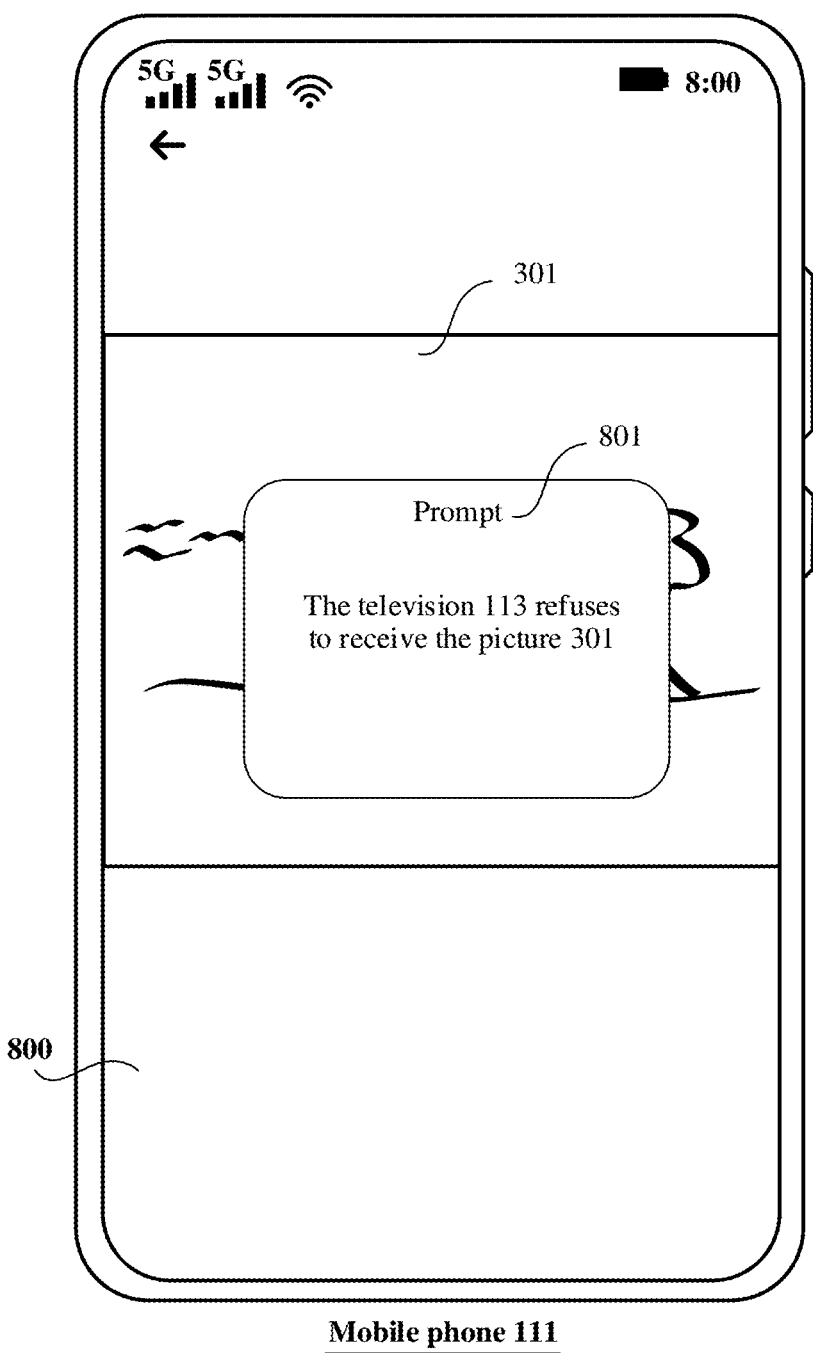
FIG. 4L is a schematic diagram of a user interface of a mobile phone 111 according to an embodiment of this application.

Optionally, if login accounts of the mobile phone 111 and the television 113 are different, that is, the mobile phone 111 logs in to an account of a user A, and the television logs in to an account of a user B, the television 113 displays, only after the user performs confirmation in a user interface of the television 113, the content sent by the mobile phone 111. For example, FIG. 4J shows a user interface 1100 of the television 113. The user interface 1100 may include an option box 1101. The option box 1101 may include a control 1102 and a control 1103. If the user taps the control 102, the television 113 may receive the picture 301 sent by the mobile phone 111. As shown in FIG. 4K, the television 113 may display the picture after receiving the picture 301. If the user taps the control 1103, the television 113 does not receive the picture 301 sent by the mobile phone 111. The mobile phone 111 may receive an indication that the television 113 does not receive the picture 301, and prompt, in a user interface of the mobile phone 111, the user with a fact that the television 113 does not receive the picture. As shown in FIG. 4L, after receiving an indication that the television 113 does not receive the picture 301, the mobile phone 11 may display a user interface 800. The user interface 800 may include the picture 301 and a prompt box 801. The prompt box 801 is used to prompt the user with a fact that the television refuses to receive the picture 301 sent by the mobile phone 111. When the user B is watching TV, the user B may choose not to receive the picture sent by the mobile phone 111 of the user A. In this way, watching, by the user B, the video played on the television 113 may not be affected.

Figure 5A:
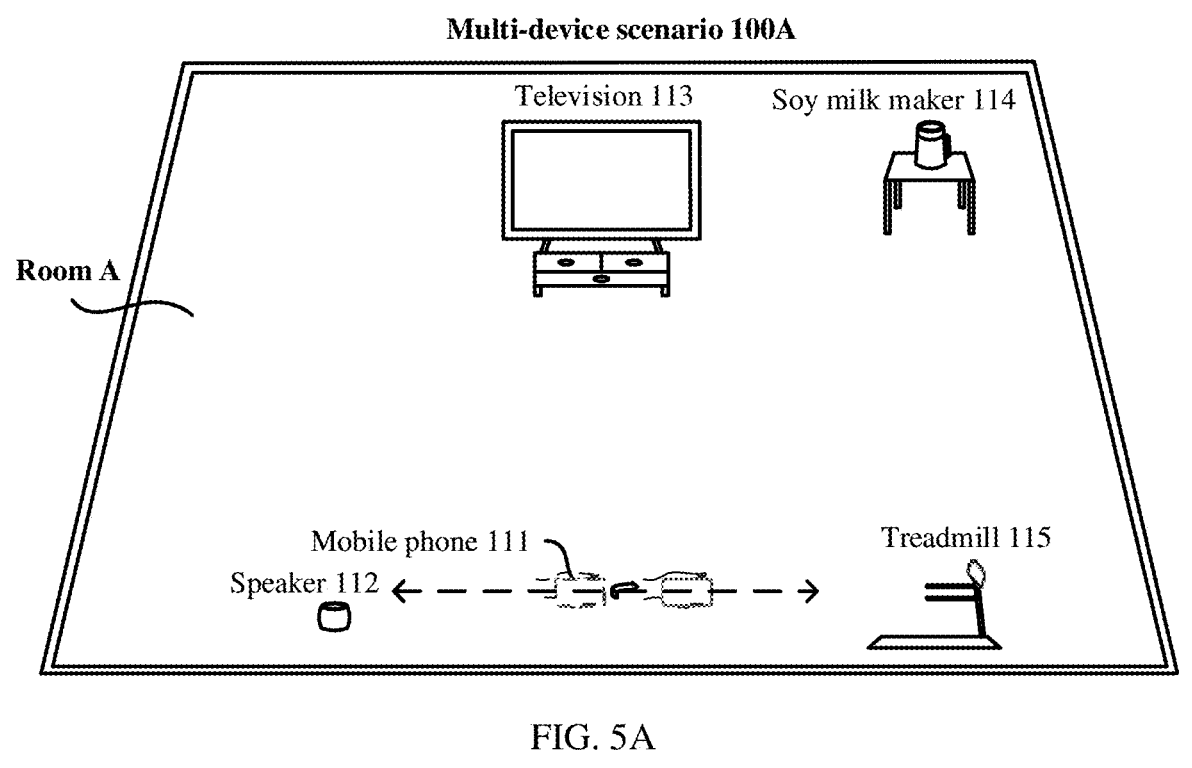

Optionally, in a possible implementation, the mobile phone 111 may determine, as target devices, electronic devices in both the direction and a reverse direction of the first directional operation of the user. As shown in FIG. 5A, the user moves the mobile phone 111 toward the treadmill 115. In response to the user operation, the mobile phone 111 may determine, as the target devices, the treadmill 115 in the direction of the first directional operation of the user and the speaker 112 in the reverse direction of the first directional operation of the user.

Figure 5B:
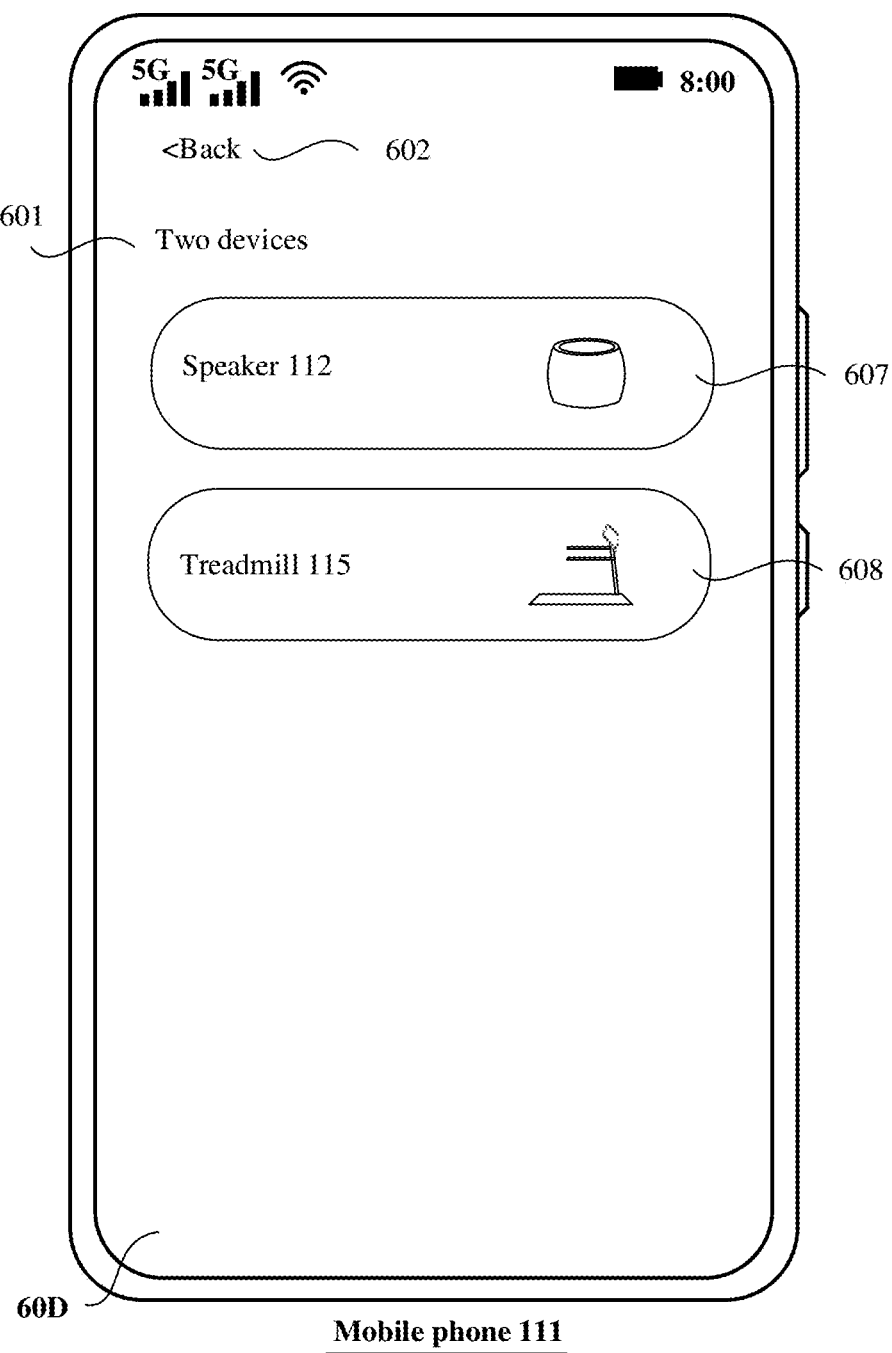
FIG. 5B to FIG. 5D are schematic diagrams of a group of user interfaces of a mobile phone 111 according to an embodiment of this application.

Further, the mobile phone 111 may display icons of the determined target devices in a user interface, for example, a user interface 60D shown in FIG. 5B. The user interface 60D may display an icon 607 of the speaker 112 and an icon 608 of the treadmill 115. For the user interface 60D, refer to the foregoing descriptions of the user interface 60A. Details are not described herein again.

Figure 5C:
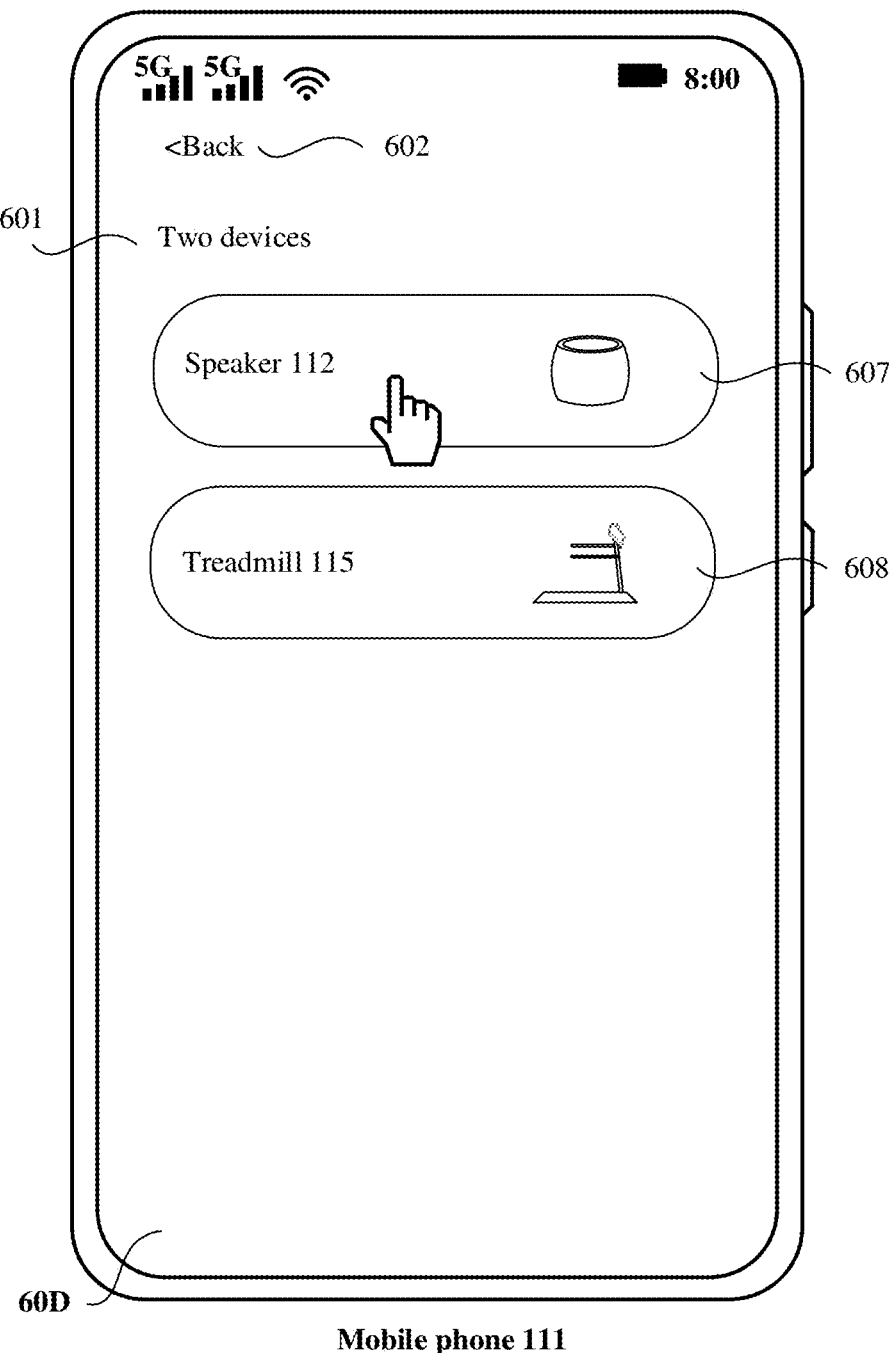
Figure 5D:
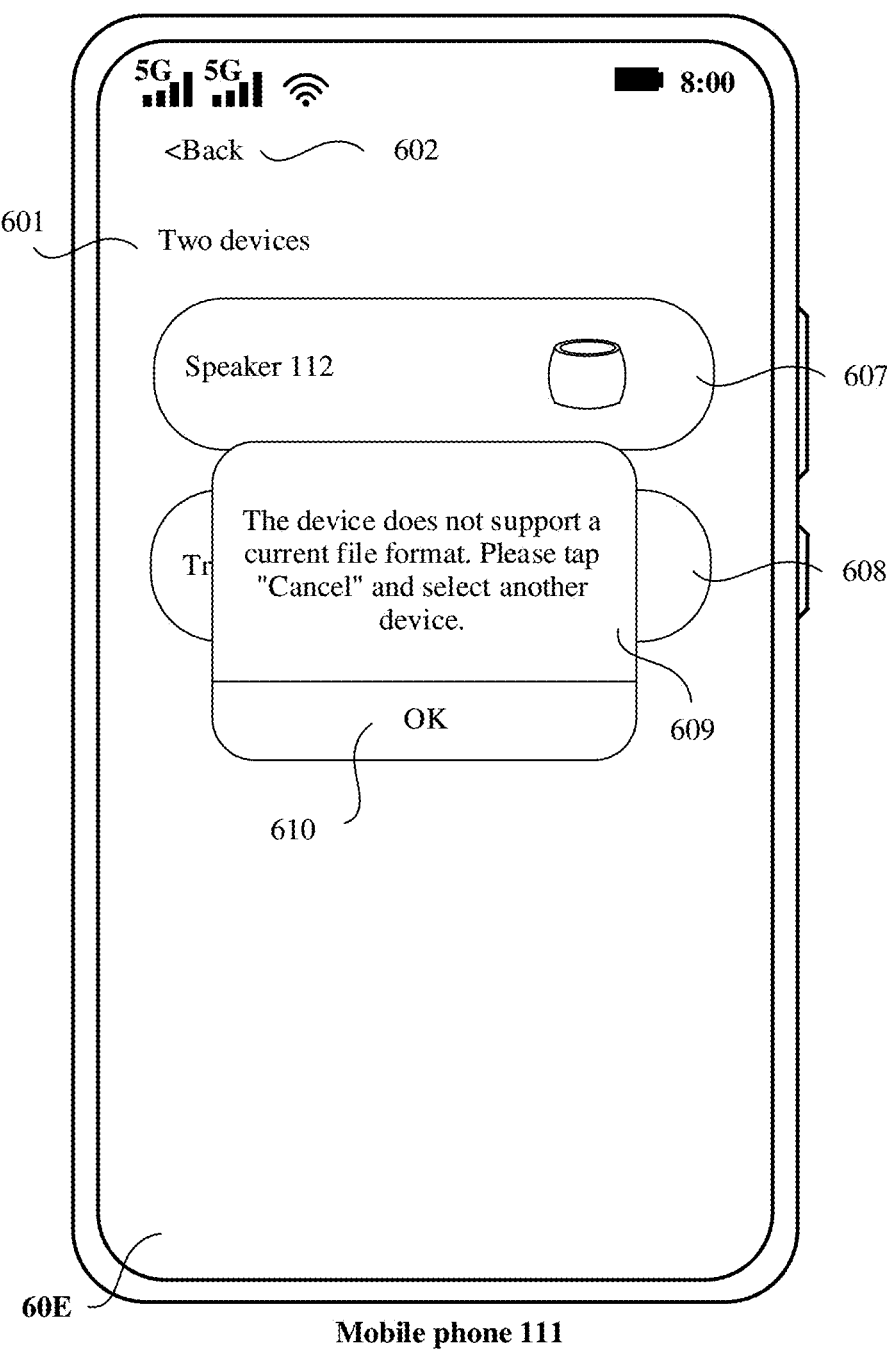

Optionally, the mobile phone may determine whether the target device supports a format of the content selected by the user. For example, as shown in FIG. 5C, the user taps the icon 607 of the speaker 112, and selects the speaker 112 as the target device that receives the picture sent by the mobile phone 111. The mobile phone 111 may determine that the speaker 112 does not support the format of the picture. The mobile phone 111 may display a prompt box to prompt the user with a fact that the target device does not support the format of the picture selected by the user. For example, FIG. 5D shows a user interface 60E. The user interface 60E may include a prompt box 609. The prompt box 609 is used to prompt the user with a fact that the target device does not support the format of the picture. The prompt box 609 may include a control 610. After the user taps the control 610, the mobile phone 111 may not display the prompt box 609.

In another feasible example, the user may further choose to send a video in the mobile phone 111 to the television 113. After receiving the video, the television 113 plays the video. For a specific process in which the mobile phone 111 sends the video to the television 113, refer to the descriptions in FIG. 3A to FIG. 3L. Details are not described herein again.

Figure 5E:
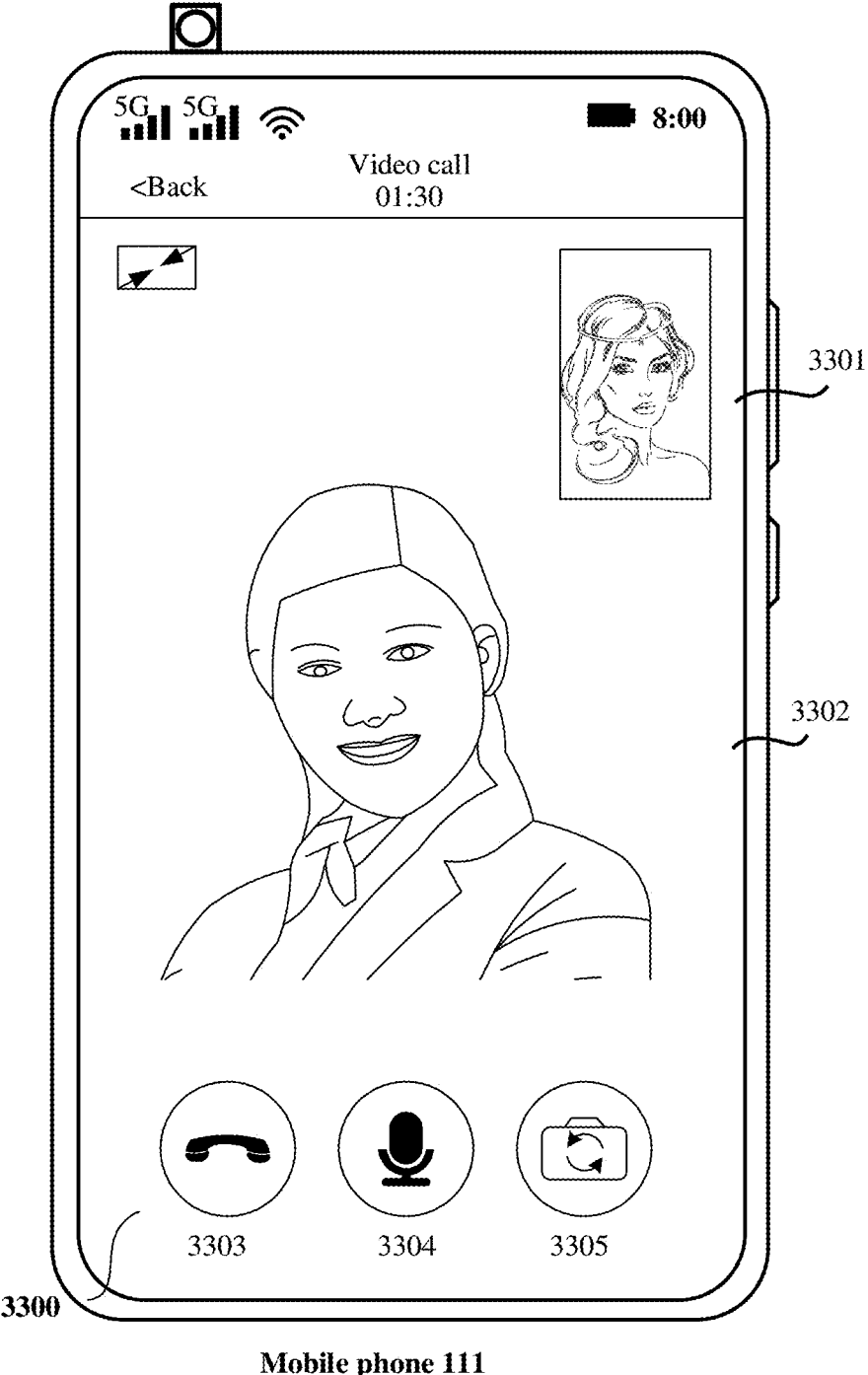
FIG. 5E is a schematic diagram of a video call interface of a mobile phone 111 according to an embodiment of this application.
Figure 5F:
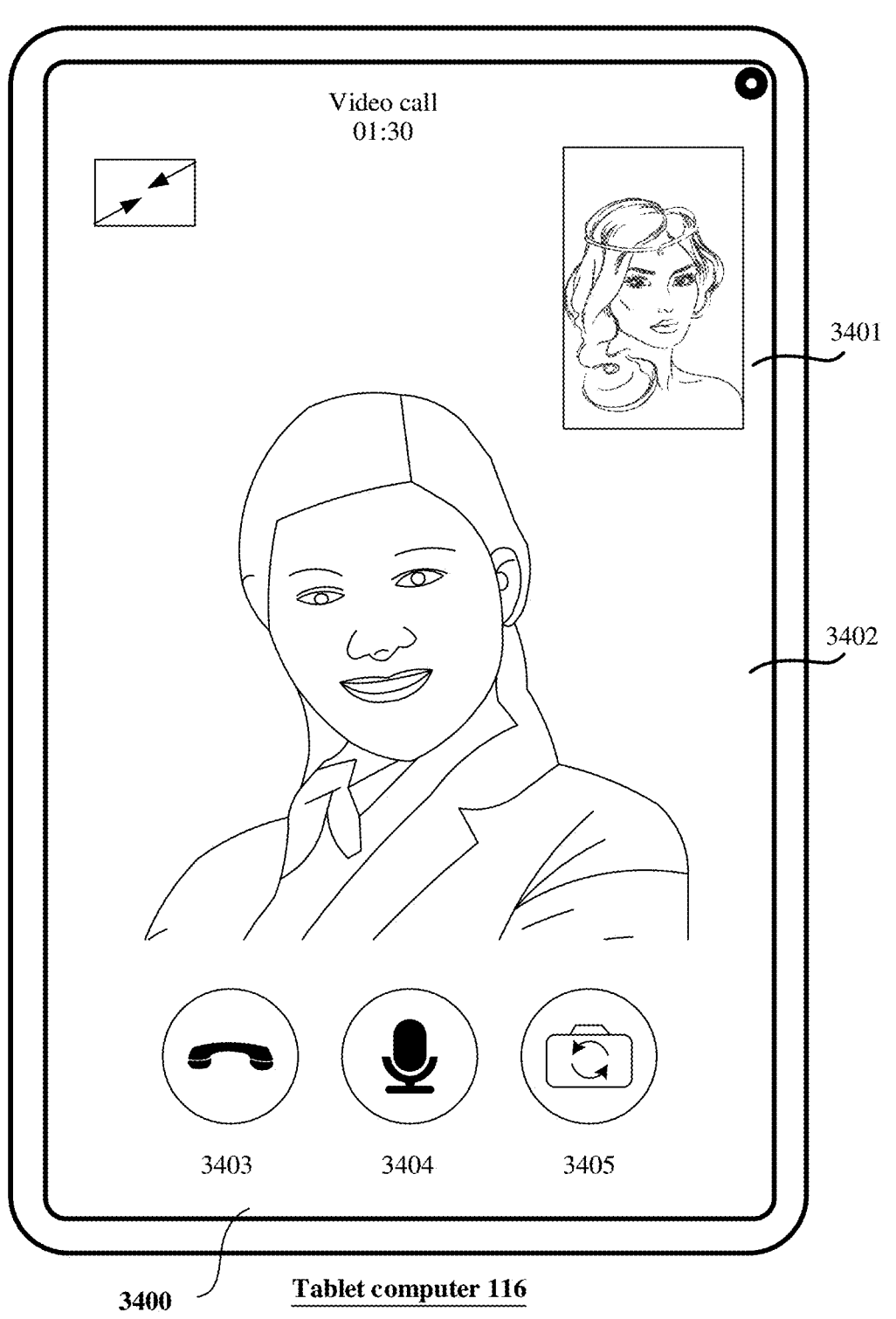
FIG. 5F is a schematic diagram of a video call interface of a tablet computer 116 according to an embodiment of this application.

In another feasible example, the user may further choose to send video call data in the mobile phone 111 to the tablet computer 116. After receiving the video call data, the tablet computer 116 displays a video call interface. The video call interface of the mobile phone 111 is shown in FIG. 5E. FIG. 5E shows a video call interface 3300. The video call interface 3300 may include a video frame 3301, a video frame 3302, a control 3303, a control 3304, and a control 3305. The video frame 3301 and the video frame 3302 may be respectively video frames shot by two devices that are making a video call. Display locations of the video frame 3301 and the video frame 3302 may be interchanged. The user may tap the control 3303 to end the video call. The user may tap the control 3303 to turn on or off a microphone. The user may tap the control 3305 to switch between a front camera and a rear camera of the mobile phone to shoot a video frame. After the user taps the control 3305, the video frame that is of the mobile phone 111 and that is displayed in the video call interface 3300 changes. For details about the video call interface 3300, refer to descriptions in the conventional technology. The details are not described herein. After the tablet computer receives the video call data of the mobile phone 111, a video call interface 3400 may be displayed in the tablet computer 116. As shown in FIG. 5F, for the video call interface 3400 shown in FIG. 5F, refer to the descriptions of the video call interface 3300. Details are not described herein again.

For a specific process in which the mobile phone 111 sends the video call to the tablet computer 116, refer to the descriptions in FIG. 3A to FIG. 3M. Details are not described herein again.

In another feasible example, the user may choose to send an audio in the mobile phone 111 to the speaker 112. After receiving the audio, the speaker 112 plays the audio. For example, for a specific process in which the mobile phone 111 sends the audio to the speaker 112, refer to the descriptions in FIG. 3A to FIG. 3L. Details are not described herein again.

In another feasible example, the user may choose to send a food preparation parameter in the mobile phone 111 to the soy milk maker 114. After receiving the food preparation parameter, the soy milk maker 114 may set a working mode based on the food preparation parameter. For example, the food preparation parameter may be heating for 10 minutes and stirring for 2 minutes. For a specific process in which the mobile phone 111 sends the food preparation parameter to the soy milk maker 114, refer to the descriptions in FIG. 3A to FIG. 3L. Details are not described herein again.

In another feasible example, the user may choose to send a motion parameter in the mobile phone 111 to the treadmill 115. After receiving the motion parameter, the treadmill 115 may set a motion mode based on the motion parameter. The motion parameter may include motion duration, a motion speed, a treadmill inclination, and the like. For a specific process in which the mobile phone 111 sends the motion parameter to the treadmill 115, refer to the descriptions in FIG. 3A to FIG. 3L. Details are not described herein again.

Optionally, when a target device and an associated device log in to a same account, permission of whether the electronic device can interact with the target device may be set in the associated device. For example, if the television 113 and the tablet computer 116 log in to a same account (for example, a Huawei cloud account), a user of the tablet computer 116 may set, in the tablet computer 116, whether the mobile phone 111 can exchange data with the television 113. If it is set in the tablet computer 116 that the mobile phone 111 is prohibited from exchanging data with the television 113, the mobile phone 111 cannot send the picture 301 to the television 113. If it is set in the tablet computer 116 that the mobile phone 111 is allowed to exchange data with the television 113, the mobile phone 111 may send the picture to the television 113.

In the control method applied to the electronic device provided in this embodiment of this application, the electronic device detects a fifth operation. The electronic device obtains a direction of the fifth operation and a third posture of the electronic device in response to the fifth operation. The electronic device determines a target device based on the direction of the fifth operation and/or the third posture. The electronic device sends a fourth request to the target device, where the fourth request is used to request the target device to send second content. When the electronic device and the target device log in to a same account, the electronic device displays the second content sent by the target device. When the electronic device and the target device do not log in to a same account, the electronic device displays third content sent by the target device, where the third content is different from the second content. The second content may include first information of a first task currently being executed by the target device and/or a first control instruction of the first task, and the third content is used to indicate a current working status of the target device.

The following describes another specific implementation process of sending (or sharing) a target file in this application. A user interaction process in another method for sending a target file may be different from the user interaction processes shown in FIG. 1A to FIG. 5F. For details, refer to an interaction process in which a user shares a target file in an electronic device with a target device that is shown in FIG. 6 to FIG. 21.

In some embodiments, a method for sharing a file between an electronic device and a target device is as follows: A user taps a sharing function icon on a display of the electronic device, where the display of the electronic device displays a device list, and the device list includes device names of a plurality of devices around the electronic device. The user queries the device names in the device list and selects a device name of a target device with which sharing is performed, so that the electronic device shares the file with the target device. Operation steps of the file sharing method are complex, and target file sharing efficiency is low. FIG. 6 to FIG. 21 provide a target file sharing method in embodiments of this application, to improve target file sharing efficiency.

With reference to a target file sharing scenario, the following describes the target file sharing method by using a specific embodiment.

Figure 6:
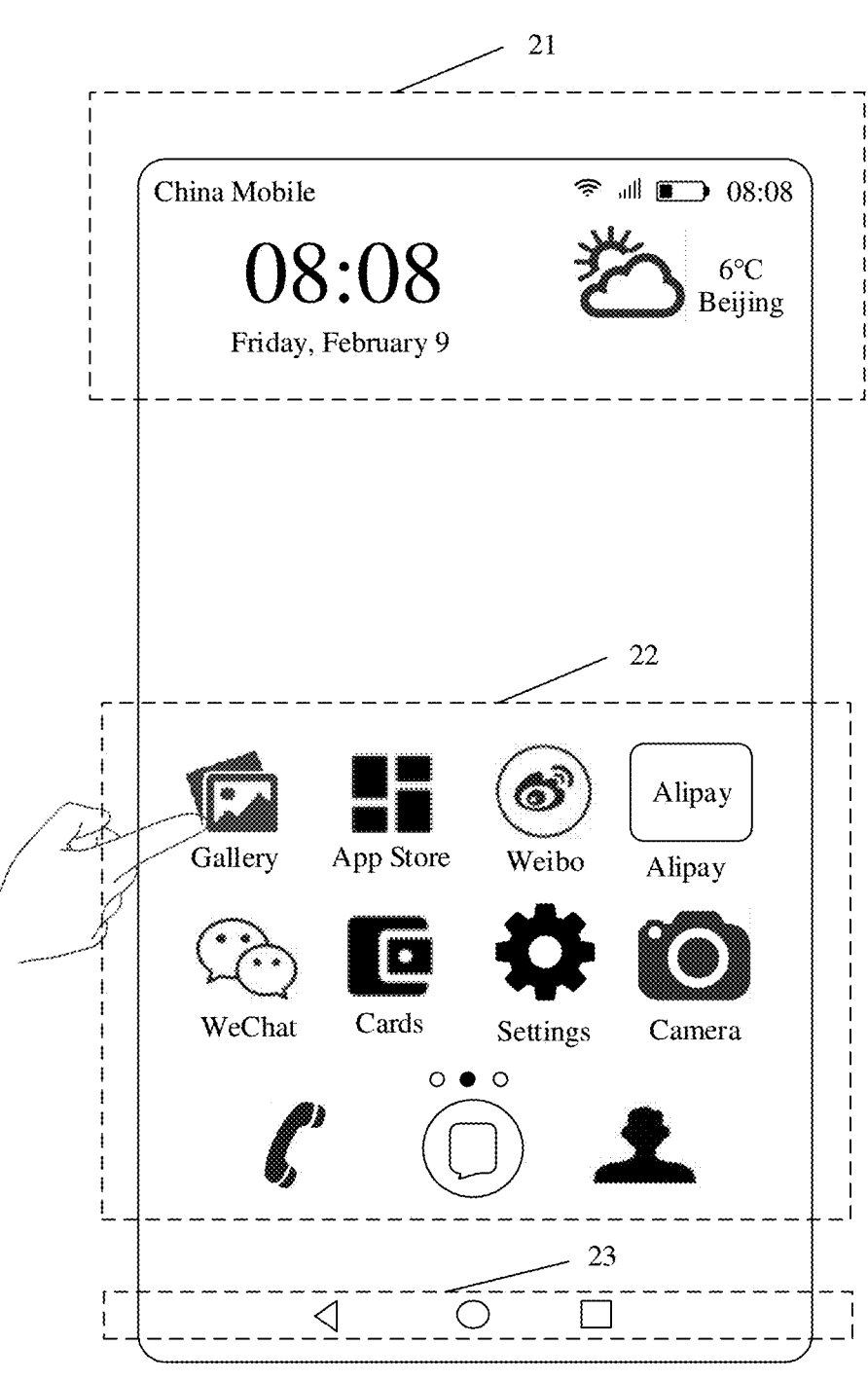
FIG. 6 is a schematic diagram of an interface of an electronic device of a user according to an embodiment of the present invention.

Sharing a picture is used as an example. It is assumed that a user needs to share a picture in a gallery with Vision, so that Vision can display the picture. The user opens an electronic device of the user, so that a display of the electronic device displays a home screen of the electronic device. FIG. 6 is a schematic diagram of an interface of an electronic device of a user according to an embodiment of this application. As shown in FIG. 6, the schematic diagram includes a status bar 21, a menu bar 22, and a function bar 23. The status bar 21 includes an operator, a current time, a current geographical location and local weather, a network status, a signal status, and a power battery level. As shown in FIG. 6, the operator is China Mobile; the current time is 08:08 on Friday, February 9; the current geographical location is Beijing, and weather in Beijing is cloudy and a temperature is 6 degrees Celsius; the network status is Wi-Fi; the signal status is full signal strength, indicating that a current signal is strong; and a black part in the power battery level may indicate a remaining battery level of the electronic device. The menu bar 22 includes an icon of at least one application, and there is a name of a corresponding application below the icon of each application, for example, Gallery, App Store, Weibo, Alipay, WeChat, Cards, Settings, Camera, Phone, Messages, and Contacts. Locations of the icon of the application and the name of the corresponding application may be adjusted based on a preference of the user. This is not limited in this embodiment of this application. The function bar 23 includes a back key, a home screen key, and a menu key. The back key is used to back to a previous level, the home screen key is used to back to a home screen, and the menu key is used to display a plurality of background applications.

It should be noted that the schematic diagram of the interface of the electronic device shown in FIG. 6 is an example for display in this embodiment of this application. The schematic diagram of the interface of the electronic device may alternatively be in another style. This is not limited in this embodiment of this application.

Figure 7:
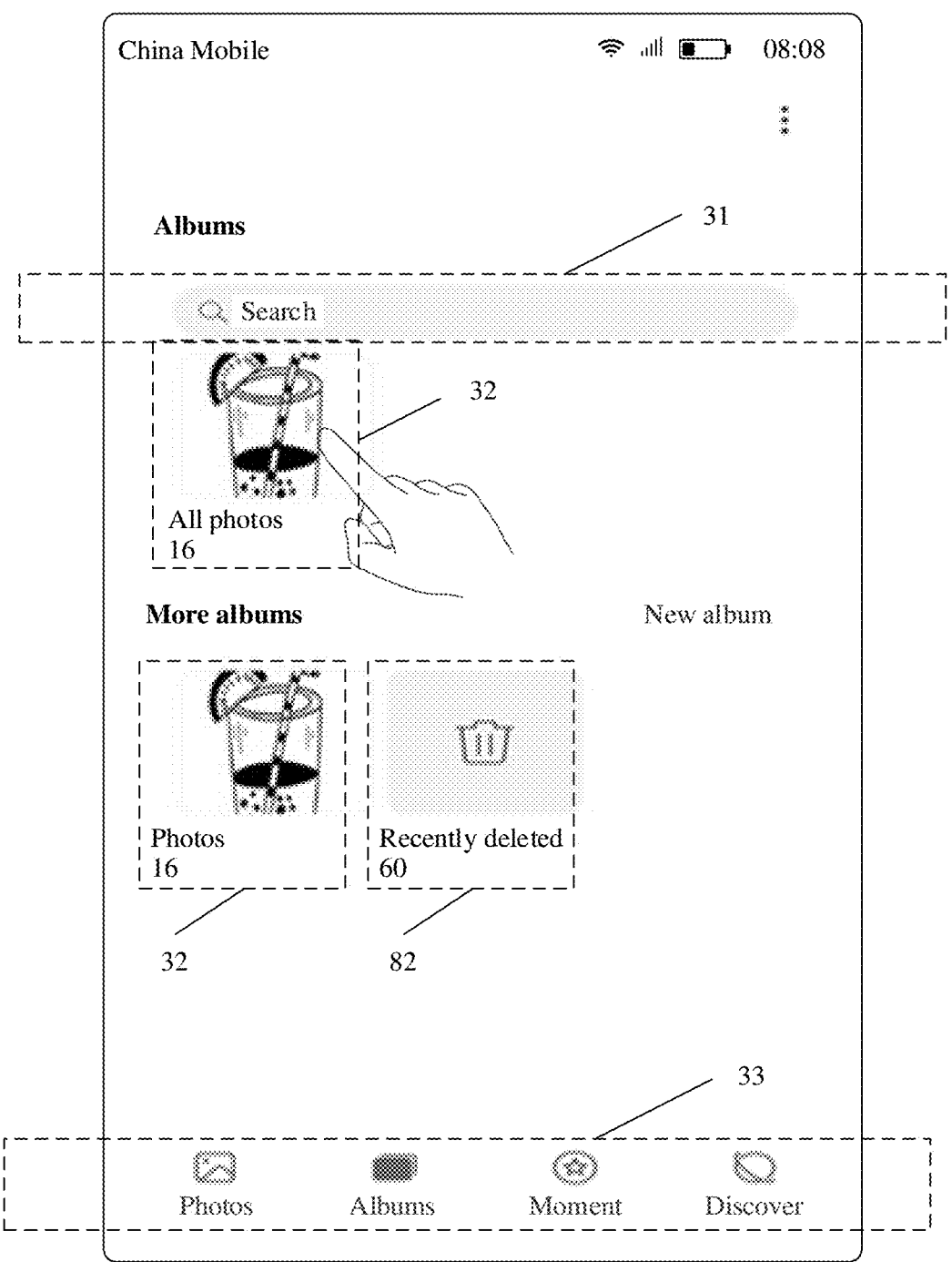
FIG. 7 is another schematic diagram of an interface of an electronic device of a user according to an embodiment of the present invention.

As shown in FIG. 6, the user may tap Gallery on the menu bar 22, so that a display of an electronic device of the user displays an interface of Gallery. FIG. 7 is another schematic diagram of an interface of an electronic device of a user according to an embodiment of this application. As shown in FIG. 7, the schematic diagram of the interface includes a photo search bar 31, at least one album 32, and a classification bar 33. The photo search bar 31 is used to perform search based on a keyword entered by the user. A type of the keyword includes a place, a person, or a time point. For example, if the keyword is Tianjin, a display of the electronic device may display all pictures taken in Tianjin. The at least one album 32 includes but is not limited to one or any combination of All photos, Photos, and Recently deleted. Further, the schematic diagram of the interface includes a "New album" key. The user may also customize a new album by tapping the "New album" key on the display. The classification bar 33 includes a photo bar, an album bar, a moment bar, and a discovery bar. For example, when the user taps the photo bar, the display of the electronic device displays all pictures of the electronic device; when the user taps the album bar, as shown in FIG. 7, the display of the electronic device displays an "All photos" album of the electronic device; when the user taps the moment bar, the display of the electronic device displays pictures obtained through time division; and when the user taps the discovery bar, the display of the electronic device displays pictures obtained after automatic classification, where the automatic classification includes but is not limited to one or any combination of landscapes, people, and food.

It should be noted that the schematic diagram of the interface of the electronic device shown in FIG. 7 is an example for display in this embodiment of this application. The schematic diagram of the interface of the electronic device may alternatively be in another style. This is not limited in this embodiment of this application.

Figure 8:
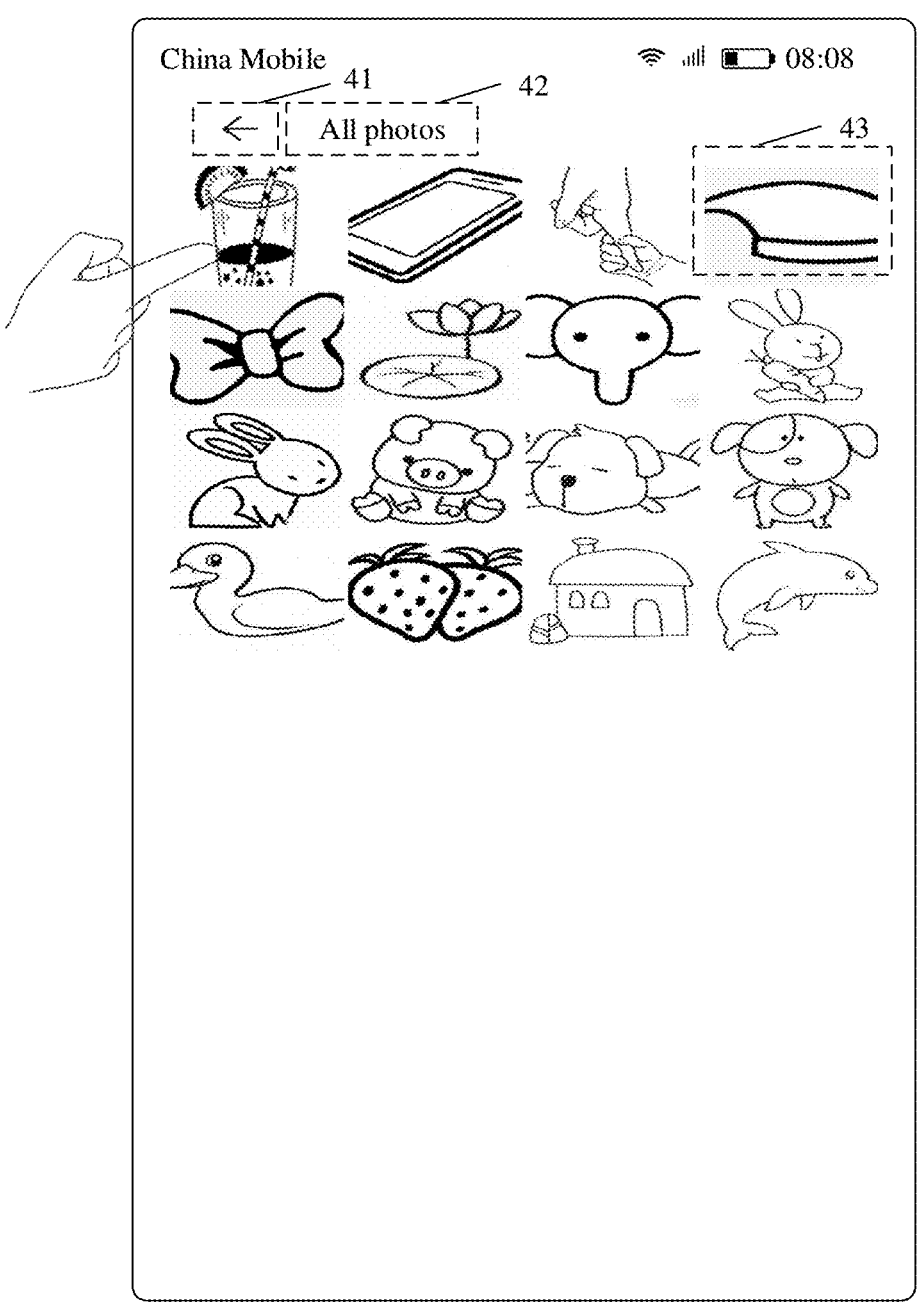
FIG. 8 is another schematic diagram of an interface of an electronic device of a user according to an embodiment of the present invention.

As shown in FIG. 7, the user taps the "All photos" album, so that the display of the electronic device of the user displays a schematic diagram of an interface of the "All photos" album. FIG. 8 is another schematic diagram of an interface of an electronic device of a user according to an embodiment of this application. As shown in FIG. 8, the schematic diagram of the interface includes a back key 41, an "All photos" album name 42, and at least one picture 43. The back key 41 is used to back to a previous-layer interface, that is, back to the interface of Gallery.

It should be noted that the schematic diagram of the interface of electronic device shown in FIG. 8 is an example for display in this embodiment of this application. The schematic diagram of the interface of the electronic device may alternatively be in another style. Alternatively, the user may tap another album to select a to-be-shared picture. This is not limited in this embodiment of this application.

The user may select a target file by performing a selection operation. As shown in FIG. 8, the target file is a to-be-shared picture. For example, the selection operation is an operation of tapping a picture. Specifically, a touchscreen driver detects the selection operation, and sends the selection operation to an input manager, and the input manager selects the target file based on the selection operation. It should be noted that the selection operation of tapping the picture shown in FIG. 8 is merely an example operation of selecting the target file, and the target file may alternatively be selected in another manner. A manner of selecting the target file is not limited in this embodiment of this application.

Figures 9A, 9B, 9C, 9D, 9E:
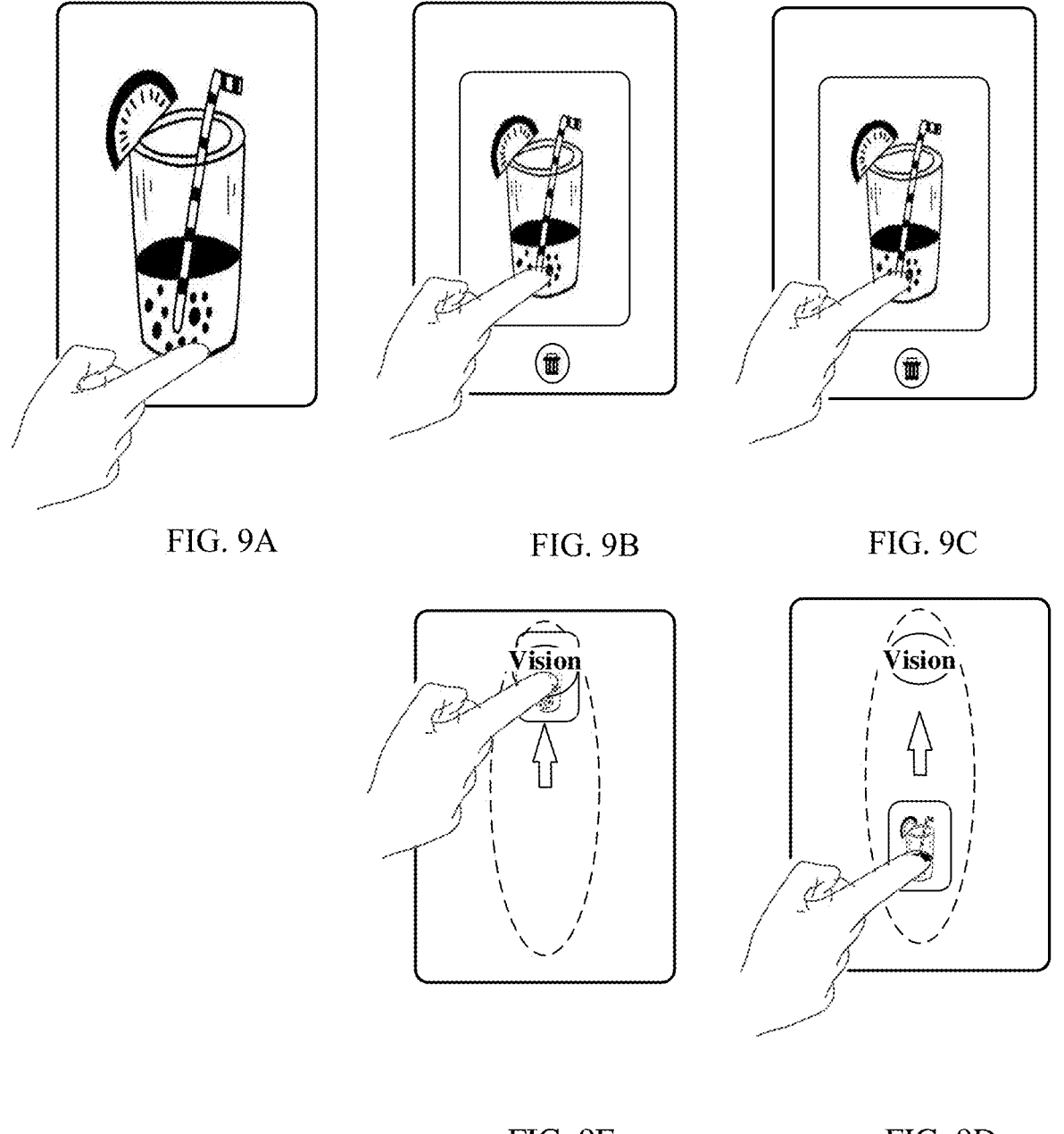
FIG. 9A to FIG. 9E are a schematic diagram of an operation of sharing a target file to a target device according to an embodiment of the present invention.
Figures 15A, 15B, 15C, 15D, 15E:
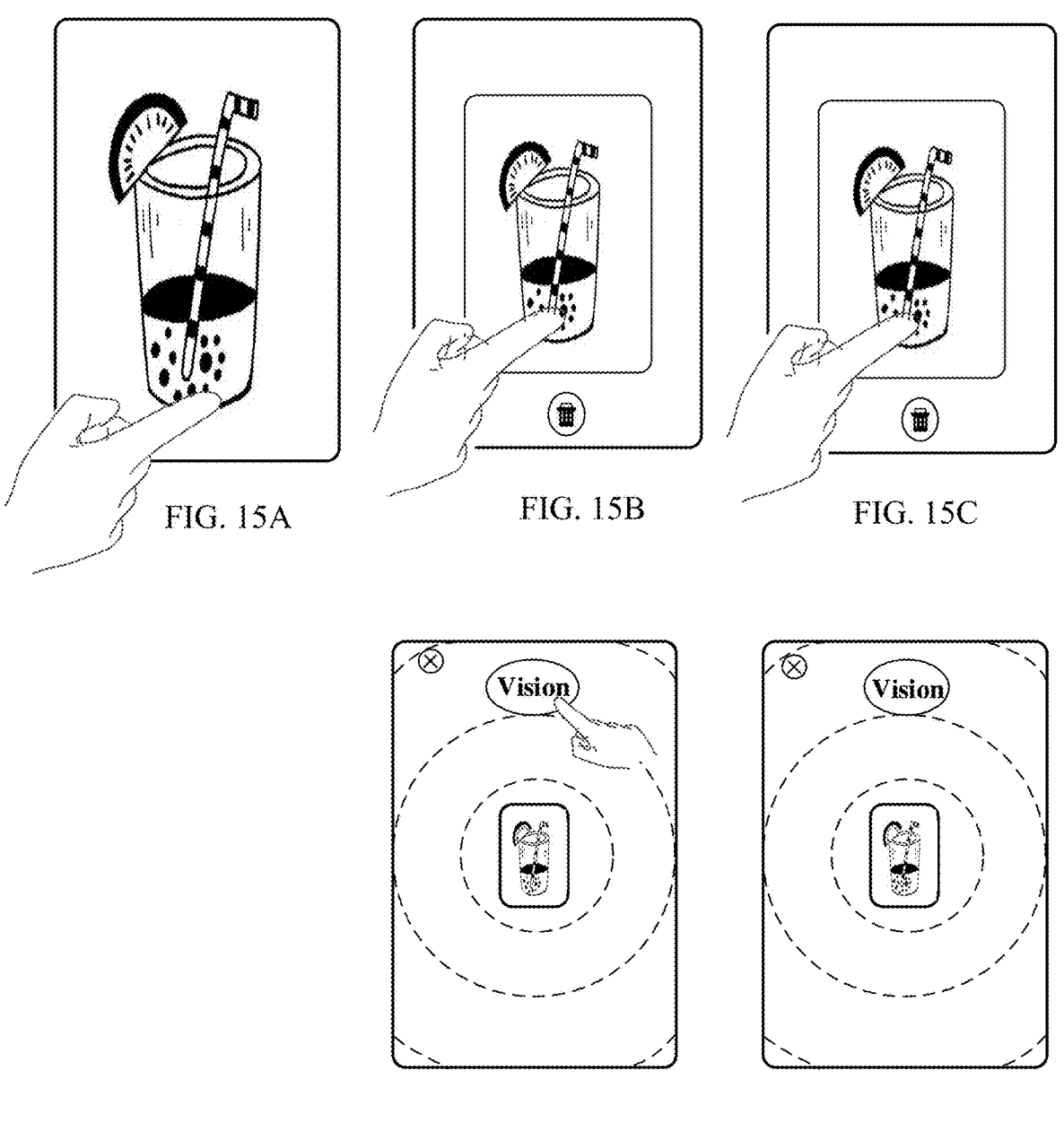
FIG. 15A to FIG. 15E are another schematic diagram of an operation of sharing a target file to a target device according to an embodiment of the present invention.

The user may trigger, by performing a first operation, the display of the electronic device to display a sharing interface, where the interface includes an icon of at least one shareable device, and the icon of the shareable device is used to indicate a positioned shareable device around the electronic device. The first operation may include a first slide operation and a first press operation. Sharing a picture is used as an example. FIG. 9A to FIG. 9D are a schematic diagram of a sharing interface according to an embodiment of this application. As shown in FIG. 9A, after selecting the picture, the user drags the picture with a finger to slide upward from a bottom area of the display of the electronic device. Optionally, a size of the picture may be gradually scaled down to a specific size as the finger slides upward. A schematic diagram obtained after the sliding is FIG. 9B. After dragging the picture with the finger to slide upward, the user presses the picture, where a schematic diagram of pressing the picture is FIG. 9C, and keeps press duration greater than or equal to first specified duration, for example, the first press duration is 700 ms. Optionally, after the press duration is greater than or equal to the first specified duration, the size of the picture is scaled down for a second time, and the picture that is scaled down for the second time continues to move with movement of the finger. The display of the electronic device displays the sharing interface. The sharing interface may include icons of all shareable devices around the electronic device, or may include only an icon of a shareable device that the head of the electronic device faces. A positioning driver of the electronic device may position the shareable device that the head of the electronic device faces. When the sharing interface includes only the icon of the shareable device that the head of the electronic device faces, it may be convenient for the user to select the target device more accurately, and the shareable device that the head of the electronic device faces may also be intuitively displayed. The sharing interface shown in FIG. 9D includes an icon of one shareable device, that is, an icon of Vision. As shown in FIG. 9D, in the interface, a border of a specified shape surrounds the picture that is scaled down for the second time and the icon of Vision, and an indication graphic is set between the picture that is scaled down for the second time and the icon of Vision, to indicate an operation direction of a next operation of the user. For example, the border of the specified shape is an elliptical closed dashed line, and the indication graphic is an arrow. If the sharing interface includes icons of a plurality of shareable devices, in the interface, one border of a specified shape may surround the picture that is scaled down for the second time and the icons of the plurality of shareable devices, and an indication graphic is set between the picture that is scaled down for the second time and an icon of each shareable device; or in the interface, a plurality of borders of specified shapes may surround the picture that is scaled down for the second time and the icons of the plurality of shareable devices, where each border of a specified shape surrounds the picture that is scaled down for the second time and an icon of one shareable device, and an indication graphic is set between the picture that is scaled down for the second time and an icon of each shareable device. Optionally, the sharing interface may alternatively display an icon of a shareable device in a form of a radar chart. FIG. 15D is a schematic diagram of displaying an icon of a shareable device in a form of a radar chart according to an embodiment of this application. As shown in FIG. 15D, the icon of Vision is displayed in the sharing interface in the form of the radar chart, and a picture that is scaled down for a second time is in a center of the radar chart. If positioned Vision is in a direction of 12 o'clock of the electronic device and is 3 m away from the electronic device, in the radar chart, the icon of Vision is in a direction of 12 o'clock of the picture that is scaled down for the second time, and there is a specified distance between the icon and the picture that is scaled down for the second time. For example, the specified distance is 3 cm. Further, the sharing interface shown in FIG. 15D includes an icon of an exit button, used to exit the current sharing interface. The icon of the exit button may be disposed at a specified location. For example, as shown in FIG. 15D, the icon of the exit button is disposed at an upper left corner of the display of the electronic device. It should be noted that a location of the icon of the exit button is not limited in this embodiment of this application. The picture that is scaled down for the second time and the icon of the shareable device may alternatively be in other representation forms in the radar chart. This is not limited in this embodiment of this application.

FIG. 13A to FIG. 13D (that is, FIG. 13A, FIG. 13B, FIG. 13C, and FIG. 13D) are the same as FIG. 9A to FIG. 9D (that is, FIG. 9A, FIG. 9B, FIG. 9C, and FIG. 9D). Details are not described herein again. FIG. 15A to FIG. 15C (that is, FIG. 15A, FIG. 15B, FIG. 15C) are the same as FIG. 9A to FIG. 9C (that is, FIG. 9A, FIG. 9B, FIG. 9C). Details are not described herein again.

It should be noted that descriptions of the first slide operation and the first press operation in this embodiment of this application are merely examples for description. The first slide operation and the first press operation may alternatively be in other representation forms. This is not limited in this embodiment of this application.

Figures 10A, 10B, 10C, 10D:
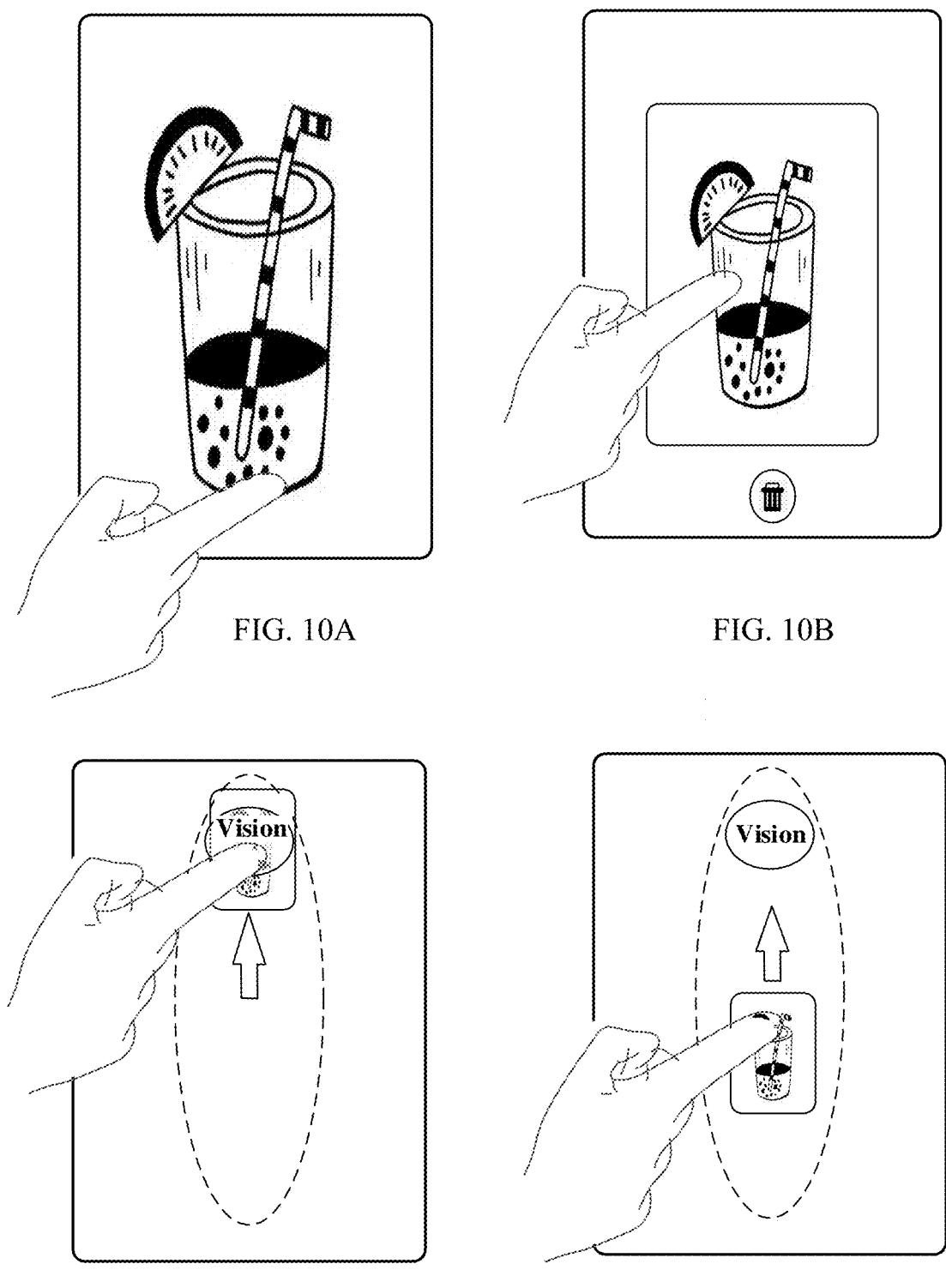
FIG. 10A to FIG. 10D are another schematic diagram of an operation of sharing a target file to a target device according to an embodiment of the present invention.

In another optional solution, the first operation may include a second slide operation. Sharing a picture is used as an example. FIG. 10A to FIG. 10C are another schematic diagram of a sharing interface according to an embodiment of this application. As shown in FIG. 10A, after selecting the picture, the user drags the picture with a finger to slide upward from a bottom area of the display of the electronic device. Optionally, a size of the picture may be gradually scaled down to a specific size as the finger slides upward. A schematic diagram obtained after the sliding is FIG. 10B.

Optionally, when a sliding distance is greater than or equal to a specified distance, the size of the picture is scaled down for a second time, and the picture that is scaled down for the second time continues to move with movement of the finger. The display of the electronic device displays the sharing interface. Optionally, the specified distance is 3 cm. The sharing interface may include icons of all shareable devices around the electronic device, or may include only an icon of a shareable device that the head of the electronic device faces. A positioning driver of the electronic device may position the shareable device that the head of the electronic device faces. When the sharing interface includes only the icon of the shareable device that the head of the electronic device faces, it may be convenient for the user to select the target device more accurately, and the shareable device that the head of the electronic device faces may also be intuitively displayed. The sharing interface shown in FIG. 10C includes an icon of one shareable device, that is, an icon of Vision. As shown in FIG. 10C, in the interface, a border of a specified shape surrounds the picture that is scaled down for the second time and the icon of Vision, and an indication graphic is set between the picture that is scaled down for the second time and the icon of Vision, to indicate an operation direction of a next operation of the user. For example, the border of the specified shape is an elliptical closed dashed line, and the indication graphic is an arrow. If the sharing interface includes icons of a plurality of shareable devices, in the interface, one border of a specified shape may surround the picture that is scaled down for the second time and the icons of the plurality of shareable devices, and an indication graphic is set between the picture that is scaled down for the second time and an icon of each shareable device; or in the interface, a plurality of borders of specified shapes may surround the picture that is scaled down for the second time and the icons of the plurality of shareable devices, where each border of a specified shape surrounds the picture that is scaled down for the second time and an icon of one shareable device, and an indication graphic is set between the picture that is scaled down for the second time and an icon of each shareable device. Optionally, the sharing interface may alternatively display an icon of a shareable device in a form of a radar chart.

Figures 16A, 16B, 16C:
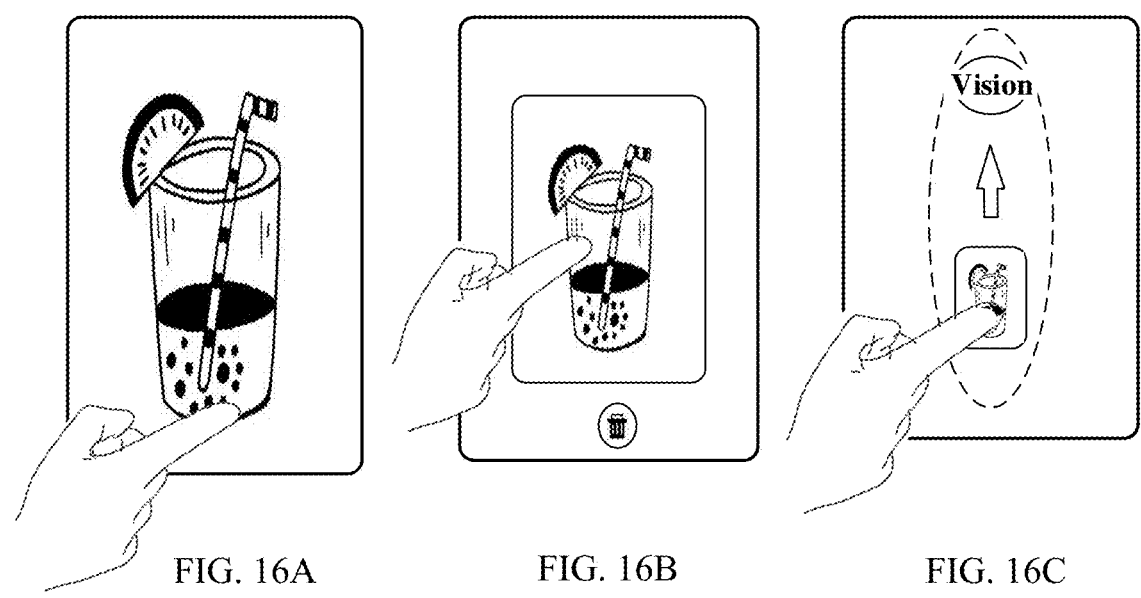
FIG. 16A to FIG. 16E are another schematic diagram of an operation of sharing a target file to a target device according to an embodiment of the present invention.
Figure 17A:
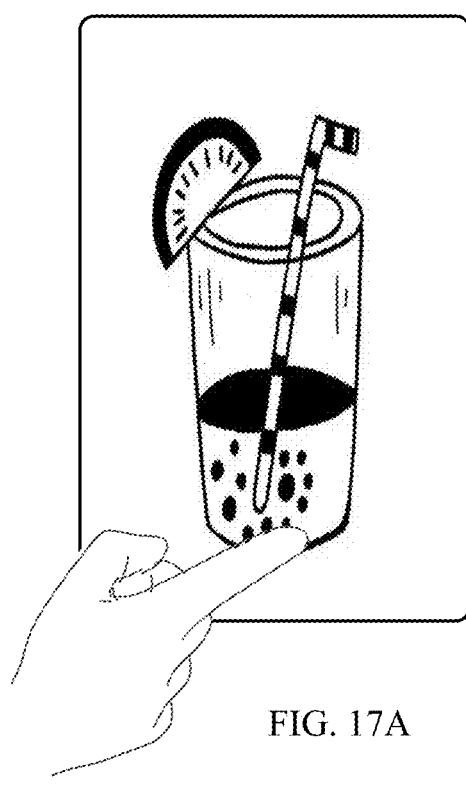
FIG. 17A to FIG. 17D are another schematic diagram of an operation of sharing a target file to a target device according to an embodiment of the present invention.
Figure 17B:
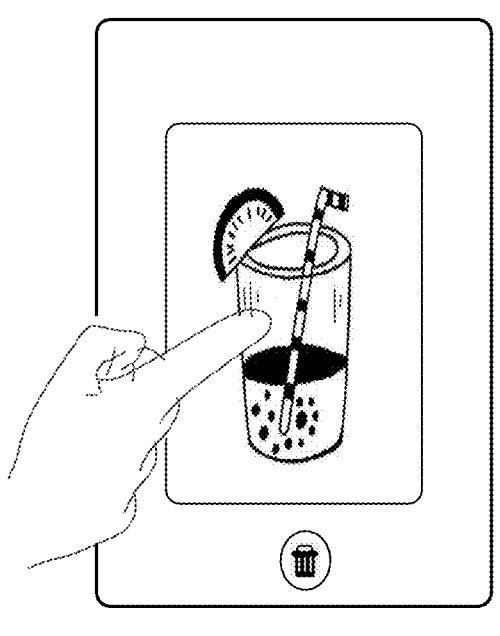

FIG. 16A and FIG. 16B are the same as FIG. 10A to FIG. 10C. Details are not described herein again. FIG. 17A and FIG. 17B are the same as FIG. 10A and FIG. 10B. Details are not described herein again.

It should be noted that descriptions of the second slide operation in this embodiment of this application are merely an example for description. The second slide operation may alternatively be in another representation form. This is not limited in this embodiment of this application.

In another optional solution, the first operation may include a second press operation, the second press operation includes a multi-finger press operation, and a quantity of fingers is greater than 1 and less than or equal to 5. In an optional solution, the multi-finger press operation includes a three-finger press operation. Sharing a picture is used as an example. FIG. 11A to FIG. 11C are another schematic diagram of a sharing interface according to an embodiment of this application. As shown in FIG. 11A and FIG. 11B, after selecting the picture, the user presses the picture with three fingers and keeps press duration greater than or equal to second specified duration. In an optional solution, the second specified duration is 700 ms. When the press duration is greater than or equal to the second specified duration, the display of the electronic device displays the sharing interface. In this case, the picture may be displayed on the display of the electronic device in full screen mode or in a specific size. The picture displayed in the sharing interface shown in FIG. 11C is displayed on the display of the electronic device in full screen mode. The sharing interface may include icons of all shareable devices around the electronic device, or may include only an icon of a shareable device that the head of the electronic device faces. A positioning driver of the electronic device may position the shareable device that the head of the electronic device faces. When the sharing interface includes only the icon of the shareable device that the head of the electronic device faces, it may be convenient for the user to select the target device more accurately, and the shareable device that the head of the electronic device faces may also be intuitively displayed. The sharing interface shown in FIG. 11C includes an icon of one shareable device, that is, an icon of Vision. As shown in FIG. 11C, the interface displays the icon of the shareable device in a form of a radar chart. Optionally, in the sharing interface, a border of a specified shape may also surround a scaled-down picture and the icon of Vision, and the icon of the shareable device is displayed in a form of an indication graphic that is set between the scaled-down picture and the icon of Vision. For details, refer to FIG. 12C or FIG. 14C. Details are not described herein.

Figures 12A, 12B, 12C, 12D:
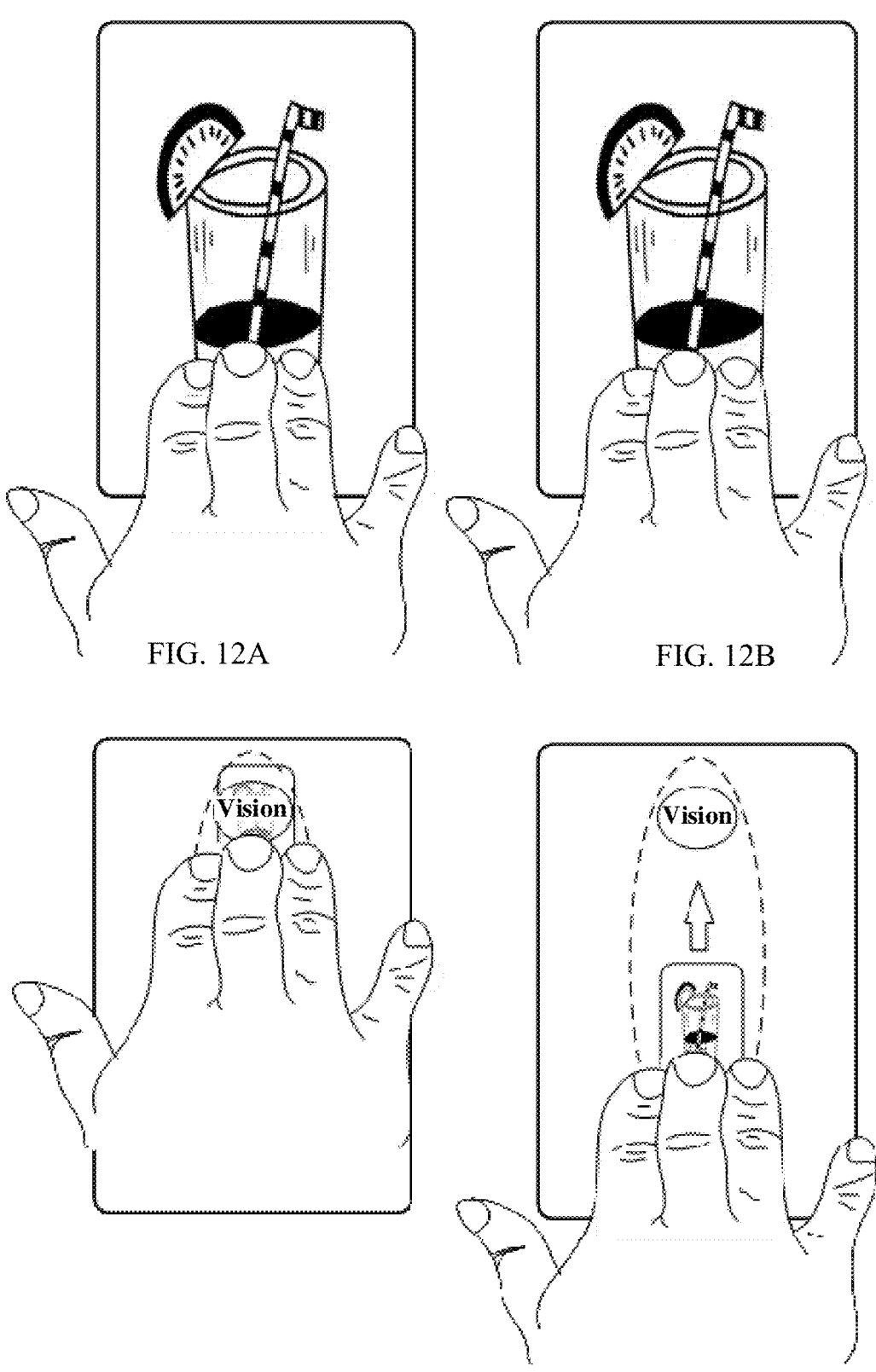
FIG. 12A to FIG. 12D are another schematic diagram of an operation of sharing a target file to a target device according to an embodiment of the present invention.
Figures 14A, 14B, 14C, 14D, 14E:
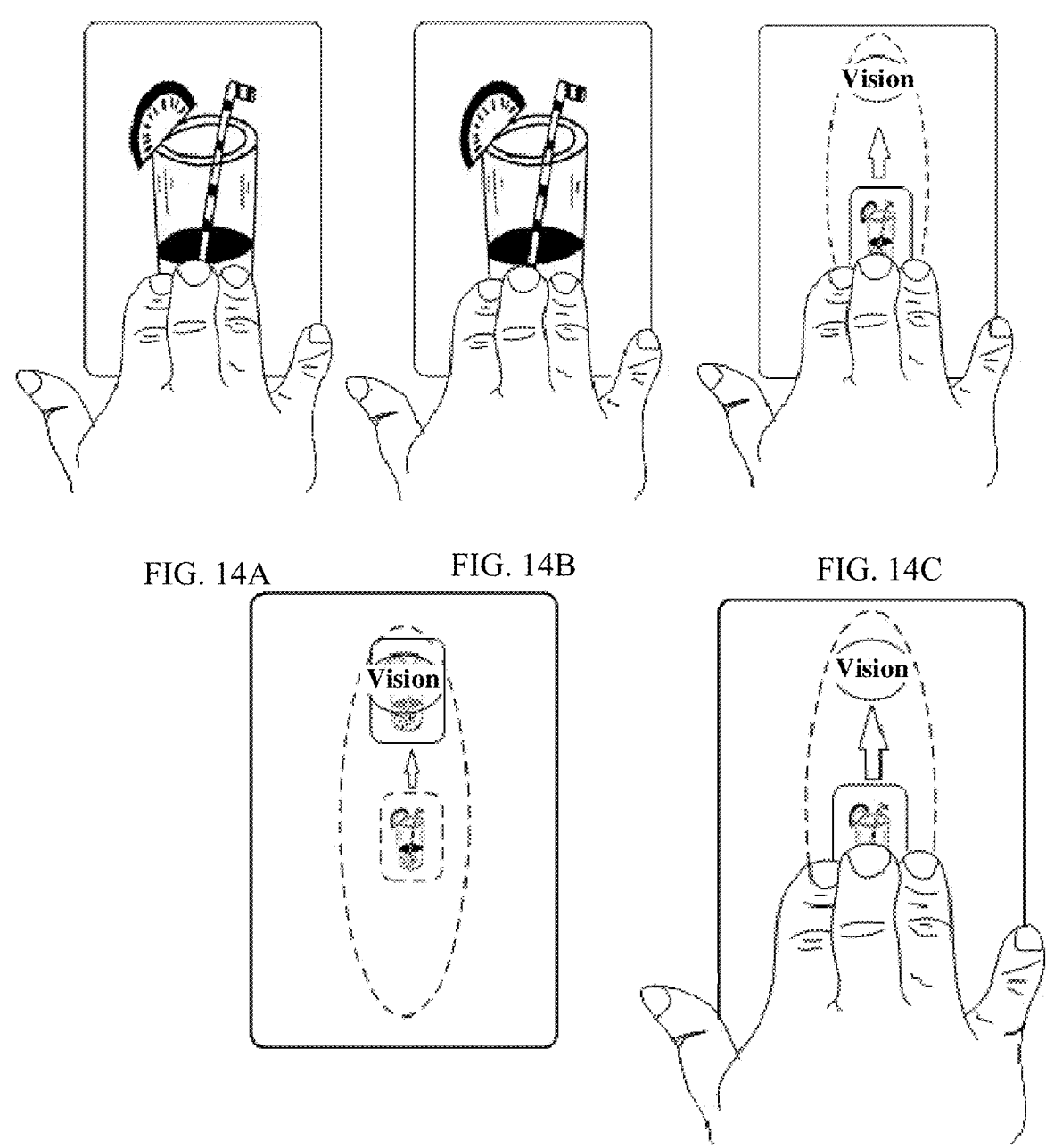
FIG. 14A to FIG. 14E are another schematic diagram of an operation of sharing a target file to a target device according to an embodiment of the present invention.

FIG. 12A and FIG. 12B are the same as FIG. 11A and FIG. 11B. FIG. 14A and FIG. 14B are the same as FIG. 11A and FIG. 11B. Details are not described herein again.

It should be noted that descriptions of the second press operation in this embodiment of this application are merely examples for description. The second press operation may alternatively be in another representation form. This is not limited in this application.

Further, the sharing interface shown in FIG. 11C includes an icon of an exit button, used to exit the current sharing interface. The icon of the exit button may be disposed at a specified location. For example, as shown in FIG. 11C, the icon of the exit button is disposed at an upper left corner of the display of the electronic device. It should be noted that a location of the icon of the exit button is not limited in this embodiment of this application.

Figure 17D:
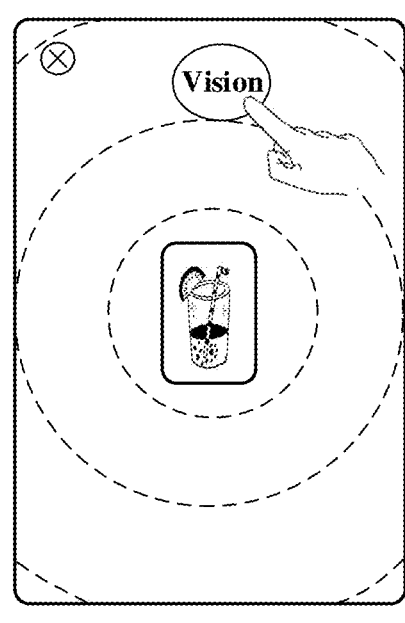
Figure 17C:
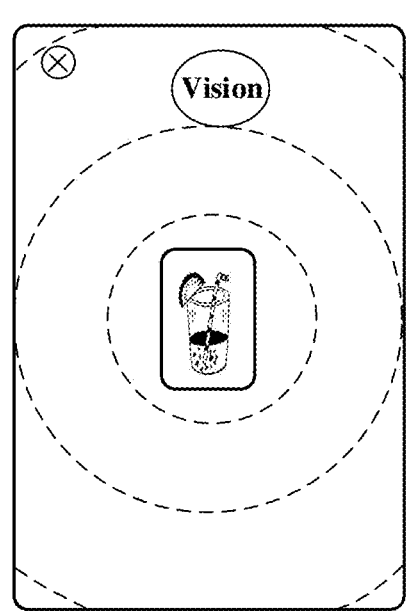

FIG. 17C is another schematic diagram of an interface of displaying an icon of a shareable device in a form of a radar chart according to an embodiment of this application. A difference between FIG. 17C and FIG. 11C lies only in that a picture in FIG. 17C is displayed on the display of the electronic device in a specific size, and the picture in FIG. 11C is implemented on the display of the electronic device in full screen mode.

The user may trigger, by performing a second operation, sharing of a target file to a target device. The second operation includes an operation of dragging the target file to an icon of the target device. For example, the target file is a picture, and the target device is Vision. FIG. 9E is a schematic diagram of an interface of sharing a target file to a target device according to an embodiment of this application. As shown in FIG. 9E, the sharing interface includes an icon of one shareable device, that is, an icon of Vision. The user may drag, with a single finger in a direction indicated by the indication graphic, the picture that is scaled down for the second time to the icon of Vision, to complete an operation of sharing the picture with Vision. If the sharing interface includes icons of a plurality of shareable devices, the user may drag, with a single finger in a direction shown by an indication graphic, the picture that is scaled down for the second time to an icon of one of the shareable devices, where the icon is used to indicate a target device.

FIG. 10D is the same as FIG. 9E. Details are not described herein again.

In this embodiment of this application, the user may alternatively drag the target file to the icon of the target device with a plurality of fingers, where a quantity of fingers is greater than 1 and less than or equal to 5. In an optional solution, the user may drag the target file to the icon of the target device with three fingers. For example, the target file is a picture, and the target device is Vision. FIG. 12D is another schematic diagram of an interface of sharing a target file to a target device according to an embodiment of this application. As shown in FIG. 12D, the user drags a scaled-down picture to an icon of Vision with three fingers in a direction indicated by an indication graphic, to complete an operation of sharing the image with Vision. If the sharing interface includes icons of a plurality of shareable devices, the user may drag, with a plurality of fingers in a direction shown by an indication graphic, the scaled-down picture to an icon of one of the shareable devices, where the icon is used to indicate a target device.

Further, in a process in which the target file is shared with the target device, a sharing progress bar appears around an icon of the target device. The sharing progress bar is used to indicate a current sharing progress. After the sharing is completed, a sharing completion identifier is displayed in an interface of the target device. Optionally, the sharing completion identifier is located in an upper right corner of the icon of the target device. A style of the sharing completion identifier may be set based on an actual situation. For example, the style of the sharing completion identifier is a tick icon. It should be noted that a location of the sharing completion identifier and the style of the sharing completion identifier are not limited in this embodiment of this application.

Figures 13A, 13B, 13C, 13D, 13E, 13F:
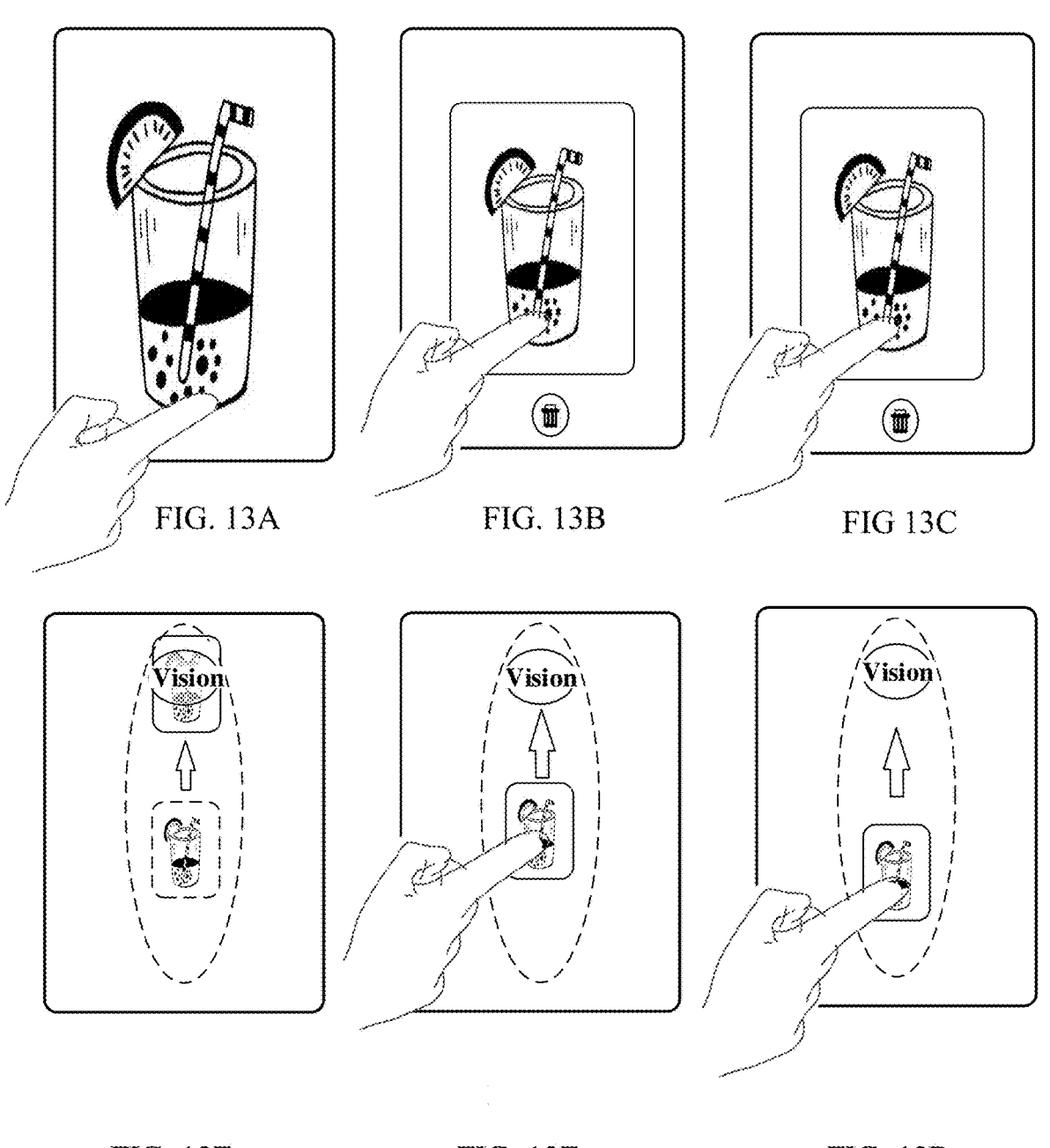
FIG. 13A to FIG. 13F are another schematic diagram of an operation of sharing a target file to a target device according to an embodiment of the present invention.

In another optional solution, the second operation may include an operation of dragging the target file in a direction in which the icon of the target device is located and then releasing the target file, so that the target file is moved to the icon of the target device. For example, the target file is a picture, and the target device is Vision. FIG. 13E and FIG. 13F are another schematic diagram of an interface of sharing a target file to a target device according to an embodiment of this application. As shown in FIG. 9E, the sharing interface includes an icon of one shareable device, that is, an icon of Vision. The user may drag, with a single finger in a direction indicated by the indication graphic, the picture that is scaled down for the second time in a direction of the icon of Vision, and then release the finger. An interface displayed after the finger is released is shown in FIG. 13F. A dashed line part is a location of the picture that is scaled down for the second time before the finger is released. The picture is moved from a location of the dashed line part to the icon of Vision with a specified animation effect. For example, the specified animation effect is fast movement.

Figures 16D, 16E:
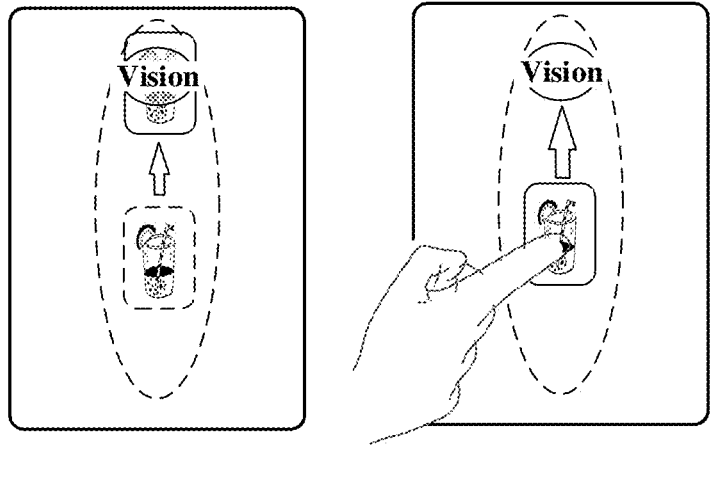

FIG. 16D and FIG. 16E are the same as FIG. 13E and FIG. 13F. Details are not described herein again.

In this embodiment of this application, when the sharing interface includes an icon of one shareable device, the user may alternatively drag, with a plurality of fingers, the target file in a direction in which the icon of the target device is located and then release the target file, so that the target file is moved to the icon of the target device. A quantity of fingers is greater than 1 and less than or equal to 5. In an optional solution, the user may drag, with three fingers, the target file in a direction in which the target device is located and then release the target file. FIG. 14D and FIG. 14E are another schematic diagram of an interface of sharing a target file to a target device according to an embodiment of this application. As shown in FIG. 14D, the sharing interface includes an icon of one shareable device, that is, an icon of Vision. The user may drag, with three fingers in a direction indicated by the indication graphic, the picture that is scaled down for the second time in a direction of the icon of Vision, and then release the fingers. An interface displayed after the fingers are released is shown in FIG. 14E. A dashed line part is a location of the picture that is scaled down for the second time before the fingers are released. The picture is moved from a location of the dashed line part to the icon of Vision with a specified animation effect. For example, the specified animation effect is fast movement.

Figure 18:
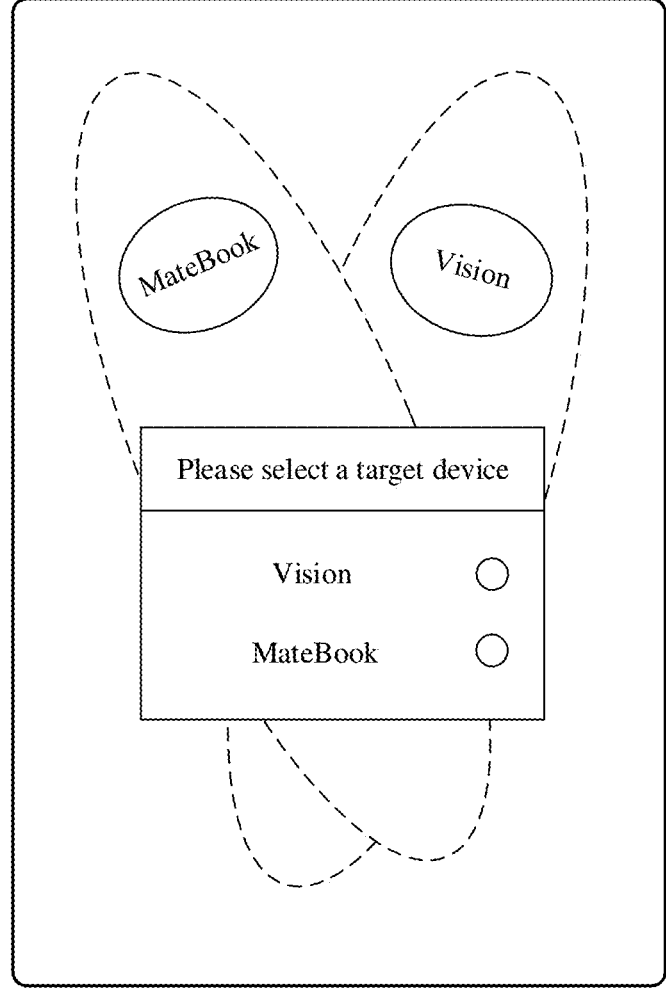
FIG. 18 is a schematic diagram of an interface of a first pop-up window according to an embodiment of the present invention.

In this embodiment of this application, if the sharing interface includes icons of a plurality of shareable devices, when the user drags, with a single finger or a plurality of fingers in a direction indicated by the indication graphic, the picture that is scaled down for the second time in a direction of the icon of Vision, and then releases the finger, because the sharing interface includes two shareable devices, the target device cannot be determined. Therefore, the user needs to select the target device, and the display of the electronic device displays a first pop-up window. Sharing a picture is used as an example. FIG. 18 is a schematic diagram of an interface of a first pop-up window according to an embodiment of this application. As shown in FIG. 18, a sharing interface includes icons of two shareable devices: Vision and MateBook. When a user releases a finger, a display of the electronic device displays the first pop-up window. A first pop-up window problem of the first pop-up window is: "Please select a target device". A first pop-up window option includes "Vision" and "MateBook". In this embodiment of this application, the first pop-up window option of the first pop-up window is set to a plurality of options. To be specific, the user may select at least one shareable device from a plurality of shareable devices, determine the at least one selected shareable device as a target device, and share a target file with the at least one target device.

It should be noted that the first pop-up window option shown in FIG. 18 includes device names of the plurality of shareable devices, and the first pop-up window shown in FIG. 18 is merely an example of the first pop-up window provided in this embodiment of this application. In another optional solution, the first pop-up window option of the first pop-up window may further include icons of a plurality of shareable devices. In another optional solution, the first pop-up window option of the first pop-up window may further include device names and icons of a plurality of shareable devices. This is not limited in this embodiment of this application.

Figure 19:
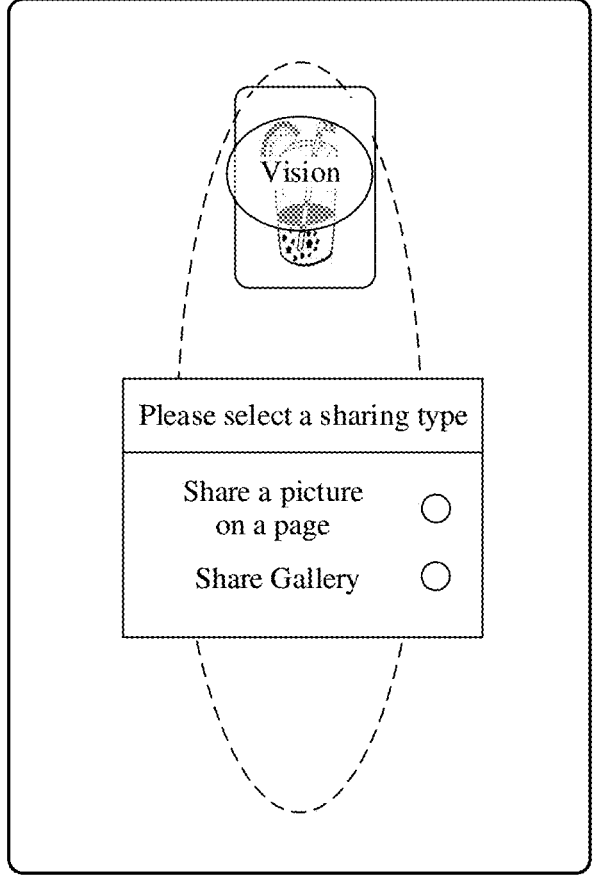
FIG. 19 is a schematic diagram of an interface of a second pop-up window according to an embodiment of the present invention.

In this embodiment of this application, in a process of sharing the target file to the at least one target device, whether the target device has a capability of displaying an application to which the target file belongs needs to be determined. If the target device does not have the capability of displaying the application to which the target file belongs, the target file is shared with the target device. If the target device has the capability of displaying the application to which the target file belongs, the electronic device displays a second pop-up window for the user to select a sharing type of the target file. For example, a determining condition for determining whether the target device has the capability of displaying the application to which the target file belongs is whether the target device has a display. Specifically, if it is determined that the target device has the display, it indicates that the target device has the capability of displaying the application to which the target file belongs. If it is determined that the target device does not have the display, it indicates that the target device does not have the capability of displaying the application to which the target file belongs. Sharing a picture is used as an example. FIG. 19 is a schematic diagram of an interface of a second pop-up window according to an embodiment of this application. As shown in FIG. 19, after a scaled-down picture is moved to an icon of a target device, it is determined that Vision has a display, and the electronic device displays the second pop-up window. The second pop-up window includes a second pop-up window question and a second pop-up window option. The second pop-up window question is: "Please select a sharing type". The second pop-up window option includes "Share a picture on a page" and "Share Gallery". The second pop-up window option of the second pop-up window is set to a single option. When the user selects "Share a picture on a page", it indicates that only the current picture is shared with Vision. When the user selects "Share Gallery", it indicates that Gallery is shared with Vision. It should be noted that the determining condition for determining whether the target device has the capability of displaying the application to which the target file belongs that is described in this embodiment of this application is merely an example for description. In some embodiments, the capability of the target device may be further determined based on another determining condition. This is not limited in this embodiment of this application.

In another optional solution, the second operation may include an operation of releasing the first operation and tapping icons of one or more shareable devices. For example, the target file is a picture, and the target device is Vision. FIG. 15D and FIG. 15E are a schematic diagram of an interface of sharing a target file with a target device according to an embodiment of this application. A schematic diagram of releasing a first operation by a user is FIG. 15D. The user releases a finger, that is, releases the first operation. After the user releases the first operation, the display of the electronic device displays a sharing interface, where the sharing interface includes an icon of a shareable device that the head of the electronic device faces, and a positioning driver of the electronic device may position the shareable device that the head of the electronic device faces. As shown in FIG. 15E, the sharing interface includes an icon of one shareable device that the head of the electronic device faces, that is, an icon of Vision, and the icon of the shareable device is displayed in the sharing interface in a form of a radar chart. The user may tap the icon of Vision with a finger, determine Vision as the target device, and share the picture with Vision. When the sharing interface includes icons of a plurality of shareable devices that the head of the electronic device faces, the user may tap one or more icons of one or more shareable devices with a finger, where the icon is used to indicate a shareable device, determine, as one or more target devices, the one or more shareable devices indicated by the one or more tapped icons of the one or more shareable devices, and share the target file to the at least one target device. The schematic diagrams of the interfaces shown in FIG. 15D and FIG. 15E each further include an icon of an exit button, used to exit the current sharing interface. If the user expects to terminate sharing of the target file in this case, the user may tap the icon of the exit button to back to the interface shown in FIG. 15A, or may tap the target file to back to the interface shown in FIG. 15A. Alternatively, the user may terminate sharing of the target file in another manner. This is not limited in this embodiment of this application.

FIG. 17D is the same as FIG. 15E. Details are not described herein again. A difference between FIG. 11D and FIG. 15E lies only in that a picture in FIG. 15E is displayed on the display of the electronic device in a specific size, and the picture in FIG. 11D is implemented on the display of the electronic device in full screen mode.

It should be noted that selecting the target device in a tapping manner shown in FIG. 15E is merely an example for description. The target device may alternatively be selected in another manner. This is not limited in this embodiment of this application.

In embodiments of this application, the first operation and the second operation are used to describe specific operations, but these operations should not be limited to these terms. These terms are merely used to distinguish between the operations. For example, without departing from the scope of embodiments of this application, the first operation may also be referred to as a second operation. Similarly, the second operation may also be referred to as a first operation. In this embodiment of this application, capabilities supported by shareable devices are different. Therefore, sharing types of sharing target files are different. The sharing type includes an application type or a file type. The application type includes a type of sharing, by the electronic device, an application to which the target file belongs with the target device. After the sharing, if the user performs an operation on the application on the electronic device and generates a result, the result is displayed on a display of the target device. The file type includes a type of sharing the target file with the target device.

Figure 20:
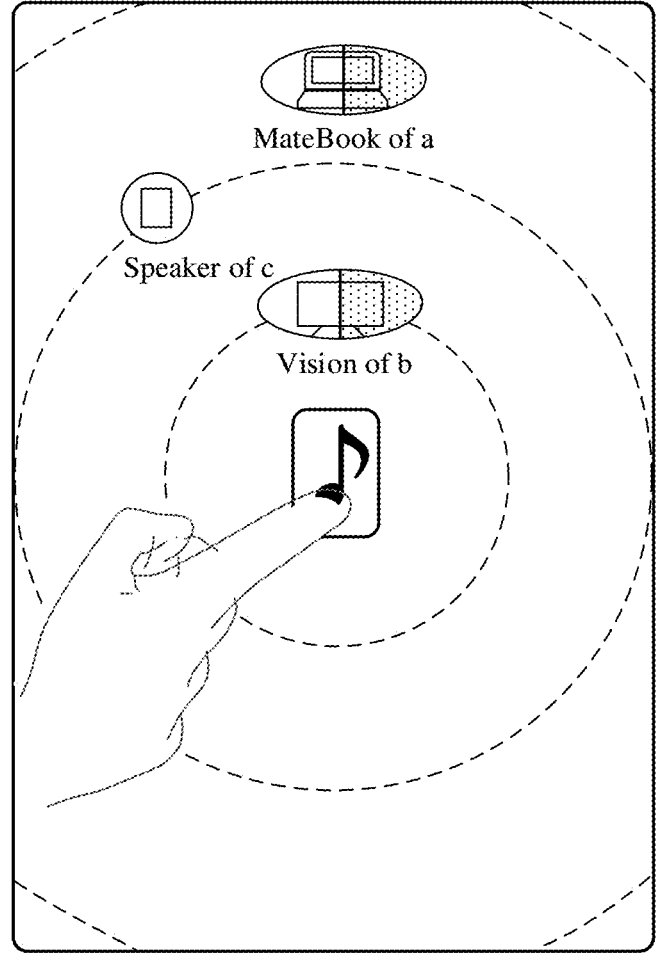
FIG. 20 is a schematic diagram of an icon of a shareable device according to an embodiment of the present invention.
Figure 21:
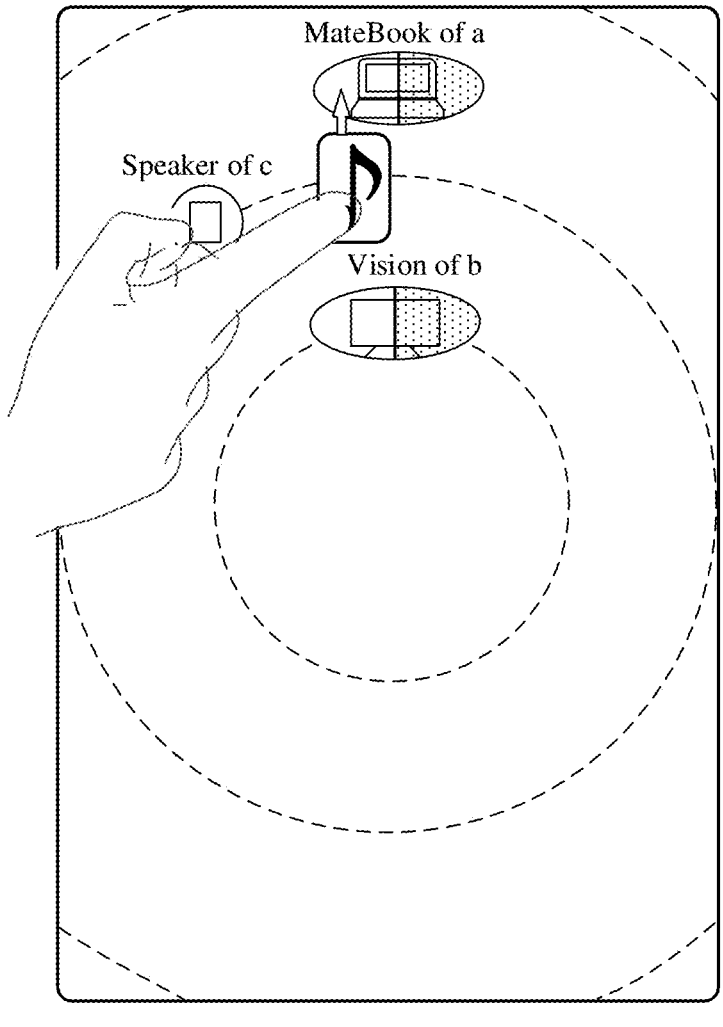
FIG. 21 is a schematic diagram of an interface of selecting a sharing type according to an embodiment of the present invention.

Sharing a music file is used as an example. FIG. 20 is a schematic diagram of an icon of a shareable device according to an embodiment of this application. As shown in FIG. 20, the schematic diagram of the icon includes icons of a plurality of shareable devices, the icons of the plurality of shareable devices are displayed on a display of an electronic device in a form of a radar chart, and the plurality of shareable devices include MateBook of a user a, Vision of a user b, and a speaker of a user c. The icon of the shareable device may have different shapes, the icon of the shareable device may include a plurality of sub-icons, each sub-icon corresponds to one sharing type, different sub-icons may have different patterns, and the different patterns may represent different sharing types. For example, an icon of MateBook of the user a is an elliptical icon, and the elliptical icon is divided into left and right sub-icons. A pattern of the left sub-icon is a blank pattern, and a pattern of the right sub-icon is a dot pattern. The blank pattern indicates that the music file is shared with MateBook, and the wave point pattern indicates that an application to which the music file belongs is shared with MateBook. An icon of the speaker of the user c is a circular icon, and a pattern of the circular icon is a blank pattern, indicating that the target file is shared with the speaker. The user may drag the music file to a sub-icon of the target device with a finger. FIG. 21 is a schematic diagram of an interface of selecting a sharing type according to an embodiment of this application. As shown in FIG. 21, if the user drags the music file to the left sub-icon of MateBook of the user a, the music file approaches the left sub-icon of MateBook of the user a, and an indication graphic is displayed in the current interface, where the indication graphic is used to indicate a sharing type. As shown in FIG. 21, the indication graphic is an arrow, and the arrow indicates that a sharing type of the music file is a file type.

Further, if the target device does not support sharing of the target file, the icon of the target file is not displayed or the icon of the target device is displayed in a specified display manner. Sharing a picture is used as an example. If a positioned shareable device around the electronic device includes a speaker, but the speaker does not support sharing of the picture, an icon of the speaker may not be displayed in the sharing interface, or a gray icon of the speaker is displayed in the sharing interface.

In this embodiment of this application, when the target file approaches the sub-icon of the target device, the selected sharing type is indicated by using the indication graphic, so that a current selection direction of the user can be more clearly indicated, and a probability that the user selects an incorrect sharing type due to a hand error is reduced, so that the user can make accurate selection based on an intention of the user.

It should be noted that the icon of the shareable device may alternatively have another shape, for example, a triangle, a rectangle, or a rhombus. This is not limited in this embodiment of this application. The sub-icon may alternatively have another pattern, for example, a horizontal stripe pattern, a vertical stripe pattern, or a wave pattern. This is not limited in this embodiment of this application. In this embodiment of this application, descriptions of the different sharing types represented by the different patterns are merely used as examples for description. The different patterns may alternatively represent other sharing types. This is not limited in this embodiment of this application.

Figure 22A:
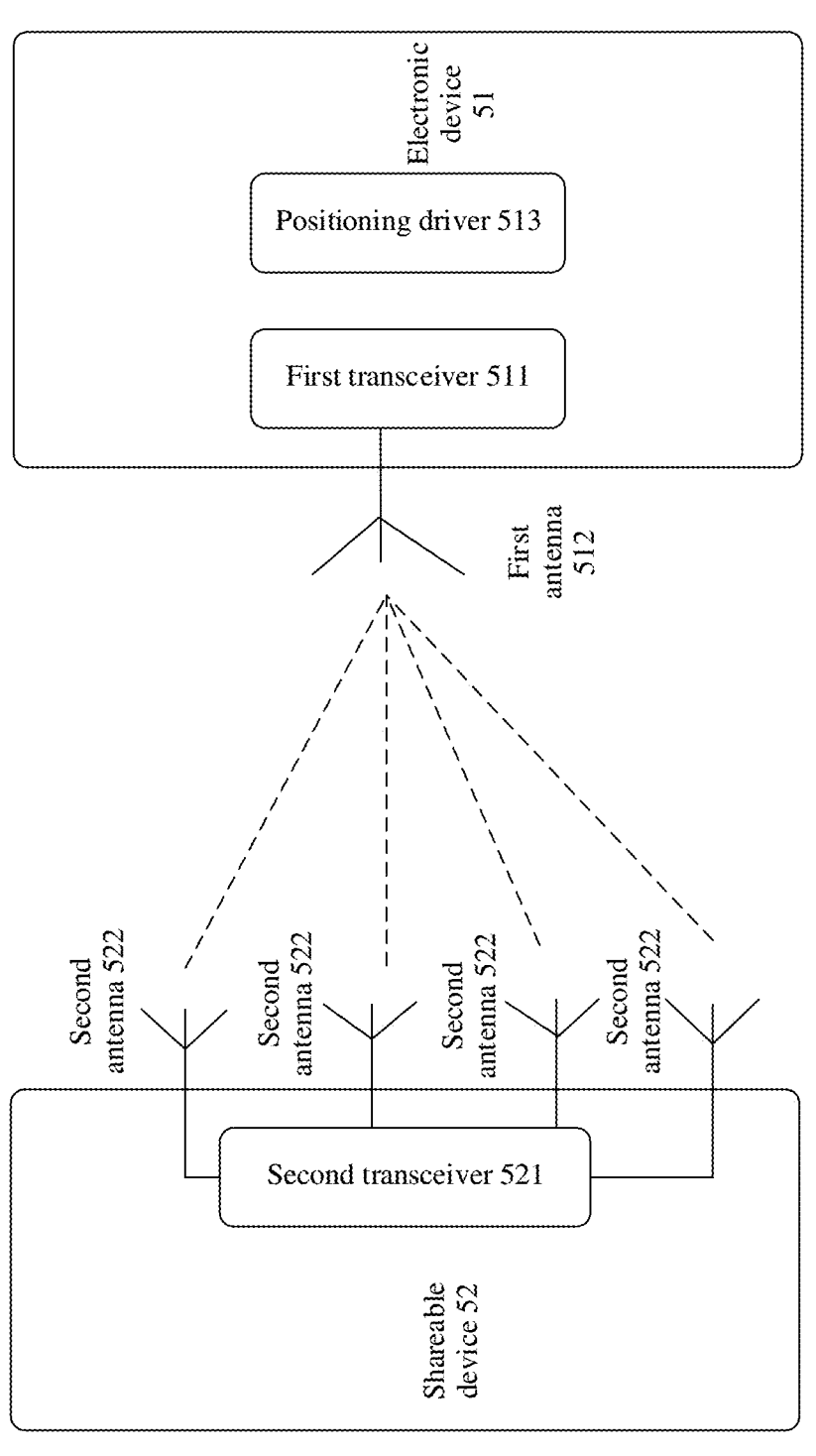
FIG. 22A is a schematic diagram of positioning a shareable device by an electronic device according to an embodiment of the present invention.

The following describes a process of positioning a shareable device around an electronic device. For example, there is one shareable device. FIG. 22A is a schematic diagram of positioning a shareable device by an electronic device according to an embodiment of this application. As shown in FIG. 22A, the schematic diagram includes an electronic device 51 and a shareable device 52. The electronic device 51 includes a first transmitter 511, a first receiver 512, a first antenna 512, and a positioning driver 513. The shareable device 52 includes a second transmitter 521, a second receiver 521, and a second antenna 522. The following separately describes a positioning process in which the positioning driver includes a UWB driver and a positioning process in which the positioning driver includes a Bluetooth driver.

If the positioning driver 513 includes a UWB driver, the UWB driver includes a UWB chip. The UWB chip controls the first transmitter 511 to send a measurement pulse signal to the second receiver 521 of the shareable device 52 through a single first antenna 512; the second transmitter 521 reflects back a reflected signal to the first receiver 512 of the electronic device based on the measurement pulse signal through a plurality of second antennas 522; the first receiver 512 sends the reflected signal to the UWB chip; the UWB chip may record a first timestamp at which the measurement pulse signal is sent and a second timestamp at which the reflected signal is received, and calculate a distance between the electronic device and the shareable device based on a time period between the first timestamp and the second timestamp by using a time of flight (Time of Flight, ToF for short) ranging method; and the UWB chip calculates a location of the shareable device based on the distance between the electronic device and the shareable device by using a spherical intersection method. The time of flight ranging method specifically includes: multiplying the time period between the first timestamp and the second timestamp by a propagation speed of the measurement pulse signal in the air, to obtain a distance of one round trip of the pulse signal, and then dividing the distance by 2, to obtain the distance between the electronic device and the shareable device. The propagation speed of the measurement pulse signal in the air is a fixed value, that is, v=300,000 km/s.

If the positioning driver 513 includes a Bluetooth driver, the Bluetooth driver includes a Bluetooth chip. A positioning process of the Bluetooth driver is the same as the positioning process of the UWB driver. Details are not described herein again.

The following describes a positioning process of a shareable device that the head of the electronic device faces.

Figure 22B:
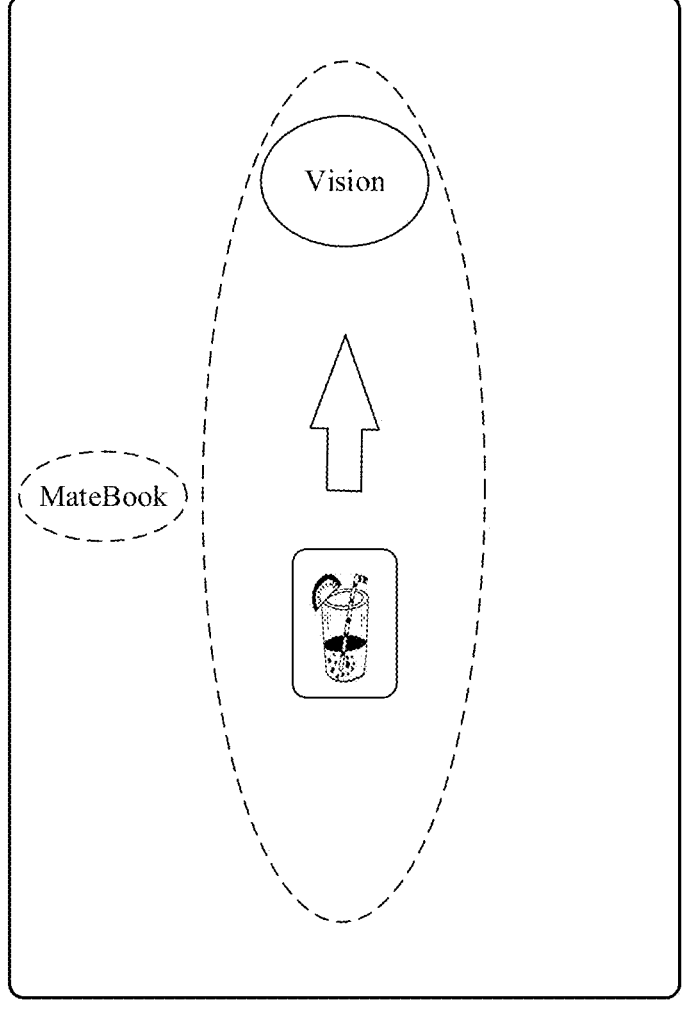
FIG. 22B is a schematic diagram of an interface of positioning a shareable device that the head of an electronic device faces according to an embodiment of the present invention.

A gyro sensor is disposed in the electronic device, and the gyro sensor may detect an orientation of the head of the electronic device. The positioning driver 513 includes a positioning chip, and the positioning chip is a UWB chip or a Bluetooth chip. As described above, the positioning chip may calculate a distance between the electronic device and the shareable device and a location of the shareable device. For example, Vision is in a direction of 12 o'clock of the electronic device and is 3 m away from the electronic device. The gyro sensor may send the detected orientation of the head of the electronic device to the positioning chip. The positioning chip positions, based on the orientation of the head of the electronic device, the distance between the electronic device and the shareable device, and the location of the shareable device, the shareable device that the head of the electronic device faces. FIG. 22B is a schematic diagram of an interface of positioning a shareable device that the head of an electronic device faces based on an embodiment of this application. As shown in FIG. 22B, a positioning driver of the electronic device positions two shareable devices located around the electronic device. The two shareable devices are respectively Vision and MateBook. Vision is at a location to which the head of the electronic device points, and MateBook is at a location on a left side of the electronic device. A sharing interface displays only an icon of the shareable device that the head of the electronic device faces, that is, the interface displays only an icon of Vision, and does not display an icon of MateBook. A border of the icon of Vision is represented by a solid line, to indicate that the sharing interface displays the icon of Vision. A border of the icon of MateBook is represented by a dashed line, to indicate that the sharing interface does not display the icon of MateBook. In the interface, a border of a specified shape surrounds a picture and the icon of Vision, and an indication graphic is set between the picture and the icon of Vision, to indicate an operation direction of a next operation of the user. For example, the border of the specified shape is an elliptical closed dashed line, and the indication graphic is an arrow. It should be noted that the border of the icon that is of the shareable device and that is not displayed may alternatively have another representation form. This is not limited in this embodiment of this application.

In this embodiment of this application, the electronic device may not only send a target file to a target device in a pointing direction, but also display, in the electronic device, a task (for example, first information described below) that is being executed by the target device. The electronic device may further control the target device in a user interface of the electronic device, for example, power off, power on, pause, or start.

With reference to the accompanying drawings, the following shows an example of a specific process in which an electronic device obtains first information or a control instruction of a target device in a direction of a first directional operation of a user.

FIG. 23A to FIG. 23L show an example of a process in which a mobile phone 111 obtains first information or a control instruction of a television 113.

Figure 23A:
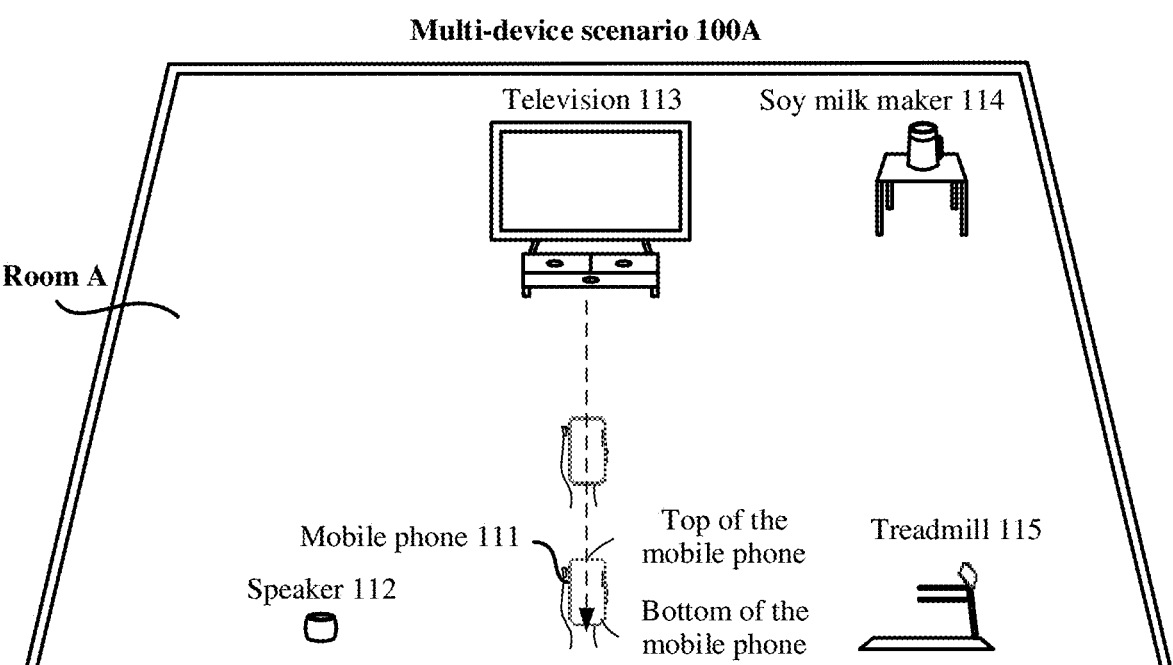
FIG. 23A is a schematic diagram of selecting a target device in a multi-device scenario according to an embodiment of this application.

FIG. 23A shows a user in a multi-device scenario 100A. For the multi-device scenario 100A, refer to the foregoing descriptions in FIG. 1A. Details are not described herein again. In the multi-device scenario 100A, the user may perform a second directional operation on the mobile phone. When the user performs the second directional operation on the mobile phone 111, the mobile phone 111 may display a home screen.

In this embodiment of this application, a fifth operation may include the second directional operation.

Figure 23B:
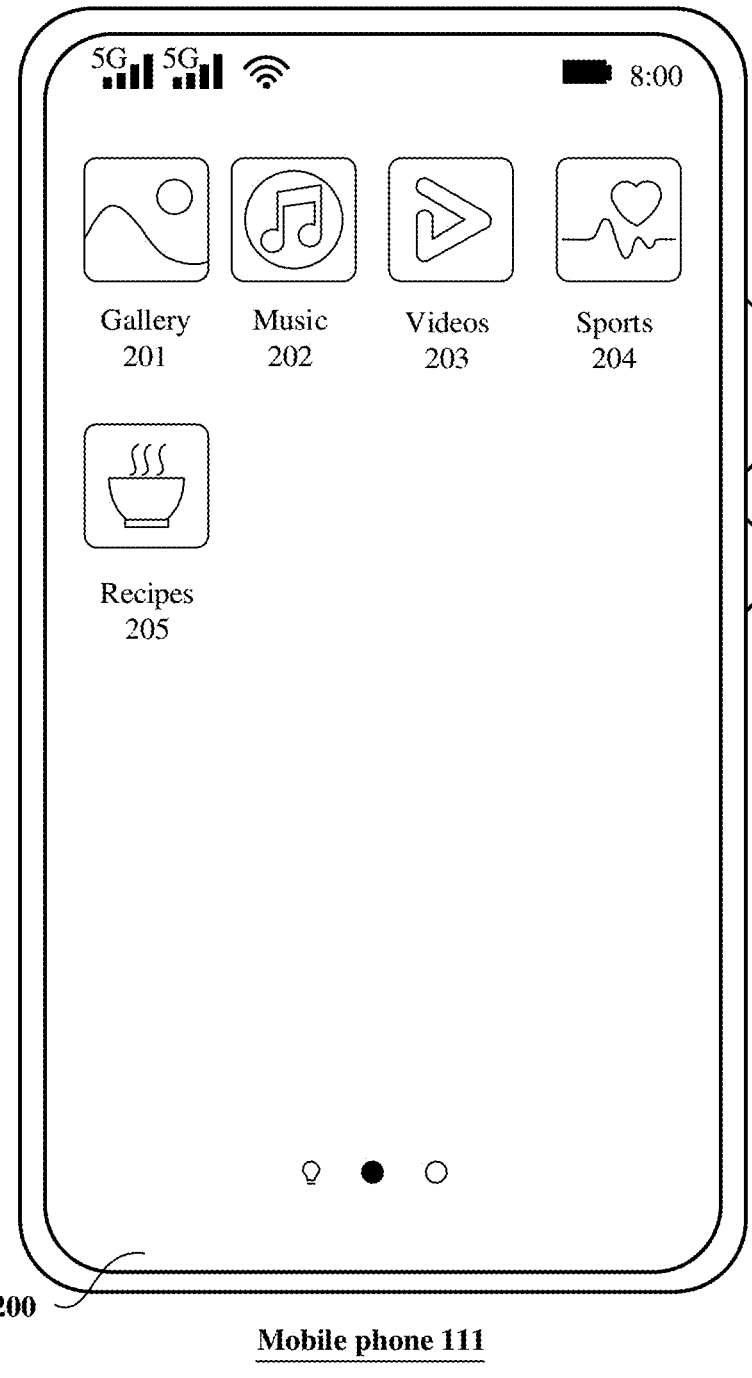
FIG. 23B is a schematic diagram of a user interface of a mobile phone 111 according to an embodiment of this application.

FIG. 23B shows a user interface 200 of the mobile phone 111. The user interface 200 is a home screen of the mobile phone 111. For details about the user interface 200, refer to the foregoing descriptions in FIG. 2A. The details are not described herein again.

Optionally, when the user performs the second directional operation on the mobile phone 111, the mobile phone 111 may display another user interface, for example, a video playback interface or a lock screen interface. This is not limited herein.

The second directional operation performed by the user on the mobile phone 111 may be that the user points the top of the mobile phone 113 to the television 113 and moves the mobile phone in a direction away from the television 113 shown in FIG. 23A. In a moving process, the top of the mobile phone 111 may always point to the television 113. The mobile phone 111 may detect the user operation by using an acceleration sensor and an angular velocity sensor. For example, when acceleration detected by the acceleration sensor is greater than or equal to a third threshold, and an angular velocity detected by the gyro sensor is a fourth threshold, the mobile phone 111 may determine that the user is performing the second directional operation on the mobile phone 111. The third threshold and the fourth threshold may be configured by a system.

Optionally, the mobile phone 111 may detect the second directional operation of the user by using an acceleration sensor and a touch sensor. For example, when acceleration detected by the acceleration sensor is greater than or equal to a third threshold, and the touch sensor does not detect a touch operation of the user within third duration, the mobile phone 111 determines that the user is performing the second directional operation on the mobile phone 11. The third duration may be configured by a system. The mobile phone 111 may determine a target device based on the second directional operation, and determine that the user expects the mobile phone 111 to obtain first information or a control instruction of the target device.

Figure 23C:
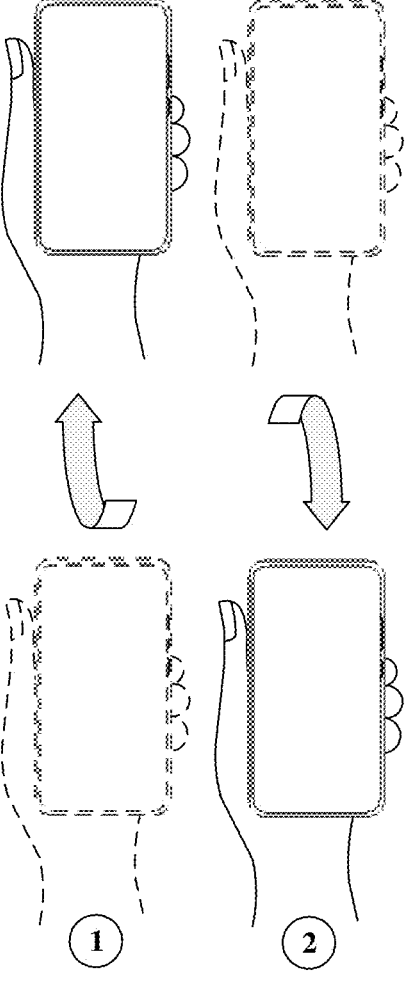
FIG. 23C is a schematic diagram of a user operation according to an embodiment of this application.

Optionally, the second directional operation may be a combination of two user operations. For example, as shown in FIG. 23C, the user may first move the mobile phone 111 in a direction close to the television, and then move the mobile phone 111 in a direction away from the television 113. In this way, the mobile phone 111 may first determine the target device based on an operation that the user moves the mobile phone 111 in a direction close to the television. Then, the mobile phone 111 may determine, based on an operation that the user moves the mobile phone 111 in a direction away from the television 113, that the user expects the mobile phone 111 to obtain the first information or the control instruction of the target device.

Figure 23D:
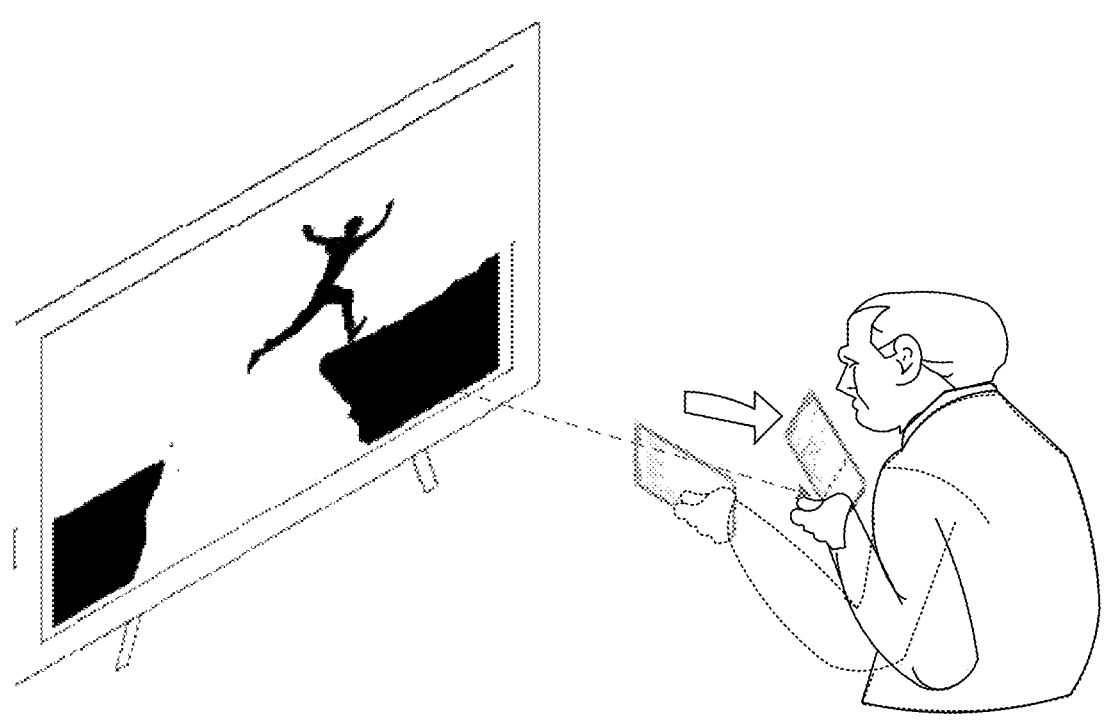
FIG. 23D is a schematic diagram of another user operation according to an embodiment of this application.

Optionally, the second directional operation may be that when the top of the electronic device points to the target device, the user moves the electronic device in a direction away from the target device. As shown in FIG. 23D, the top of the mobile phone 111 points to the television 113, and the user moves the mobile phone 111 in a direction away from the television 113.

Figure 23E:
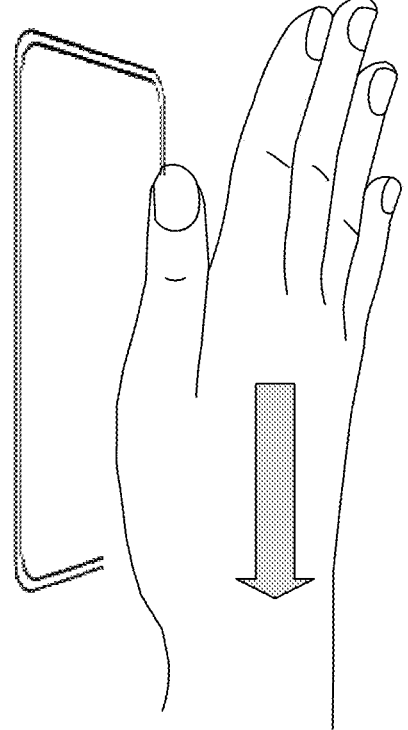
FIG. 23E is a schematic diagram of another user operation according to an embodiment of this application.

Optionally, the second directional operation may alternatively be that when the user places the top of the mobile phone 111 in a direction close to the target device (for example, the television 113), the user moves a hand in a second direction in an air manner above a display of the mobile phone 111. For example, as shown in FIG. 23E, the user places the top of the mobile phone 111 in a direction close to the target device, and slides a hand from the top of the mobile phone 111 to the bottom in an air manner above the display of the mobile phone 111. The mobile phone 111 may detect an orientation of the top of the mobile phone nil by using an acceleration sensor and a gyro sensor. The mobile phone 111 may detect, by using a camera, that the user slides the hand from the top of the mobile phone 111 to the bottom in an air manner above the display of the mobile phone 111.

Optionally, the second directional operation may be a combination of two user operations. For example, the user first moves the mobile phone 111 in a direction of close to the television. Then, a hand of the user slides in a second direction on the display of the mobile phone 111.

Figure 23F:
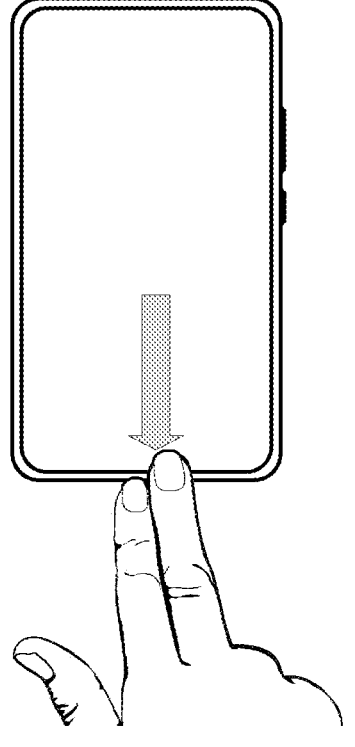
FIG. 23F is a schematic diagram of another user operation according to an embodiment of this application.

Optionally, the second directional operation may be that when the user places the top of the mobile phone 111 in a direction close to the target device (for example, the television 113), a hand of the user slides in a second direction on the display of the mobile phone 111. For example, as shown in FIG. 23F, the user places the mobile phone 111 in a direction close to the target device, and a hand of the user slides from top to bottom on the display of the mobile phone 111. The mobile phone 111 may detect an orientation of the top of the mobile phone 111 by using an acceleration sensor and a gyro sensor. The mobile phone 111 may detect, by using a touch sensor, that the hand of the user slides from top to bottom on the display of the mobile phone 111.

Optionally, the second directional operation may be that the user first moves the mobile phone 111 in a direction close to the television, and then slides in a second direction on the display of the mobile phone 111.

When the mobile phone 111 detects the second directional operation of the user, the mobile phone 111 may obtain location information (for example, three-dimensional location coordinates) of another electronic device (for example, the television 113, the soy milk maker 114, the speaker 112, or the treadmill 115) in the multi-device scenario 100A, and determine an electronic device in a direction of the directional operation. For details herein, refer to the foregoing descriptions of how the mobile phone 111 obtains the location information of the another device. The details are not described herein again.

When the mobile phone 111 detects the second directional operation of the user, the mobile phone 111 may determine that the target device is the television 113. In this case, the mobile phone 111 may display an icon of the television 113 in a user interface, for example, the user interface 60C shown in FIG. 4E. Alternatively, the mobile phone 111 may not display the icon of the television in the user interface, but directly send, to the television 113, a request for obtaining the first information or the control instruction of the television 113.

Figure 23G:
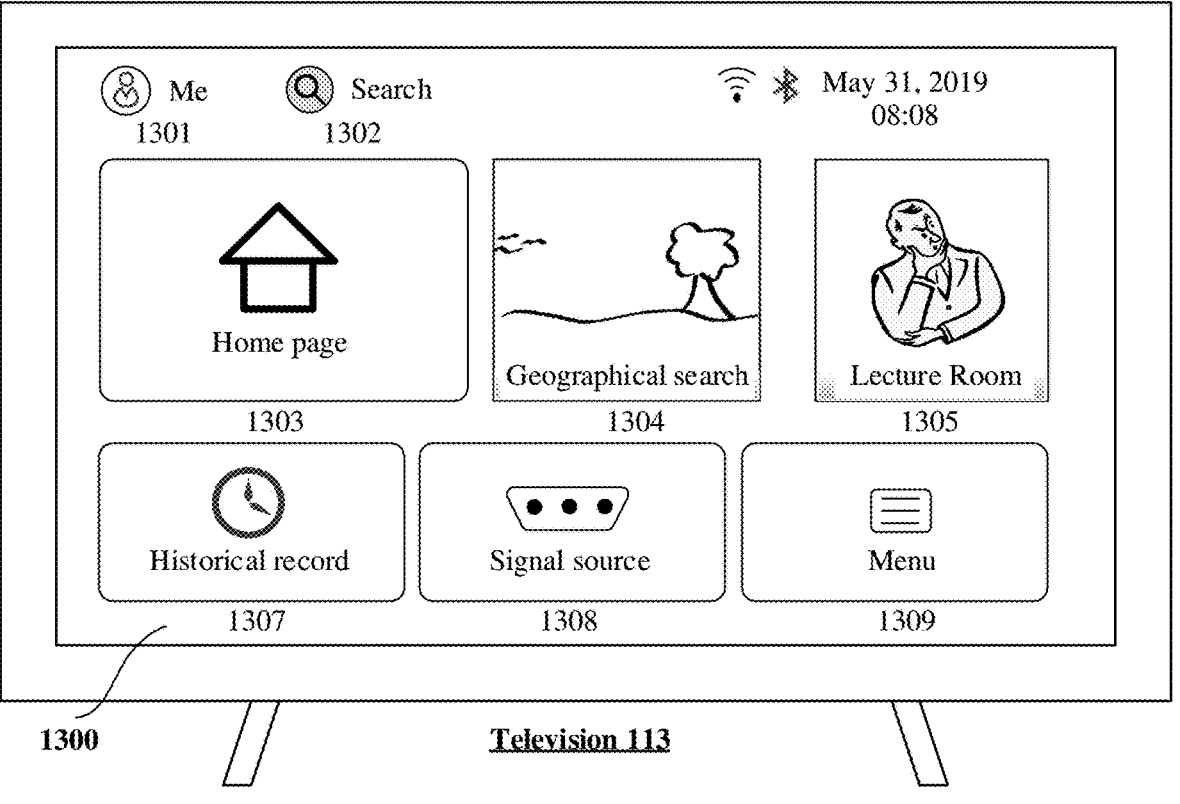
FIG. 23G is a schematic diagram of a user interface of a television 113 according to an embodiment of this application.

When the television 113 receives the request sent by the mobile phone 111, a user interface of the television 113 may be shown in FIG. 23G. FIG. 23G shows a user interface 1300 of the television 113. The user interface 1300 may include a control 1301 to a control 1309. The user may tap the control 1301 to view account login information of the television 113. The user may tap the control 1302 to search for content related to a text entered by the user. The user may tap the control 1303 to back to a home page of the television 113. The user may tap the control 1304 to watch a geographical search program. The user may tap the control 1305 to watch the television program "XXX". The user may tap the control 1307 to view a historical record of a television program played on the television 113. The user may tap the control 1308 to view a signal source of the television 113. The user may tap the control 1309 to view a menu of the television 113. The television 113 may send a control instruction to the mobile phone 111. The control instruction is used by the mobile phone 111 to control the television 113.

Figure 23H:
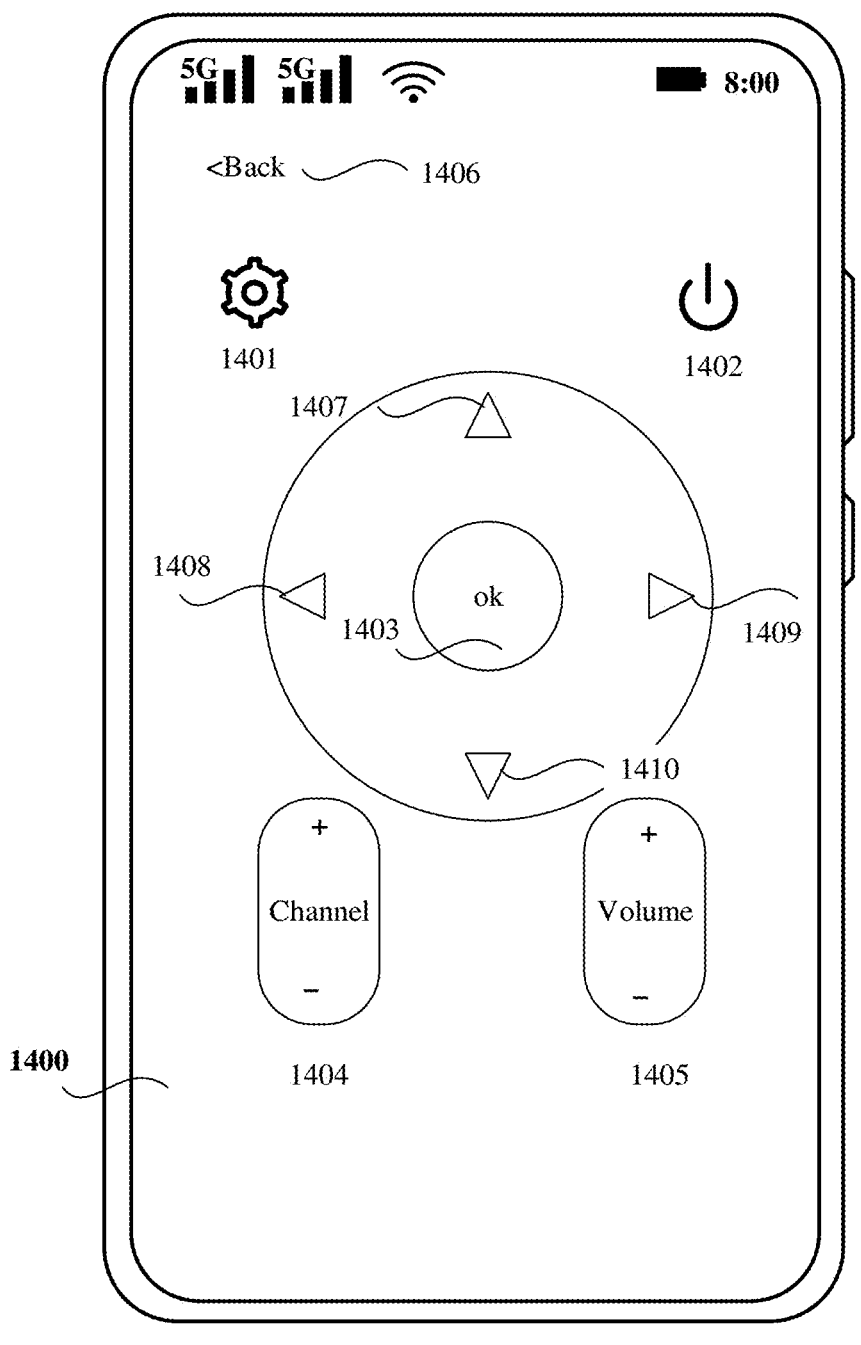
FIG. 23hH and FIG. 23I are schematic diagrams of a group of user interfaces of a mobile phone 111 according to an embodiment of this application.

The mobile phone 113 may receive the control instruction sent by the television 113. As shown in FIG. 23H, after receiving the control instruction, the mobile phone 111 may display a user interface 1400. The user interface 1400 may include a control 1401 to a control 1410. After the user taps the control 1401, the television 113 may display a setting interface. The user may tap the control 1402 to turn off or on the television 113. The user may tap the control 1403 to select a program on the television 113 for playback. The user may tap the control 1404 to switch to a next or previous channel on the television 113. The user may tap the control 1405 to increase or decrease volume of the television 113. The user may tap the control 1407 to scroll up a program list in the television 113. The user may tap the control 1410 to scroll down a program list in the television 113. The user may tap the control 1408 to rewind a program played on the television 113. The user may tap the control 1409 to fast forward a program played on the television 113. The user may tap the control 1406 to back to a previous-level interface of the mobile phone 111.

Figure 23I:
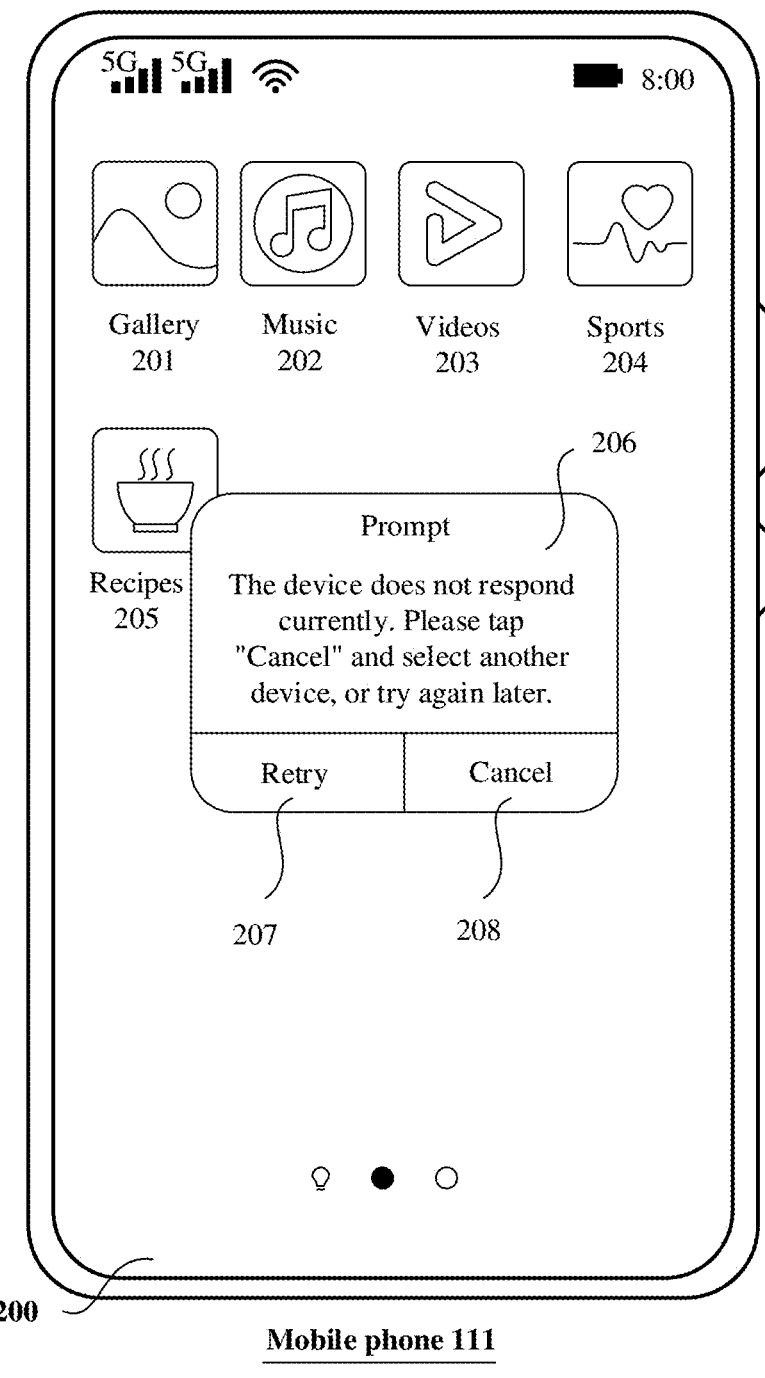

Optionally, if login accounts of the mobile phone 111 and the television 113 are different, and the mobile phone 111 does not obtain permission of the television 113, the mobile phone 111 cannot obtain the first information or the control instruction of the television 113. Alternatively, if the television 113 is in a busy state (for example, another user is controlling the television 113, or the television 113 is exchanging data with another electronic device), the mobile phone 111 cannot obtain the first information or the control instruction of the television 113. As shown in FIG. 23I, the mobile phone 111 displays a prompt box 206 in the user interface 200. The prompt box 206 is used to prompt the user that the television 113 does not respond. Optionally, the prompt box 206 may further include a control 207 and a control 208. The user may tap the control 207 to send the request to the television 113 again. The request is used to request the television 113 to send the first information and the control instruction. The user may tap the control 208 to cancel a task that is in the mobile phone 111 and in which the first information and the control instruction of the television 113 need to be obtained.

Figure 23J:
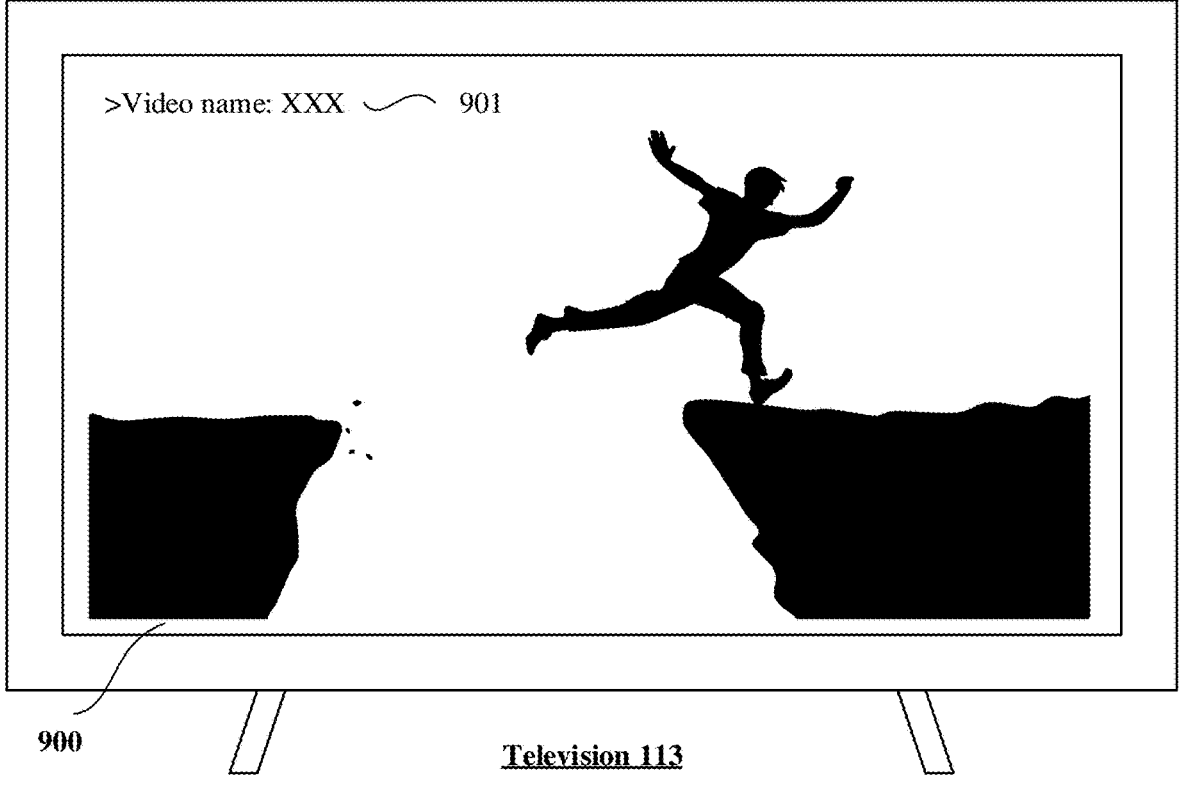
FIG. 23J is a schematic diagram of a user interface of a television 113 according to an embodiment of this application.

Optionally, when the television 113 receives the request sent by the mobile phone 111, a user interface of the television 113 may be shown in FIG. 23j. The television 113 may display a user interface 900. The user interface 900 displays a video that is being played. The user interface 900 may include a text 901. The text 901 is used to display information about the played video, for example, a video name. In response to the request from the mobile phone 111, the television 113 may send the first information of the television 113 to the mobile phone 111, or send the first information and the control instruction.

Figure 23K:
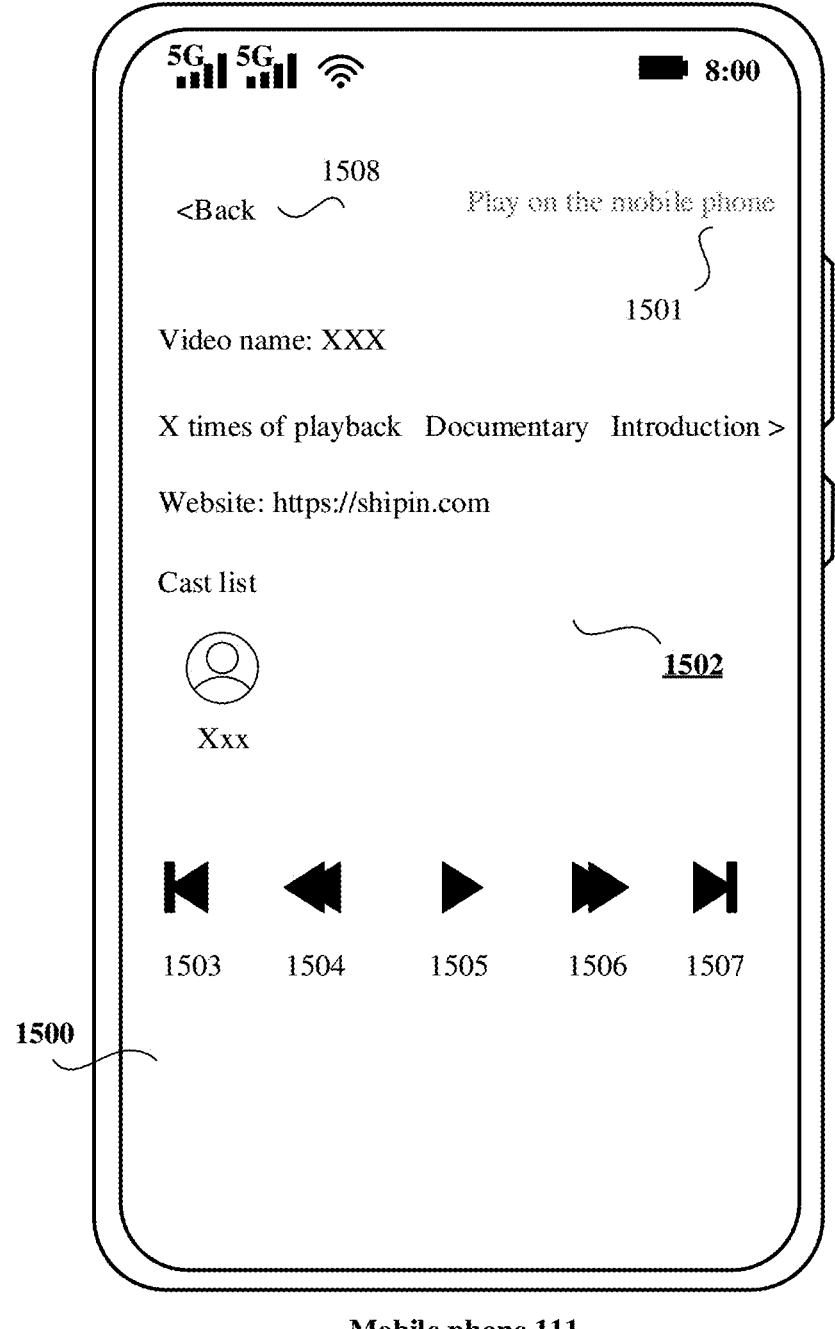
FIG. 23K and FIG. 23L are schematic diagrams of a group of user interfaces of a mobile phone 111 according to an embodiment of this application.

The mobile phone 111 may receive the first information and the control instruction that are sent by the television 113. As shown in FIG. 23K, after receiving the first information and the control instruction that are sent by the television 113, the mobile phone 111 may display a user interface 1500. The user interface 1500 may include a control 1501, text information 1502, a control 1503, a control 1504, a control 1505, a control 1506, a control 1507, and a control 1508. The user may tap the control 1501, and the mobile phone 111 may play, in response to the user operation, the video that is being played on the television 113. The text information 1502 is used to display information about the video currently being played on the television 113, for example, a video name, a quantity of playback times (for example, "X times of playback"), a video type (for example, a documentary), a website, and a cast list. The user may tap the control 1503 to control the television 113 to play a previous episode of video. The user may tap the control 1504 to control rewinding of the video played on the television 113. The user may tap the control 1505 to control pause or play of the video played on the television. The user may tap the control 1506 to control fast forwarding of the video played on the television 113. The user may tap the control 1507 to control the television 113 to play a next episode of video. The user may tap the control 1508 to back to a previous-level interface of the mobile phone 111.

Figure 23L:
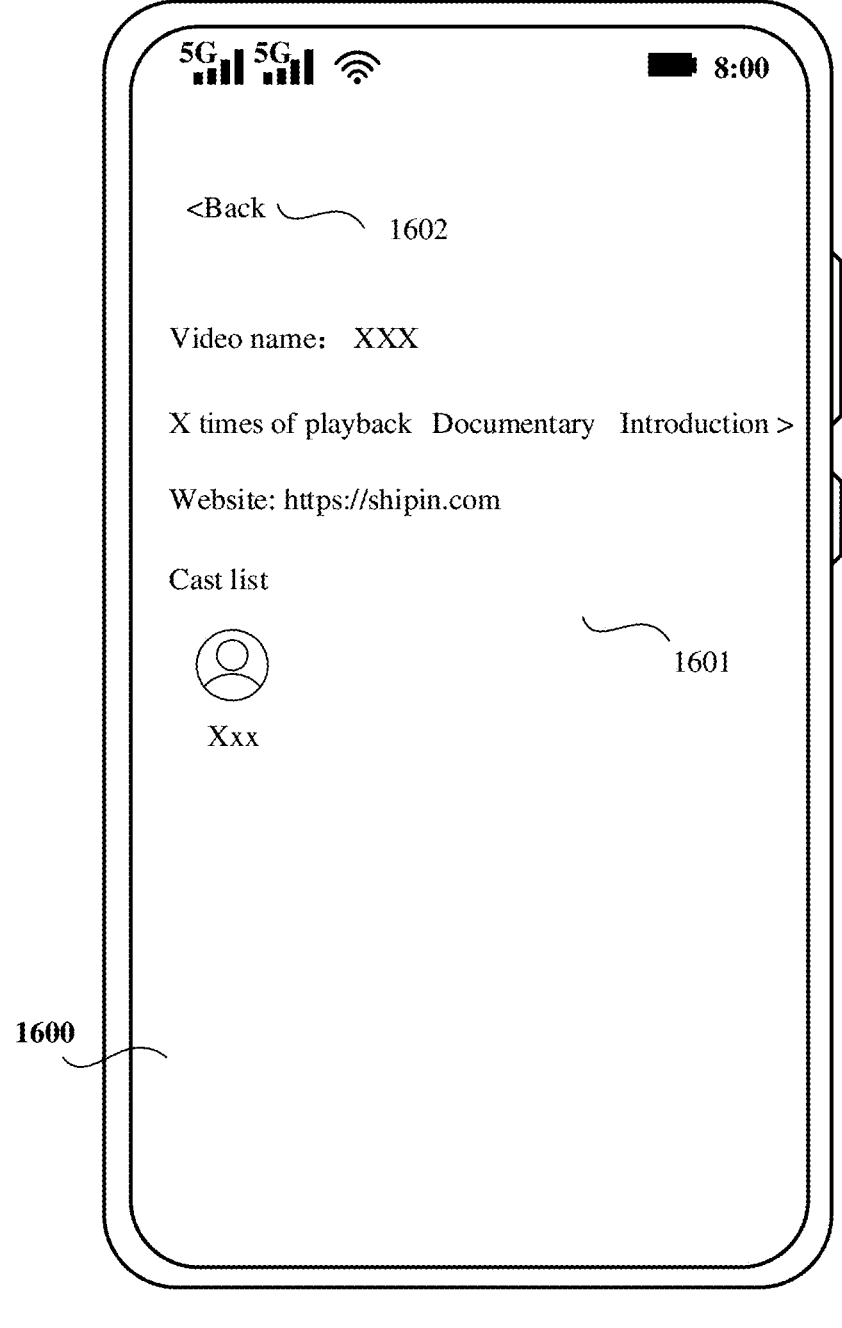

Optionally, as shown in FIG. 23L, after receiving the first information and the control instruction that are sent by the television 113, the mobile phone 111 may display a user interface 1600. The user interface 1600 may include text information 1601 and a control 1602. The text information 1601 is used to display information about the video currently being played on the television 113, for example, a video name, a quantity of playback times (for example, "X times of playback"), a video type (for example, a documentary), a website, and a cast list. The user may tap the control 1602 to back to a previous-level interface of the mobile phone 111.

In this way, the user may obtain the first information and the control instruction of the television 113 in the mobile phone in by performing a simple operation. Therefore, the user may view, in the mobile phone in, the information about the video currently played on the television 113, or may control the television 113 based on a directional operation. In this way, the user operation is simple, and user experience can be improved.

Figure 24A:
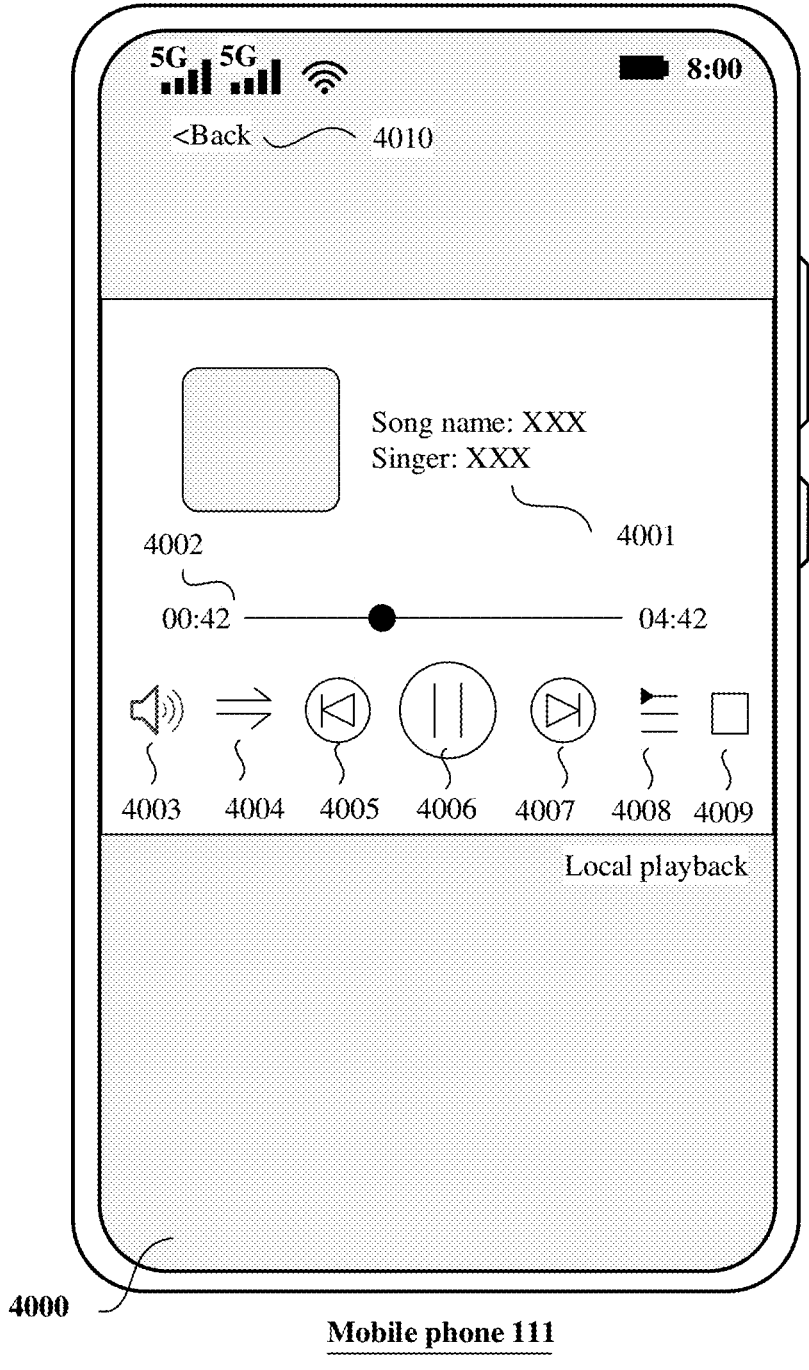
FIG. 24A and FIG. 24B are schematic diagrams of a group of user interfaces of a mobile phone 111 according to an embodiment of this application.

In a feasible example, the mobile phone 111 may further obtain first information and a control instruction of the speaker 112 based on a directional operation. For a specific operation process in which the mobile phone 111 obtains the first information and the control instruction of the speaker 112 based on the directional operation, refer to the foregoing descriptions in FIG. 23A to FIG. 23E. Details are not described herein again. As shown in FIG. 24A, after the mobile phone 111 receives the first information and the control instruction of the speaker 112, the mobile phone 111 may display a user interface 4000. The user interface 4000 may include a text 4001, a song progress bar 4002, and a control 4003 to a control 4010. The text 4001 may be information (for example, a song name and a song singer) about a song played by the speaker 112. The user may adjust a playback progress of the song in the speaker 112 by using the song progress bar 4002. The user may tap the control 4003 to adjust playback volume of the song in the speaker 112. The user may tap the control 4004 to enable the mobile phone 111 to perform a Bluetooth connection to the speaker 112. The user may tap the control 4005 to enable the speaker 112 to play a previous song. The user may tap the control 4006 to control the speaker 112 to pause or start playing of the song. The user may tap the control 4007 to enable the speaker 112 to play a next song. The user may tap the control 4008 to view a music playlist of the speaker 112. The user may tap the control 4009, and after the user taps the control 4009, the mobile phone 111 may play the song currently being played in the speaker 112.

Figure 24B:
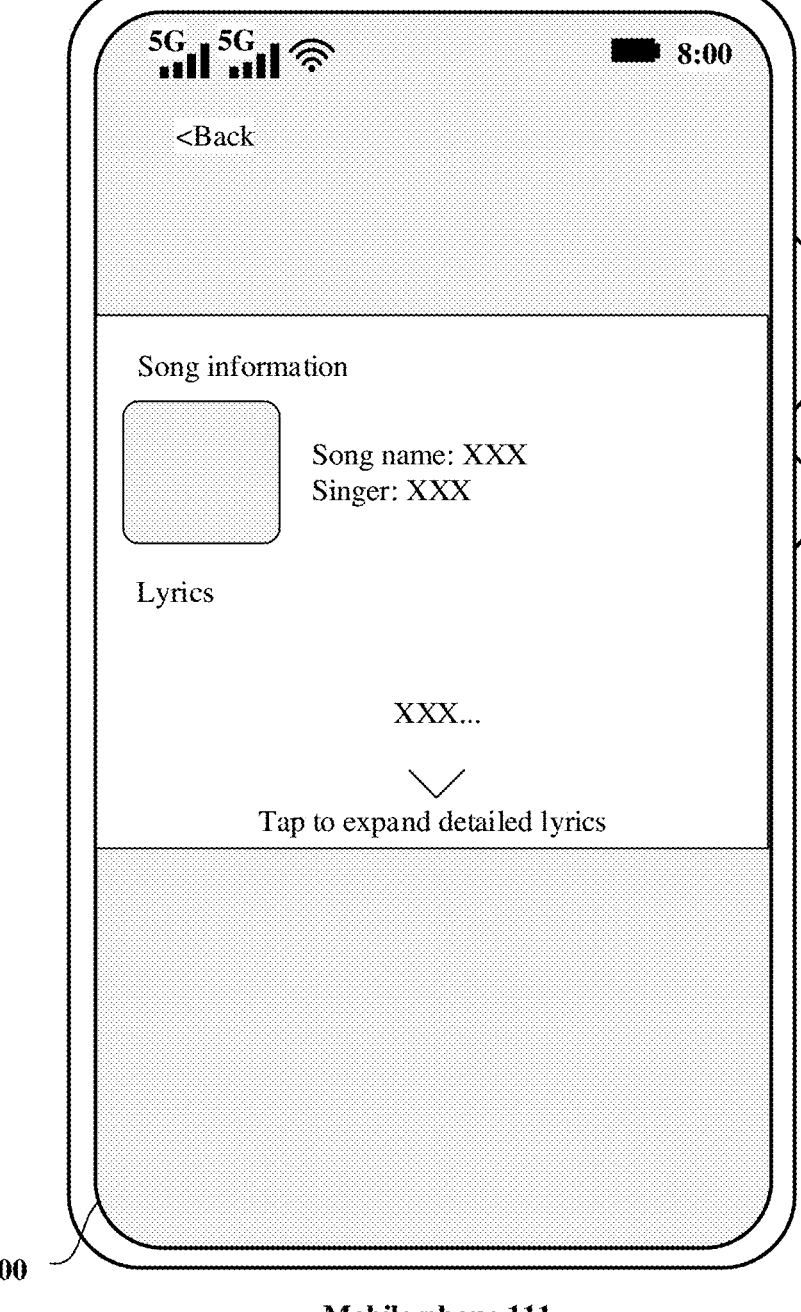

Optionally, if the mobile phone 111 does not have permission to control the speaker 112, the mobile phone can obtain only the first information of the speaker 112. As shown in FIG. 24B, after the mobile phone 111 receives the first information of the speaker 112, the mobile phone 111 may display a user interface 4100. The user interface 4100 may display information such as a name, a singer, and lyrics of the song currently played in the speaker 112.

Figure 25A:
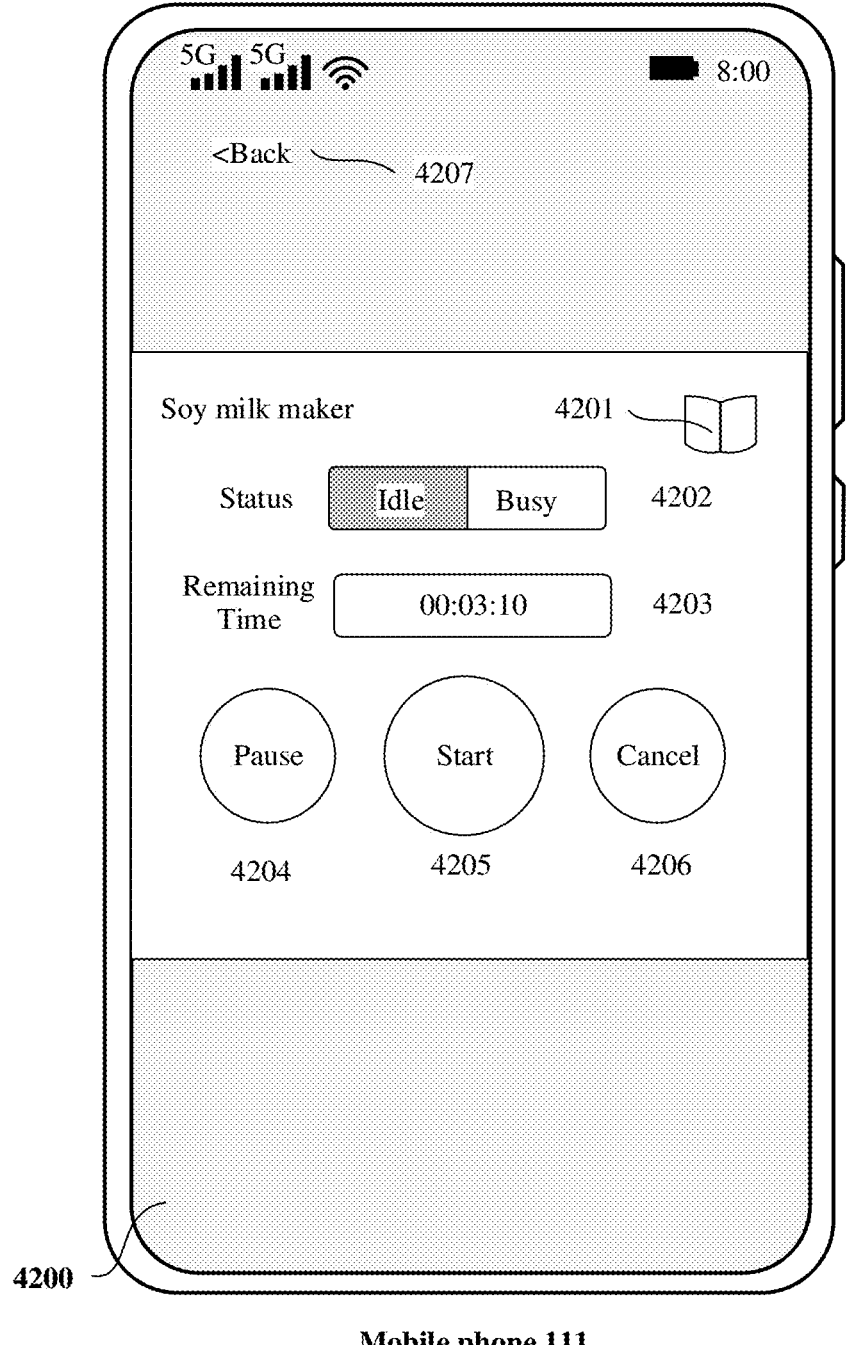
FIG. 25A and FIG. 25B are schematic diagrams of a group of user interfaces of a mobile phone 111 according to an embodiment of this application.

In a feasible example, the mobile phone 111 may further obtain first information and a control instruction of the soy milk maker 114 based on a directional operation. For a specific operation process in which the mobile phone 111 obtains the first information and the control instruction of the soy milk maker 114 based on the directional operation, refer to the foregoing descriptions in FIG. 23A to FIG. 23E. Details are not described herein again. As shown in FIG. 25A, after the mobile phone 111 receives the first information and the control instruction of the soy milk maker 114, the mobile phone 111 may display a user interface 4200. The user interface 4200 may include a control 4201 to a control 4207. The user may tap the control 4201 to view a detailed preparation procedure of food being prepared in the soy milk maker 114. The control 4202 is used to display a current status (for example, idle or busy) of the soy milk maker 114. The control 4203 is used to display a remaining time (for example, "00:03:10") for the soy milk maker 114 to complete food preparation. The user may tap the control 4204 to pause the soy milk maker 114. The user may tap the control 4205 to start the soy milk maker 114. The user may tap the control 4206 to cancel a current task in the soy milk maker 114. The user may tap the control 4207 to back to a previous-level interface of the mobile phone 111.

Figure 25B:
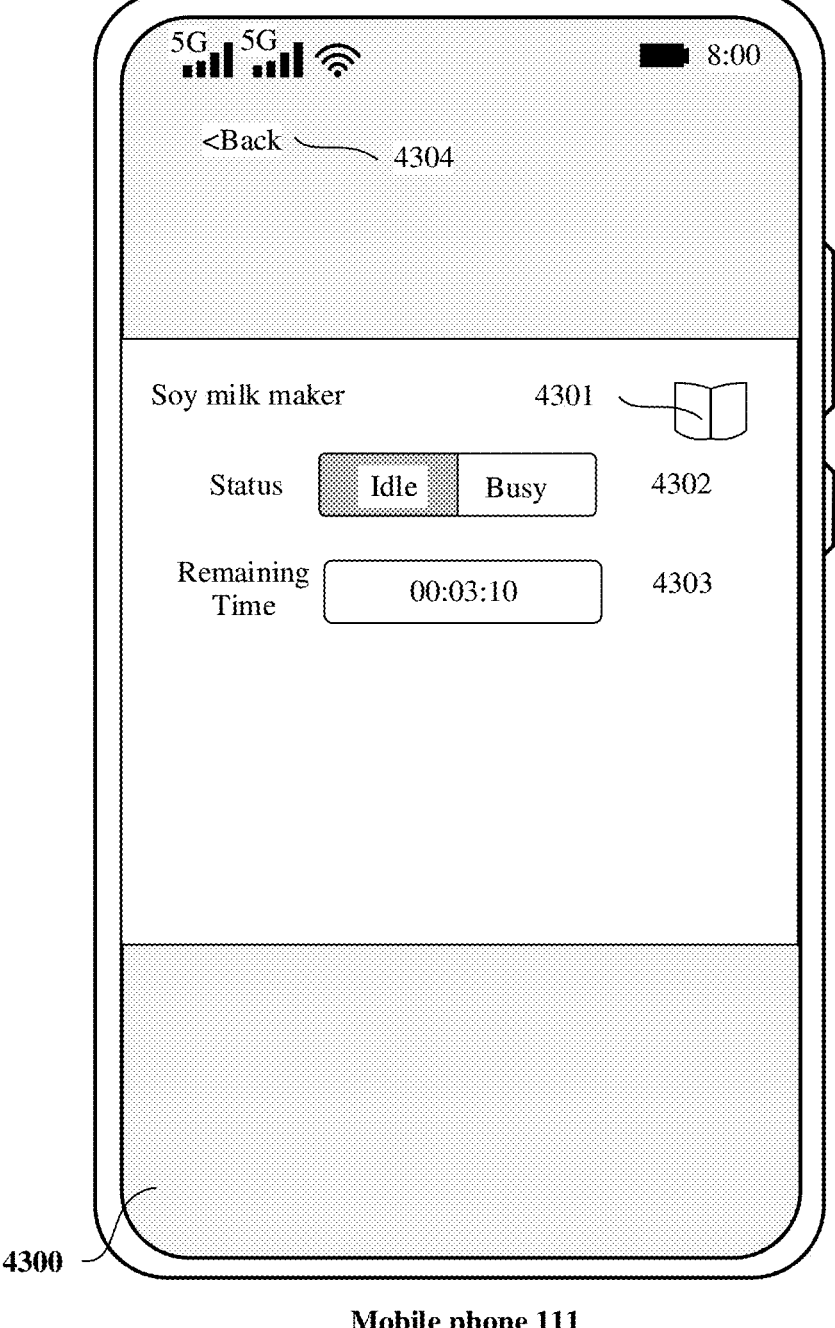

Optionally, if the mobile phone 111 does not have permission to control the soy milk maker 114, the mobile phone can obtain only the first information of the soy milk maker 114. As shown in FIG. 25B, after the mobile phone 111 receives the first information of the soy milk maker 114, the mobile phone 111 may display a user interface 4300. The user interface 4300 may include a control 4301 to a control 4304. The user may tap the control 4301 to view a detailed preparation procedure of food being prepared in the soy milk maker 114. The control 4302 is used to display a current status (for example, idle or busy) of the soy milk maker 114. The control 4303 is used to display a remaining time (for example, "00:03:10") for the soy milk maker 114 to complete food preparation. The user may tap the control 4304 to back to a previous-level interface of the mobile phone 111.

Figure 26A:
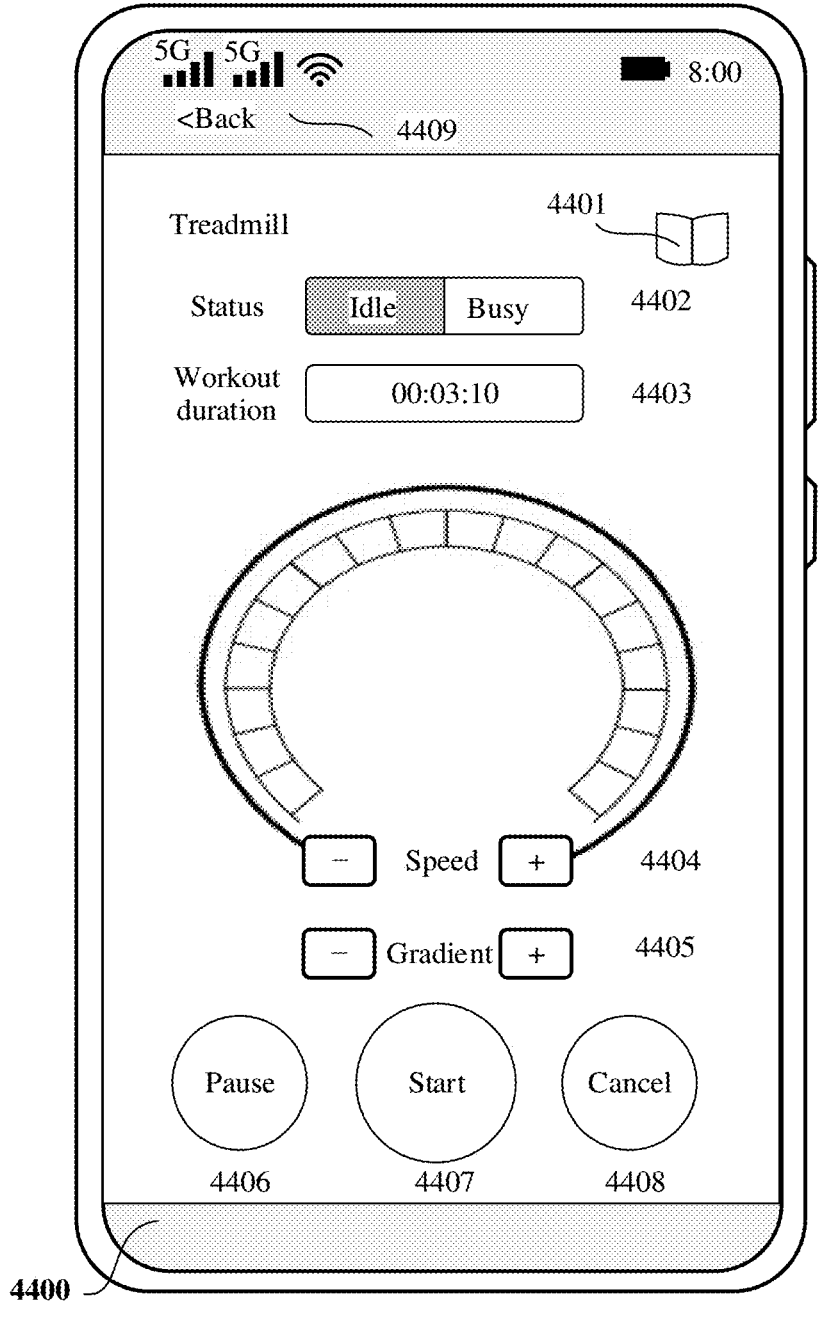
FIG. 26A and FIG. 26B are schematic diagrams of a group of user interfaces of a mobile phone 111 according to an embodiment of this application.

In a feasible example, the mobile phone 111 may further obtain first information and a control instruction of the treadmill 115 based on a directional operation. For a specific operation process in which the mobile phone 111 obtains the first information and the control instruction of the treadmill 115 based on the directional operation, refer to the foregoing descriptions in FIG. 23A to FIG. 23E. Details are not described herein again. As shown in FIG. 26A, after the mobile phone 111 receives the first information and the control instruction of the treadmill 115, the mobile phone 111 may display a user interface 4400. The user interface 4400 may include a control 4402 to a control 4409. The user may tap the control 4401 to view details of an ongoing course on the treadmill 115. The control 4402 is used to display a current status (for example, idle or busy) of the treadmill 115. The control 4403 is used to display a remaining time (for example, "00:03:10") for the treadmill 115 to complete ongoing exercise. The user may tap the control 4404 to adjust a speed of the treadmill 115. The user may tap the control 4405 to adjust a gradient of the treadmill. The user may tap the control 4406 to pause the treadmill 115. The user may tap the control 4407 to start the treadmill 115. The user may tap the control 4408 to cancel an exercise task in the treadmill 115.

Figure 26B:
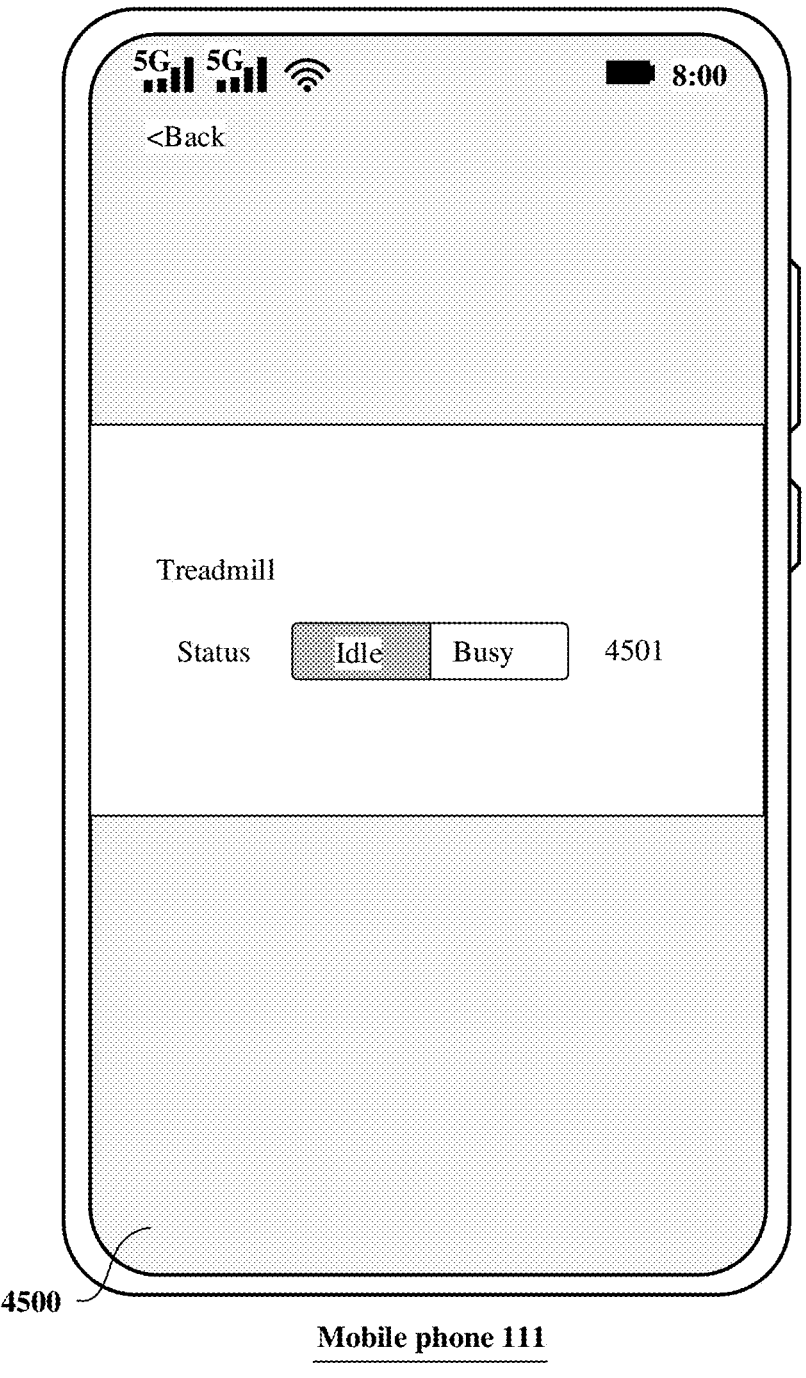

Optionally, if the mobile phone 111 does not have permission to control the treadmill 115, the mobile phone can obtain only the first information of the treadmill 115. As shown in FIG. 26B, after the mobile phone 111 receives the first information of the treadmill 115, the mobile phone 111 may display a user interface 4500. The user interface 4500 may include a control 4501. The control 4501 is used to display a current status (for example, idle or busy) of the treadmill 115.

The mobile phone 111 may further obtain first information and a control instruction of an electronic device such as the tablet computer 116 and the computer 117 based on a second directional operation. For details, refer to the foregoing descriptions that the mobile phone 111 obtains the first information and the control instruction of the television 113 based on the second directional operation. The details are not described herein again.

In some embodiments, increasingly more users choose to integrate smart home devices such as security protection, lighting, health, kitchen appliances, home improvement, and cleaning by using intelligent technologies, to construct an efficient smart home system for residential facilities and family schedule affairs, so as to improve home security, convenience, comfort, and the like. In the smart home system, a portable device (such as a smartphone) may be usually used to implement management and control on different smart home devices. For example, a smart home application may be installed in a smartphone, and the application includes virtual "cards" that correspond to a plurality of smart home devices and that are added by a user. The user can manage and control different smart home devices through different virtual "cards". However, as there are increasingly more smart home devices, when a user needs to control, for example, a smart home device A, the user needs to enter a control interface of the smart home device A by using a virtual "card", and control the smart home device A by performing an operation in the control interface. For example, the user taps a virtual power button to control the smart home device A to be turned on or off. If the user needs to control a plurality of smart home devices, the user needs to perform corresponding control operations one by one in control interfaces corresponding to a plurality of virtual "cards". The foregoing process of controlling the smart home device is complex and takes a long time, and therefore user experience is poor.

Embodiments of this application provide a smart home device control method, to simplify a process of controlling a smart home device and improve user experience. The following describes, in detail with reference to the accompanying drawings in embodiments of this application, an implementation process of controlling a target device (which may be referred to as a smart home device below) by using an electronic device (which may be referred to as a portable device below) provided in embodiments of this application.

An embodiment of this application provides a smart home device control method. The method is applied to a process of controlling a smart home device by using a portable device in a smart home system. The smart home system includes but is not limited to one or more portable devices, one or more routers, and one or more smart home devices.

Figure 27:
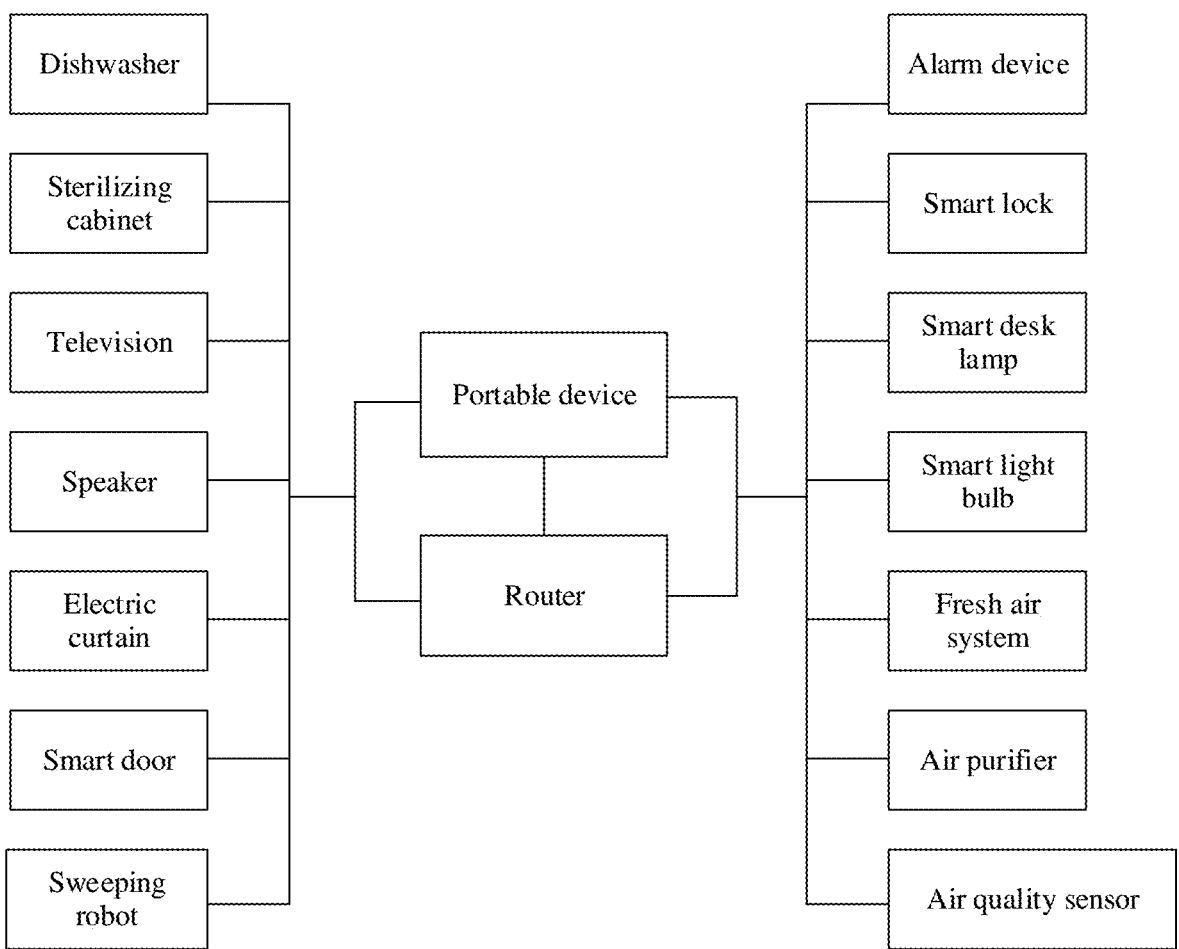
FIG. 27 is a schematic diagram of a structure of a smart home system according to an embodiment of this application.

The smart home devices are various home devices that can be controlled by using a wireless communications technology in the smart home system, for example, a home device used for security protection, lighting, environment, health, kitchen appliances, entertainment, home improvement, or cleaning. For example, FIG. 27 is a schematic diagram of a structure of a smart home system according to an embodiment of this application. As shown in FIG. 27, smart home devices in the smart home system may include devices such as an alarm device and a smart lock that are used for security protection; devices such as a smart desk lamp and a smart light bulb that are used for lighting; devices such as a fresh air system, an air purifier, and an air quality sensor that are used for health; devices such as a dishwasher and a sterilizing cabinet that are used for kitchen appliances; devices such as a television and a speaker that are used for entertainment; devices such as an electric curtain and a smart door that are used for home improvement; or a device such as a sweeping robot used for cleaning.

A router in the smart home system shown in FIG. 27 may also be referred to as a smart host or a home gateway. The router is a hardware device that connects two or more networks and functions as a gateway between the networks. The router is a dedicated intelligent network device that reads an address in each data packet and determines how to transmit the data packet. In the smart home system, the router is wirelessly connected to a host, so that a user can conveniently manage and control different smart home devices by using a portable device. Usually, the router may provide a wireless fidelity (wireless fidelity, Wi-Fi) hotspot, and the smart home device and the portable device may access a Wi-Fi network by accessing the Wi-Fi hotspot provided by the router.

In this application, the portable device is configured to assist the user in selecting and controlling devices such as smart home devices and routers in the smart home system. For example, the portable device may be a smartphone.

It should be noted that FIG. 27 in this application is merely used as an example of the smart home system, and a specific structure of the smart home system is not limited in this application. For example, the smart home system may alternatively not include the router, and the portable device in the smart home system may directly control the smart home device (for example, directly control the smart home device in a Wi-Fi direct manner). For another example, the smart home system may further include another device such as a smart home device having another function.

In addition, in addition to the smartphone, the portable device in this application may be a netbook, a tablet computer, a smartwatch, a smart band, a telephone watch, a smart camera, a palmtop computer, a personal digital assistant (personal digital assistant, PDA), a portable multimedia player (portable multimedia player, PMP), an augmented reality (Augmented Reality, AR) device, a virtual reality (Virtual Reality, VR) device, or the like. Alternatively, the portable device may be an electronic device of another type or structure. This is not limited in this application.

Figure 28A:
FIG. 28A, FIG. 28B, and FIG. 28C are a schematic diagram of an operation process in which a portable device controls a smart home device.
Figure 28B:
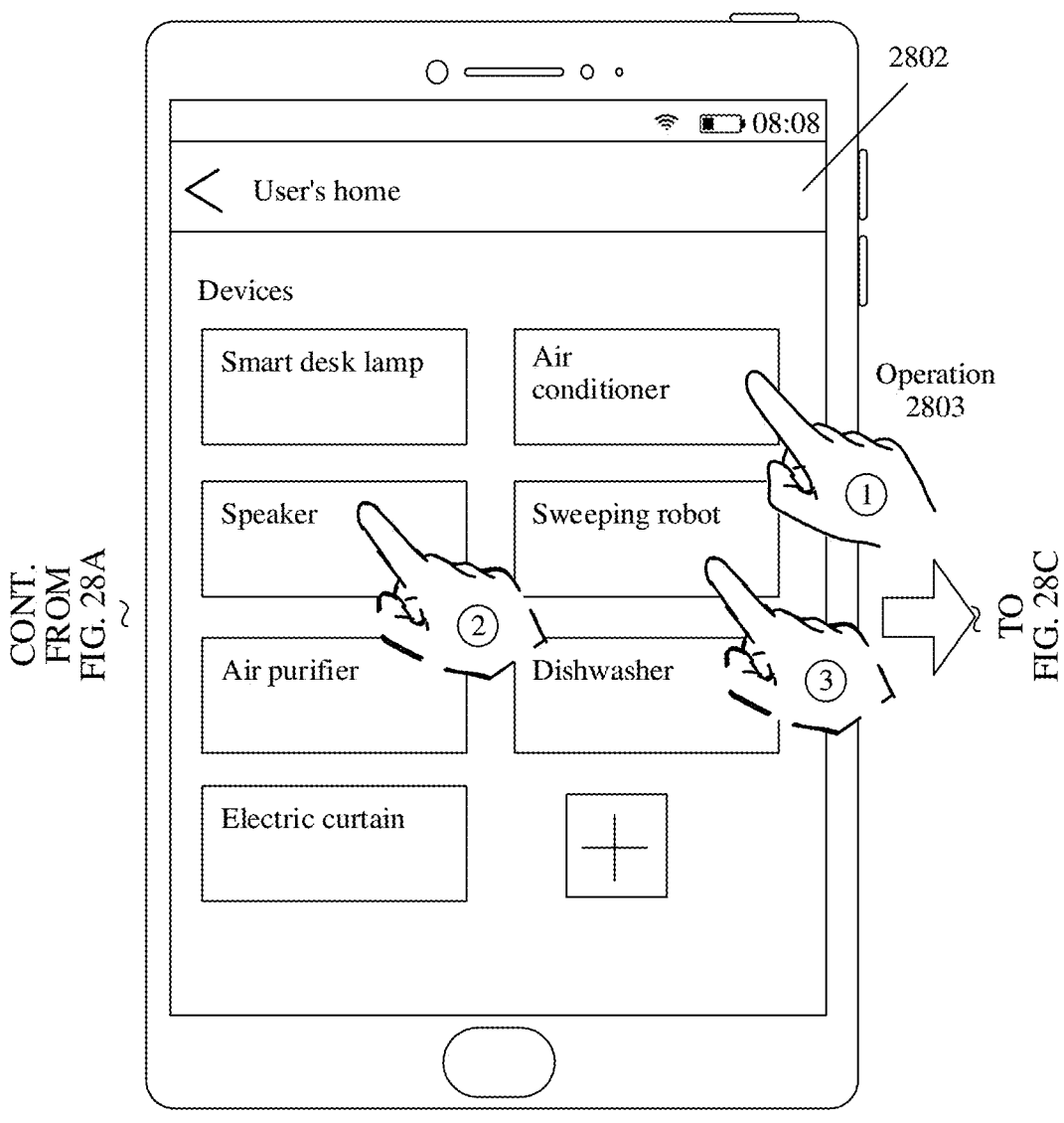
Figure 28C:
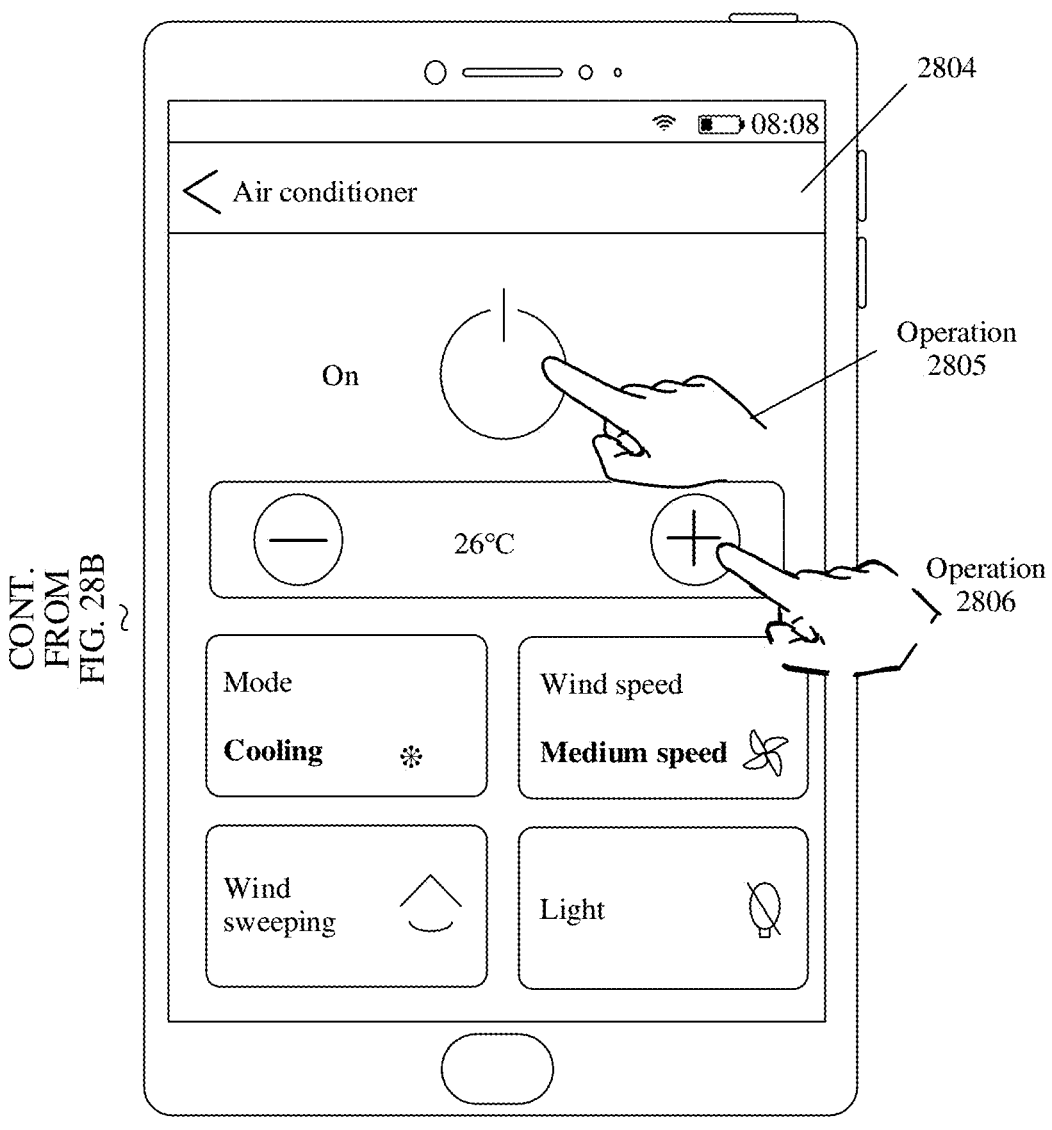

As a smart home device control method, FIG. 28A, FIG. 28B, and FIG. 28C are a schematic diagram of an operation process in which a portable device controls a smart home device. In response to an operation (an operation 2801 shown in FIG. 28A) of opening a smart home application on a smartphone when a user has an intention of controlling a smart home device, as shown in FIG. 28B, the smartphone displays a smart home application interface 2802. Virtual "cards" that correspond to all smart home devices and that are added by the user are displayed in the smart home application interface 2802, for example, virtual "cards" corresponding to a smart desk lamp, an air conditioner, a speaker, a sweeping robot, an air purifier, a dishwasher, and an electric curtain shown in FIG. 28B. Assuming that in this case, the user needs to control the air conditioner, the speaker, and the sweeping robot, the user needs to tap virtual "cards" corresponding to the air conditioner, the speaker, and the sweeping robot one by one to enter a corresponding control interface to perform an operation. For example, in response to an operation of opening an air conditioner control interface by the user (an operation 2803 of tapping, by the user, a virtual "card" corresponding to the air conditioner shown in FIG. 28B), as shown in FIG. 28C, the smartphone displays an air conditioner control interface 2804. The air conditioner control interface 2804 includes a power button, a temperature up button ("+"), a temperature down button ("−"), and the like. The smartphone may control the air conditioner in response to an operation performed by the user in the air conditioner control interface 2804. For example, in response to an operation 2805 of tapping the power button by the user in the air conditioner control interface 2804, the smartphone controls the air conditioner to be turned on. Next, in response to an operation 2806 of tapping the temperature up button ("+") by the user in the air conditioner control interface 2804, the smartphone controls the air conditioner to increase a cooling temperature.

It can be learned that when a plurality of smart home devices are operated in the control interface, the smart home devices need to be operated one by one, that is, entering a control interface of a first smart home device→operating the first smart home device→back→entering a control interface of a second smart home device→operating the second smart home device→back→ . . . . The foregoing process of controlling the smart home device is complex and takes a long time, and therefore user experience is poor.

To resolve the foregoing problem, an embodiment of this application provides a smart home device control method. The method may provide a solution of directly controlling a smart home device based on a button of a portable device. A basic principle of the method is as follows: When an operation intention of a user is determined, that is, when a smart home device that expects to be controlled by the user is determined, a control object of the button of the portable device is switched to the smart home device, to directly control the smart home device based on the operation on the button of the portable device.

In some embodiments, the button of the portable device may include a physical button, for example, a power button, a volume up button ("+"), a volume down button ("−"), or a fingerprint button. In this application, the operation on the physical button of the portable device may include but is not limited to an operation on a single physical button and a multiplexing operation on a plurality of physical buttons. The operation on the single physical button is, for example, a press operation on the power button. The multiplexing operation on the plurality of physical buttons is, for example, a simultaneous press operation on the power button and the volume up button ("+"). A specific form of the operation is not limited in this application, and is specifically determined based on function settings of the physical button.

For example, when determining that the user expects to control a desk lamp, the smartphone may control, by using a power button of the smartphone, the desk lamp to be turned on or off; and control, by using a volume up button ("+") of the smartphone, brightness of the desk lamp to increase, and control, by using a volume down button ("−") of the smartphone, brightness of the desk lamp to decrease. For another example, when determining that the user expects to control a speaker, the smartphone may control, by using a power button of the smartphone, the speaker to be turned on or off; and control, by using a volume up button ("+") of the smartphone, volume of the speaker to increase, and control, by using a volume down button ("−") of the smartphone, volume of the speaker to decrease. For another example, when determining that the user expects to control a television, the smartphone may control, by using a power button of the smartphone, the television to be turned on or off; perform, by using a fingerprint button of the smartphone, verification on an identity of a user who uses a television service; and control, by using a volume up button ("+") of the smartphone, volume of the television to increase, and control, by using a volume down button ("−") of the smartphone, volume of the television to decrease.

Figure 29:
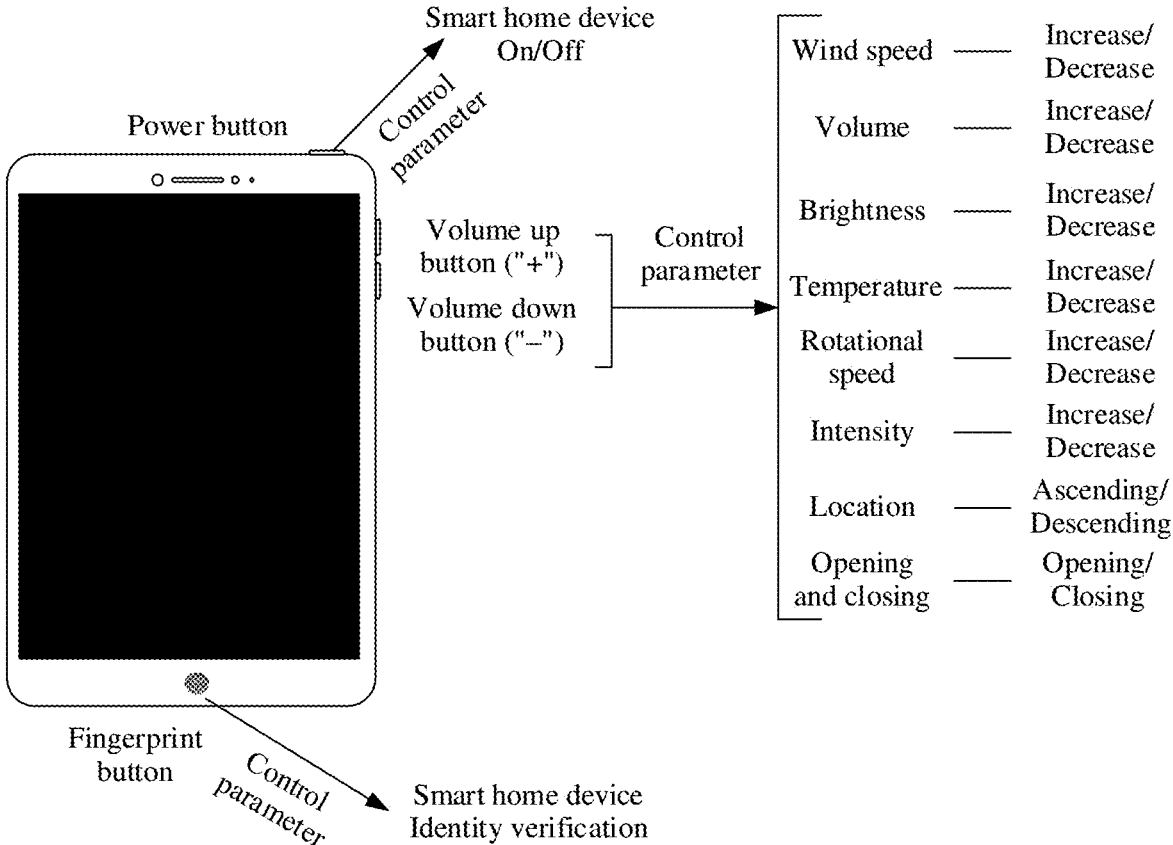
FIG. 29 is a diagram of an example of a control parameter corresponding to a physical button of a portable device according to an embodiment of this application.

FIG. 29 describes, by using a power button, a volume up button ("+"), and a volume down button ("−") of a portable device as an example, a control parameter corresponding to a physical button of the portable device. As shown in FIG. 29, the power button of the portable device may correspond to "turn-on" or "turn-off" of any smart home device. The volume up button ("+") of the portable device may correspond to an increase in a wind speed, an increase in volume, an increase in brightness, an increase in a temperature, an increase in a rotational speed, an increase in intensity, ascending, opening, or the like. The volume down button ("−") of the portable device may correspond to a decrease in a wind speed, a decrease in volume, a decrease in brightness, a decrease in a temperature, a decrease in a rotational speed, a decrease in intensity, descending, closing, or the like. Specific control parameters corresponding to the volume button of the portable device are determined based on functions of the smart home device. For example, when the smart home device is a fan or an air conditioner, the volume button of the portable device may correspond to a wind speed or a rotational speed of the fan or the air conditioner; when the smart home device is a television or a speaker, the volume button of the portable device may correspond to volume of the television or the speaker; when the smart home device is a desk lamp, the volume button of the portable device may correspond to brightness or intensity of the desk lamp; when the smart home device is an air conditioner, the volume button of the portable device may correspond to a temperature of the air conditioner; when the smart home device is a fan, the volume button of the portable device may correspond to a rotational speed of the fan; when the smart home device is a clothes hanger, the volume button of the portable device may correspond to ascending/descending of a desk lamp; or when the smart home device is a smart lock, the volume button of the portable device may correspond to opening and closing of the smart lock.

It should be noted that FIG. 29 in this application is merely used as an example of a correspondence between the physical button of the portable device and the control parameter. A control parameter to which the physical button of the portable device may correspond is not limited to the control parameter shown in FIG. 29. For details, refer to functions and adjustable parameters of the smart home device.

In addition, a specific form of the button of the portable device is not limited in this application. In some other embodiments, the button of the portable device may include a virtual button. For example, the button of the portable device may be a virtual button that is in an application interface and that is installed in the portable device for remote control. Alternatively, the button of the portable device may be a virtual operation in another user interface (user interface, UI) of the portable device. This is not limited in this application.

In some other embodiments, when detecting that a moving track of the portable device meets a preset moving track, and/or the portable device moves to a preset spatial posture, the portable device may determine a smart home device (that is, a smart home device to which the portable device points) (for example, a first smart home device) that expects to be controlled by the user.

For example, the preset moving track may include but is not limited to a track away from the body of the user. In some embodiments, the preset moving track may be a track in which the mobile phone moves from a location A to a location B and that is shown in (a) in FIG. 30 or (b) in FIG. 30. Moving to the preset spatial posture may include but is not limited to moving to a spatial posture at an included angle of 90° (or an included angle close to 90°) with a horizontal plane, or moving to a spatial posture at an included angle of a (where 0≤α<90°) with the horizontal plane. In some embodiments, moving to the preset spatial posture is moving to a spatial posture that is at an included angle of 90° with a horizontal plane after the mobile phone moves from a location A to a location B and that is shown in (a) in FIG. 31. In some other embodiments, moving to the preset spatial posture is moving to a spatial posture that is at an included angle of a with a horizontal plane after the mobile phone moves from a location A to a location B and that is shown in (b) in FIG. 31, where 0≤α<900.

Figure 30:
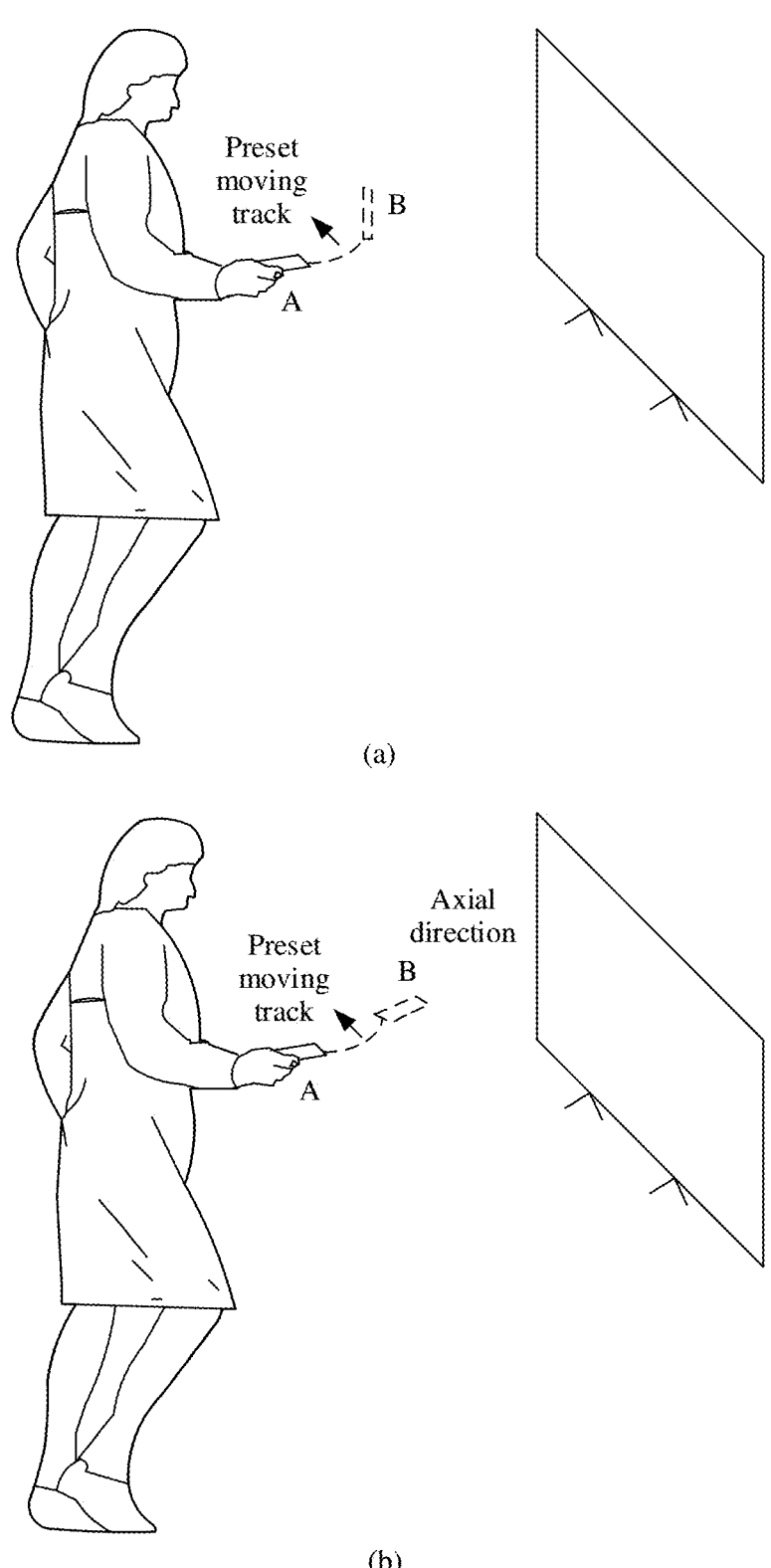
FIG. 30 is a diagram of an example in which two portable devices meet preset moving tracks according to an embodiment of this application.
Figure 31:
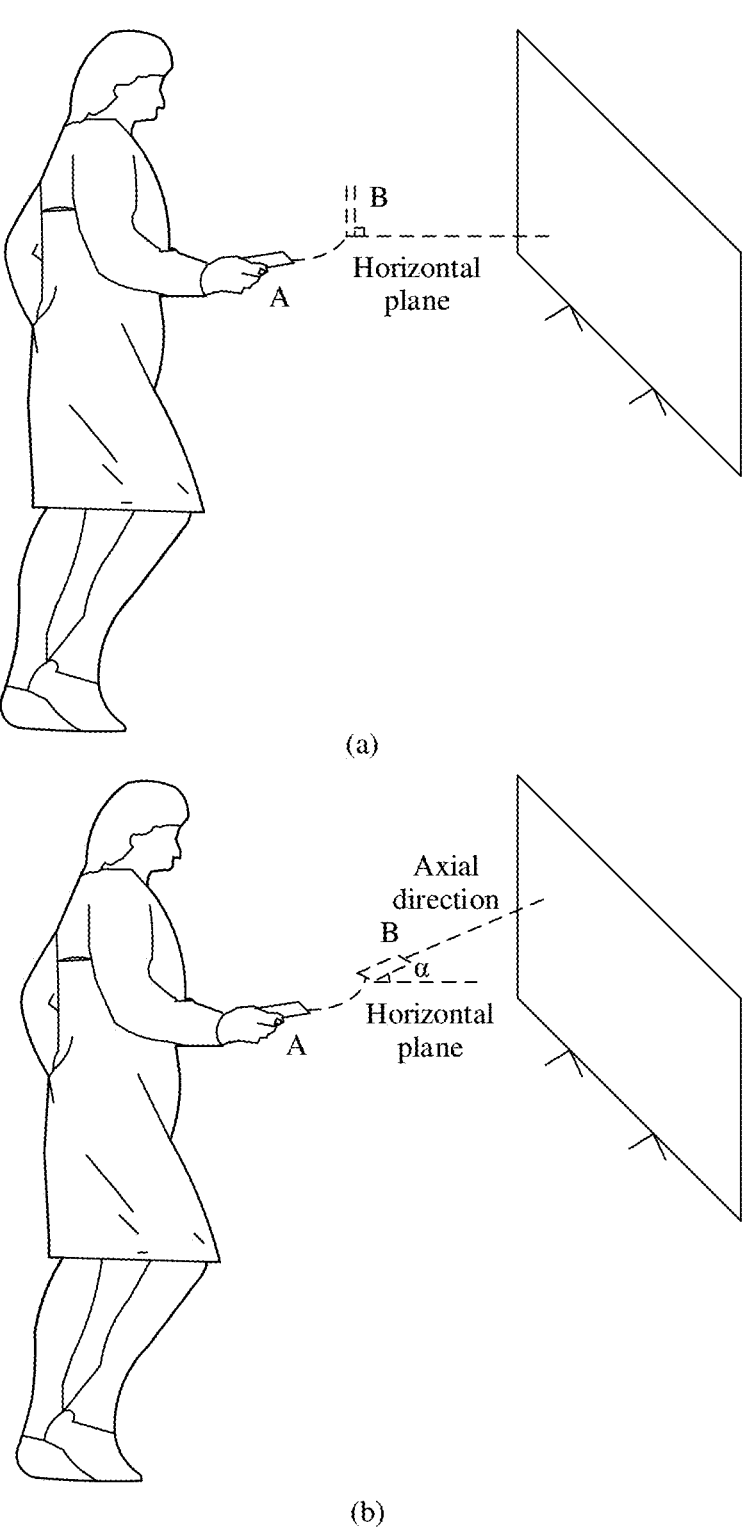
FIG. 31 is a diagram of an example in which a portable device moves to a preset spatial posture according to an embodiment of this application.

It should be noted that the preset moving tracks shown in (a) in FIG. 30 and (b) in FIG. 30 in this application are merely used as examples. A specific track threshold, a determining criterion, and the like of the preset moving track are not limited in this application. In addition, the spatial postures of the mobile phone at the locations B shown in (a) in FIG. 31 and (b) in FIG. 31 are merely used as two examples. A specific setting, a determining criterion, and the like of the preset spatial posture are not limited in this application.

In this application, in a possible implementation, the portable device may determine a moving track and/or a spatial posture of the portable device based on motion data that is of the portable device and that is collected by a sensor driver.

For example, the portable device may collect a moving direction and a moving speed of the portable device in real time by using an acceleration sensor, draw a moving track of the portable device, and further determine whether the moving track of the portable device meets a preset moving track.

For another example, the portable device may determine a spatial posture of the portable device by using a 9-axis fusion algorithm based on motion data that is of the portable device and that is collected by a gyro sensor, an acceleration sensor, and a magnetic sensor in real time, and further determine whether the spatial posture of the portable device meets a preset spatial posture. In this application, the spatial posture of the portable device may be represented by a Euler angle of a preset coordinate system of the portable device relative to a ground coordinate system. The Euler angle includes a pitch (pitch) angle θ, a yaw (yaw) angle φ, and a roll (roll) angle ϕ.

Figure 32A:
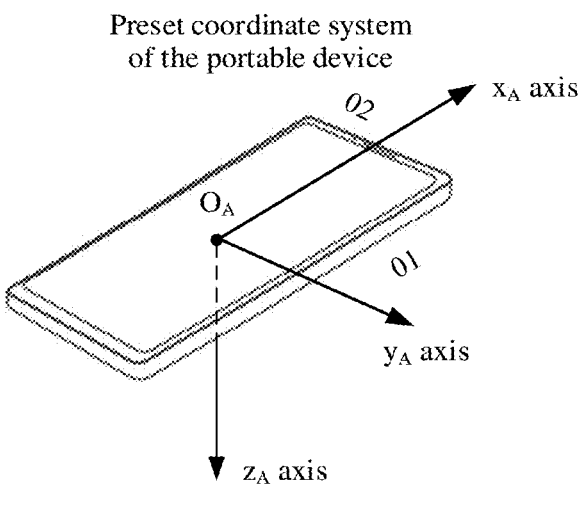
FIG. 32A is a schematic diagram of a preset coordinate system of a portable device according to an embodiment of this application.

A smartphone is used as an example. For a preset coordinate system of the portable device, refer to FIG. 32A. As shown in FIG. 32A, an $x_A$ axis, a $y_A$ axis, and a $z_A$ axis that use $O_A$ as a coordinate origin form a right-hand rectangular coordinate system. $O_A$ shown in FIG. 32A may be a center of gravity of the smartphone. The smartphone may include four sides: a long side 01, a short side 02, the other long side that is parallel to the long side 01 and that has an equal length, and the other short side that is parallel to the short side 02 and that has an equal length. The $y_A$ axis is parallel to the short side 02 of the smartphone. The $x_A$ axis is parallel to the long side 01 of the smartphone and is upward. The $z_A$ axis is perpendicular to the $y_A$ axis, and is perpendicular to the $x_A$ axis.

Figure 32B:
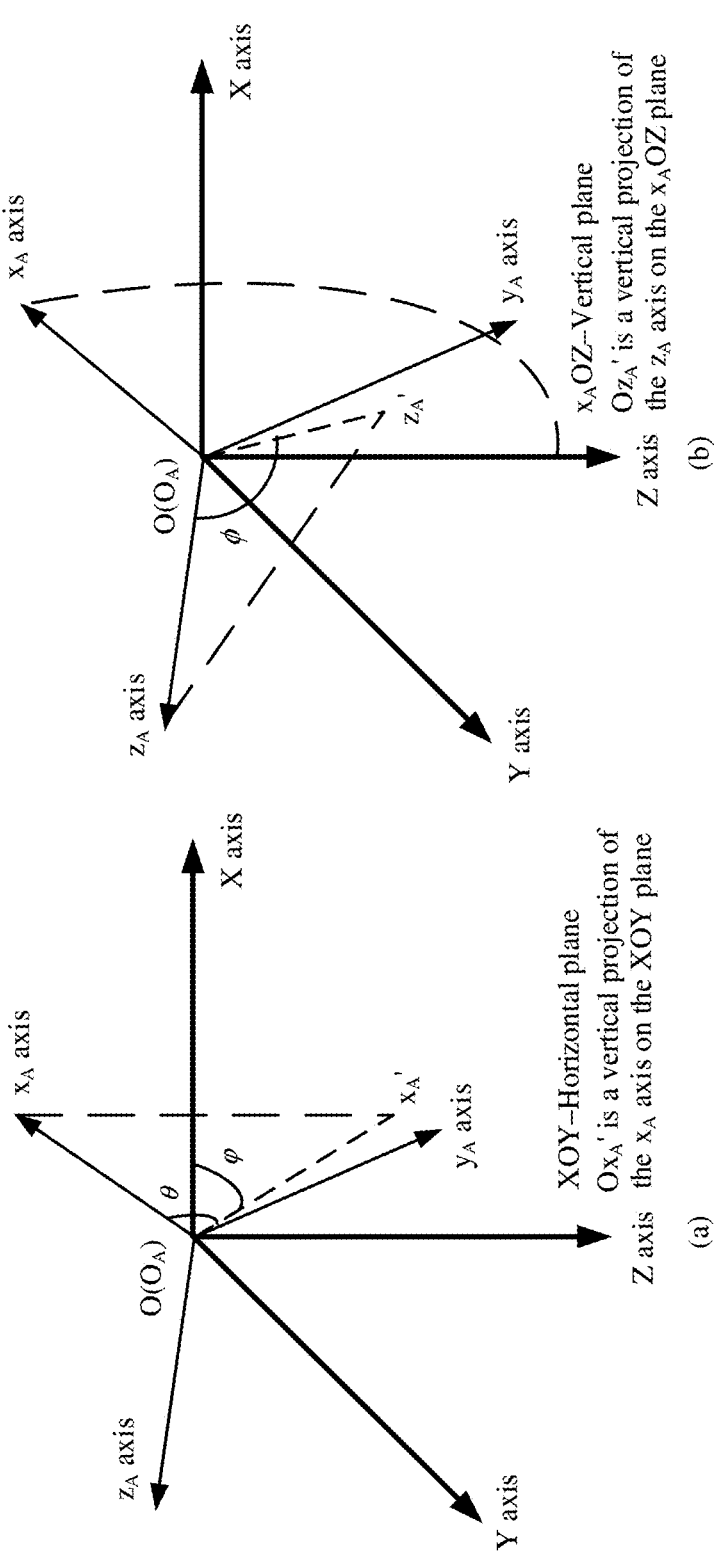
FIG. 32B is a schematic diagram of a method for determining a spatial posture of a portable device according to an embodiment of this application.

The ground coordinate system may be shown in FIG. 32B. As shown in (a) in FIG. 32B and (b) in FIG. 32B, an X axis, a Y axis, and a Z axis that use O as a coordinate origin form a right-hand rectangular coordinate system. The coordinate origin O shown in (a) in FIG. 32B and (b) in FIG. **32*b*** may be any point in space. The X axis points to any direction in a horizontal plane. The Z axis is perpendicular to a plane on which the X axis is located and points to a center of the earth. The Y axis is perpendicular to the X axis, and is perpendicular to the Z axis.

Based on the preset coordinate system of the portable device that is shown in FIG. 32A and the ground coordinate system shown in FIG. 32B, a pitch angle 9 of the preset coordinate system of the portable device relative to the ground coordinate system may be an included angle between an x axis of the preset coordinate system of the portable device and a plane (that is, a horizontal plane) on which XOY of the ground coordinate system is located. A pitch angle θ of the preset coordinate system of the smartwatch relative to the ground coordinate system is an included angle between the $x_A$ axis and the horizontal plane (that is, the plane on which XOY is located). A yaw angle φ of the preset coordinate system of the portable device relative to the ground coordinate system is a horizontal included angle between the x axis of the preset coordinate system of the portable device and the X axis of the ground coordinate system, that is, an included angle between $Ox_A'$ (that is, $O_Ax_A'$) and the X axis of the ground coordinate system. A roll angle θ of the preset coordinate system of the portable device relative to the ground coordinate system is an included angle between the $z_A$ axis of the preset coordinate system of the portable device and a vertical plane (that is, a plane on which $x_AOZ$ is located) passing through the $x_A$ axis.

It should be noted that in FIG. 32A, only the smartphone is used as an example to describe the preset coordinate system of the portable device. The preset coordinate system of the portable device may be further defined according to another rule. For example, the coordinate origin may alternatively be any other point on the portable device or outside the portable device. Directions of the three axes of the preset coordinate system are not limited to directions of the $x_A$ axis, the $y_A$ axis, and the $z_A$ axis that are shown in FIG. 32A. Settings of a location of the coordinate origin and a direction of the coordinate axis of the preset coordinate system of the portable device are not limited in this embodiment of this application.

In some examples, when the portable device detects that the portable device meets a preset moving track, and/or the portable device moves to a preset spatial posture, the portable device may specifically determine, in step 1 and step 2, a smart home device (that is, a smart home device to which the portable device points) (for example, a first smart home device) that expects to be controlled by the user.

Step 1: The portable device detects and identifies a surrounding smart home device.

For example, the portable device may trigger a UWB driver or a Bluetooth driver to detect and identify the surrounding smart home device.

Figure 33:
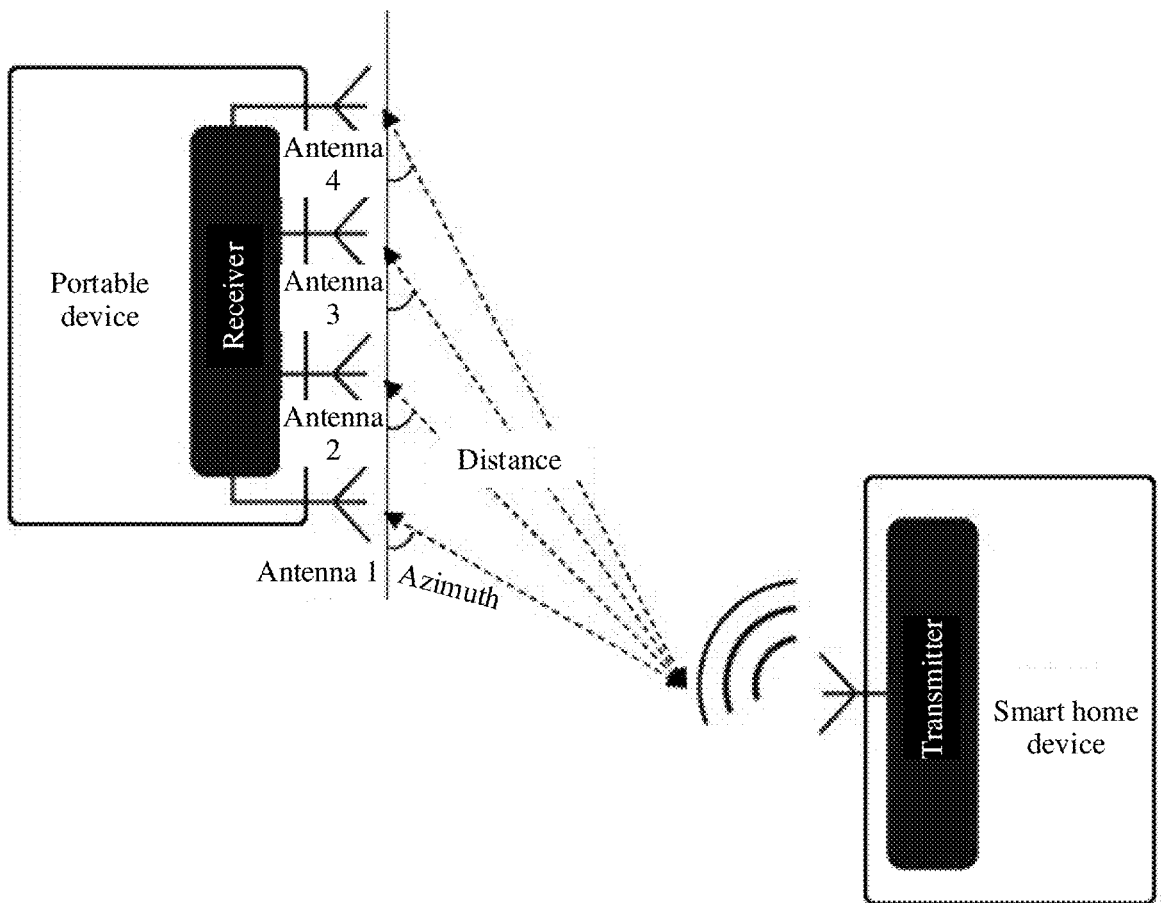
FIG. 33 is a schematic diagram of a method for determining an azimuth and a distance of a smart home device relative to a portable device according to an embodiment of this application.

It may be understood that after accessing a network (for example, Wi-Fi), the smart home device and the portable device may obtain access information of the smart home device and the portable device. For example, the access information may include a network access manner, a communication address (such as an IP address), a received signal strength indication (received signal strength indication, RSSI) parameter, and the like. As shown in FIG. 33, because signal strength gradually attenuates with a propagation distance, a UWB or Bluetooth sensor may receive, through a plurality of antennas, signals sent by a plurality of transmit devices (for example, a smart home device). A transmission time difference between different received signals is calculated based on strength of the different received signals, to calculate azimuths and distances of different transmit devices (for example, a smart home device) relative to a receive device (for example, a portable device), so as to identify the smart home device by the portable device.

Figure 34:
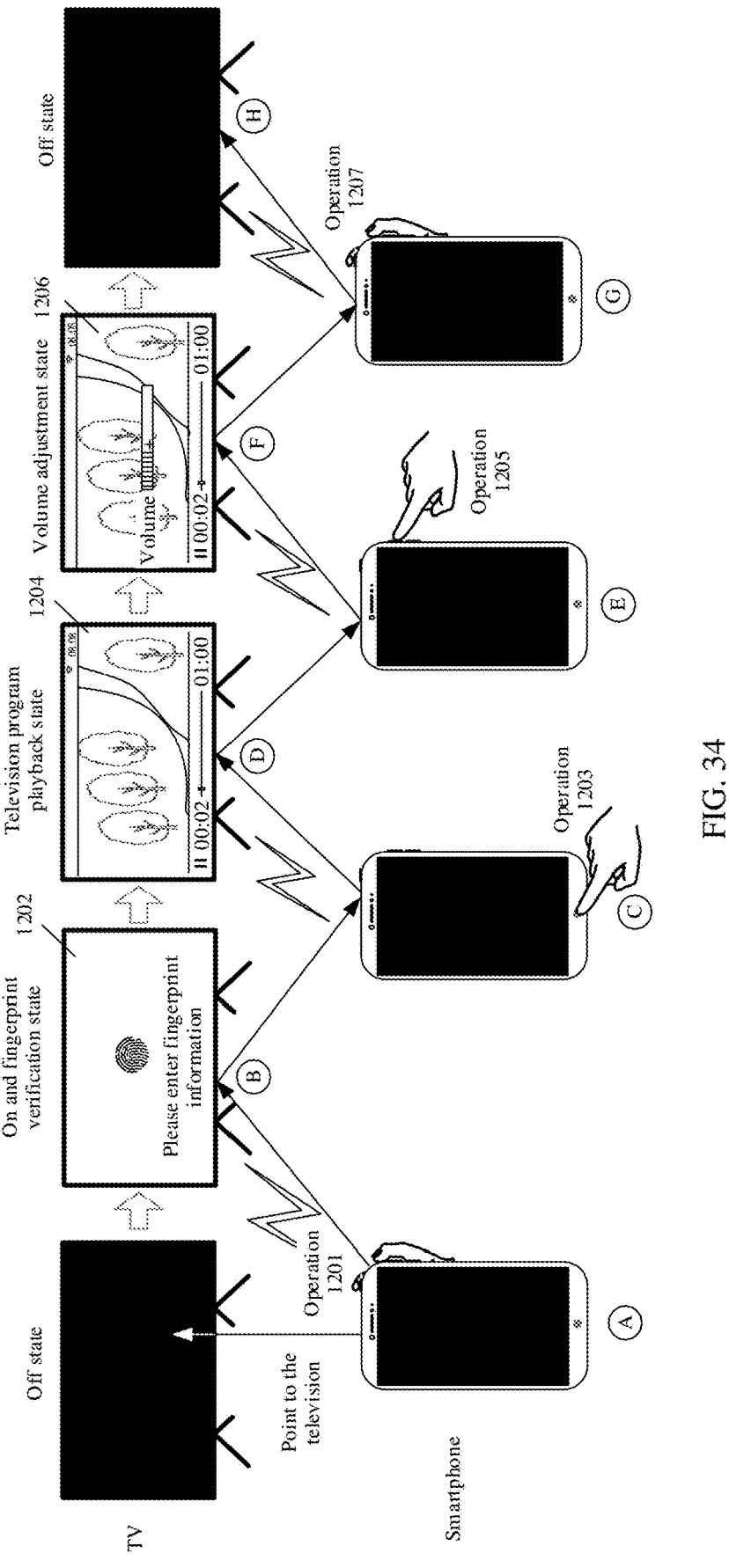
FIG. 34 is a diagram of an example in which a smartphone controls a television according to an embodiment of this application.

It is assumed that a first smart home device is a television. As shown in FIG. 34, when the television is in an off state, a first operation is an operation 1201 (shown in a mark A in FIG. 34) of pressing a power button of the smartphone when the user holds a smartphone and points the smartphone to the television. In this case, as shown in a mark B in FIG. 34, the television is turned on, and an interface 1202 is displayed. In some embodiments, assuming that the user presses a fingerprint button of the smartphone (an operation 1203 shown in a mark C in FIG. 34) according to a fingerprint verification indication in the interface 1202 on a display of the television, as shown in a mark D in FIG. 34, fingerprint verification on the television succeeds, and a television program interface 1204 is displayed. In some other embodiments, assuming that the user presses a volume up button ("+") of the smartphone (an operation 1205 shown in a mark E in FIG. 34) in a process of watching a television program, as shown in a mark F in FIG. 34, the television displays a volume up interface 1206, and volume of the television increases. In some other embodiments, assuming that the user presses the power button of the smartphone (an operation 1207 shown in a mark G in FIG. 34), as shown in a mark H in FIG. 34, the television is turned off.

Figure 35:
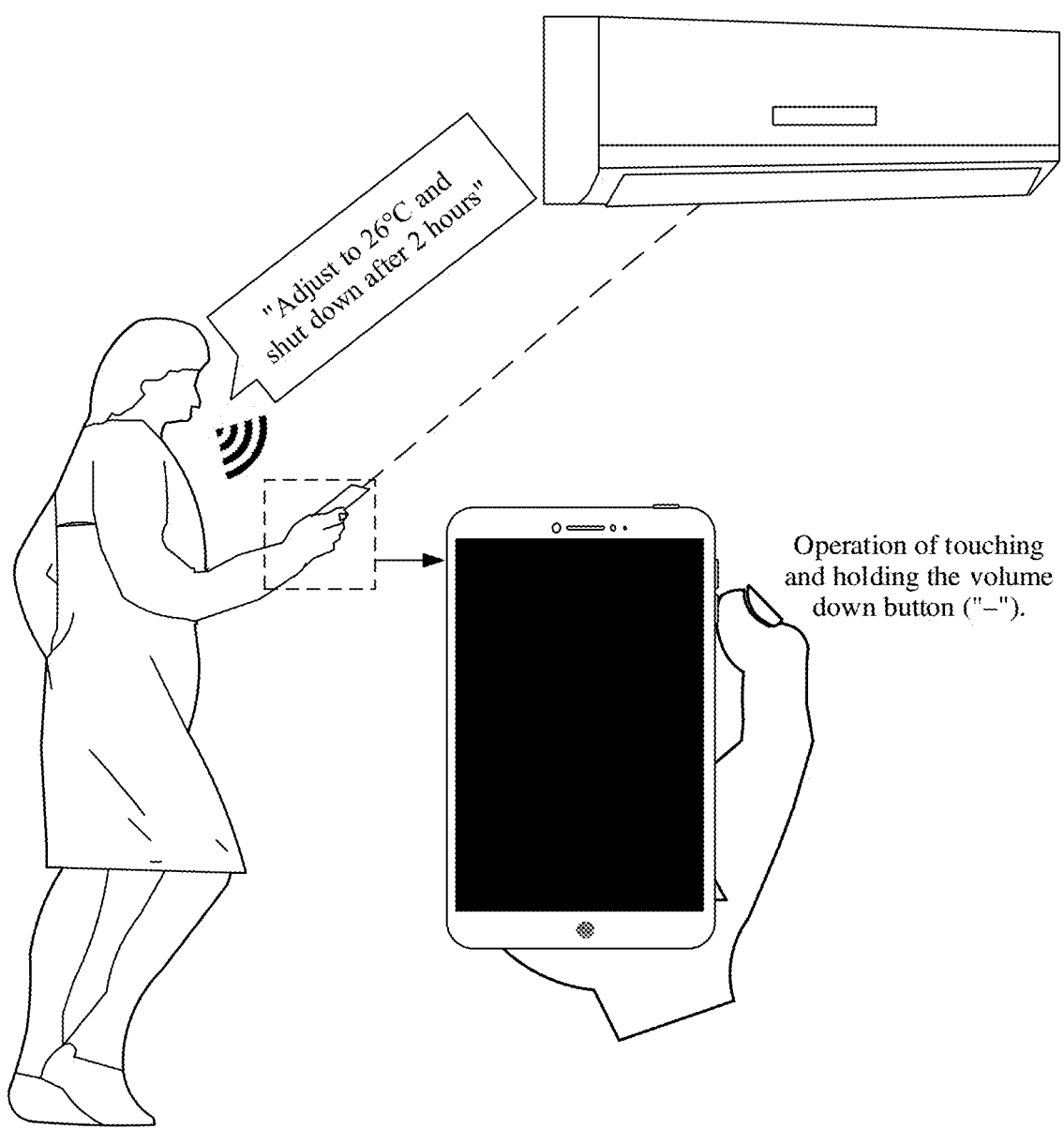
FIG. 35 is a diagram of an example in which a smartphone controls an air conditioner according to an embodiment of this application.

For example, it is assumed that the first smart home device is an air conditioner, and the portable device is a smartphone. A voice button of the smartphone may be implemented by touching and holding a volume down button ("−"). As shown in FIG. 35, in response to a voice instruction "Adjust to 26° C. and shut down after 2 hours" sent when the user touches and holds the volume down button ("−") of the smartphone, the air conditioner adjusts the temperature to 26° C. and shuts down after working for two hours.

A specific process in which the electronic device controls the target device that is provided in this embodiment of this application is not limited to the implementation processes shown in FIG. 27 to FIG. 35. The user may further implement, based on operation processes shown in FIG. 36A to FIG. 36D to FIG. 53A and FIG. 53B, that the electronic device controls the target device (which may also be referred to as an intelligent device below). Usually, the user may control a plurality of intelligent devices by using the electronic device. However, when the user controls the plurality of intelligent devices by using the electronic device, the user may need to open a dedicated application, and tap a corresponding intelligent device in the application, to implement control on the intelligent device. Consequently, the entire operation process is complex, and user experience is poor.

Figure 36A:
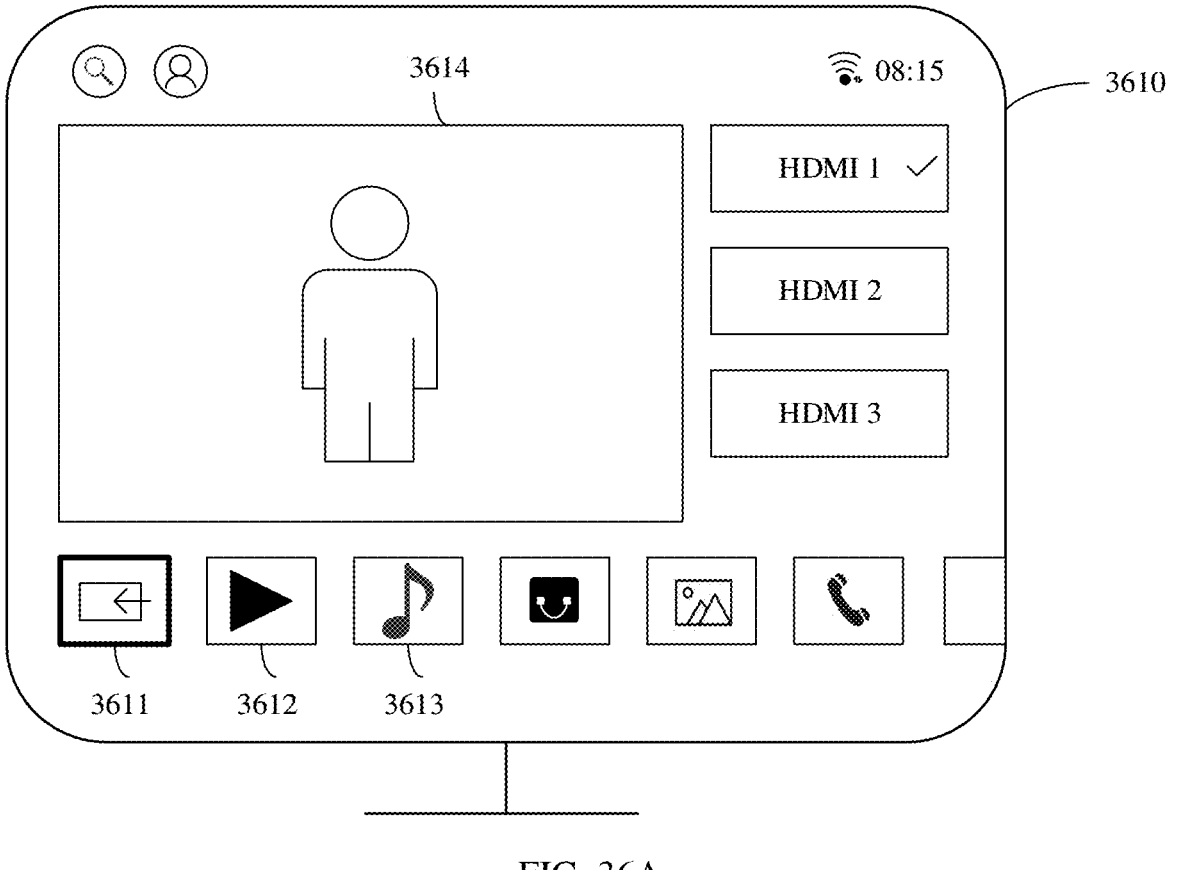
Figure 36B:
Figure 36C:
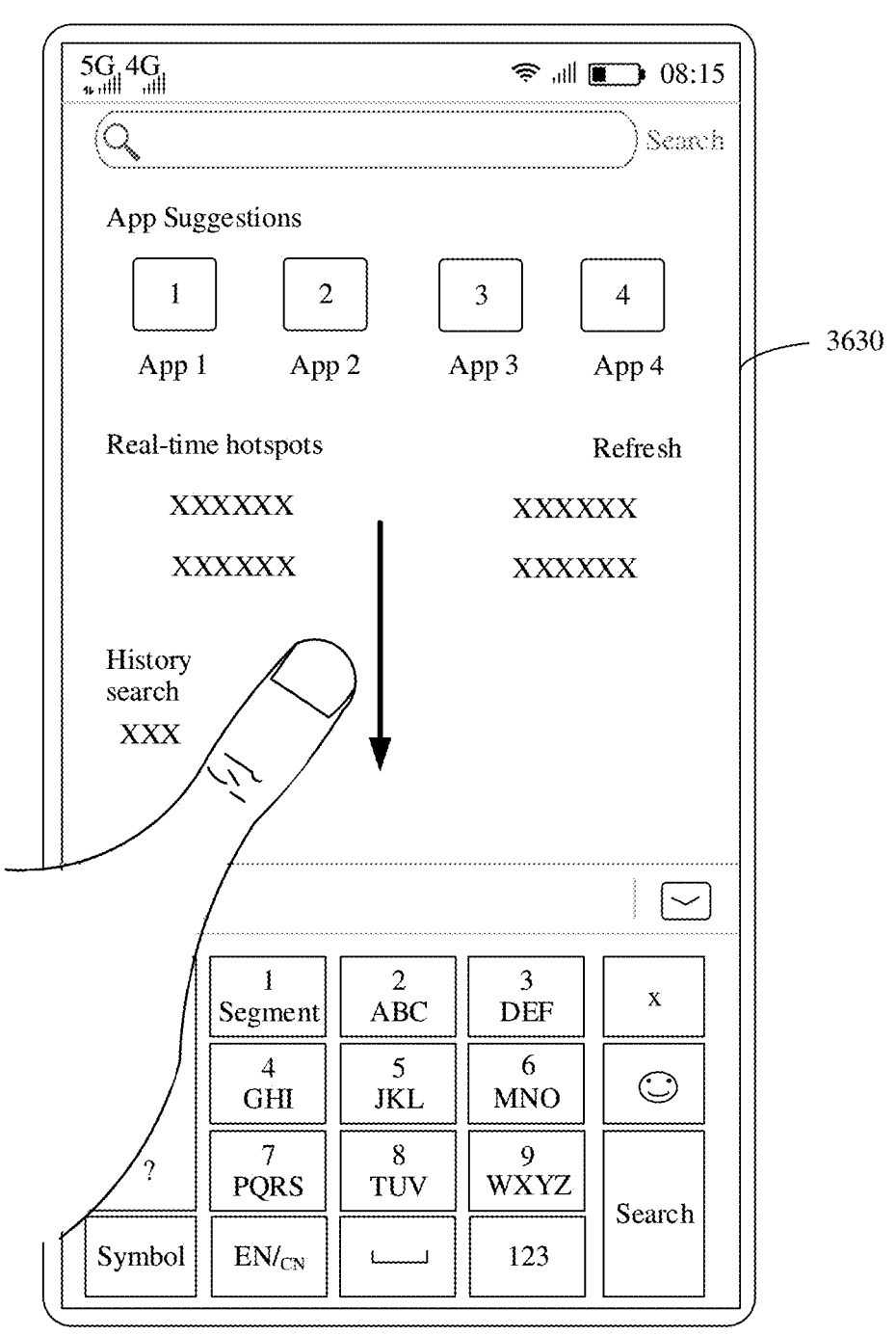
Figure 36D:
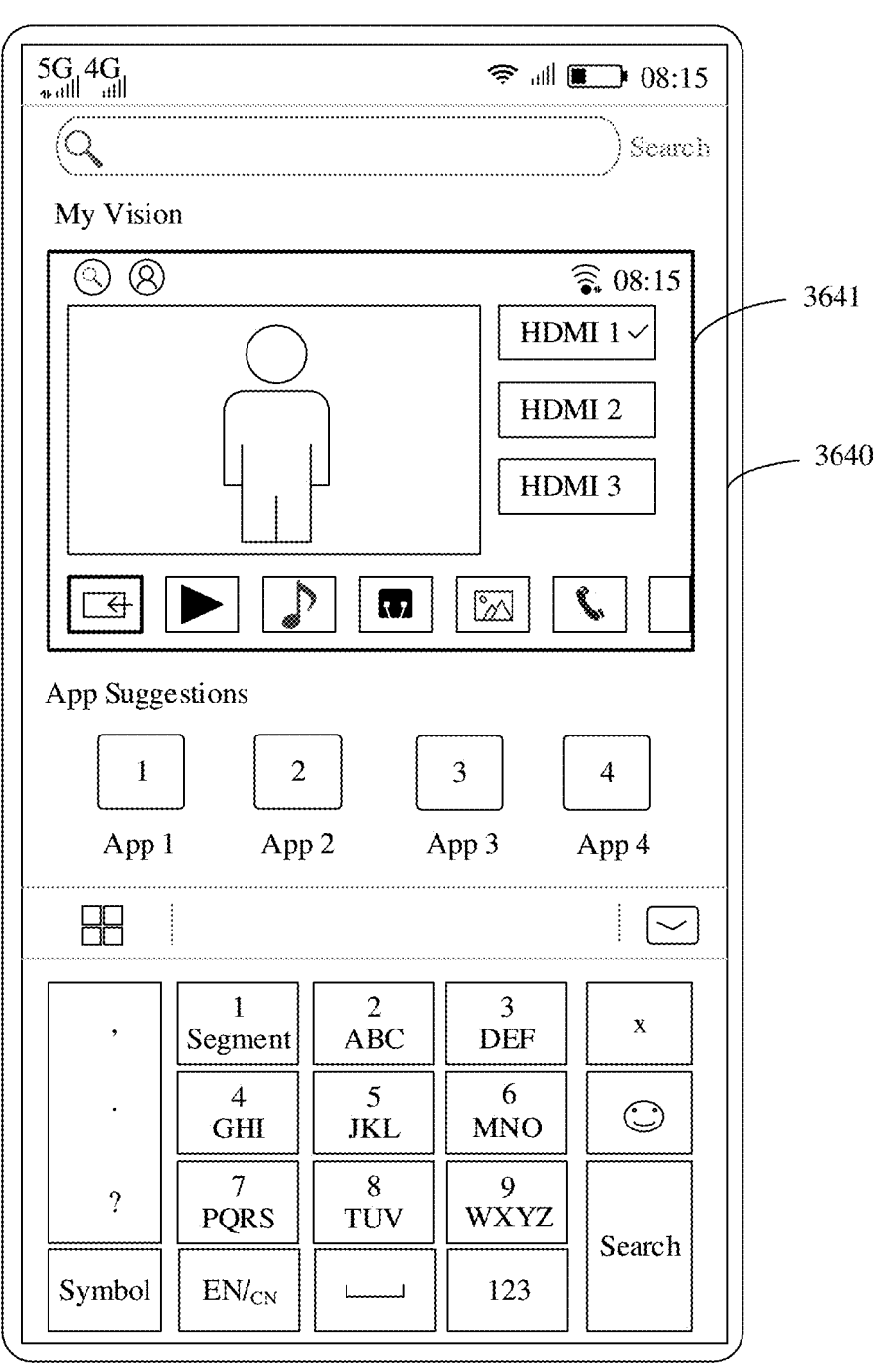

FIG. 36A to FIG. 36D to FIG. 53A and FIG. 53B show an intelligent device control process in which an operation can be simplified in embodiments of this application, to simplify a process in which an electronic device controls an intelligent device and improve user experience. Details are as follows:

FIG. 36A to FIG. 36D are a schematic diagram of a group of GUIs according to an embodiment of this application. FIG. 36B to FIG. 36D show a process in which a mobile phone interacts with another intelligent device in a home screen state. The intelligent device may be a smart television, a speaker, an air conditioner, a tablet computer, or the like. In this embodiment of this application, an intelligent device in a current pointing direction of the head of the mobile phone is a smart television.

Refer to FIG. 36A. The GUI is a display interface 3610 of a smart television. The display interface 3610 may include a preview interface 3614 and function options such as an interface option 3611, a video option 3612, and an audio option 3613. The user may connect the smart television to a set-top box through the interface option 3611, for example, a high-definition multimedia interface (high-definition multimedia interface, HDMI). The user may search for a video by using the video option 3612, search for music by using the audio option 3613, and the like.

Refer to FIG. 36B. The GUI is a home screen 3620 of the mobile phone. After detecting an operation that a single finger of the user slides downward at any location on the home screen 3620, the mobile phone may display a GUI shown in FIG. 36C.

Refer to FIG. 36C. The GUI is a search interface 3630 of the mobile phone. The search interface 3630 may display several applications (application, App) commonly used by the user, real-time hotspots, history search, and the like. When the mobile phone detects that the finger of the user continues sliding downward, if a sliding distance is greater than a preset value, the mobile phone may display a GUI shown in FIG. 36D.

Refer to FIG. 36D. The interface 3640 may include a display interface card 3641 used to display the smart television in the pointing direction of the mobile phone. The display interface card 3641 is the interface 3610 currently displayed on the smart television, that is, the display interface card 3641 may be embedded into the search interface 3630.

For example, the display interface card 3641 is at an upper location in the search interface 3630, for example, above App Suggestions. A text "My Vision" or the like may be further displayed above the display interface card 3641.

For example, the mobile phone and the smart television each may include a Bluetooth component or an ultra-wideband (ultra-wideband, UWB) component. In this case, the mobile phone may determine an orientation and a distance between the mobile phone and the smart television by using the Bluetooth component or the UWB component. For example, when the mobile phone determines that a device in a pointing direction of the head of the mobile phone is the smart television, in response to a slide operation of the user, the mobile phone displays, on a screen of the mobile phone, an interface displayed on the smart television.

The following describes, with reference to specific embodiments, a solution in which the Bluetooth component or the UWB component determines an orientation and a distance. Details are not described herein.

Optionally, the display interface card 3641 may further include several function controls that can be used to control the television, for example, increasing or decreasing volume, or switching a channel. The display interface card 3641 may further include a control used to close the display interface card 3641, or the like.

Optionally, if the smart television is not turned on, the display interface card 3641 may be a control interface for controlling on/off of the television. The user may control, in the mobile phone, the smart television to be turned on, and display an interface of the smart television.

It should be understood that, in the process of FIG. 36B to FIG. 36D, the finger of the user may not leave the home screen, that is, sliding of the finger of the user in FIG. 36B and sliding of the finger of the user in FIG. 36C are continuous. Alternatively, the finger of the user may leave the home screen, that is, sliding of the finger of the user in FIG. 36B and sliding of the finger of the user in FIG. 36C are discontinuous. To be specific, the mobile phone displays the search interface 3630 provided that the mobile phone detects that the single finger of the user slides downward on the home screen 3620, and the mobile phone pulls the display interface of the intelligent device in the pointing direction of the mobile phone into the search interface provided that the mobile phone detects that the single finger of the user slides downward in the search interface beyond a preset distance.

Optionally, in the search interface 3630, when detecting that the user shakes the mobile phone, the mobile phone may also display, on the screen of the mobile phone, the display interface card 3641 of the intelligent device in the pointing direction of the head of the mobile phone. This is not limited in this embodiment of this application.

In this embodiment of this application, when controlling the another intelligent device by using the electronic device (for example, the mobile phone), the user may point the head of the electronic device to the intelligent device, and perform a slide down gesture or a shake gesture on the screen of the electronic device, to display the display interface of the intelligent device on the screen of the electronic device. This reduces a redundant operation that the user controls the another intelligent device by using the electronic device or interacts with the another intelligent device by using the electronic device, so that interaction between the electronic device and the another intelligent device is simple and fast, to help improve user experience.

Figure 37A:
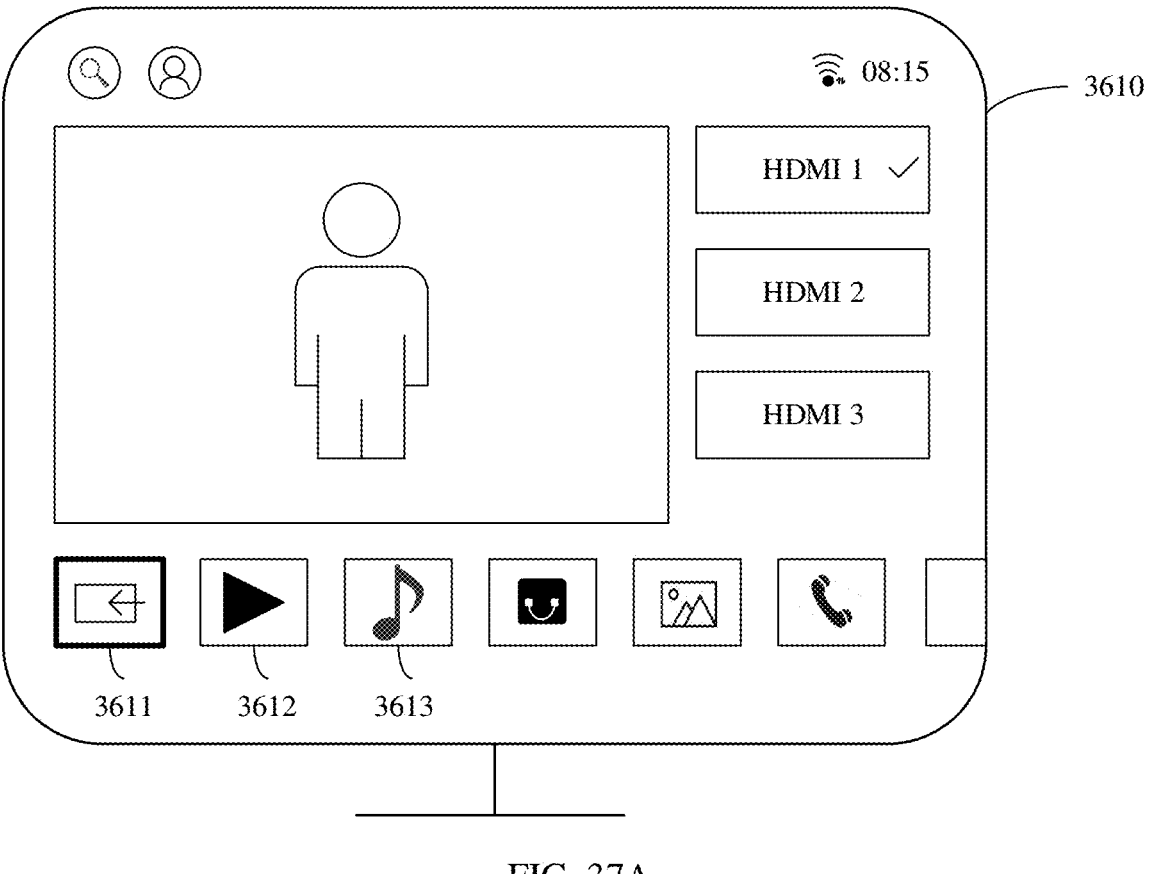
FIG. 37A to FIG. 37D are a schematic diagram of another group of GUIs according to an embodiment of this application.
Figure 37B:
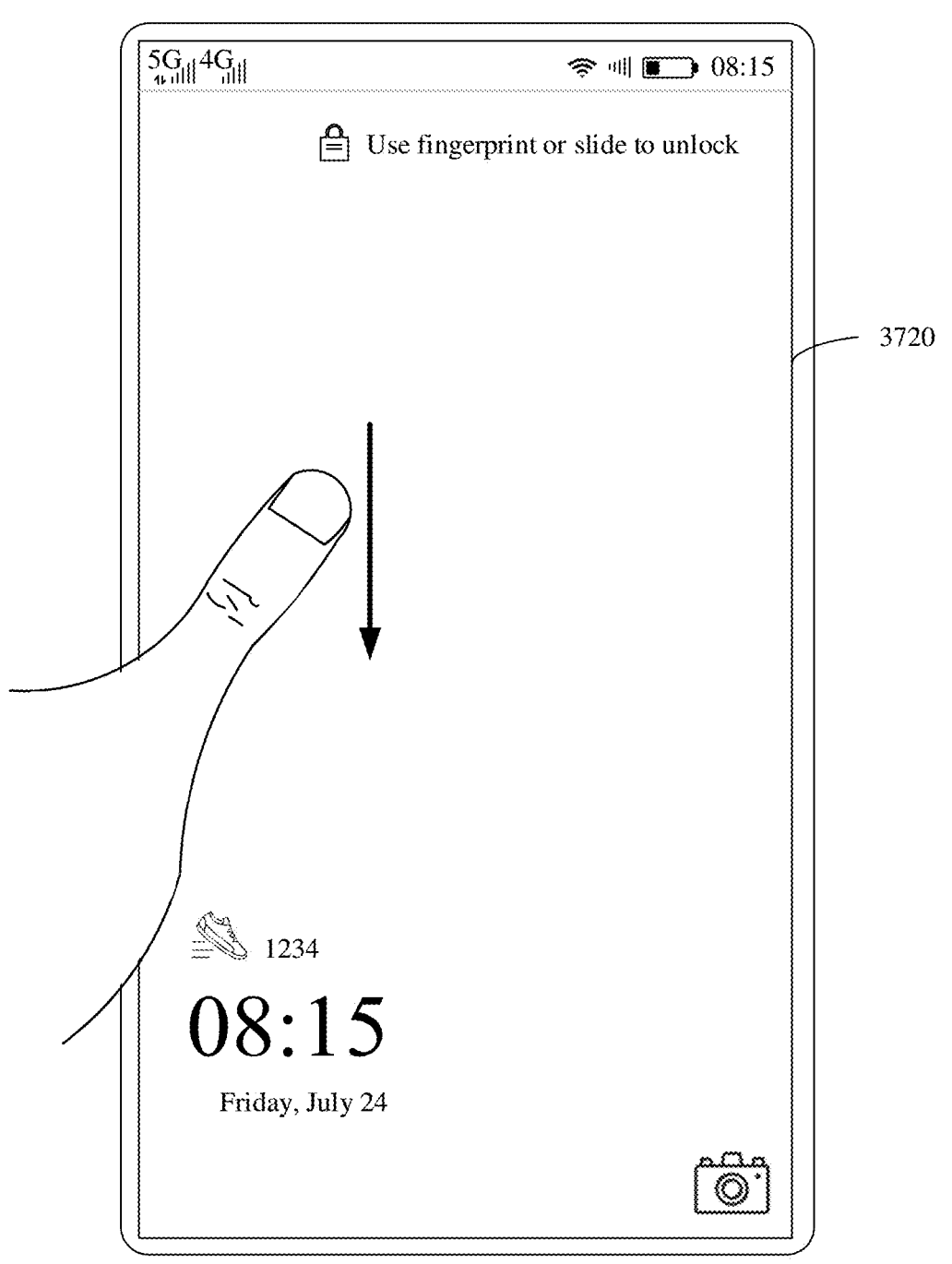
Figure 37C:
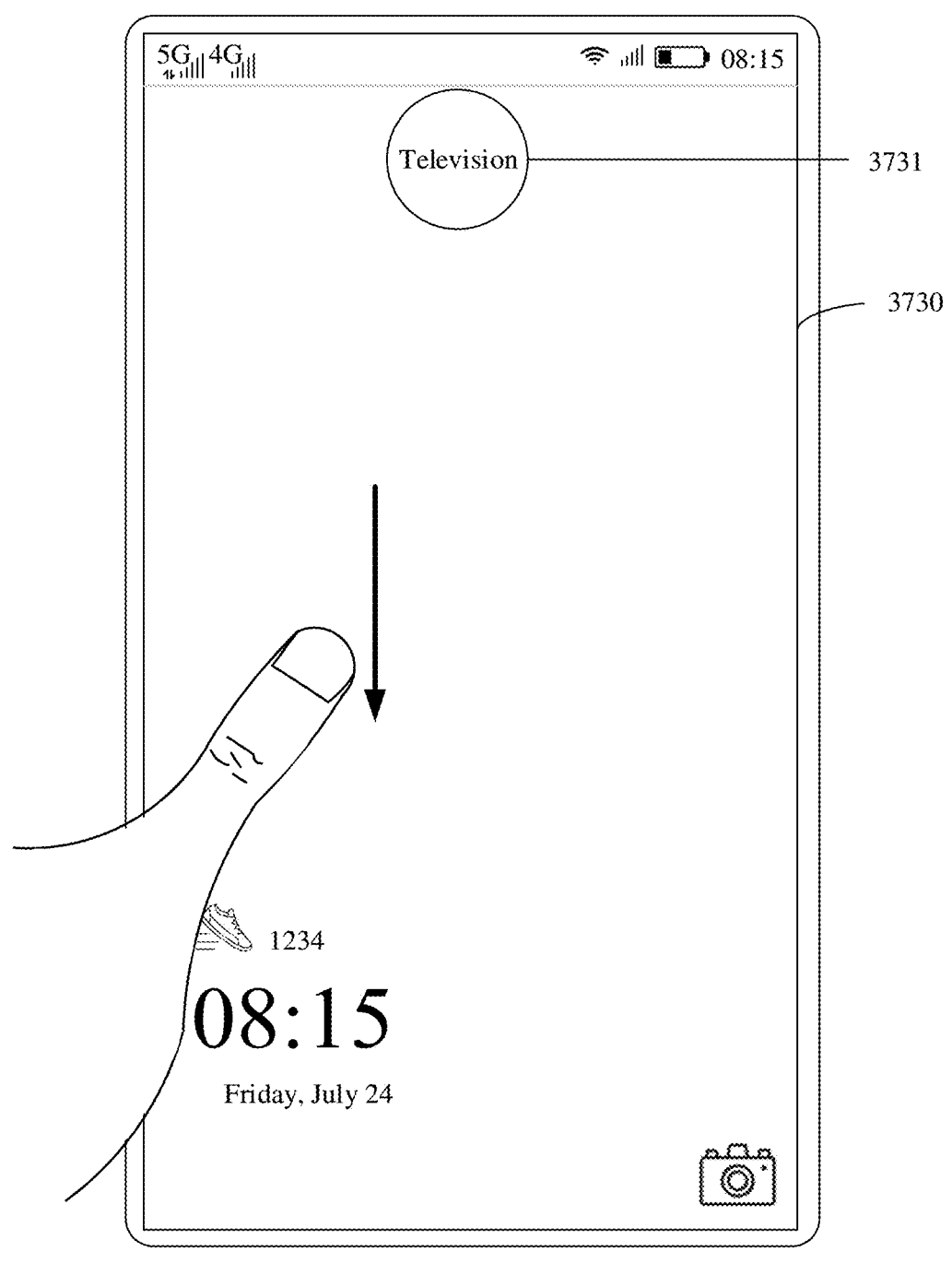
Figure 37D:
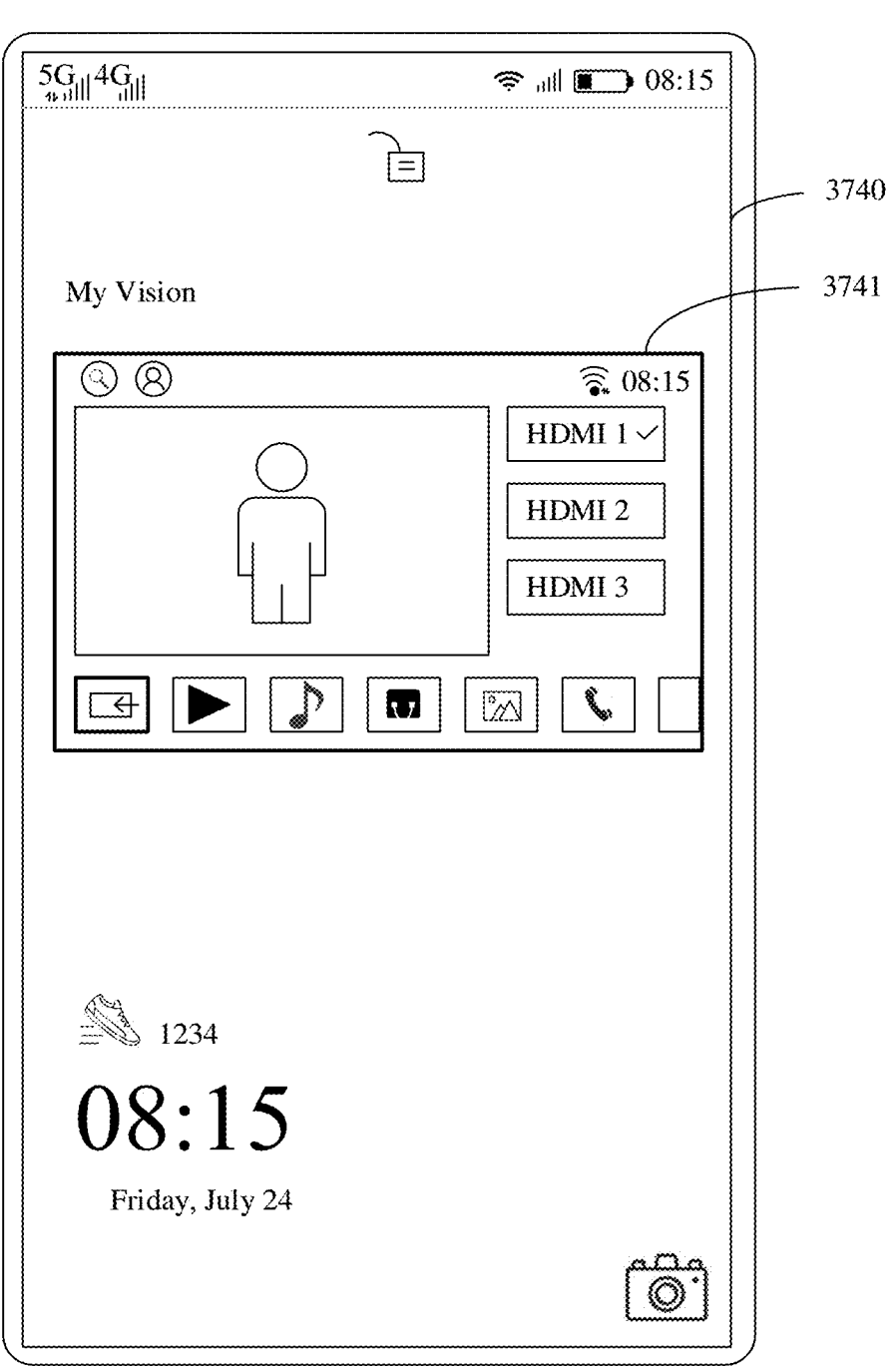

FIG. 37A to FIG. 37D are a schematic diagram of another group of GUIs according to an embodiment of this application. FIG. 37B to FIG. 37D show a process in which a mobile phone interacts with a smart television in a lock screen interface state. In this embodiment of this application, an intelligent device to which the head of the mobile phone currently points is a smart television.

For FIG. 37A, refer to related descriptions in FIG. 36A.

Refer to FIG. 37B. The GUI is a lock screen interface 3720 of the mobile phone. An icon and a prompt text that are used to prompt the user to unlock a screen may be displayed on an upper part in the lock screen interface 3720. After detecting an operation that a single finger of the user slides downward in the lock screen interface 3720, the mobile phone may display a GUI shown in FIG. 37C.

Refer to FIG. 37C. A display interface 3730 of the GUI may include a loading area 3731 used for a user prompt. The loading area 3731 may be at an upper location of the lock screen interface, for example, a location originally used to display an unlock prompt. When the mobile phone detects that the finger of the user continues sliding downward, if a sliding distance is greater than a preset value, the mobile phone may display a GUI shown in FIG. 37D.

For example, if the intelligent device to which the head of the mobile phone currently points is a smart television, the loading area 3731 is used to display "Television" that prompts the user. If the intelligent device to which the head of the mobile phone currently points is a smart speaker, the loading area 3731 may display "Speaker". In this way, the user can verify whether the device displayed in the loading area is the intelligent device to which the mobile phone currently points.

It should be understood that, in the process of FIG. 37B and FIG. 37C, sliding of the finger of the user may be continuous, or sliding of the finger of the user may be paused, but when sliding is paused, the finger of the user still needs to stay on the home screen of the mobile phone.

Refer to FIG. 37D. A lock screen interface 3740 may display a display interface card 3741 of the smart television to which the head of the mobile phone currently points. The display interface card 3741 is the display interface 3610 of the smart television. An icon or the like used to prompt the user that the screen has been unlocked may be further displayed on an upper part in the lock screen interface 3740.

The display interface card 3741 may be stacked on the lock screen interface, or the display interface card 3741 may be embedded into the lock screen interface. The display interface card 3741 may be displayed at a middle location on the screen of the mobile phone, a location above the middle location, a location below the middle location, or the like. Alternatively, the user may freely drag the display interface card 3741 based on a requirement.

Optionally, if the smart television is not turned on, the display interface card 3741 may be a control interface for controlling on/off of the television. The user may control, in the mobile phone, the smart television to be turned on, and display an interface of the smart television.

In this embodiment of this application, when controlling the another intelligent device by using the electronic device (for example, the mobile phone), the user may point the head of the electronic device to the intelligent device, and perform a slide down gesture in the lock screen interface of the electronic device, to display the display interface card of the intelligent device on the screen of the electronic device. This reduces a redundant operation that the user controls the another intelligent device by using the electronic device or interacts with the another intelligent device by using the electronic device, so that interaction between the electronic device and the another intelligent device is simple and fast, to help improve user experience.

Figure 38A:
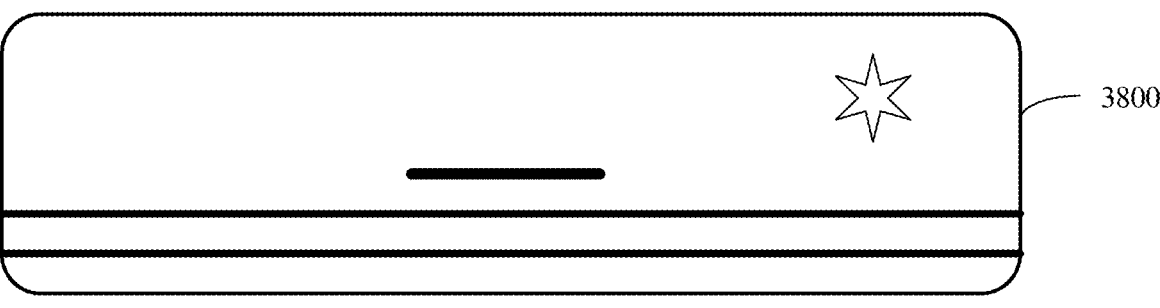
FIG. 38A to FIG. 38E are a schematic diagram of another group of GUIs according to an embodiment of this application.
Figure 38B:
Figure 38C:
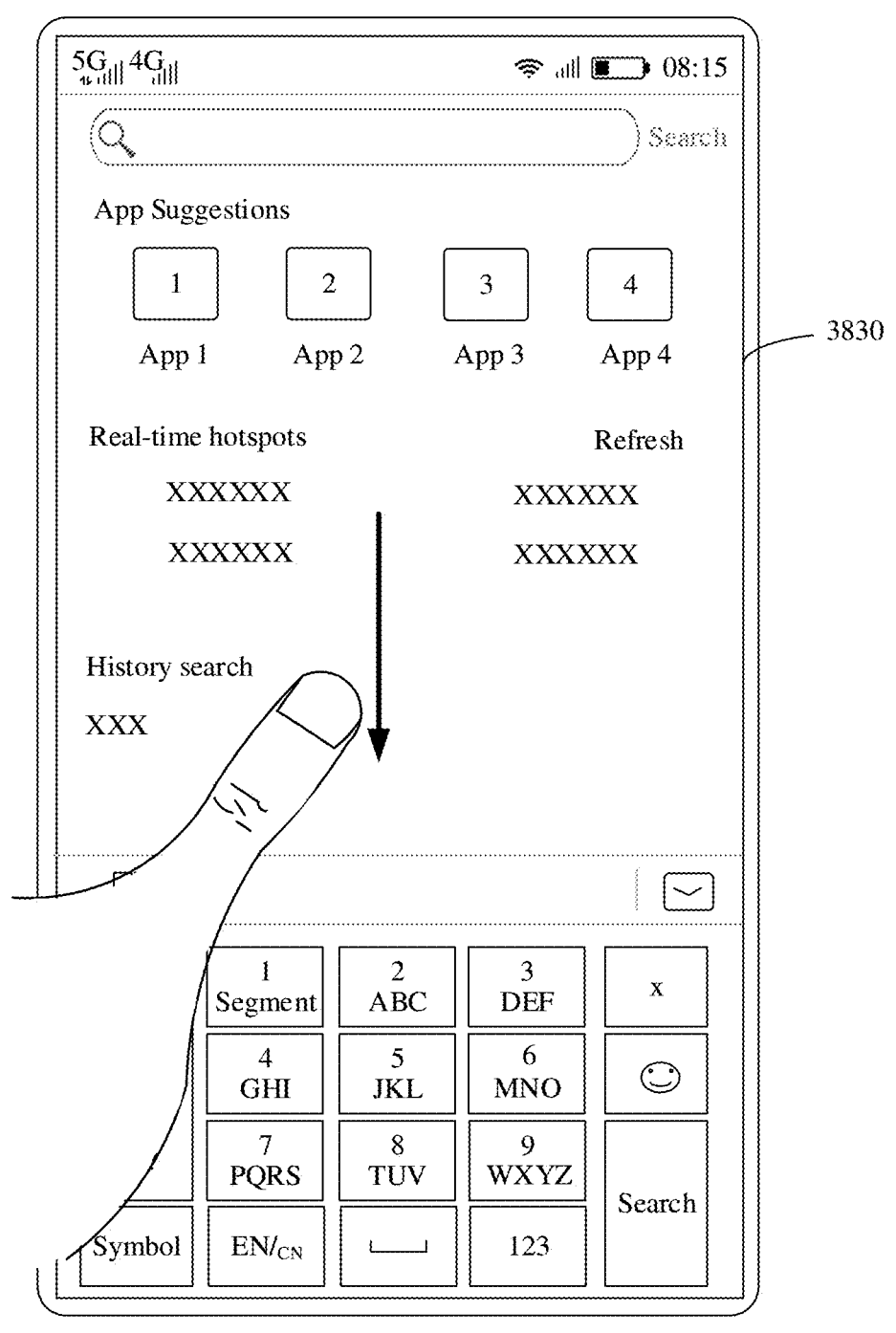
Figure 38D:
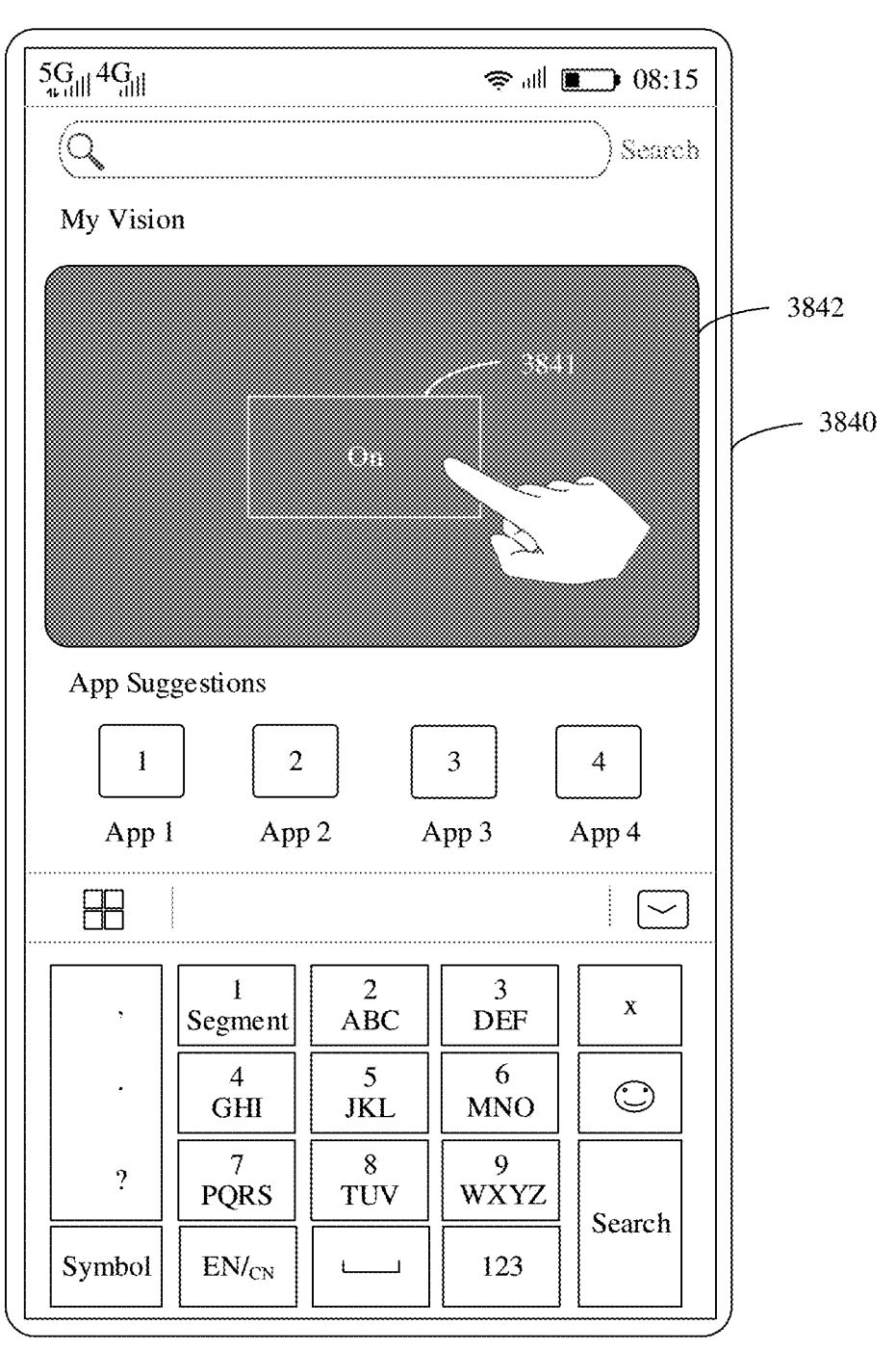

FIG. 38A to FIG. 38E are a schematic diagram of another group of GUIs according to an embodiment of this application. FIG. 38B to FIG. 38D show a process in which a mobile phone interacts with an air conditioner. In this embodiment of this application, an intelligent device in a current pointing direction of the head of the mobile phone is an air conditioner.

Refer to FIG. 38A. An air conditioner 3800 may be in an off state.

For FIG. 38B and FIG. 38C, refer to related descriptions in FIG. 36B and FIG. 36C. Details are not described again.

Refer to FIG. 38D. A display interface 3840 may display a control card 3842 of the air conditioner. The control card 3842 may include a control 3841 used to prompt the user to turn on the air conditioner. After detecting an operation of tapping the control 3841 by the user, the mobile phone may display a GUI shown in FIG. 38E.

It should be understood that, after the operation of tapping the control 3841 by the user, the air conditioner changes from the off state to an on state.

For example, the control card 3842 may be at an upper location in the search interface 3840, for example, above App Suggestions. A text "My Vision" or the like may be further displayed above the control card 3842.

Figure 38E:
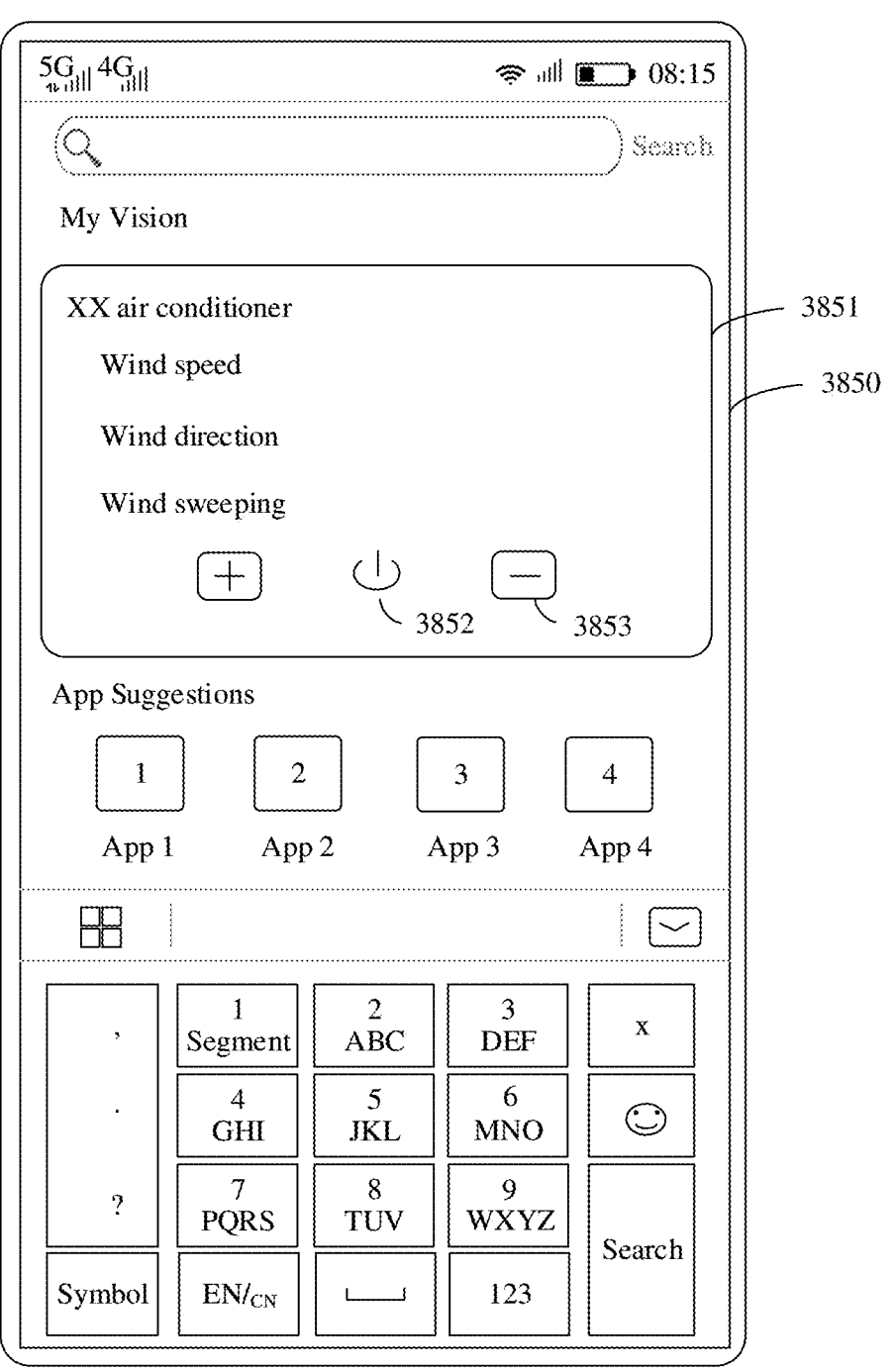

Refer to FIG. 38E. A display interface 3850 may include a control card 3851 of the air conditioner. The control card 3851 may include an area used to display a brand of the air conditioner, and function controls that can be used to control a wind speed, a wind direction, wind sweeping, a power supply 3852, a temperature increase or decrease, and the like. The user may control the air conditioner by tapping the function control. For example, the control card 3842 may be at an upper location in the search interface 3840, for example, above App Suggestions. A text "My Vision" or the like may be further displayed above the control card 3842.

Optionally, the user may perform the foregoing same operation in the lock screen interface. This is not limited in this embodiment of this application.

In this embodiment of this application, when the device to which the head of the mobile phone points is the air conditioner, the user may perform an operation of sliding the finger downward on the screen of the mobile phone, to display the control interface of the air conditioner on the screen of the mobile phone. In this technical solution, the user can simply and quickly control the air conditioner, to help improve user experience.

FIG. 39A to FIG. 39D are a schematic diagram of another group of GUIs according to an embodiment of this application. FIG. 39A to FIG. 39D show a process in which a mobile phone interacts with a tablet computer.

Figure 39A:
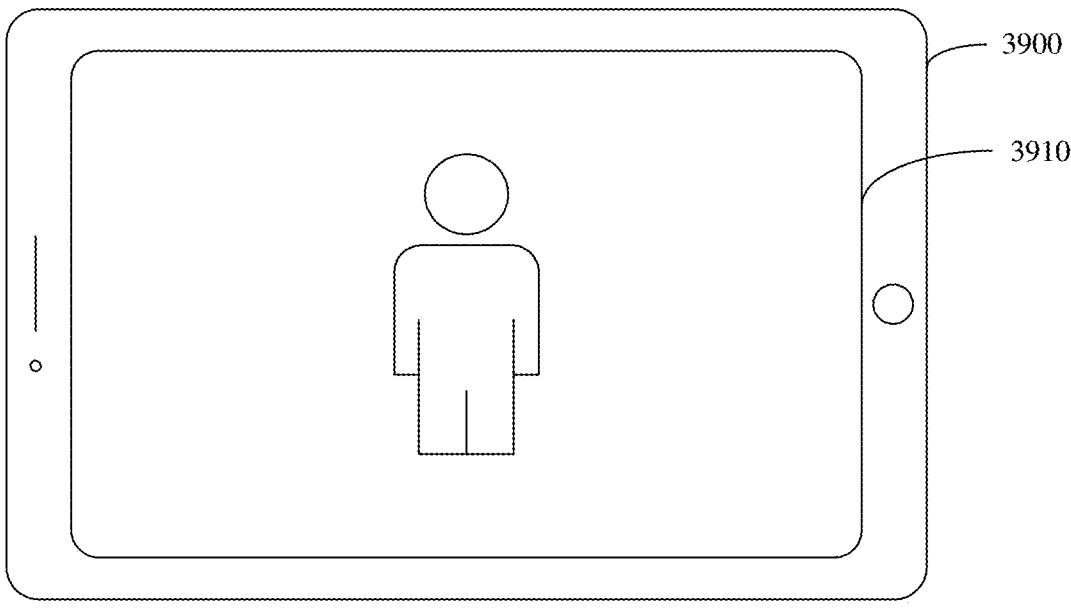
FIG. 39A to FIG. 39D are a schematic diagram of another group of GUIs according to an embodiment of this application.

FIG. 39A shows an interface 3910 in which playing is being performed by a tablet computer 3900.

Figure 39B:
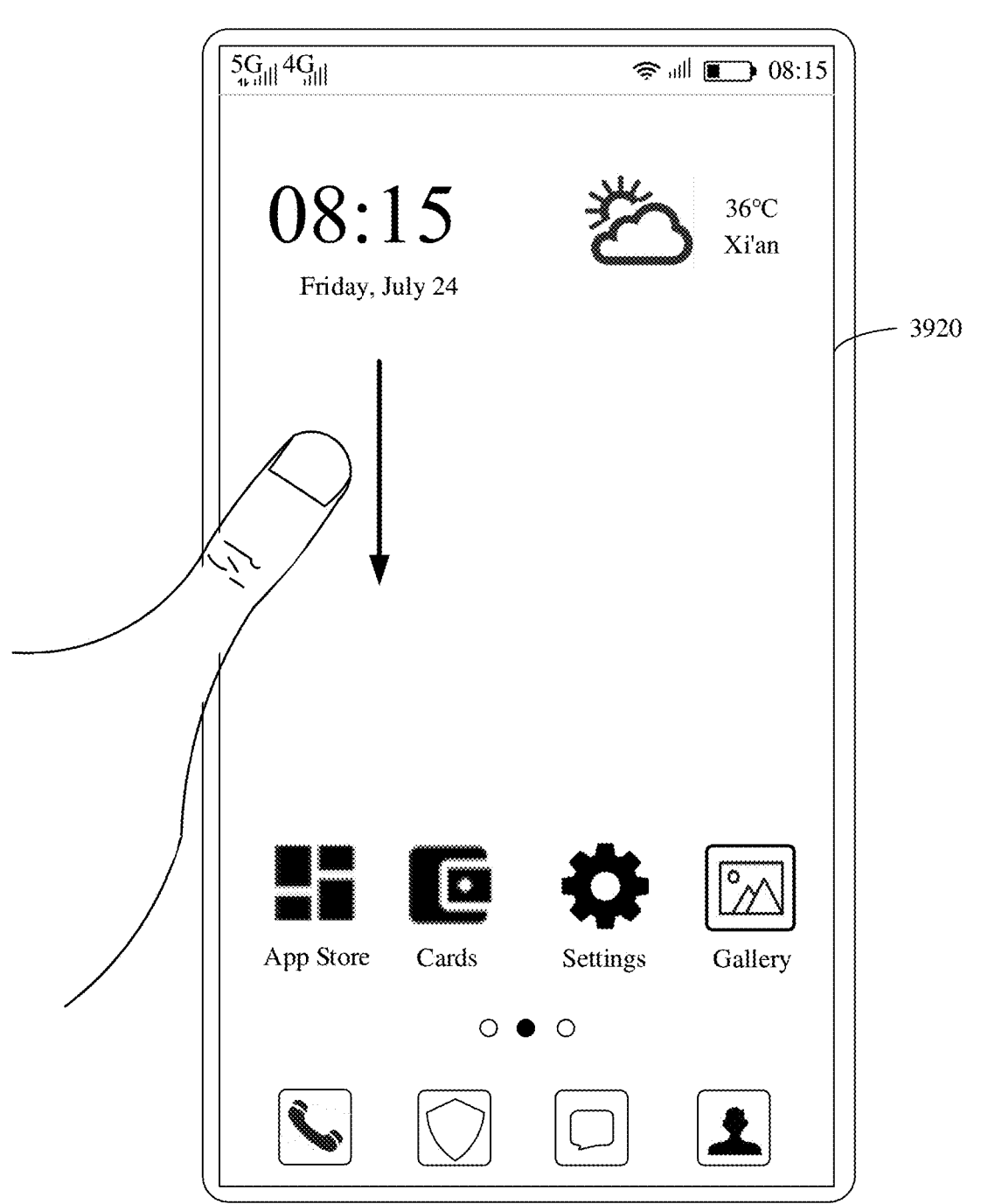
Figure 39C:
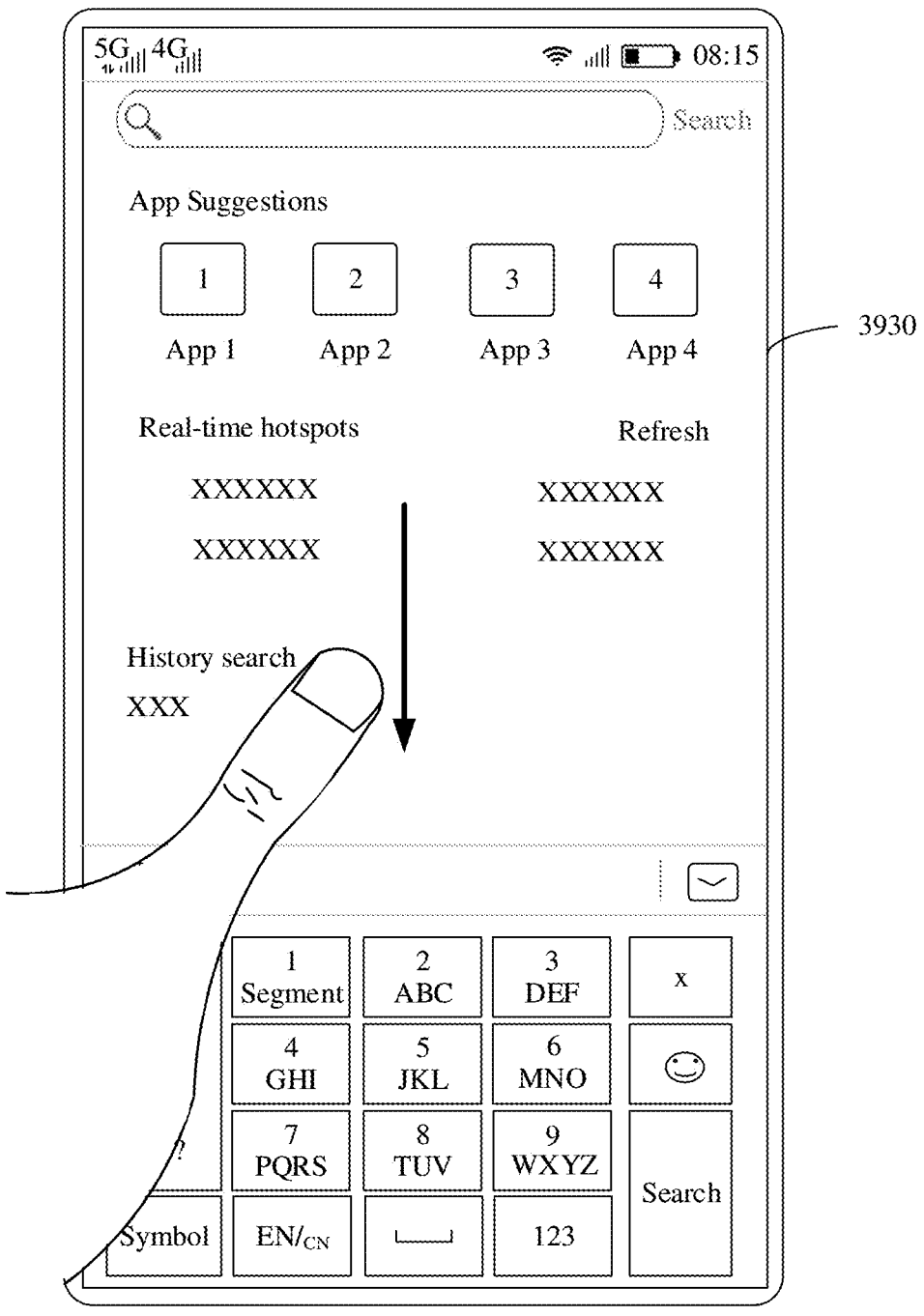
Figure 39D:
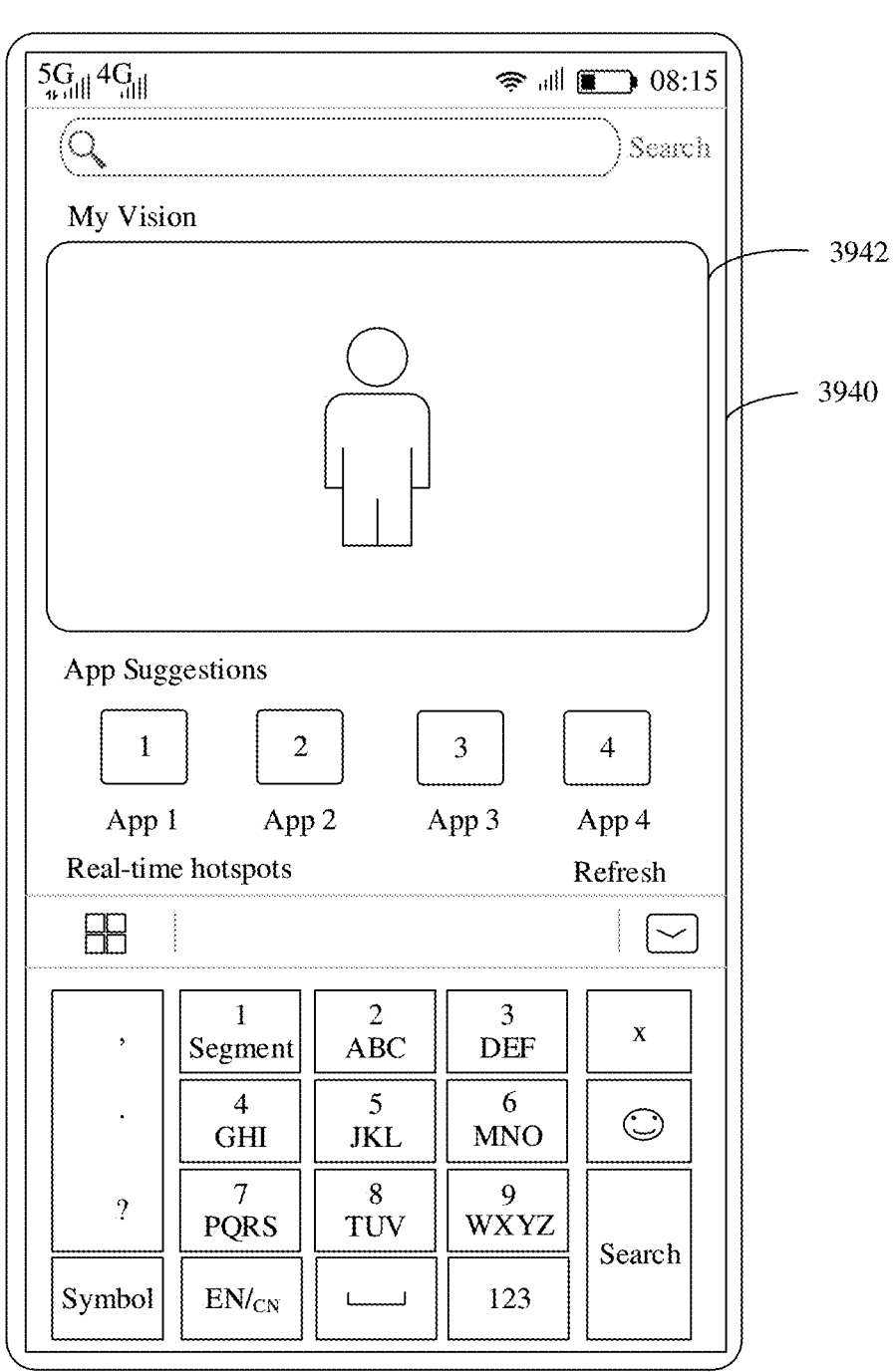

For FIG. 39B to FIG. 39D, refer to related descriptions in FIG. 36B to FIG. 36D.

In this embodiment of this application, when a device in a pointing direction of the head of the mobile phone is the tablet computer, the user may perform an operation of sliding the finger downward on the screen of the mobile phone, to display a current display interface of the tablet phone, to display a current display interface of the tablet computer on the screen of the mobile phone. In this technical solution, the user can simply and quickly control the tablet computer, to help improve user experience.

FIG. 40A to FIG. 40H are a schematic diagram of another group of GUIs according to an embodiment of this application. FIG. 40A to FIG. 40H show a process in which a mobile phone interacts with a smart television.

Figure 40A:
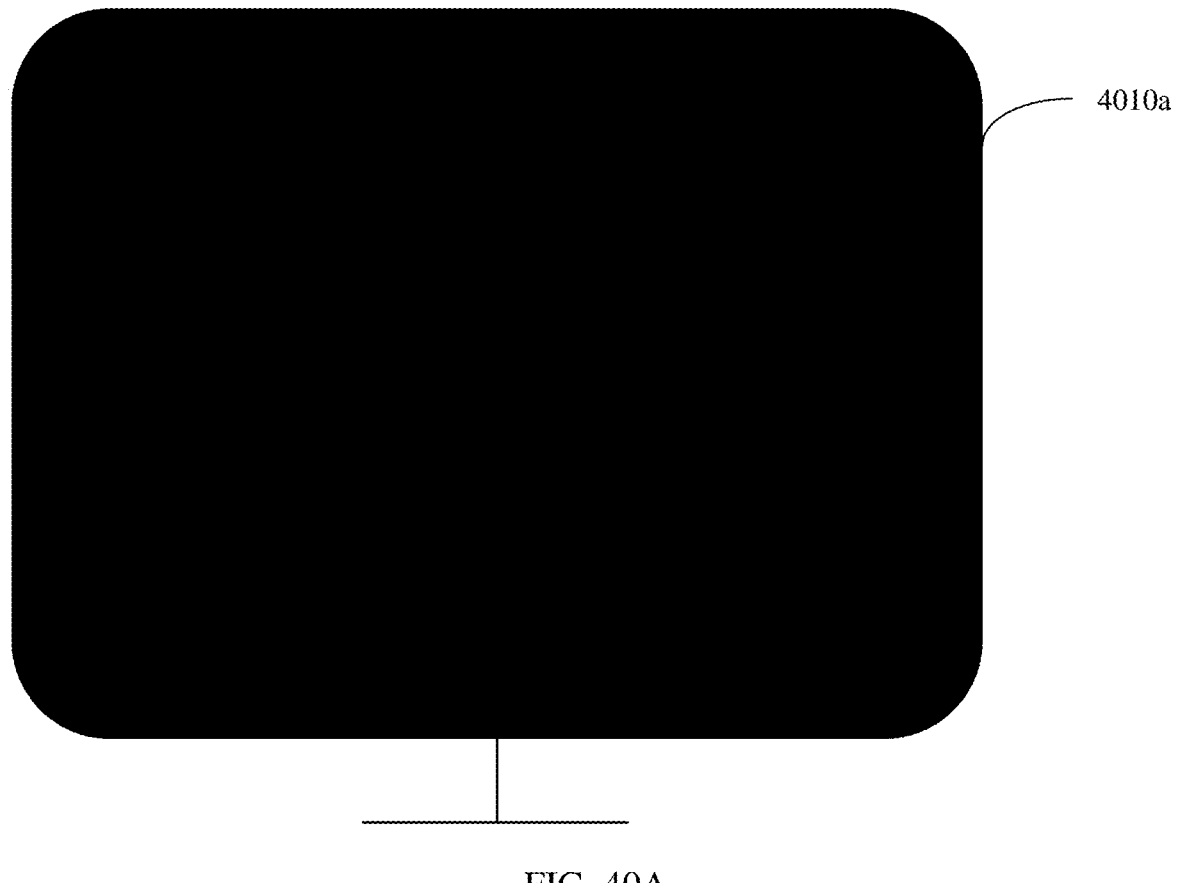
FIG. 40A to FIG. 40H are a schematic diagram of another group of GUIs according to an embodiment of this application.

Refer to FIG. 40A. A smart television is in an off state.

Figure 40B:
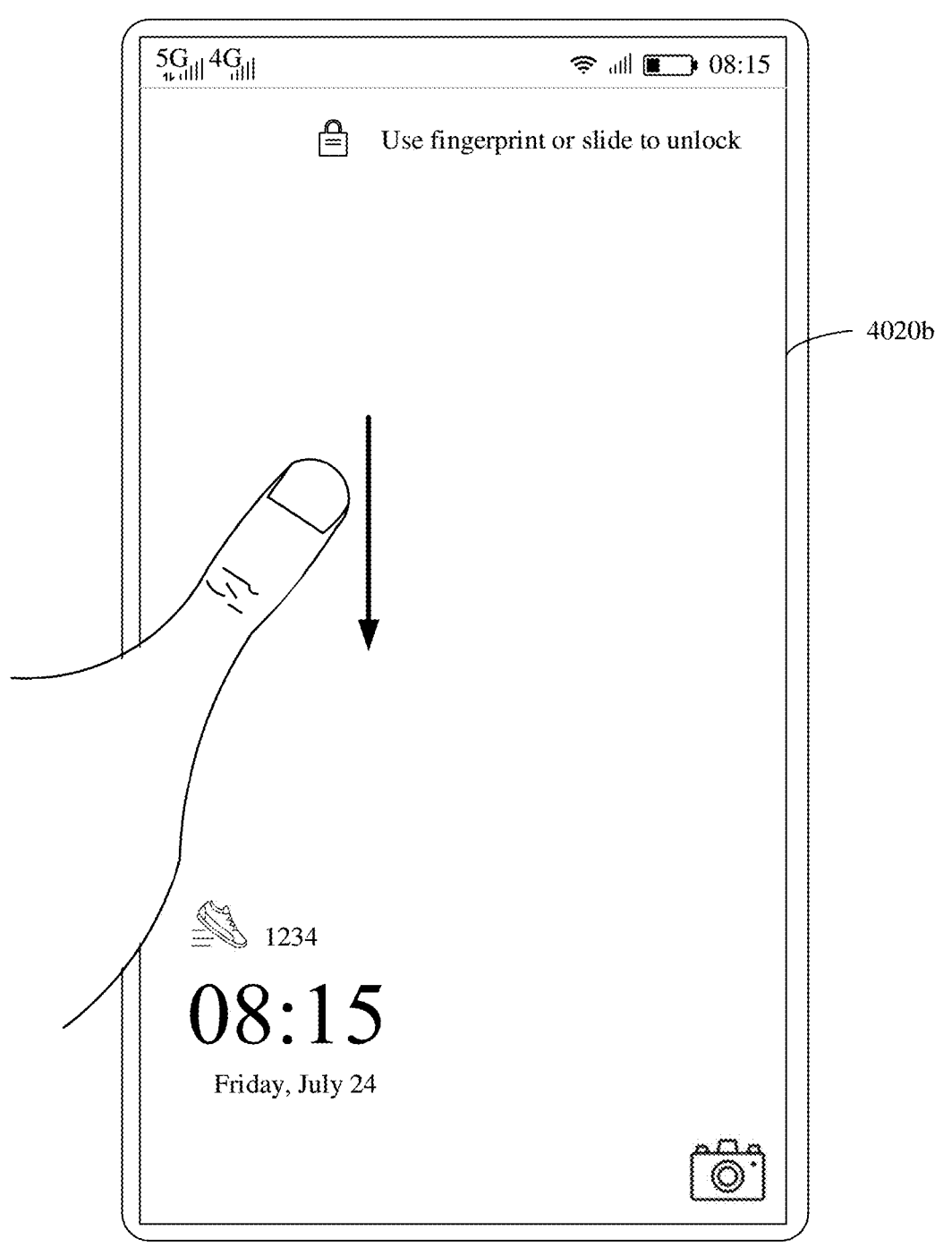
Figure 40C:
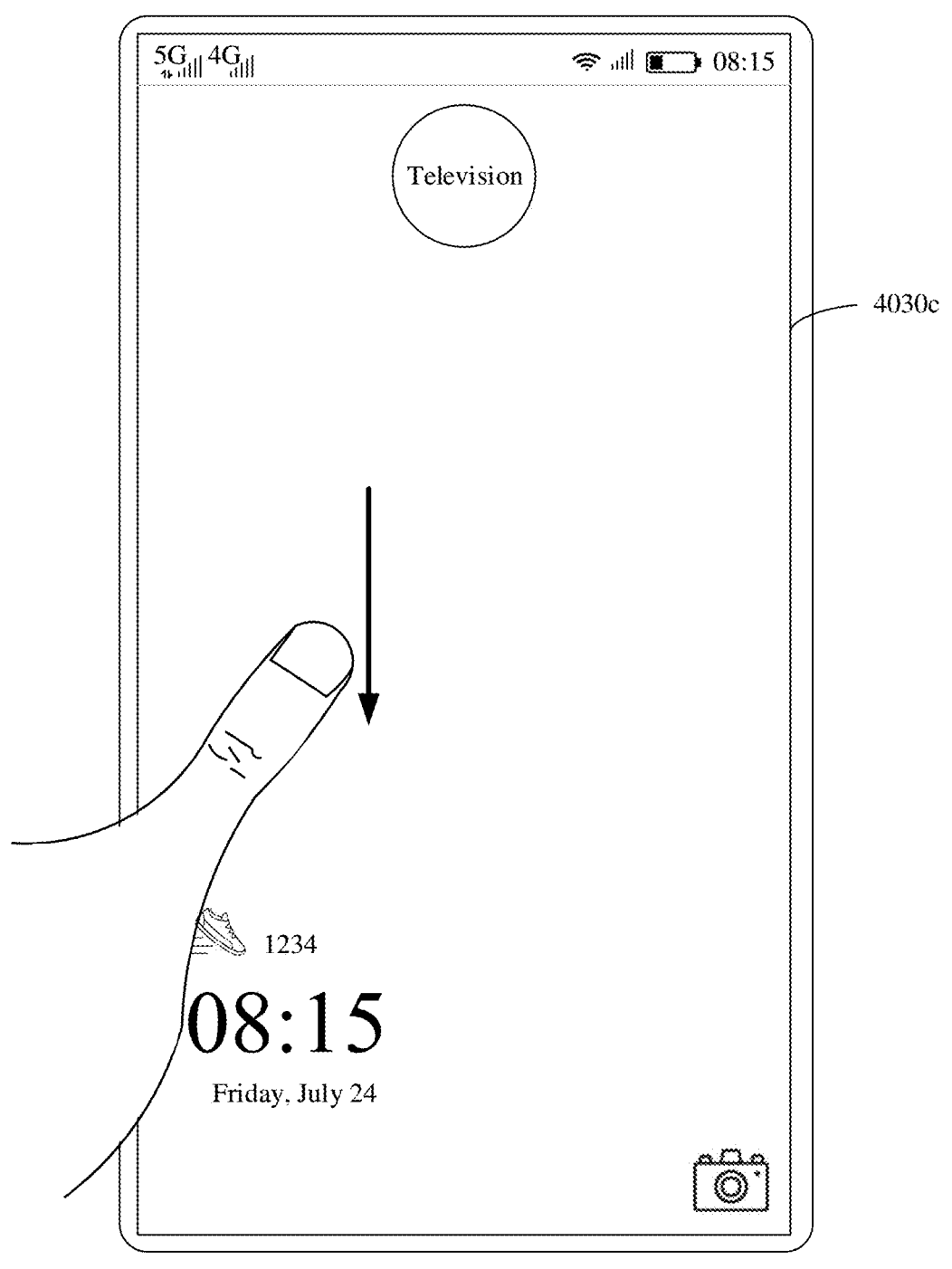

For FIG. 40B and FIG. 40C, refer to related descriptions in FIG. 37B and FIG. 37C. Details are not described again.

Figure 40D:
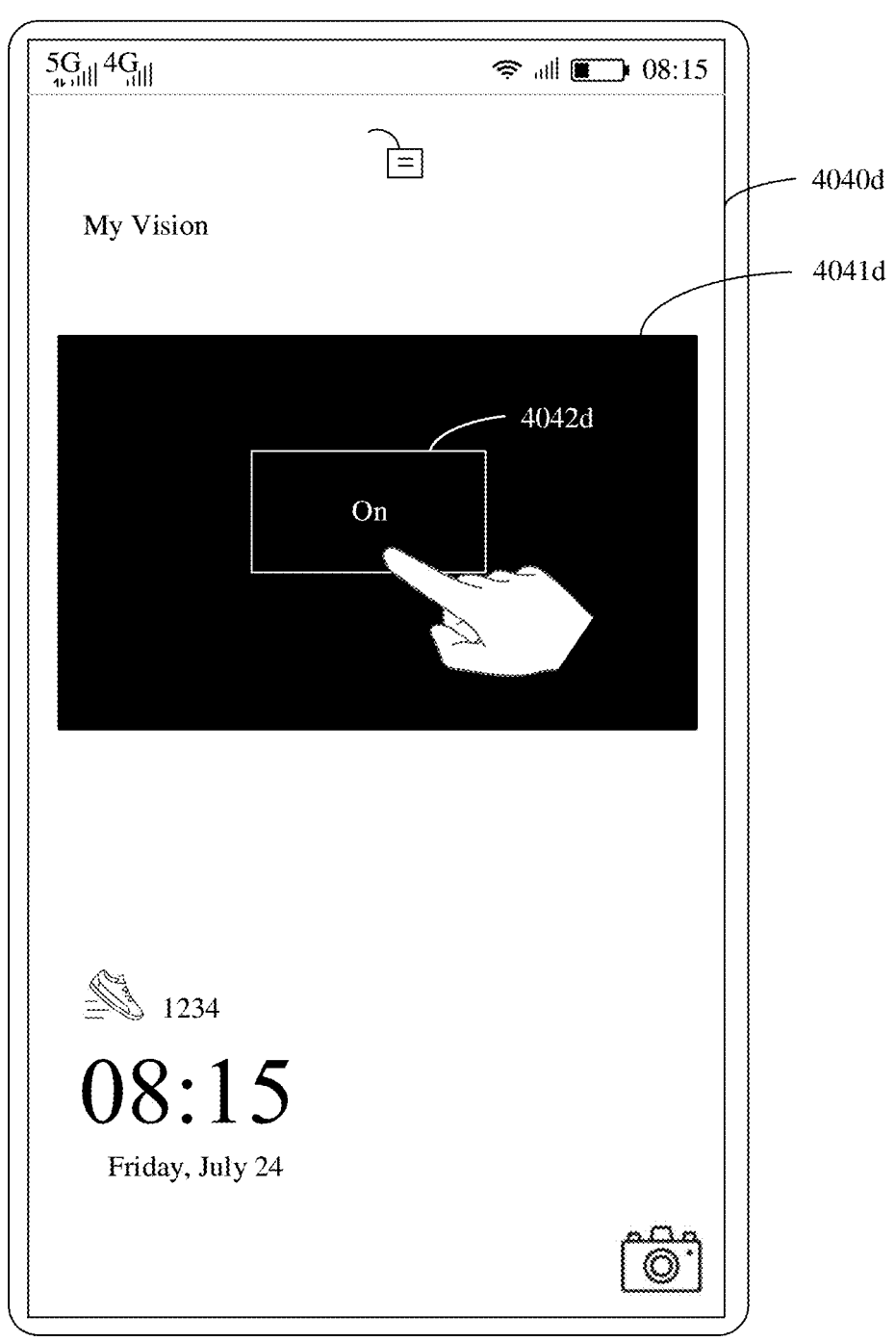

Refer to FIG. 40D. A lock screen interface 4040d includes a display interface card 4041d of the smart television, the display interface card is a control card of the smart television, and the display interface card 4041d includes a control 4042d used to prompt the user to turn on an air conditioner. A text "My Vision" or the like may be further displayed above the display interface card 741. An icon or the like used to prompt the user that the screen has been unlocked may be further displayed on an upper part in the lock screen interface 4040d. After the mobile phone detects an operation of tapping the control 4042d by the user, the smart television may display a GUI shown in FIG. 40(e), and the mobile phone may display a GUI shown in FIG. 40F or FIG. 40G.

Optionally, the display interface card 4041d may be embedded into the lock screen interface, or stacked on the lock screen interface 4040d. The display interface card 4041d may be displayed at a middle location on the screen of the mobile phone, a location above the middle location, a location below the middle location, or the like.

Figure 40E:
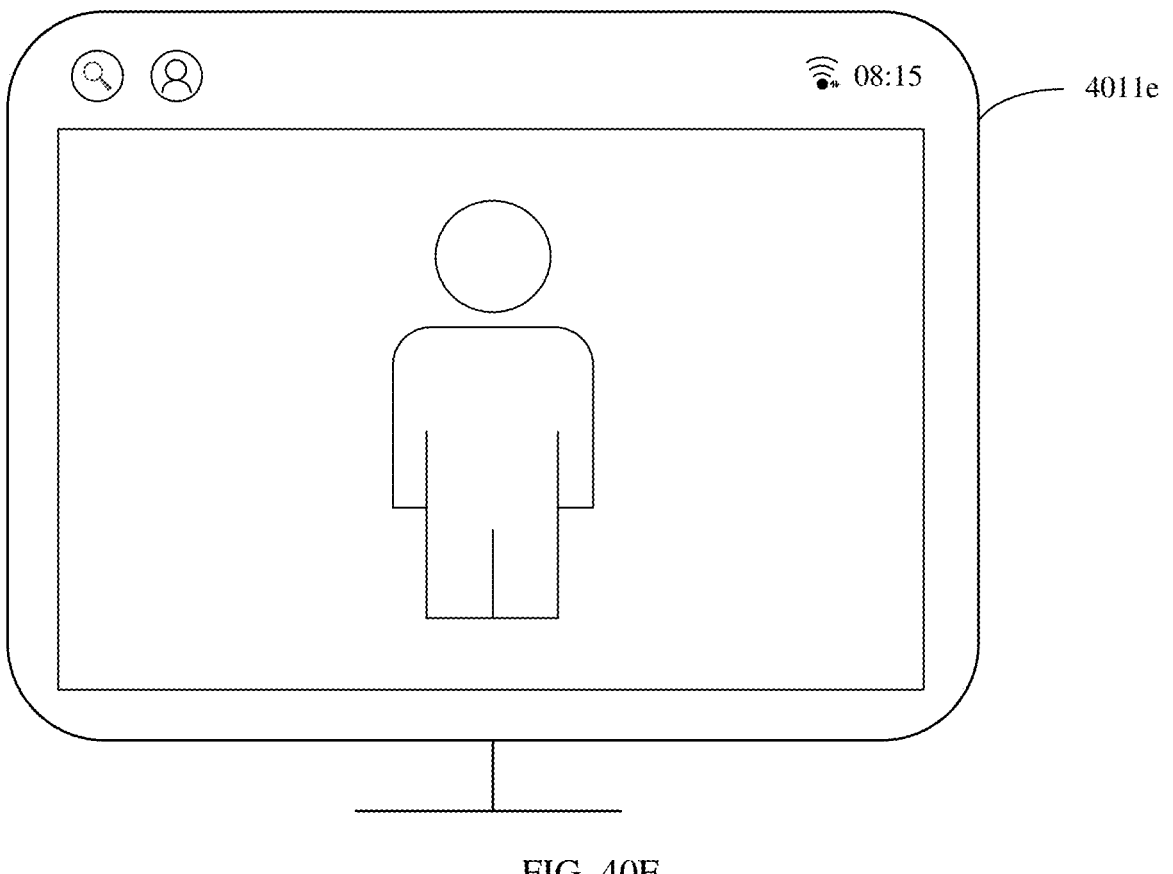

Refer to FIG. 40E. In response to the operation of tapping the control 4042d by the user, the smart television changes from the off state to an on state, and the GUI is a current display interface 4011e of the smart television.

Figure 40F:
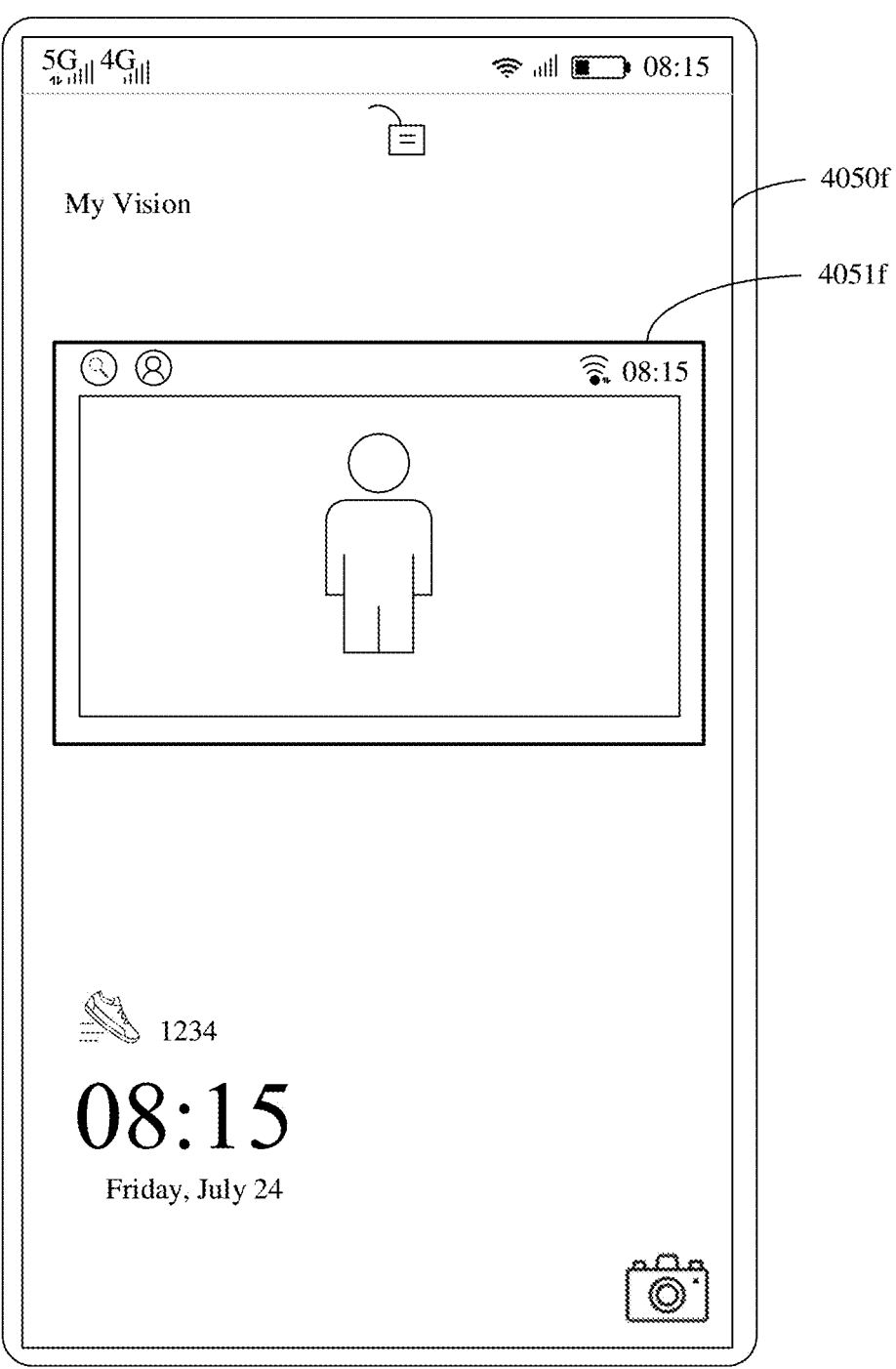

Refer to FIG. 40F. A lock screen interface 4050f includes a current display interface card 4051f of the smart television, and the display interface card 4051f is the current display interface 4011e of the smart television. A text "My Vision" or the like may be further displayed above the display interface card 4051f. An icon or the like used to prompt the user that the screen has been unlocked may be further displayed on an upper part in the lock screen interface 4050f.

Figure 40G:
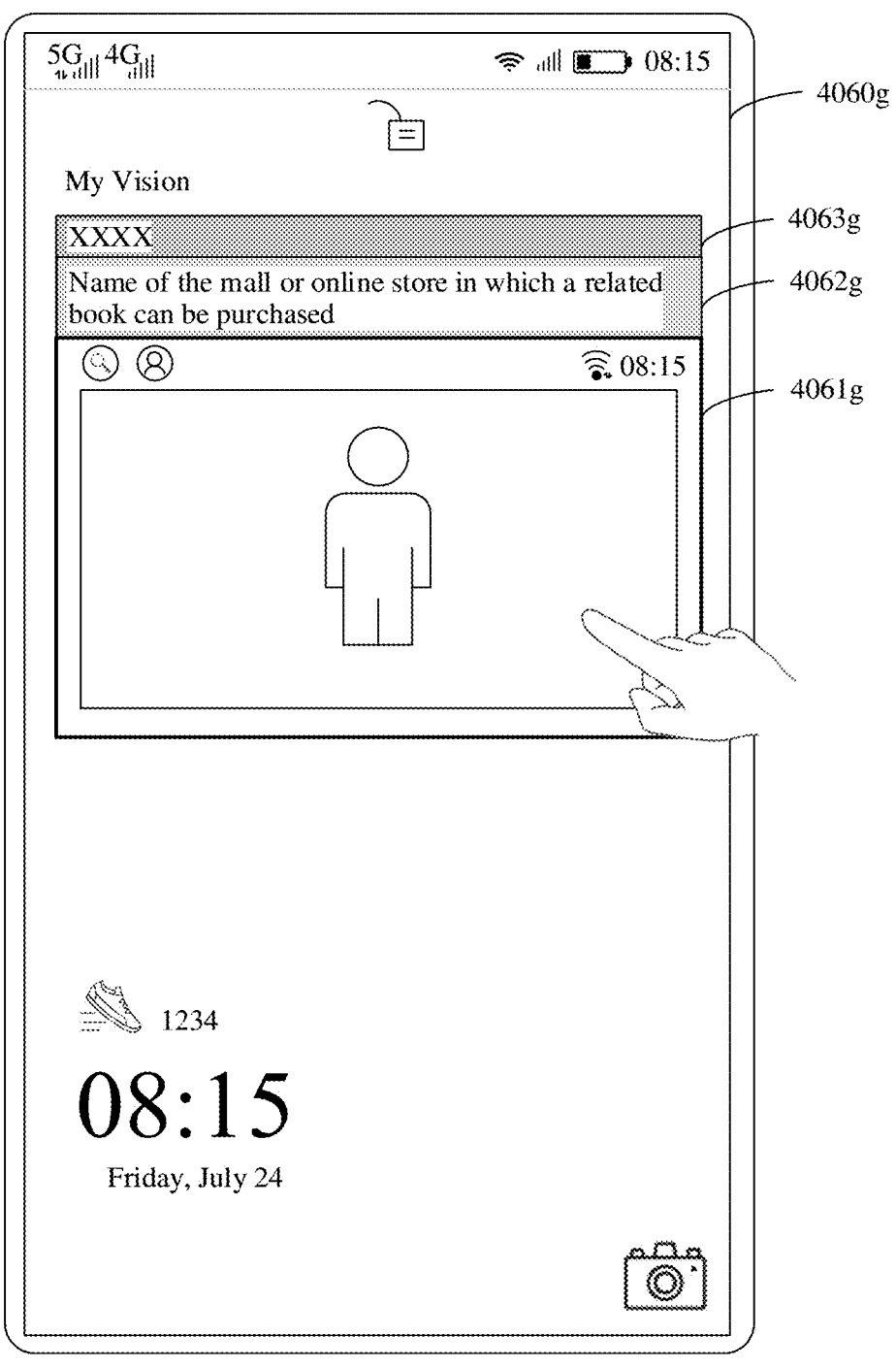

In an optional embodiment, refer to FIG. 40G. A lock screen interface 4060g includes a display interface card 4061g of the smart television and two related service content cards 4062g and 4063g. The related service content card 4062g may be a purchase link to a book related to content currently played on the smart television, and the related service content card 4063g may be a brief introduction to a person or an article related to the content currently played on the smart television. The related service content cards 4062g and 4063g may be sequentially stacked under the display interface card 4061g. After detecting an operation of tapping 4061g, 4062g, or 4063g by the user, the mobile phone may display a GUI shown in FIG. 40H.

It should be understood that, in this embodiment of this application, only an example in which the lock screen interface displays two related service content cards is used for description. A quantity of related service content cards is not limited in this embodiment of this application.

Figure 40H:
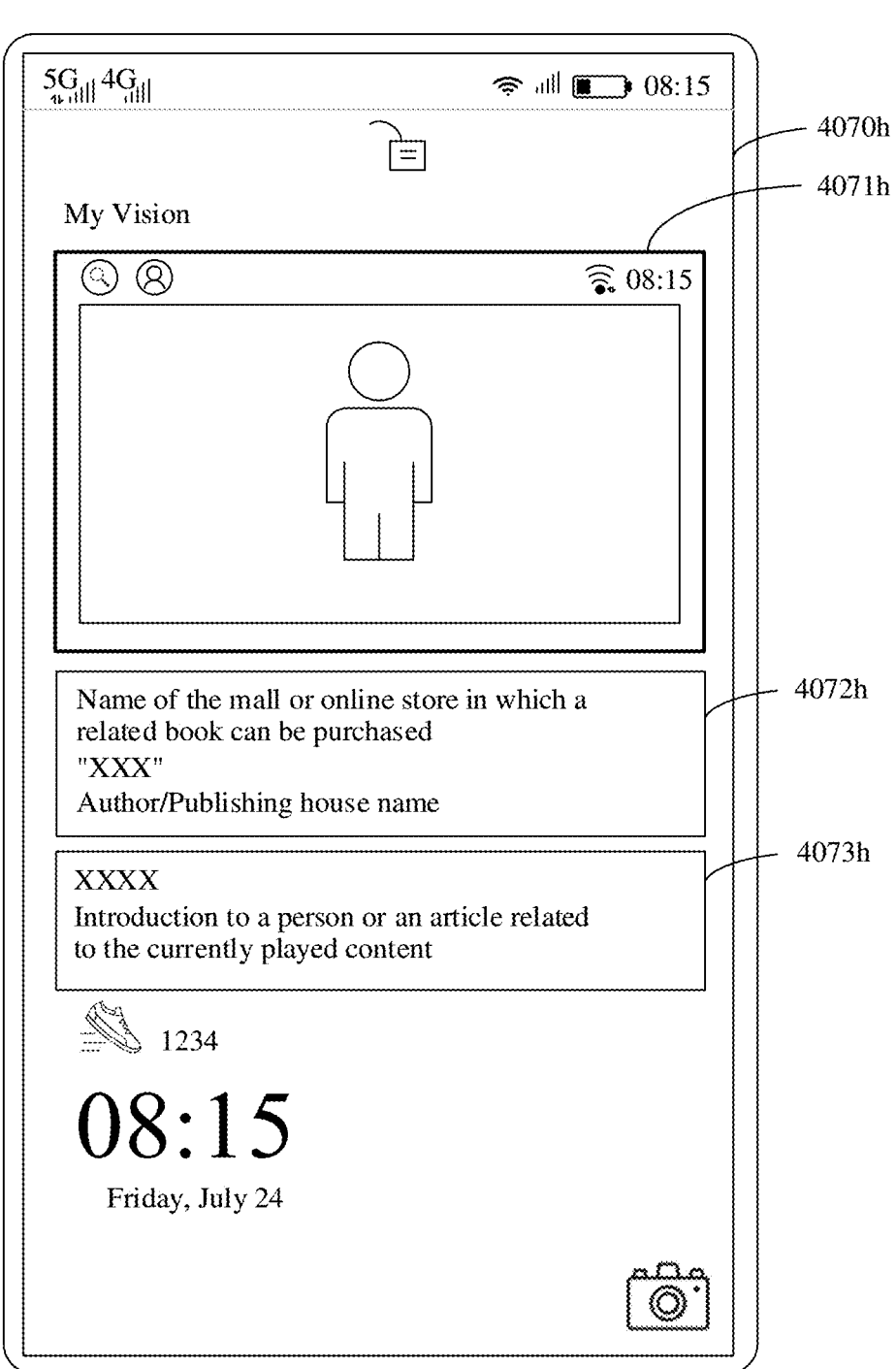

Refer to FIG. 40H. The mobile phone may display a display interface card 4071h and related service content cards 4072h and 4073h in a lock screen interface 4070h in a list form. The user may tap a related link to jump to another application or a web page.

For example, after the user taps the related service content card 4072h, the mobile phone may jump to an interface for purchasing a book.

In this embodiment of this application, when the device to which the head of the mobile phone points is the smart television, the user may perform an operation of sliding the finger downward on the screen of the mobile phone, to display the display interface of the television on the screen of the mobile phone, and further display, on the screen of the mobile phone, the service content cards related to the content in the display interface of the television, so that a plurality of related links can be provided for the user. Therefore, the user can perform a related operation in the interface, and does not need to open another App for search, to improve user experience.

FIG. 41A to FIG. 41G are a schematic diagram of another group of GUIs according to an embodiment of this application. FIG. 41A to FIG. 41G show a process in which a mobile phone interacts with a smart television.

Figure 41A:
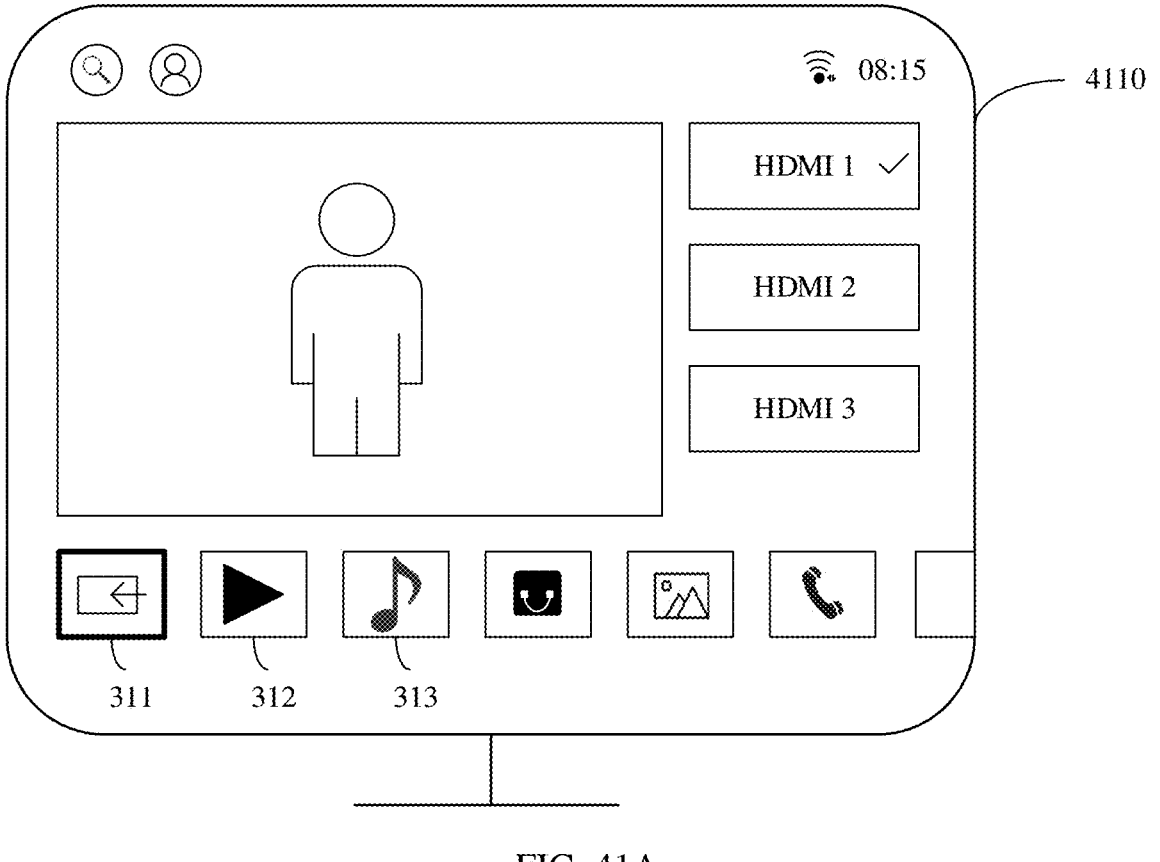
FIG. 41A to FIG. 41G are a schematic diagram of another group of GUIs according to an embodiment of this application.

Refer to FIG. 41A. The GUI is a display interface 4110 of a smart television.

Figure 41B:
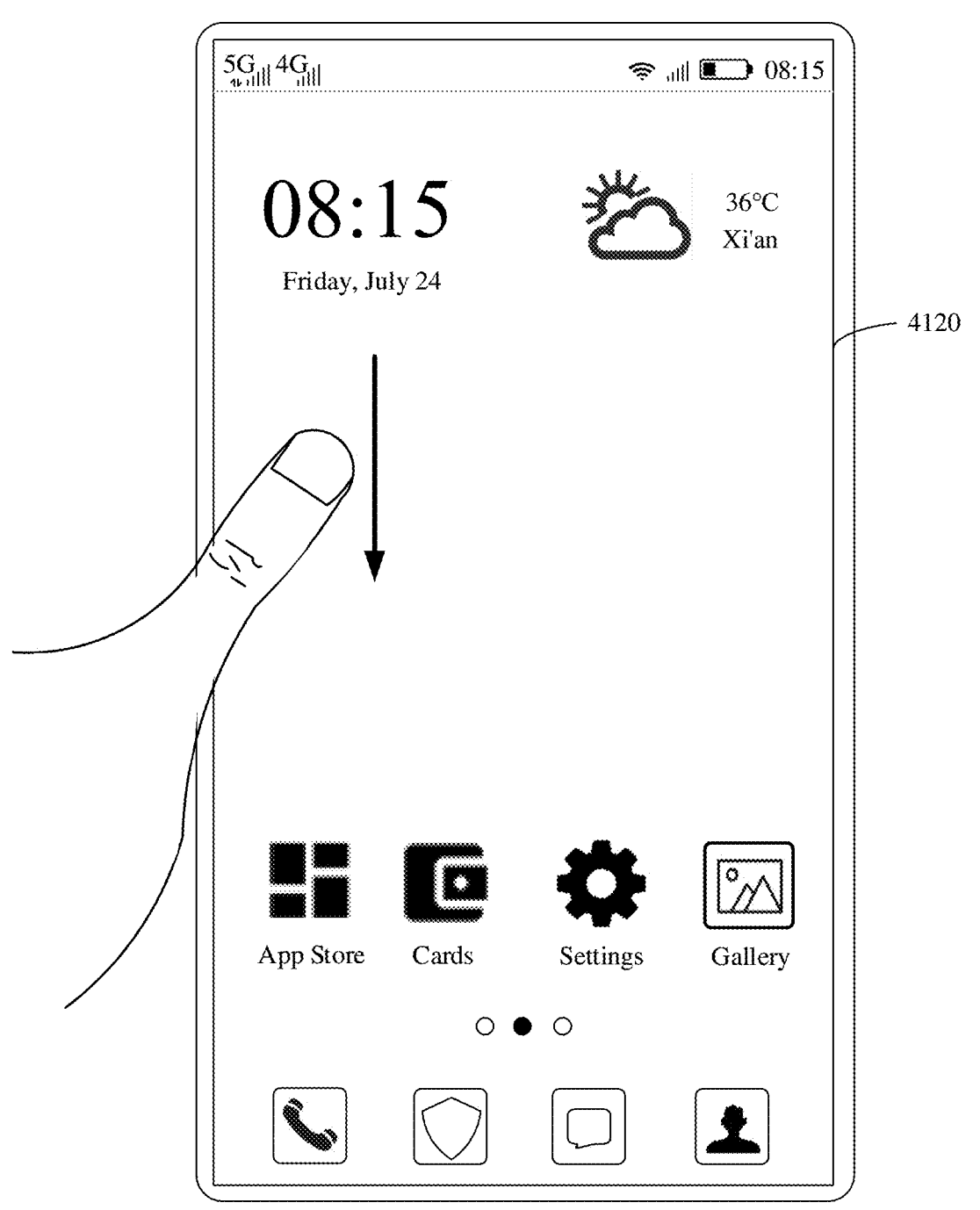
Figure 41C:
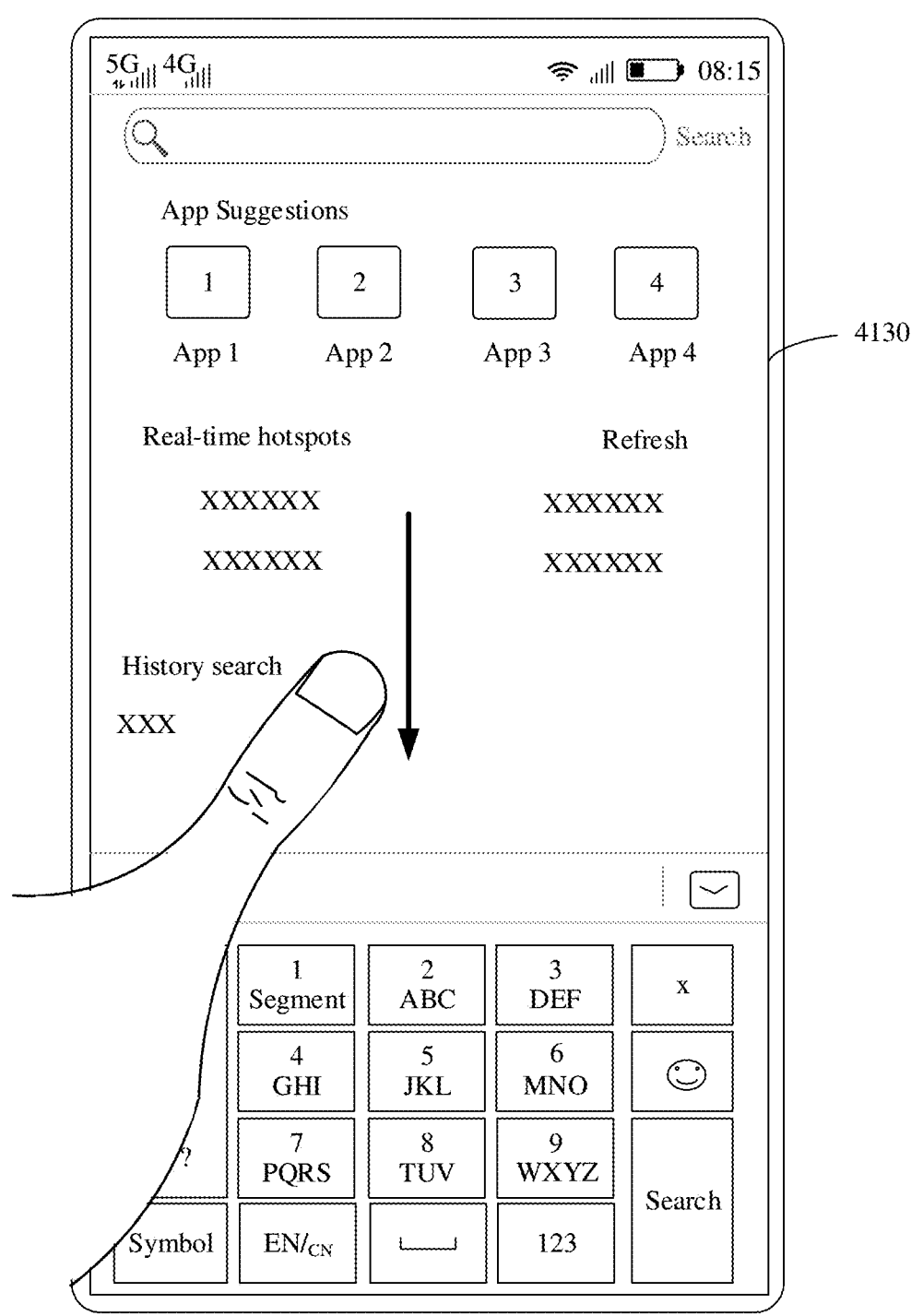

For FIG. 41B and FIG. 41C, refer to related descriptions in FIG. 36B and FIG. 36C. For brevity, details are not described again.

Figure 41D:
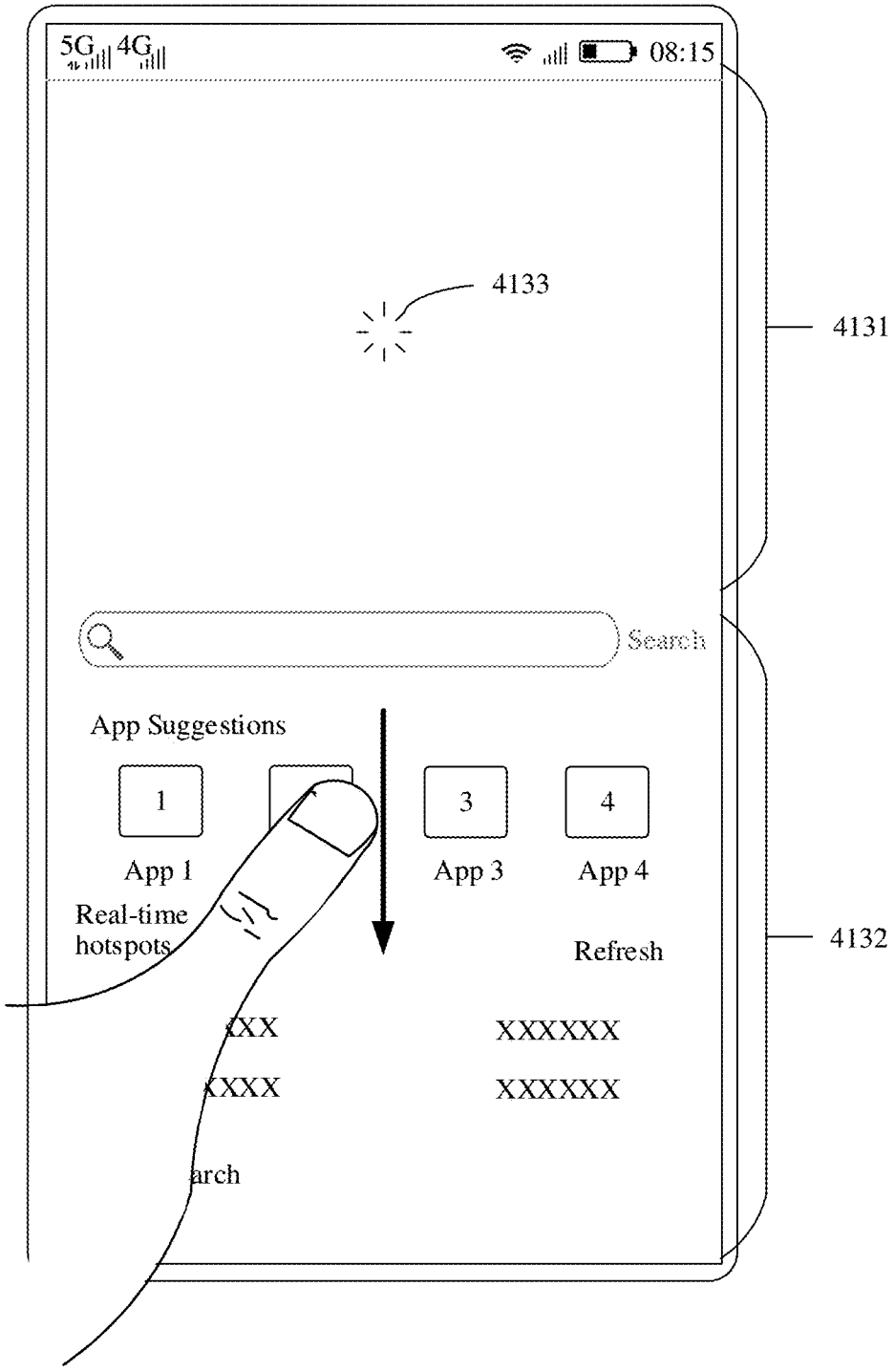

Refer to FIG. 41D. A search interface 4130 may be divided into an upper part and a lower part. An area 4131 is used to display a display interface card of the smart television, and an area 4132 is a partial display area of the original search interface 4130. In a process in which a finger of the user slides downward, the area 4131 may display an icon 4133 used to prompt the user that the display interface card of the smart television is being loaded. When detecting that a sliding distance of the finger of the user is greater than a preset distance, the mobile phone may display a GUI shown in FIG. 41E.

Figure 41E:
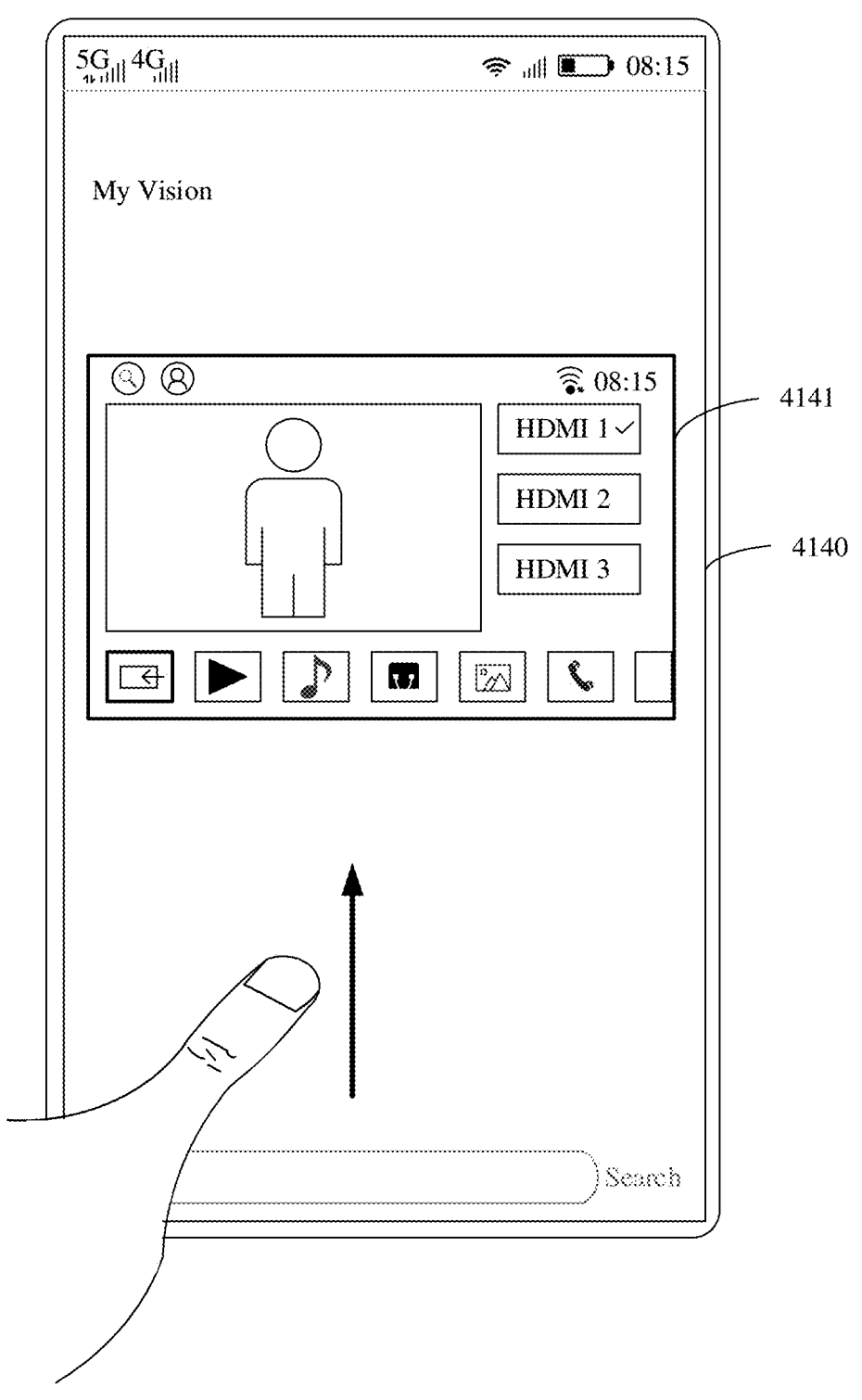

Refer to FIG. 41E. A display interface 4140 includes a display interface card 4141 of the smart television, and the display interface card 4141 is a current display interface 4110 of the smart television. An upper part of the display interface card 4141 may further include a text "My Vision" or the like. The bottom of the display interface 4140 may further include a search box of the search interface. After detecting an operation that a single finger of the user slides upward in the display interface 4140, the mobile phone may display a GUI shown in FIG. 41F.

Optionally, the display interface 4140 further includes a plurality of related service content cards (not shown in the figure). The plurality of related service content cards may be displayed below the display interface card 4141 in a list form, or sequentially stacked under the display interface card 4141.

In this embodiment of this application, sliding upward by the user in the display interface 4140 may be understood as sliding upward for a specific distance.

Figure 41F:
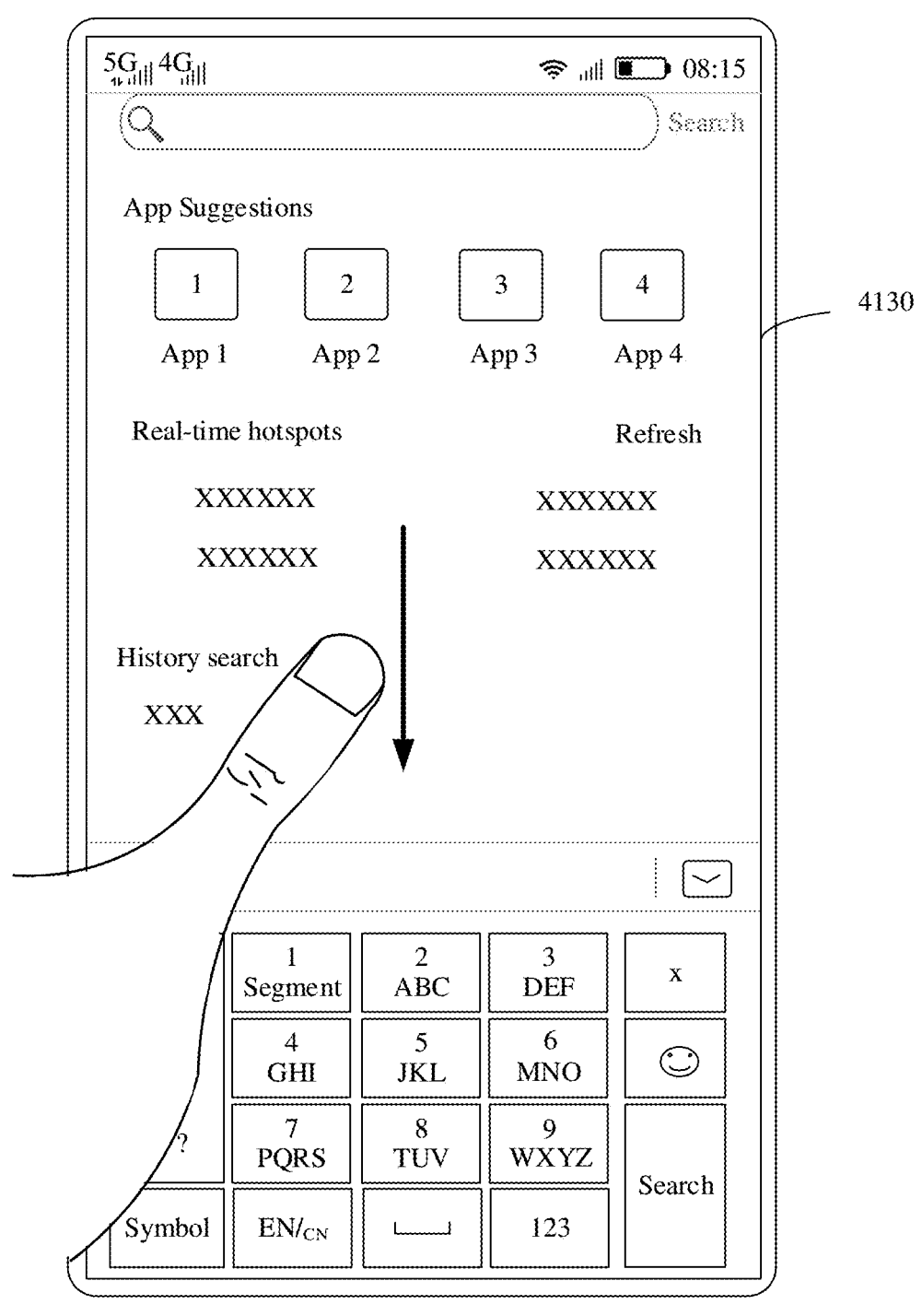

Refer to FIG. 41F. An interface is the search interface 4130 of the mobile phone. After detecting that the single finger of the user slides downward in the search interface 4130 for a specific distance, the mobile phone may display a GUI shown in FIG. 41G.

Figure 41G:
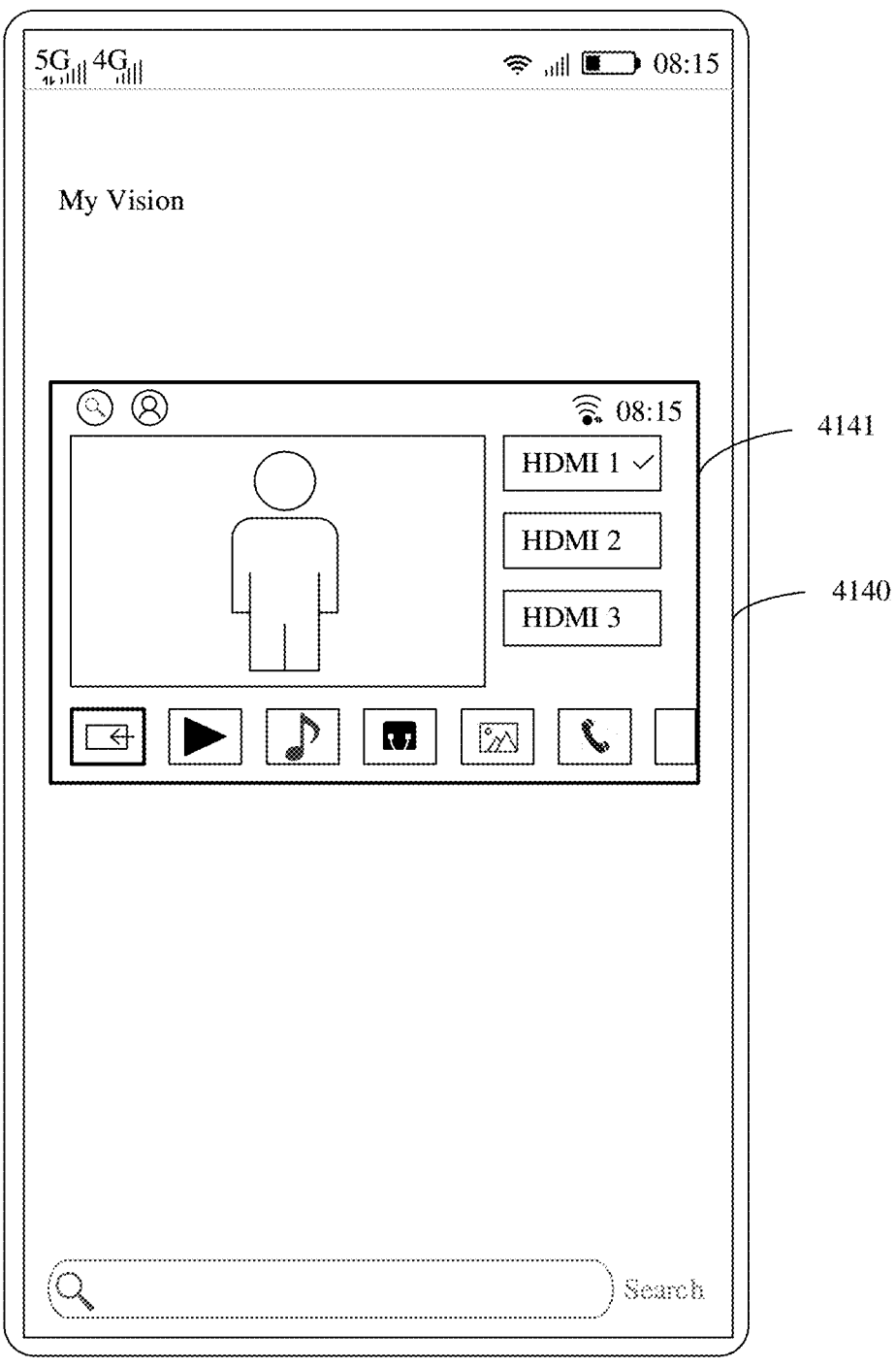

Refer to FIG. 41G. The GUI is actually the interface shown in FIG. 41E.

In this embodiment of this application, the interface that is on the mobile phone and in which the display interface card of the smart television is displayed and the search interface of the mobile phone each are divided into two interfaces, and interface display switching may be implemented based on a slide up operation and a slide down operation of the user on the screen. Therefore, the display interface card of the smart television may not affect a layout and a function of the original search interface of the mobile phone.

FIG. 42A to FIG. 42G are a schematic diagram of another group of GUIs according to an embodiment of this application. FIG. 42B to FIG. 42G show a process in which a mobile phone interacts with a smart speaker. In this embodiment of this application, an intelligent device in a current pointing direction of the head of the mobile phone is a smart speaker.

Figure 42A:
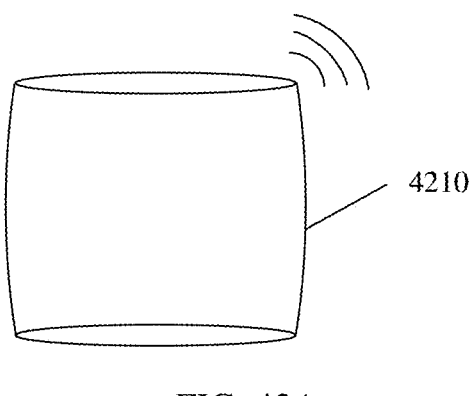
FIG. 42A to FIG. 42G are a schematic diagram of another group of GUIs according to an embodiment of this application.

FIG. 42A shows a smart speaker 4210.

Figure 42B:
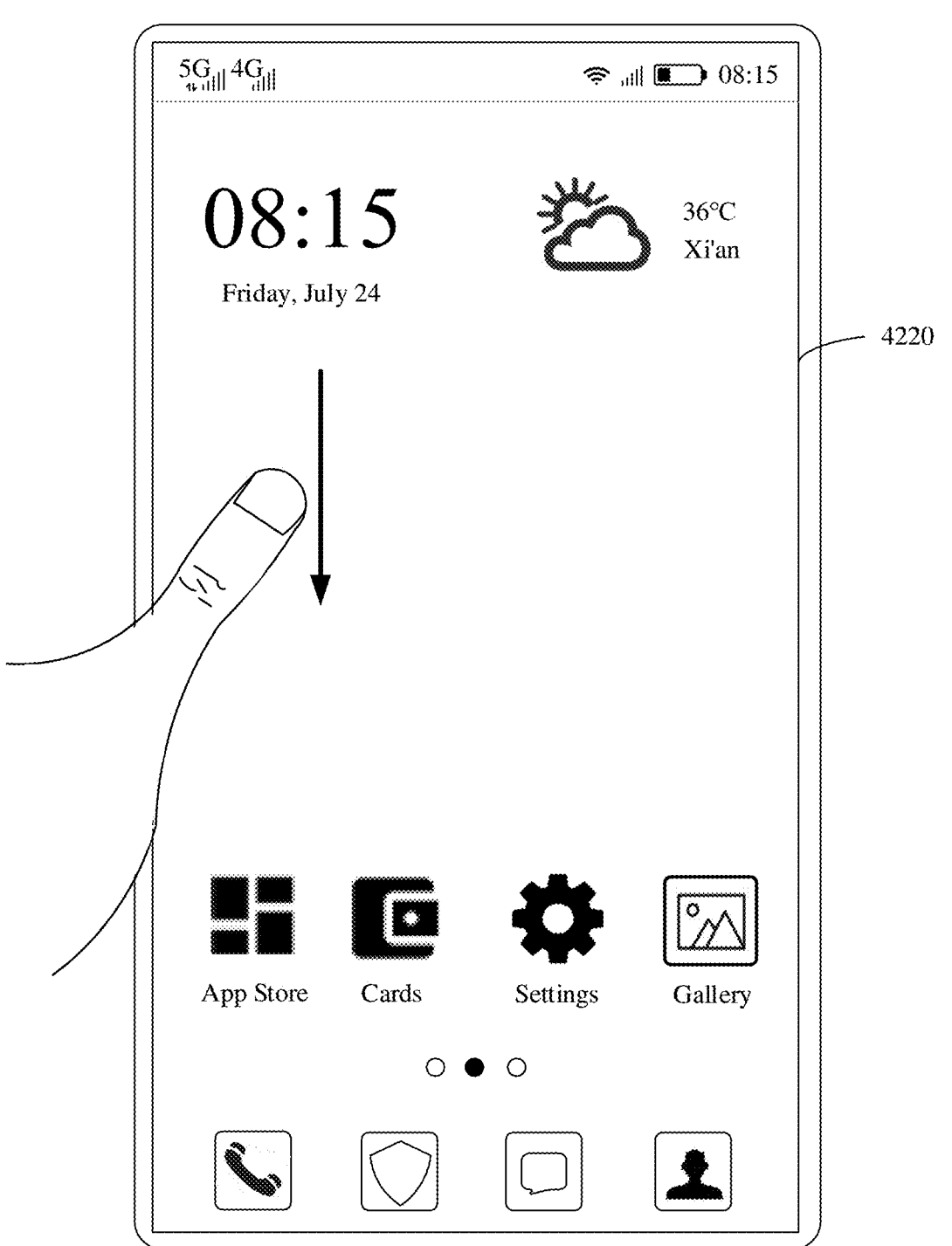
Figure 42C:
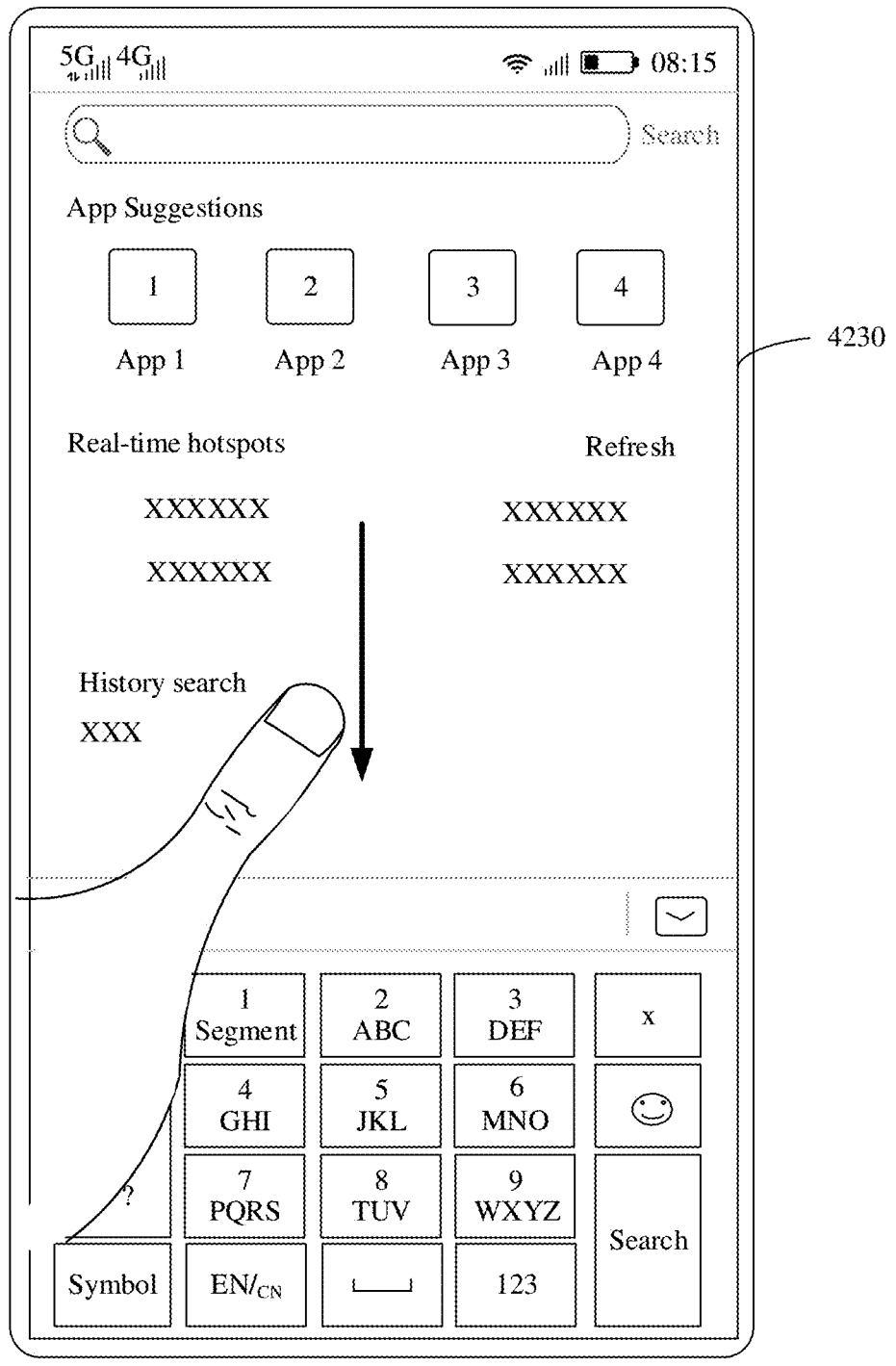

For FIG. 42B and FIG. 42C, refer to related descriptions in FIG. 36B and FIG. 36C.

Figure 42D:
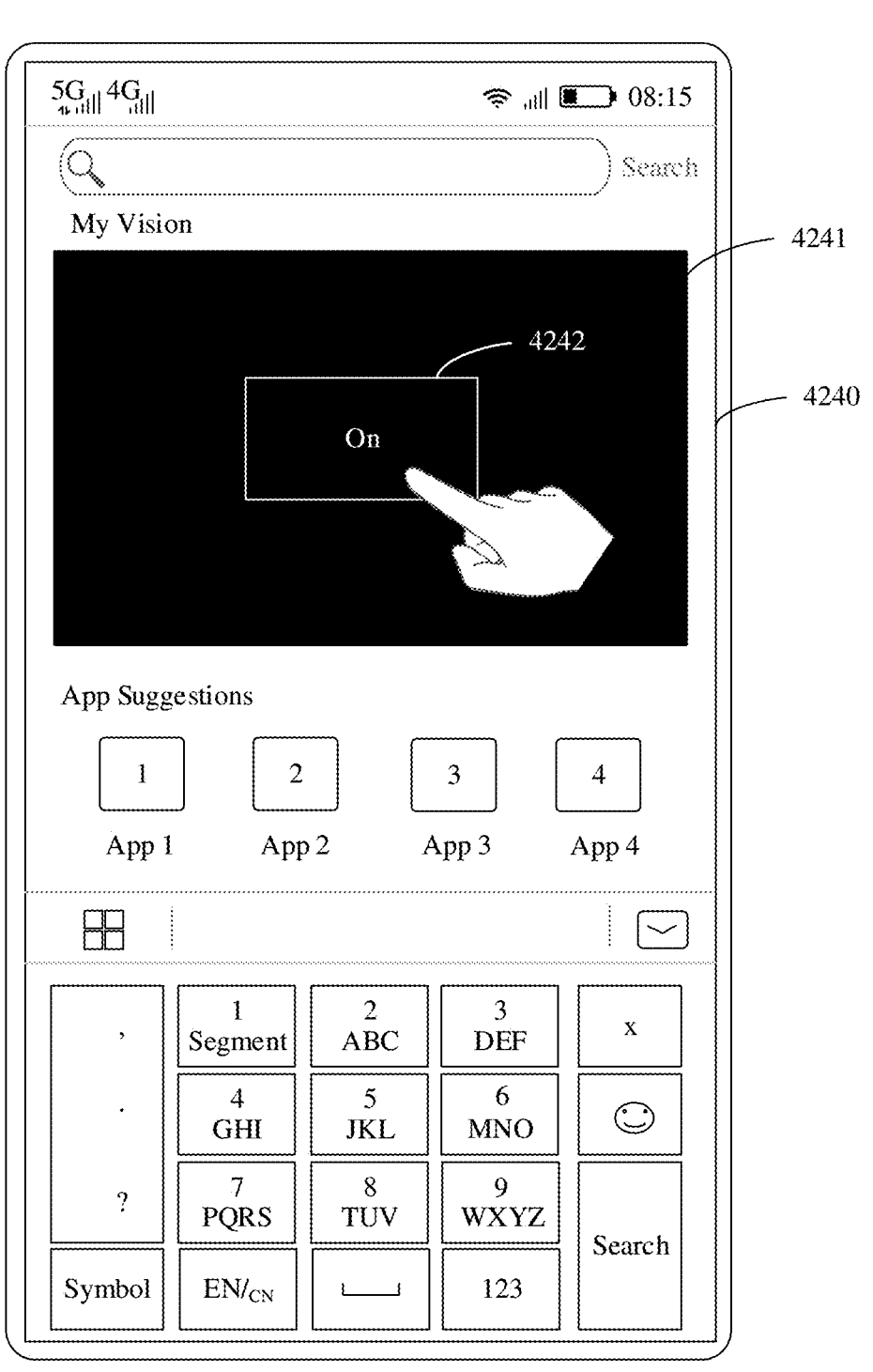

Refer to FIG. 42D. A display interface 4240 includes a control card 4241 of the speaker. The control card 4241 may be at an upper location in the interface 4240, for example, above App Suggestions. A text "My Vision" or the like may be further displayed above the display interface card 4241. When the speaker is in an off state, the card 4241 may display a control 4242 for the user to control the speaker to be turned on. After detecting an operation of tapping the control 4242 by the user, the mobile phone may display a GUI shown in FIG. 42E. Optionally, if the speaker is currently in a playing state, the speaker may directly jump from the interface shown in FIG. 42C to the GUI shown in FIG. 42E.

Figure 42E:
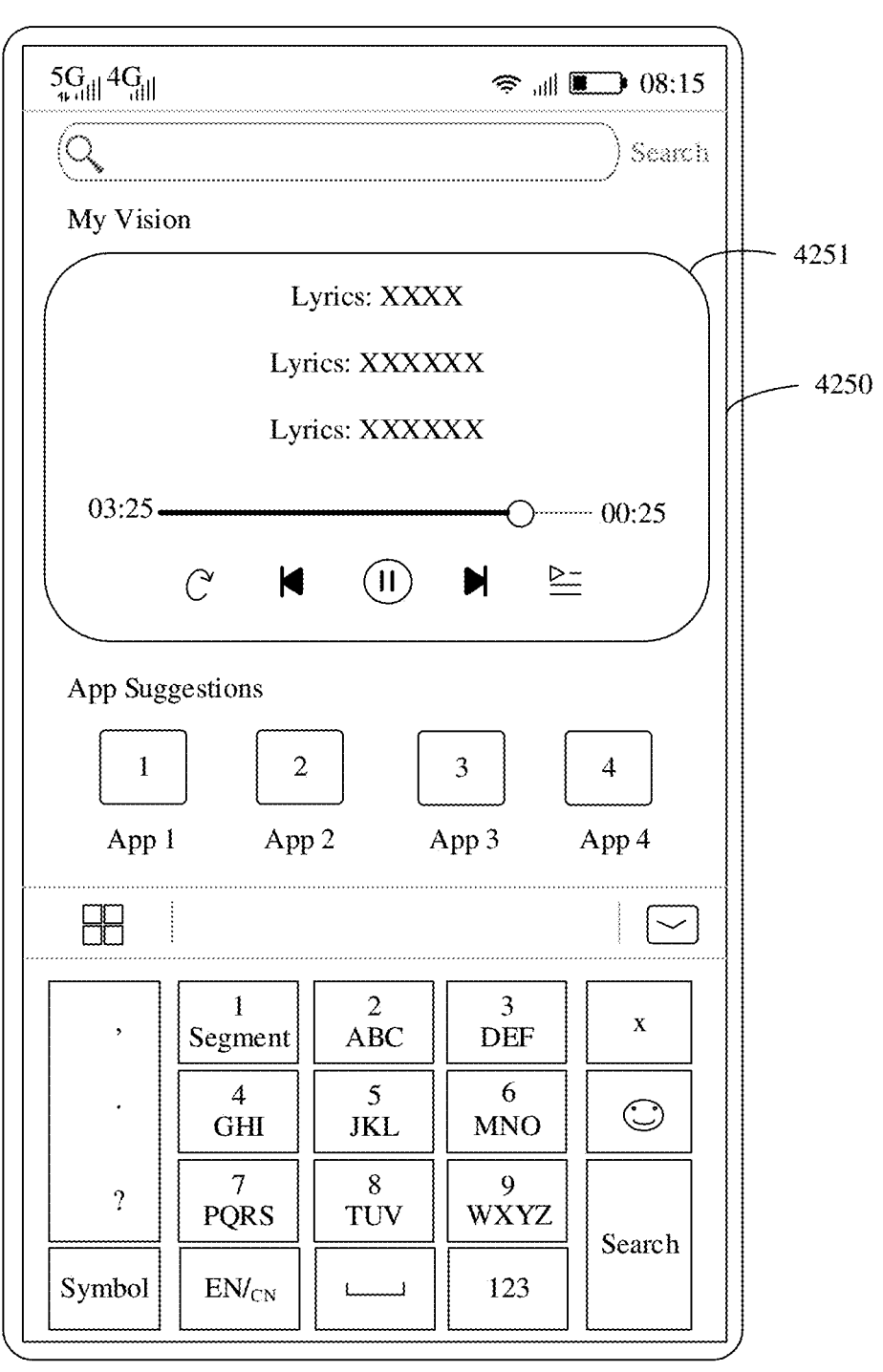

Refer to FIG. 42E. A display interface 4250 may include a display interface card 4251 of the speaker, and the card may display lyrics and a playback progress of currently played music, and display function controls such as a music playback manner, music switching, pause, and a playlist below the playback progress. The user may tap some controls in the card to control the speaker to perform operations such as music playback, switching, and playback manner settings.

Figure 42F:
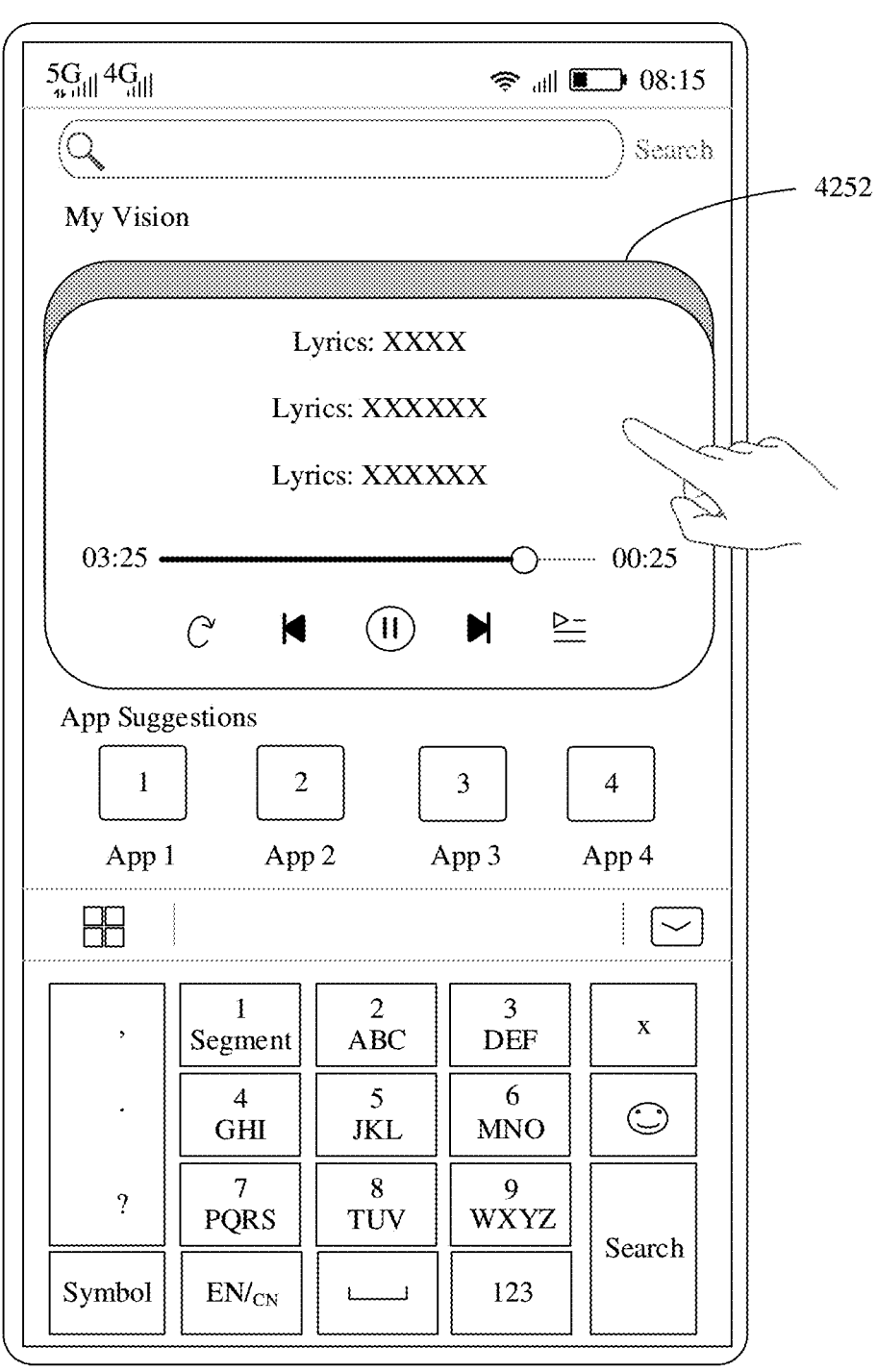

In an optional embodiment, refer to FIG. 42F. The display interface 4250 may further include a service content card 4252 related to the music, for example, a music video (music video, MV), and the service content card 4252 may be stacked under the display interface card 4251. After detecting an operation of tapping the display interface card 4251 or the service content card 4252 by the user, the mobile phone may display a GUI shown in FIG. 42G.

Figure 42G:
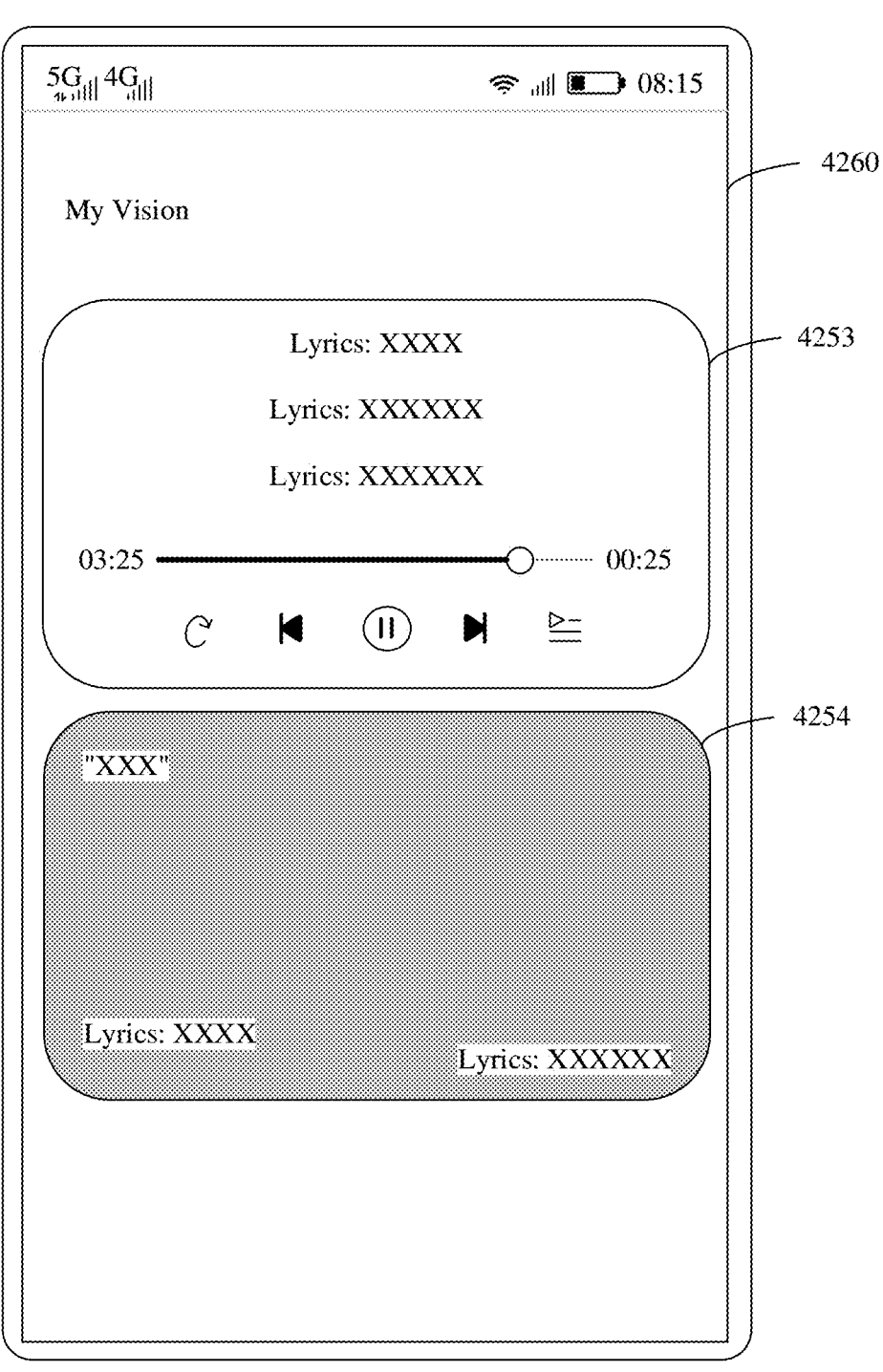

Refer to FIG. 42G. A display interface 4260 may include a display interface card 4253 and a service content card 4254 that are arranged in a list form. That is, the display interface card 4251 is a playback interface used to display the current music, the service content card 4254 is an MV interface used to display the current music, and the MV interface may display an MV name, a picture, lyrics, and the like.

In this embodiment of this application, when the device to which the head of the mobile phone points is the smart speaker, the user may perform an operation of sliding the finger downward on the screen of the mobile phone, to display the control interface of the speaker on the screen of the mobile phone, and further display, on the screen of the mobile phone, the service content card, for example, the MV, related to the content in the control interface of the speaker. Therefore, the user can synchronously display the MV of the music on the mobile phone when playing the music by using the speaker, to bring both visual and auditory feelings to the user, and improve user experience.

FIG. 43A to FIG. 43F are a schematic diagram of another group of GUIs according to an embodiment of this application. FIG. 43A to FIG. 43F show a process in which a mobile phone interacts with a smart television. In this embodiment of this application, an intelligent device to which the head of the mobile phone currently points is a smart television.

Figure 43A:
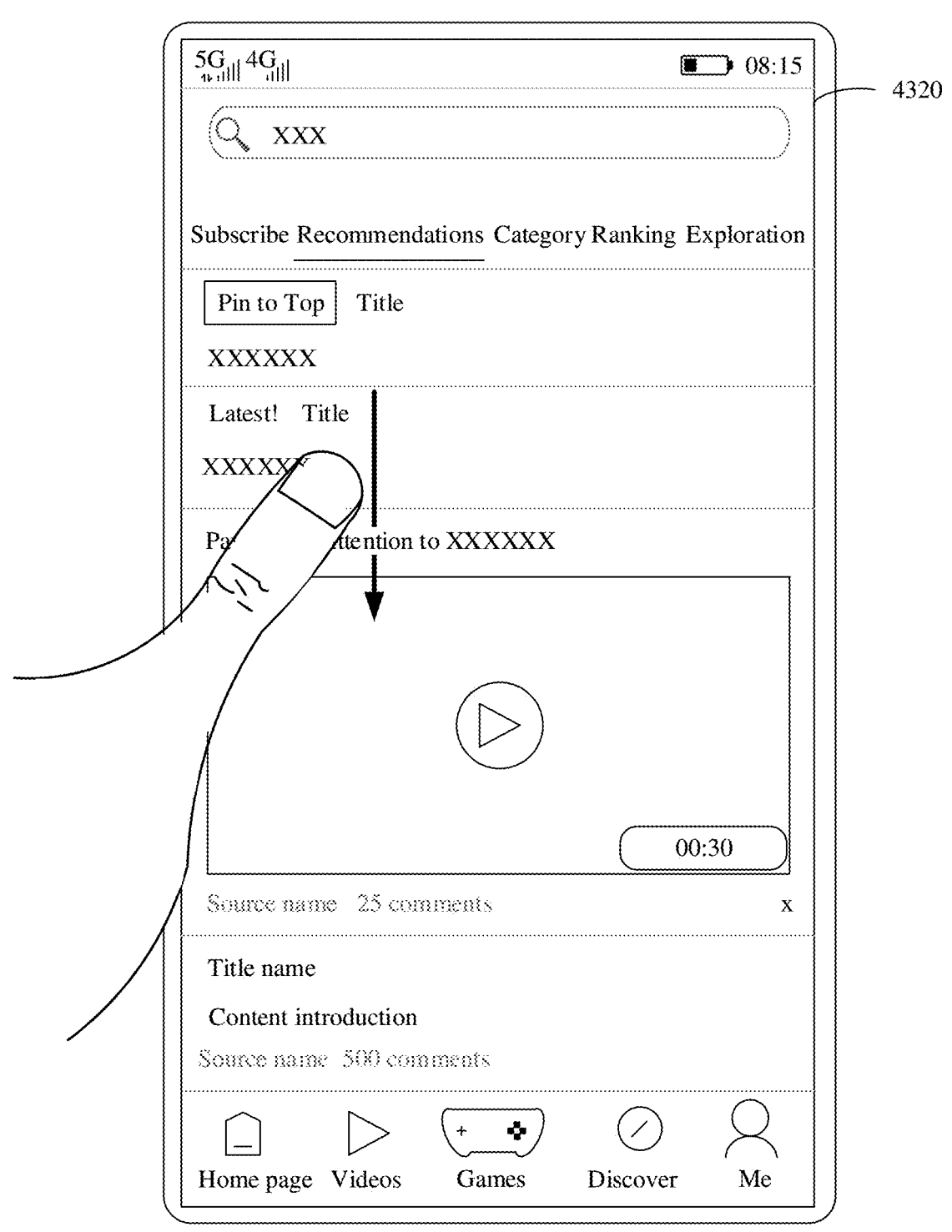
FIG. 43A to FIG. 43F are a schematic diagram of another group of GUIs according to an embodiment of this application.

Refer to FIG. 43A. A GUI is a display interface 4320 in an application. For example, the display interface 4320 is an interface of a news information application, and the interface may display a plurality of pieces of news information such as texts and videos. After detecting an operation that a single finger of the user slides downward at any location in the interface, the mobile phone may display a GUI shown in FIG. 43B.

It should be understood that the display interface 4320 may be any interface in an application. This is not limited in this embodiment of this application.

Figure 43B:
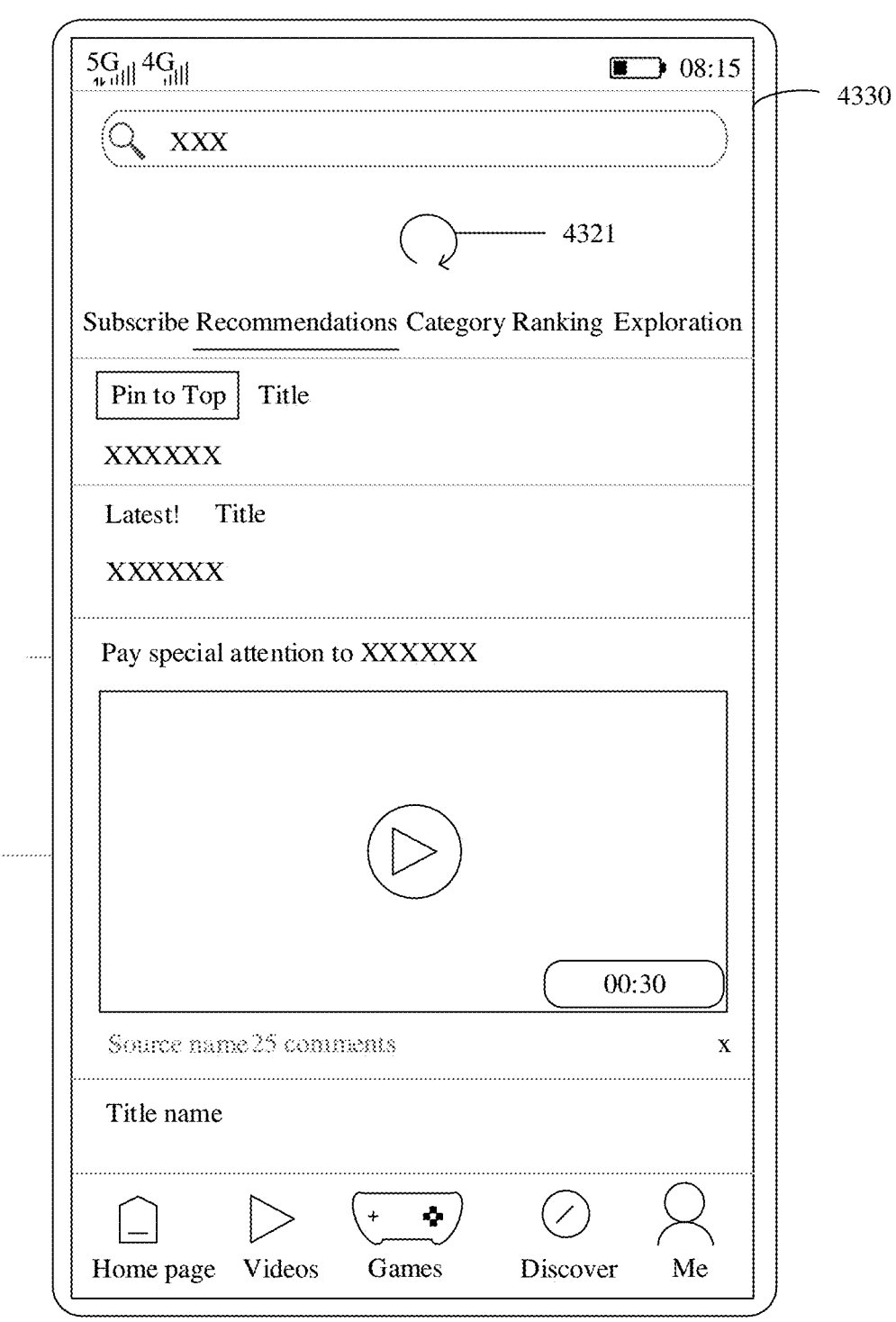

Refer to FIG. 43B. The GUI is an interface existing when the display interface 4320 is being refreshed, and an upper part of the display interface 4330 includes an icon 4321 used to prompt the user that the interface is refreshed. After the single finger of the user slides downward, the display interface 4330 may display a refreshed interface.

Optionally, the upper part of the display interface 4330 includes a guide used to prompt the user to perform refresh, for example, a display text "refreshing" or "pull-down refresh", and a display text and a downward arrow.

Figure 43C:
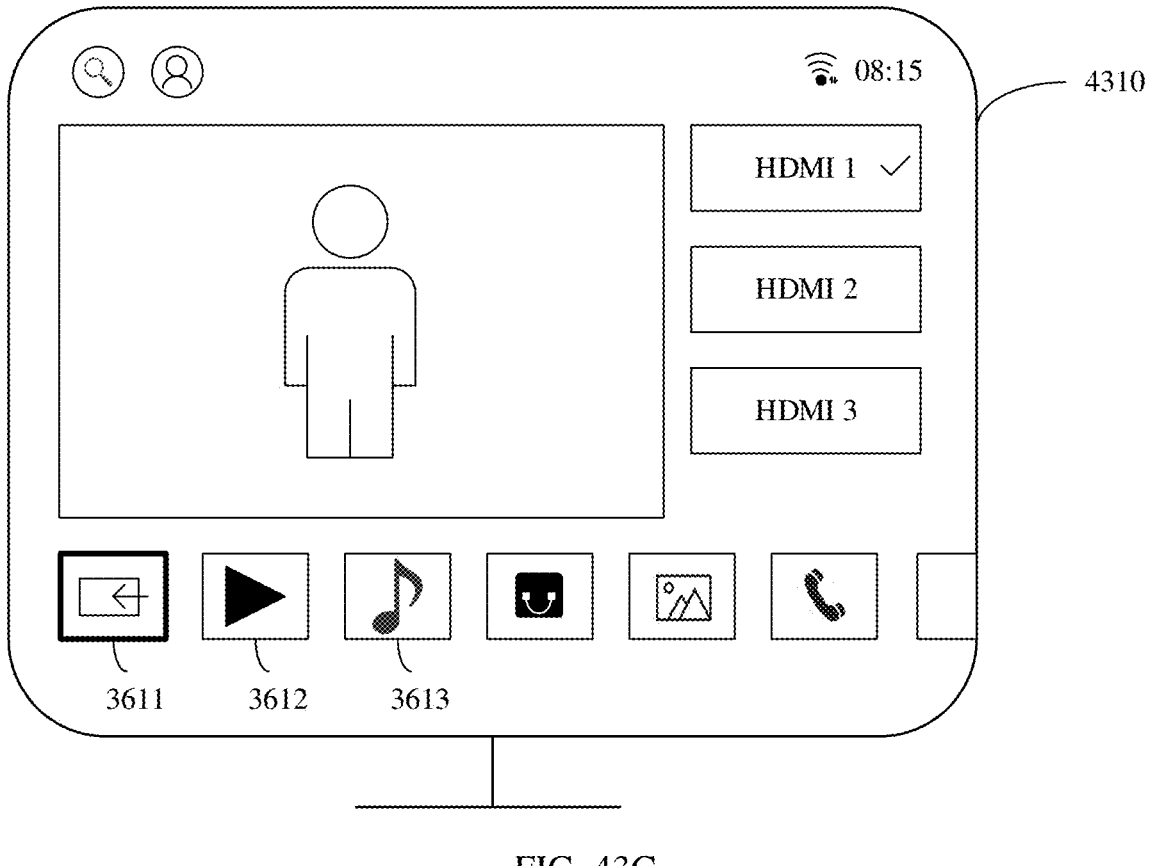

FIG. 43C shows a current display interface 4310 of the television.

Figure 43D:
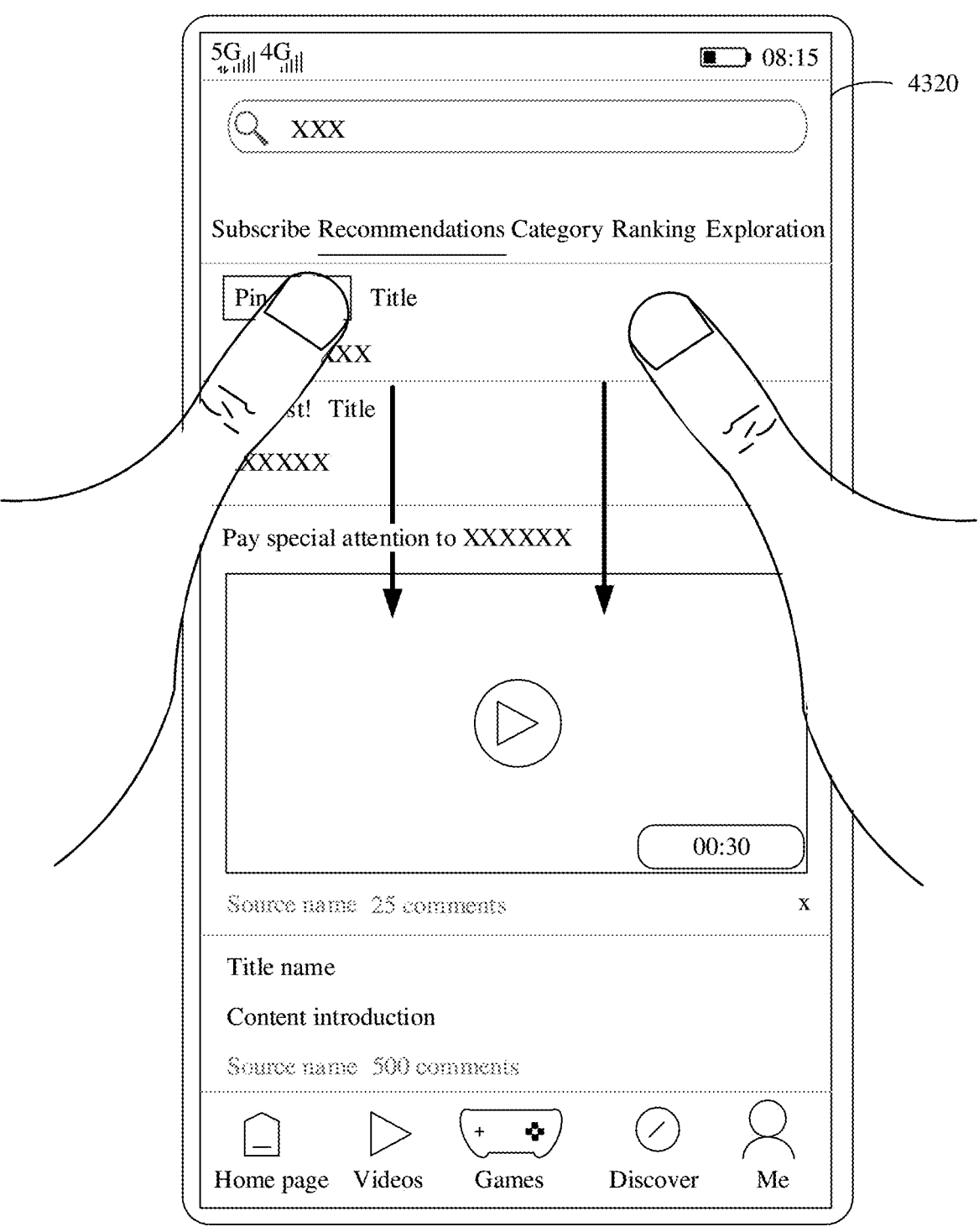

Refer to FIG. 43D. A GUI is a display interface 4320 in an application. When detecting that a plurality of fingers of the user slide downward at any location in the interface, for example, two fingers slide downward or three fingers slide downward, the mobile phone may display a GUI shown in FIG. 43E.

It should be understood that the display interface 4320 may be any interface of the mobile phone. This is not limited in this embodiment of this application.

Figure 43E:
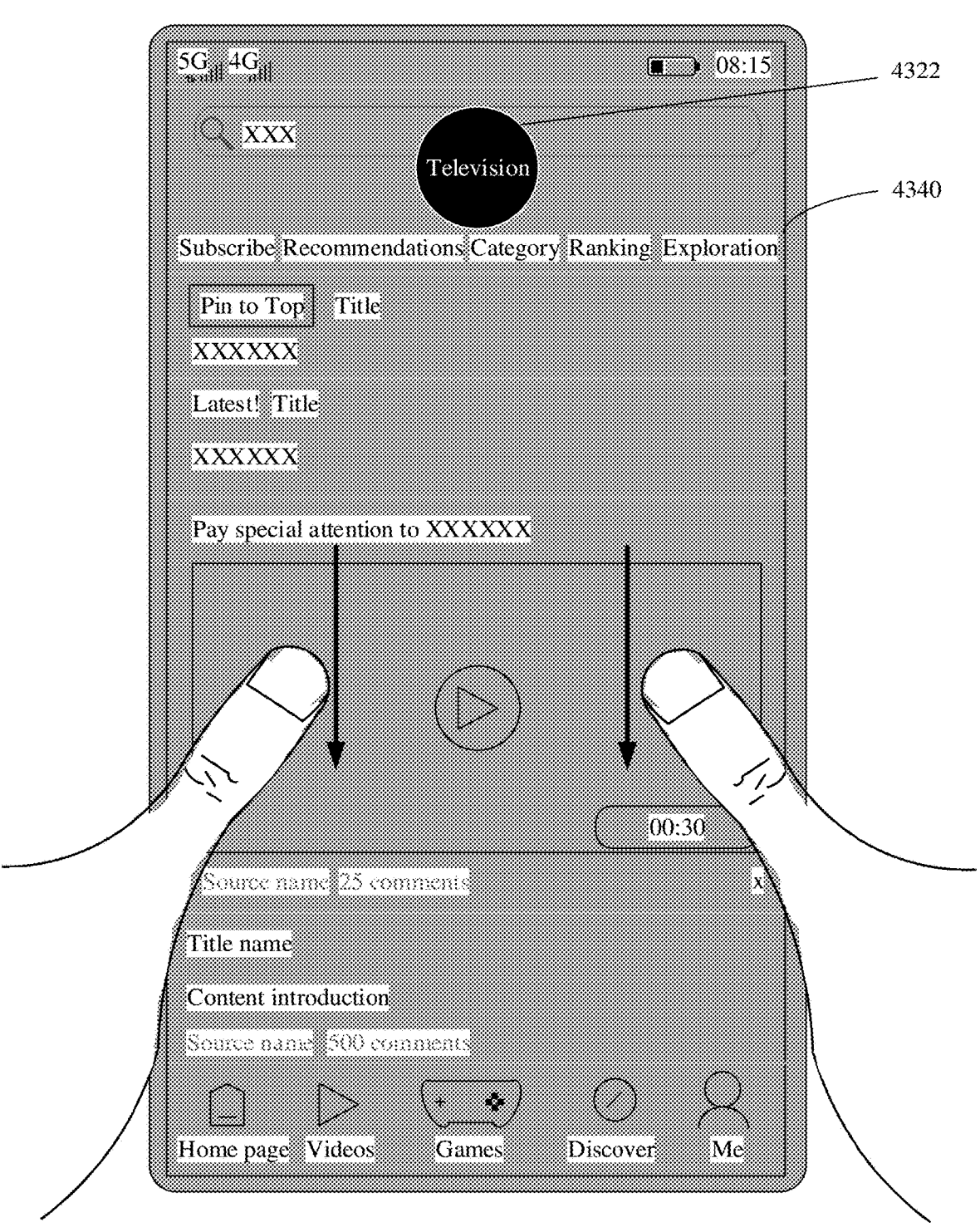

Refer to FIG. 43E. An upper part of the display interface 4340 includes a loading area 4322. The loading area 4322 is used to display "Television" that prompts the user. An interface in which the loading area 4322 is located is stacked on the display interface 4320, and displays a color different from that of the display interface 4322, for example, gray. After detecting that the plurality of fingers of the user continue sliding downward and a sliding distance exceeds a preset distance, the mobile phone may display a GUI shown in FIG. 43(f).

Figure 43F:
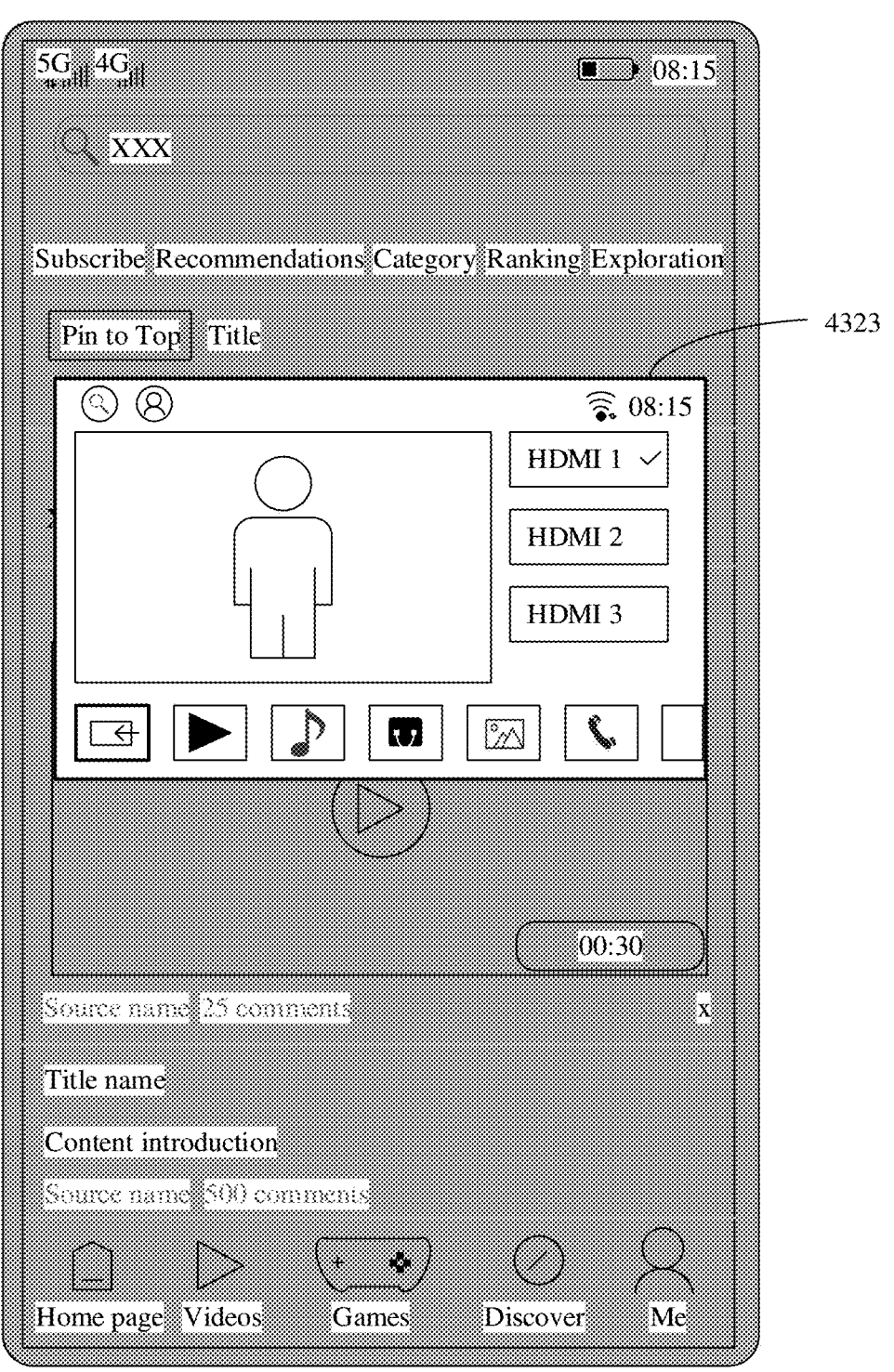

Refer to FIG. 43F. The GUI includes a display interface card 4323 that is of the smart television and that is stacked on the display interface 4320, that is, the current display interface 4310 of the smart television.

For example, the display interface card 4323 may be displayed at a middle location on the screen of the mobile phone, a location above the middle location, a location below the middle location, or the like. Alternatively, the user may freely drag the display interface card 4323 based on a requirement.

Optionally, in addition to the current display interface 4310 of the smart television, the display interface card further includes several function controls that can be used to control the television, for example, increasing or decreasing volume, or switching a channel.

Optionally, if the smart television is not turned on, the display interface card 4323 may be a control interface for controlling on/off of the television. The user may control, in the mobile phone, the smart television to be turned on, and display an interface of the smart television.

In an example, the user is browsing current news in an application, and the television is in an off state. In this case, if the user expects to turn on the television, the user may point the head of the mobile phone to the television, and slide downward with a plurality of fingers at any location in the interface, to display a control interface of the television on a screen of the mobile phone of the user. In this case, the user may turn on the television through the interface.

In another example, the user is browsing current news in an application, and the television is in a playing state. However, if the user expects to switch to another program, the user may point the head of the mobile phone to the television, and slide downward with a plurality of fingers at any location in the interface, to display a display interface card of the television on a screen of the mobile phone of the user. In this case, the user may control a function control on the display interface card to switch between programs.

In an optional embodiment, a plurality of service content cards related to content in the display interface of the television are further stacked under the display interface card 4323, for example, a link for purchasing a book or a web page of a brief introduction to a person or an article.

According to this embodiment of this application, in an interface in an application, the user may slide downward with a single finger to refresh the interface, and slide downward with a plurality of fingers to stack, on the original interface in the application, the display interface card of the intelligent device to which the head of the mobile phone points. Therefore, an original layout form of the page is not affected.

According to this embodiment of this application, when the user slides downward with a plurality of fingers in any interface, the control card or the display interface card of the intelligent device in the pointing direction of the mobile phone may be displayed in the interface of the mobile phone, to help the user control the intelligent device.

Figure 44A:
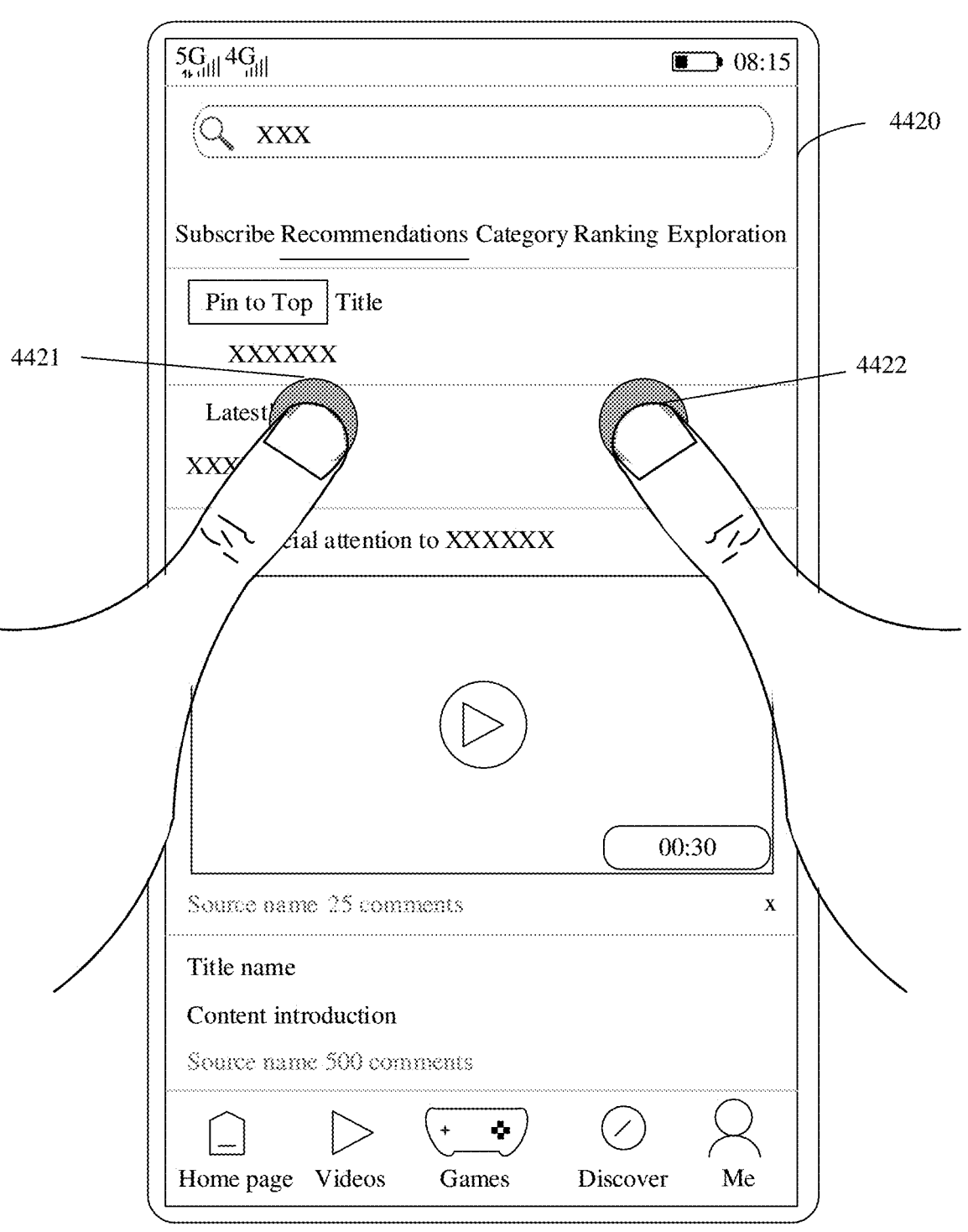
FIG. 44A to FIG. 44C are a schematic diagram of another group of GUIs according to an embodiment of this application.
Figure 44B:
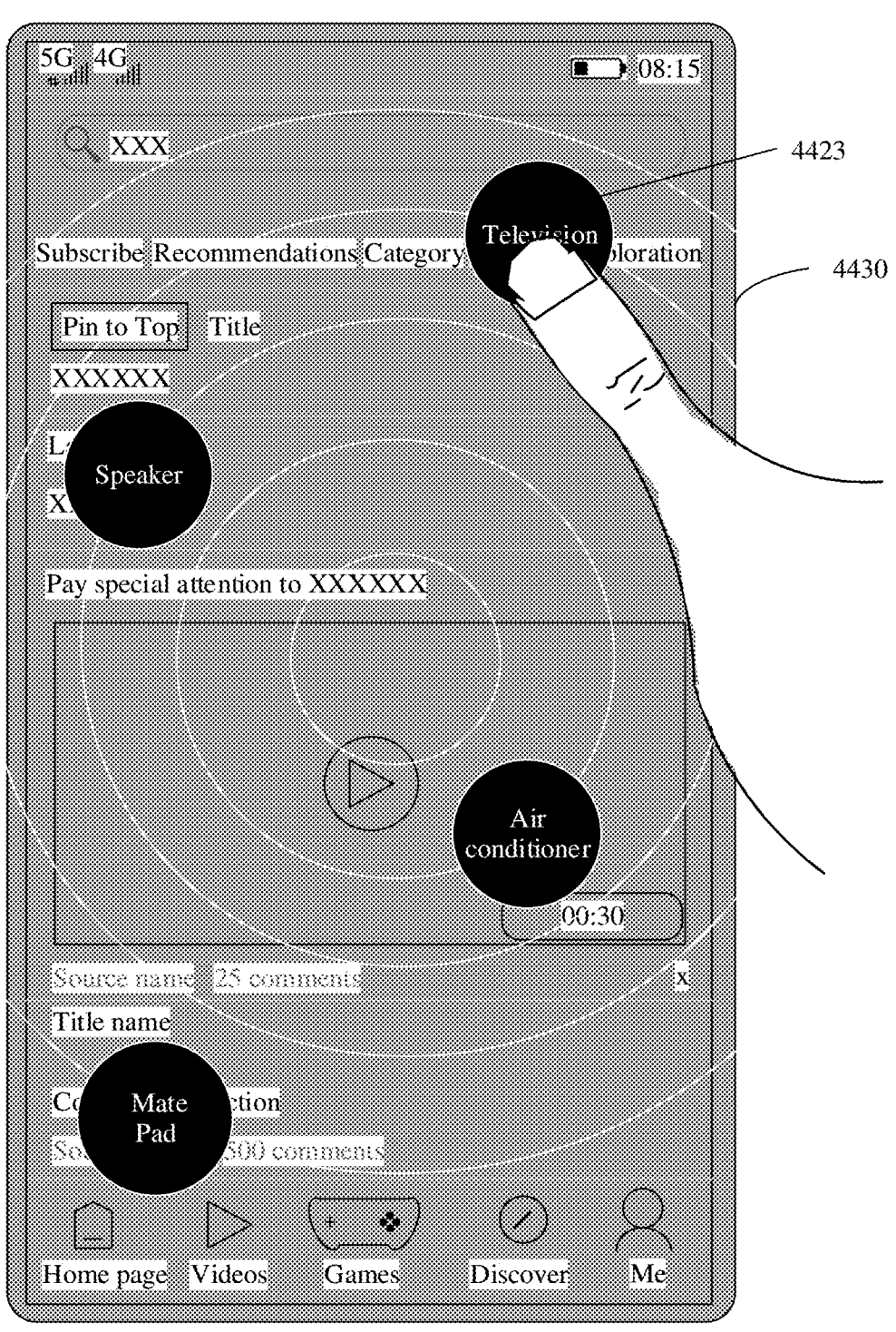
Figure 44C:
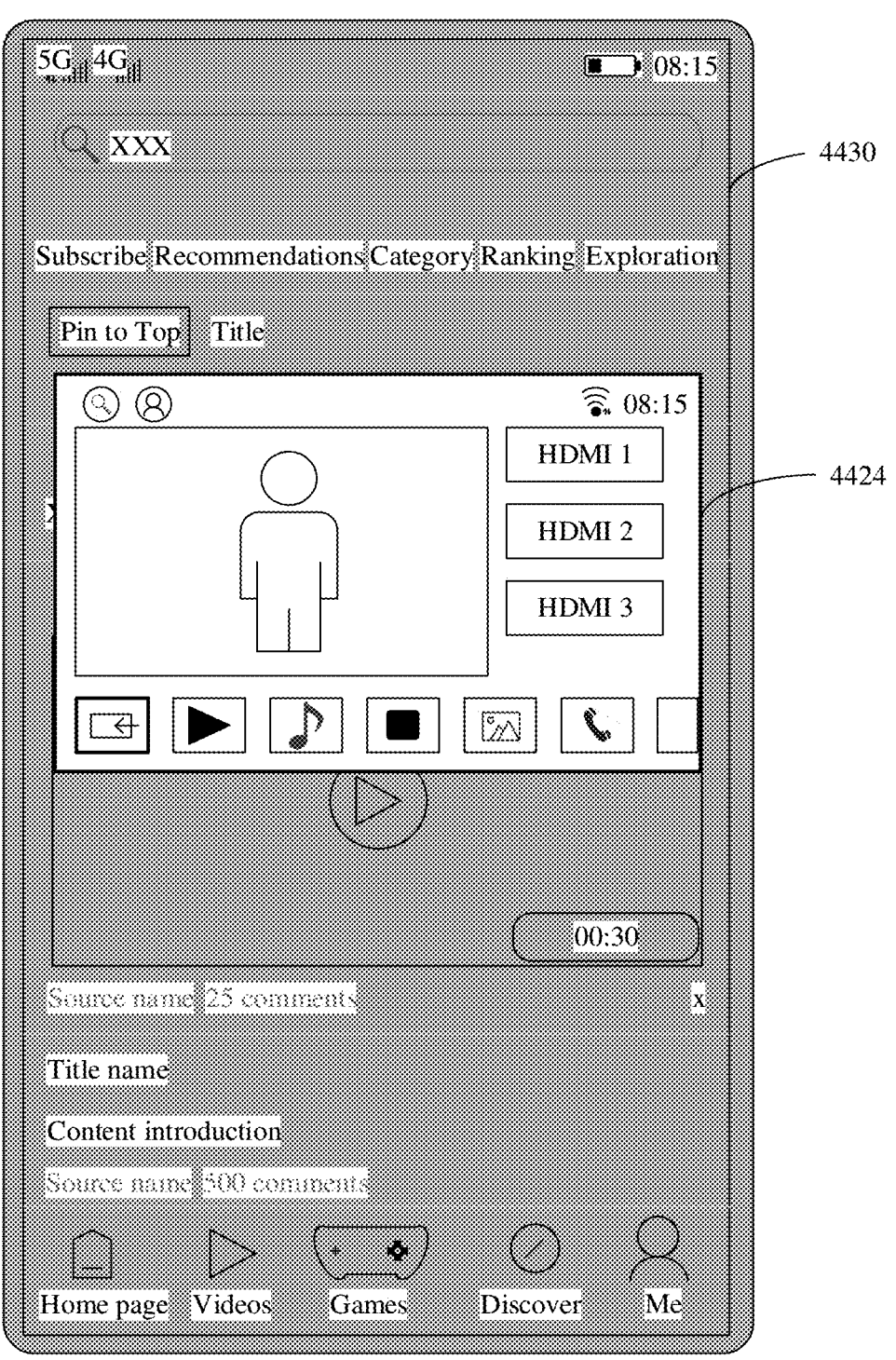

FIG. 44A to FIG. 44C are a schematic diagram of another group of GUIs according to an embodiment of this application. FIG. 44A to FIG. 44C show a process in which a mobile phone interacts with another intelligent device.

Refer to FIG. 44A. A GUI is a display interface 4420 in an application. When detecting an operation that a plurality of fingers of the user touch and hold any location in the interface, for example, two fingers touch and hold the any location or three fingers touch and hold the any location, the mobile phone may display a GUI shown in FIG. 44B.

It should be understood that, in this embodiment of this application, sliding downward by a single finger of the user still has a function of refreshing an interface.

It should be understood that the display interface 4420 may be any interface of the mobile phone.

Refer to FIG. 44B. The GUI is a radar distribution interface 4430 that is of intelligent devices allowed to be identified around the mobile phone and that is stacked on the display interface 4420. For example, the radar distribution interface displays a smart television tag, a smart speaker tag, an air conditioner tag, and a tablet computer (mate pad) tag. After detecting an operation of tapping the smart television tag 4423 by the user, the mobile phone may display a GUI shown in FIG. 44C.

Refer to FIG. 44C. The GUI is an interface 4430 stacked on the display interface 4420, the interface 4430 includes a display interface card 4424 of a smart television, and the display interface card is a current display interface of the smart television.

Optionally, the display interface card further includes several function controls that can be used to control the television, for example, increasing or decreasing volume, or switching a channel. The display interface card may further include a control used to close the display interface card.

Optionally, after the user taps the speaker tag, a control interface or a playback interface of a speaker may be displayed on the mobile phone. After the user taps the air conditioner tag, a control interface of an air conditioner may be displayed on the mobile phone.

Optionally, a location of the display interface card 4424 in the interface 4430 is not specifically limited. The user may freely drag the display interface card 4424 based on a requirement.

According to this embodiment of this application, in an interface in an application, the user may slide downward with a single finger to refresh the interface, and touch and hold the interface with a plurality of fingers to stack, on the original interface in the application, a radar distribution map of tags of all intelligent device that are allowed to be identified around the mobile phone. Therefore, an original layout form of the page is not affected, and a display interface card or a control interface of an intelligent device is displayed in the interface, so that a plurality of intelligent devices can be easily and conveniently controlled.

According to this embodiment of this application, when the user touches and holds any interface with a plurality of fingers, a radar distribution map of tags of all intelligent device that are allowed to be identified around the mobile phone may be displayed in the interface of the mobile phone, to help the user control the intelligent device.

Figure 45A:
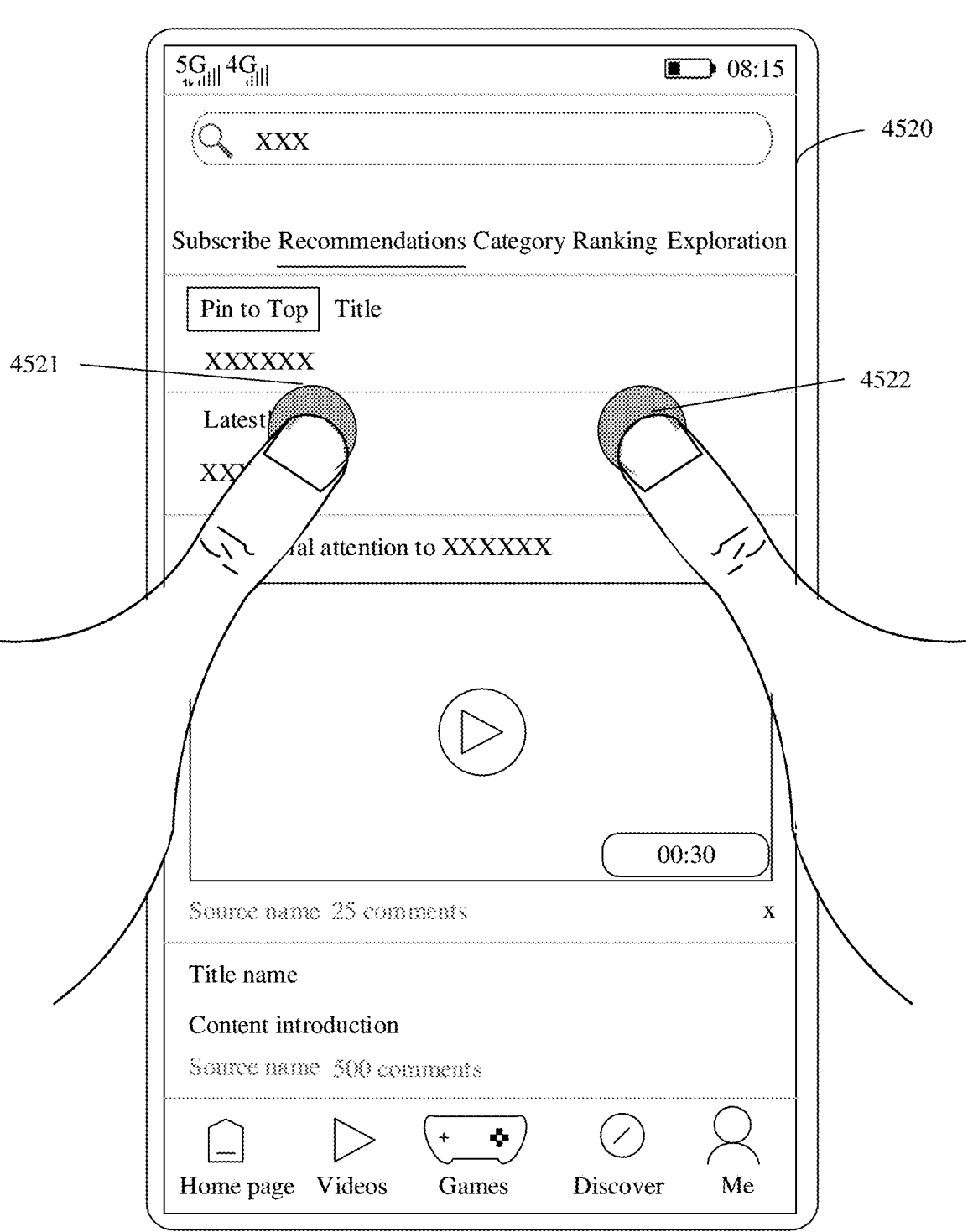
FIG. 45A to FIG. 45C are a schematic diagram of another group of GUIs according to an embodiment of this application.
Figure 45B:
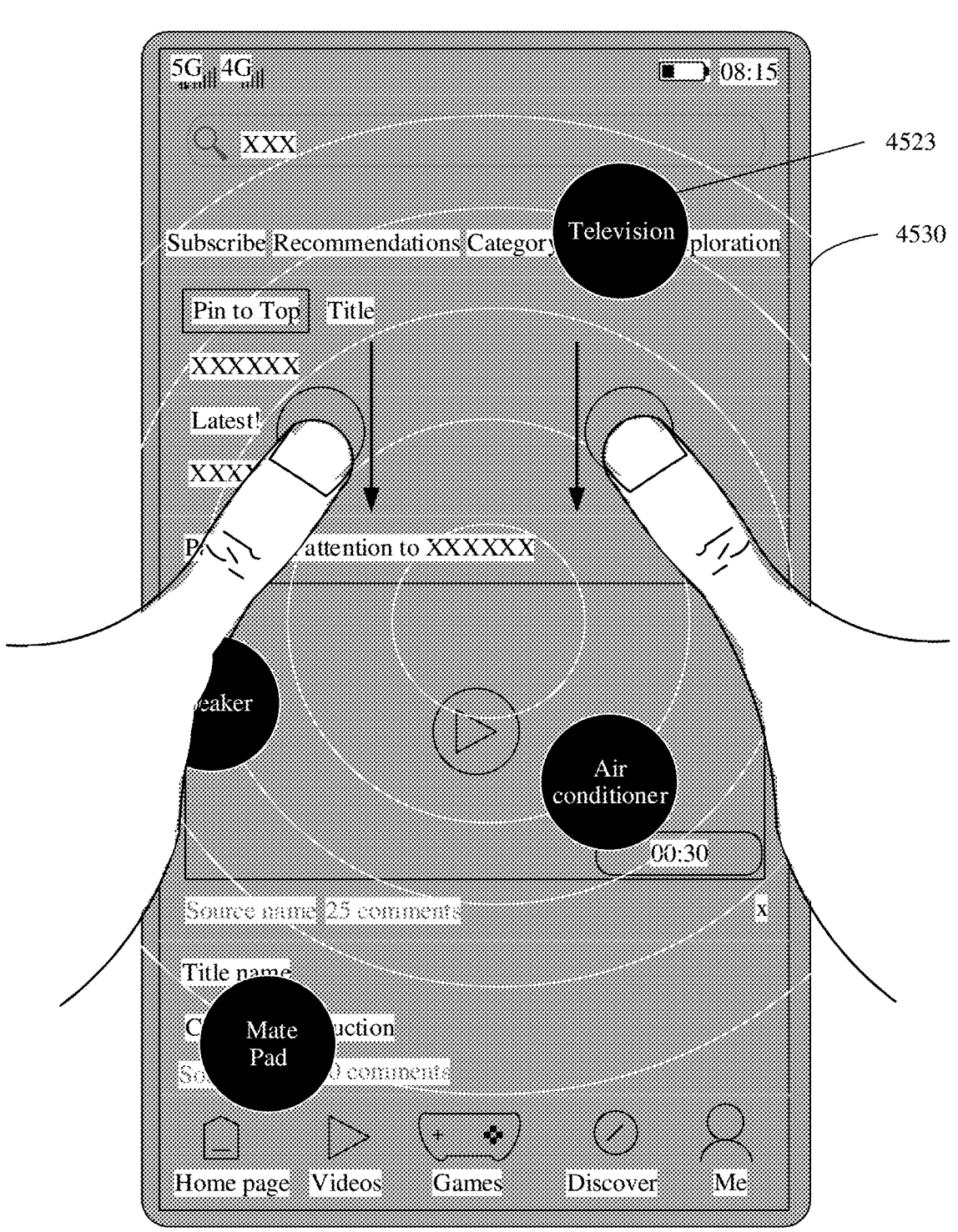
Figure 45C:
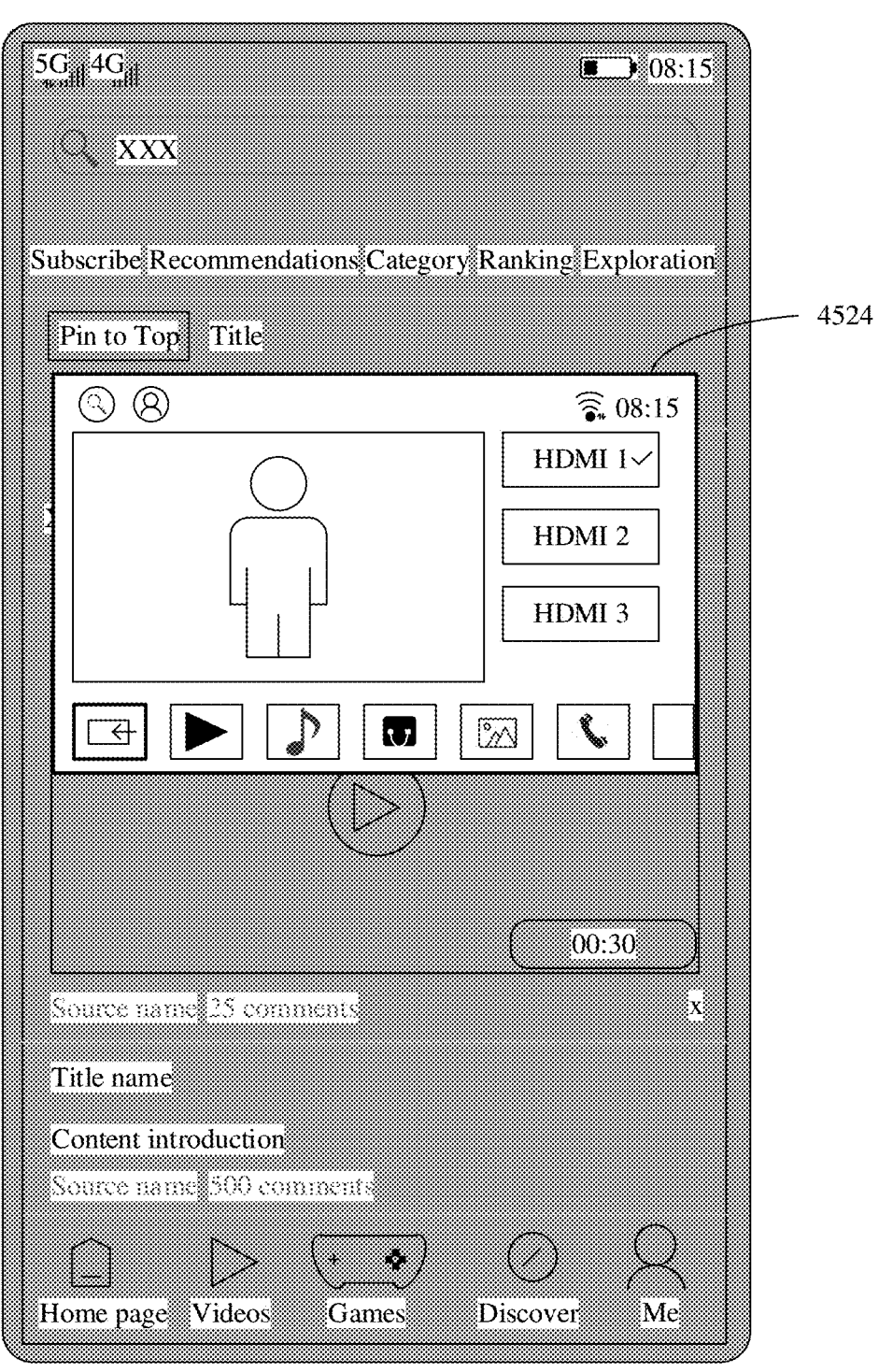

FIG. 45A to FIG. 45C are a schematic diagram of another group of GUIs according to an embodiment of this application. FIG. 45A to FIG. 45C show a process in which a mobile phone interacts with another intelligent device.

For FIG. 45A, refer to related descriptions in FIG. 44A. Details are not described again.

Refer to FIG. 45B. The GUI is a radar distribution interface 4530 that is of intelligent devices allowed to be identified around the mobile phone and that is stacked on the display interface 4520. For example, the radar distribution interface displays a smart television tag, a smart speaker tag, an air conditioner tag, and a tablet computer (mate pad) tag. When detecting that a distance by which a plurality of fingers of the user slide downward in the interface 4530 exceeds a preset distance, the mobile phone may display a GUI shown in FIG. 45C.

In this embodiment of this application, when the user touches and holds an interface in an application with a plurality of fingers to display an interface of a radar distribution tag of a smart television, the fingers of the user may not leave the screen of the mobile phone and directly slide downward, to display the GUI shown in FIG. 45C. Alternatively, when the user touches and holds an interface in an application with a plurality of fingers to display an interface of a radar distribution tag of a smart television, the fingers of the user leave the screen, and then the user performs, on the screen, an operation of sliding the plurality of fingers downward, to display the GUI shown in FIG. 45C.

For FIG. 45C, refer to related descriptions in FIG. 44C. For brevity, details are not described again.

Figure 46A:
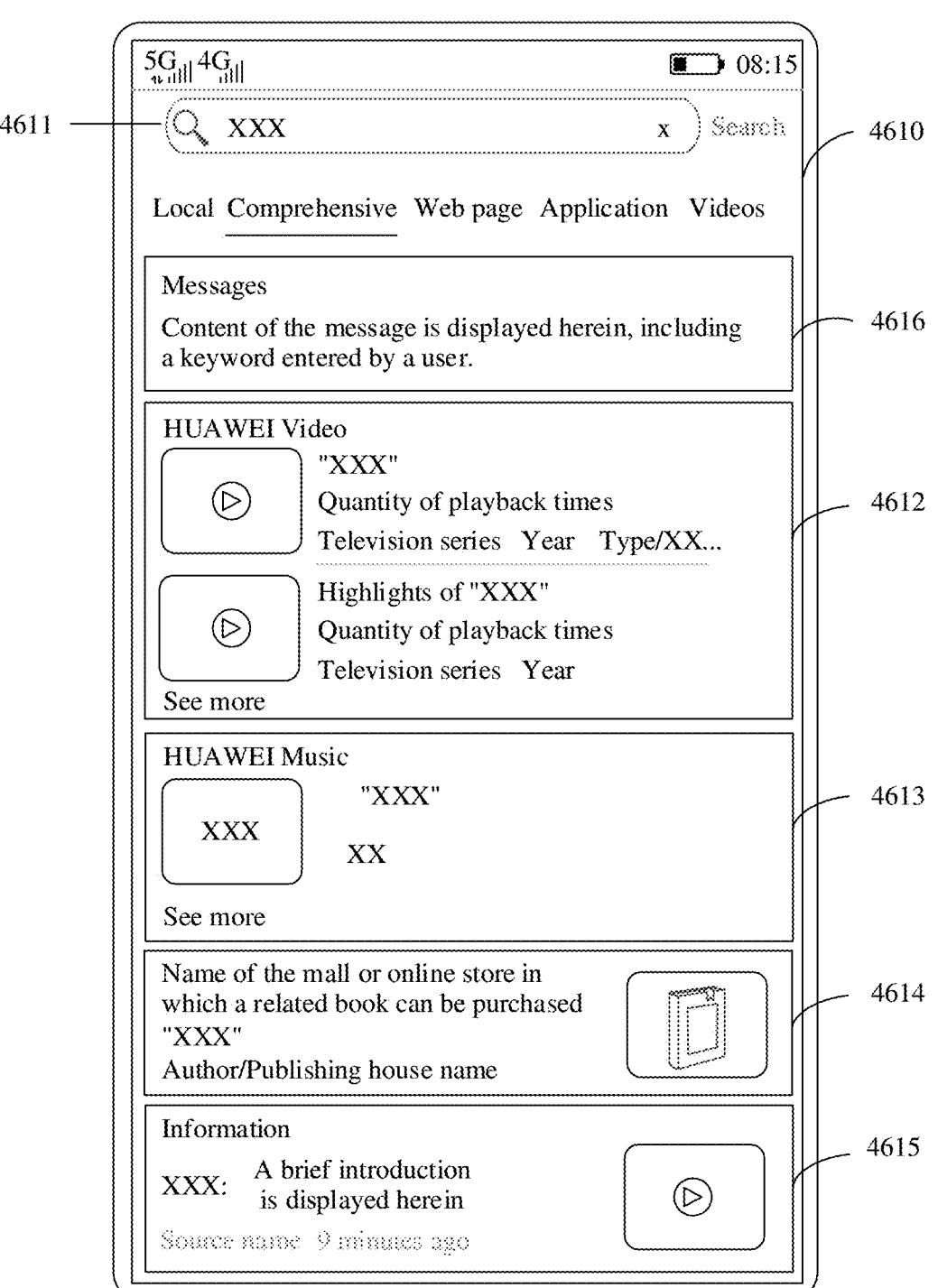
FIG. 46A to FIG. 46C are a schematic diagram of another group of GUIs according to an embodiment of this application.
Figure 46B:
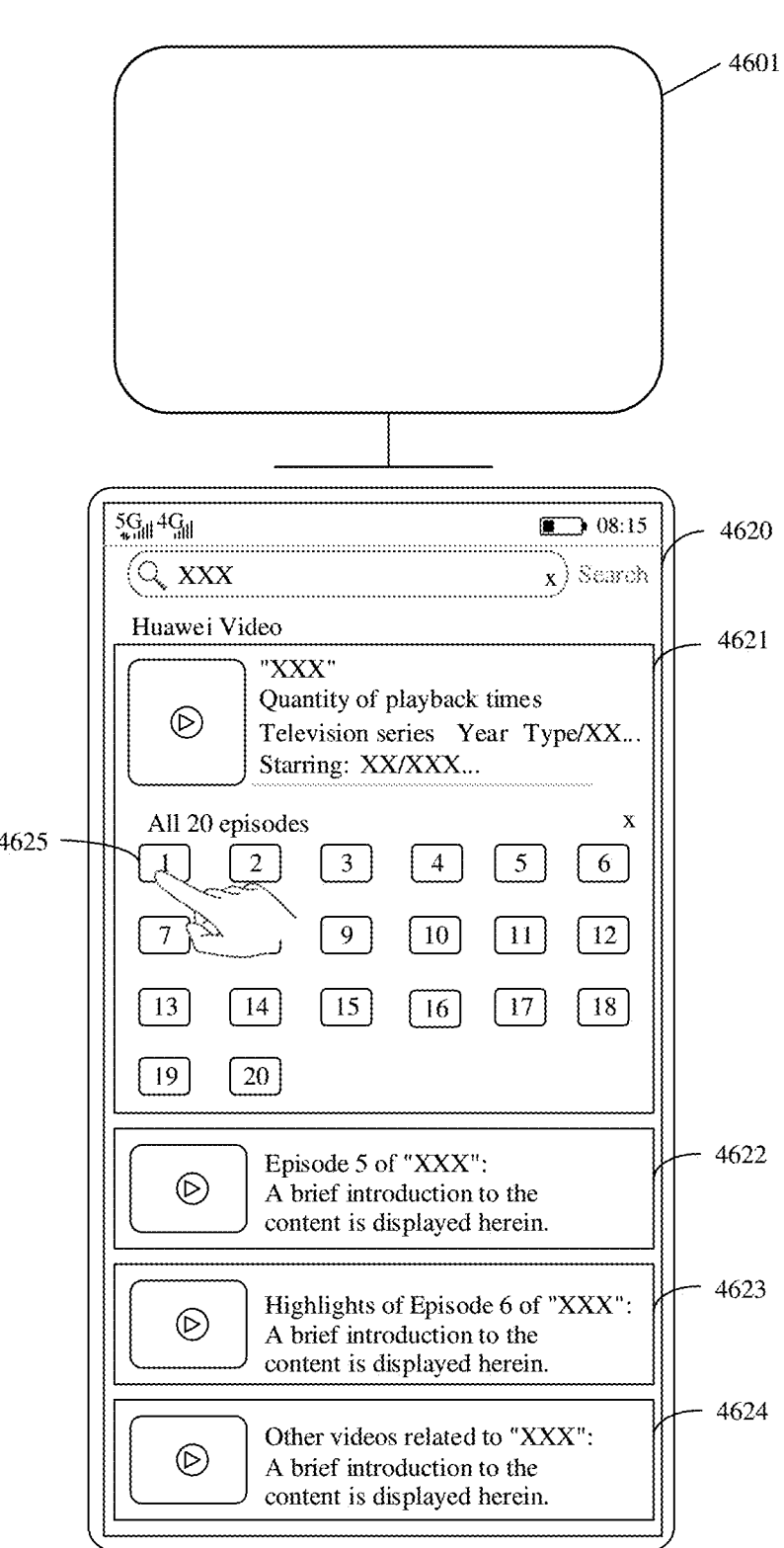
Figure 46C:
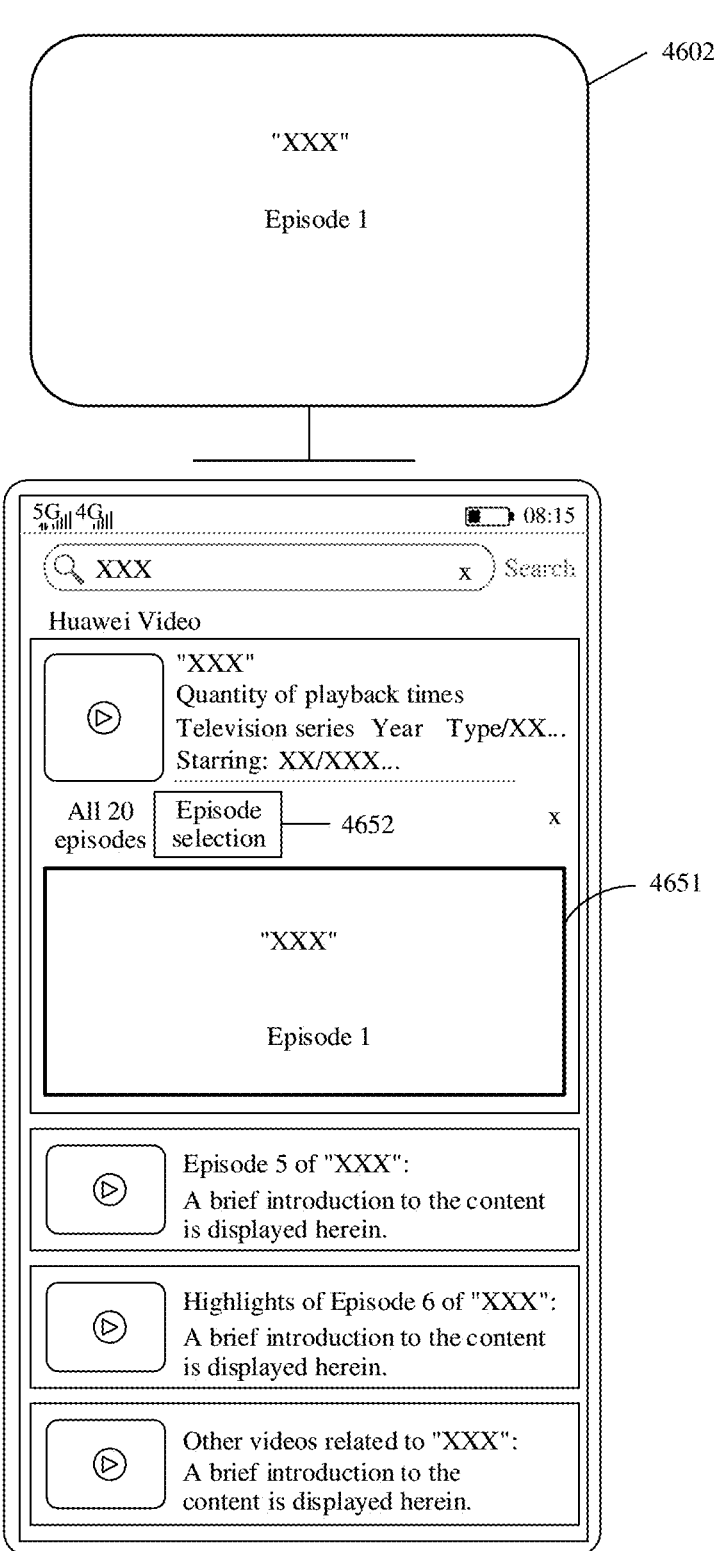

FIG. 46A to FIG. 46C are a schematic diagram of another group of GUIs according to an embodiment of this application. In this embodiment of this application, an intelligent device in a pointing direction of the head of the mobile phone is a smart television.

Refer to FIG. 46A. A GUI is an existing search result display interface 4610 obtained when a user enters a keyword in a search interface for search. After the user enters a keyword in a search box 4611 in the interface and taps Search, the interface may present all found content related to the keyword.

For example, the interface may present a video 4612, an audio 4613, and web page information 4614 and 4615 that are related to the keyword, a purchase link 4613, and a file stored in the mobile phone, for example, Messages 4616. The interface may further preferentially present content stored in the mobile phone, for example, information that is related to the keyword and that is stored in Messages or a memo.

The file stored in the mobile phone may be understood as a file stored in a memory of the mobile phone, for example, an SMS message or a memo.

Refer to FIG. 46B. A GUI is a search result display interface 4620 obtained when the user enters a keyword in a search interface for search when an intelligent device in a pointing direction of the head of the mobile phone is a smart television according to this embodiment of this application. The display interface 4620 may include a plurality of function cards related to a keyword video. In other words, the function cards displayed in the display interface 4620 are related to a capability of the smart television, and the plurality of function cards are located below a search box.

In an example, the television is currently playing a television series. When an intelligent device in a pointing direction of the head of the mobile phone is a smart television, and a keyword entered by the user in the search box in the search interface is a name of the television series, a function card 4621 may be preferentially displayed in the display interface 4620. The function card 4621 is a playback control interface of the television series, and the function card 4621 may include a brief introduction to the television series, a quantity of playback times of the television series, actor information of the television series, a release year of the television series, a playback control of each episode of the television series, and the like. A source of the function card 4621 may be displayed above the function card 4621, for example, Huawei Video. The display interface 4620 may further include a plurality of video content cards 4622, 4623, 4624, and the like that are related to the television series. The plurality of video content cards may be presented below the function card 4621 in a list or stacking form. The user may slide a finger to flip the display interface 4620, to view the plurality of video content cards.

In another example, the television is in an on state, but does not play any program. When the user enters a name of a television series in the search box, a function card 4621 may alternatively be preferentially displayed in the display interface 4620. The display interface 4620 may further include a plurality of video content cards 4622, 4623, 4624, and the like that are related to the television series.

The user may choose, based on a willingness of the user, to play a video. After detecting an operation of tapping a control 4625 by the user, the mobile phone may display a GUI shown in FIG. 46C, and the smart television also displays an episode that is being played and that is selected by the user.

Refer to FIG. 46C. The function card 4621 includes a display interface card 4651 of the smart television, and the display interface card is used to display the episode that is being played and that is selected by the user. The display interface card 4651 may be located in an episode selection area in the function card 4621, and an episode selection control 4652 may be further included above the display interface card 4651. The user may tap the episode selection control to select an episode that expects to be played.

For example, if the control 4625 is a playback control of Episode 1 of the television series, the display interface card 4651 may display a playback interface of Episode 1.

According to this embodiment of this application, when the head of the mobile phone points to another intelligent device, and the user enters a keyword in the search interface for search, a search result in the search interface is related to a capability of the intelligent device. For example, if the intelligent device is a smart television, videos are displayed in the search result, or if the intelligent device is a smart speaker, audios are displayed in the search result. When the user points the mobile phone to the smart television, the user may expect to obtain a video through search. Therefore, in this embodiment of this application, it can be convenient for the user to search for a related video.

FIG. 47A to FIG. 47D are a schematic diagram of another group of GUIs according to an embodiment of this application.

Figure 47A:
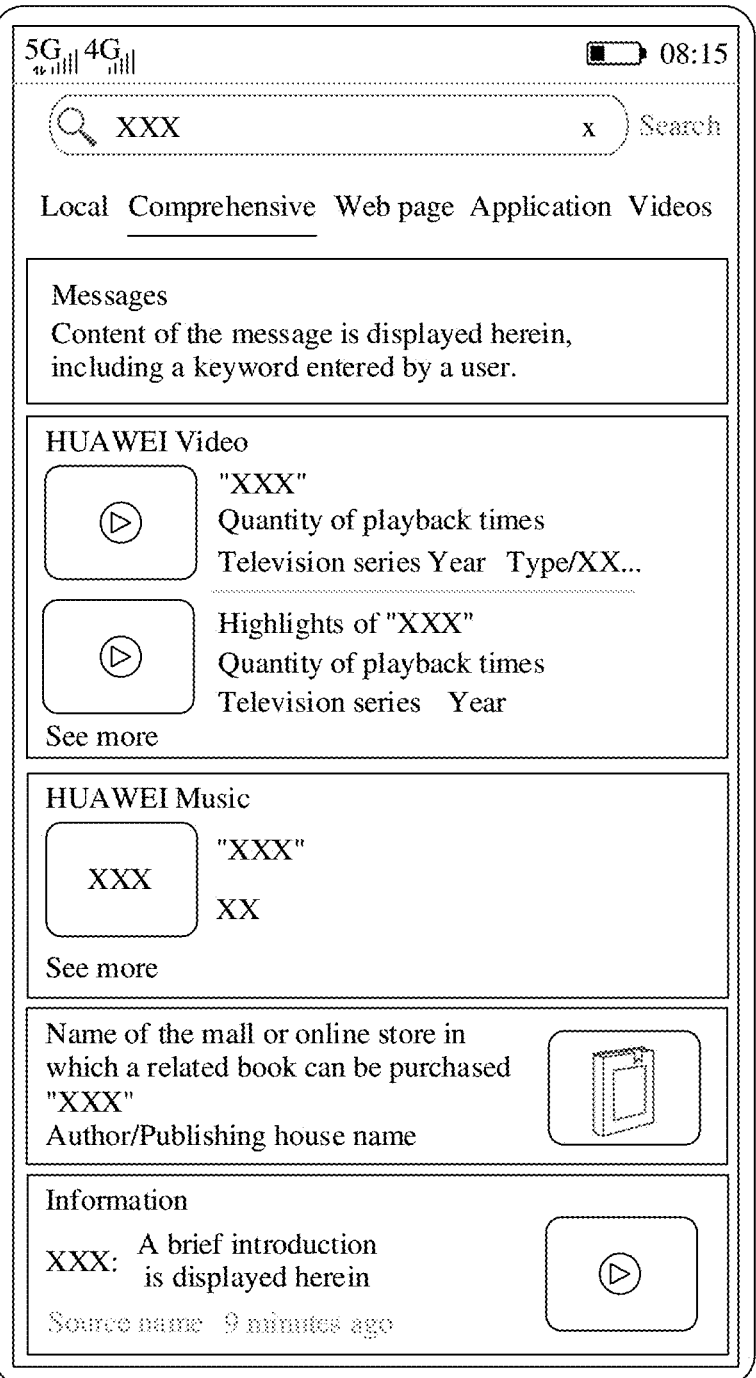
FIG. 47A to FIG. 47D are a schematic diagram of another group of GUIs according to an embodiment of this application.
Figure 47B:
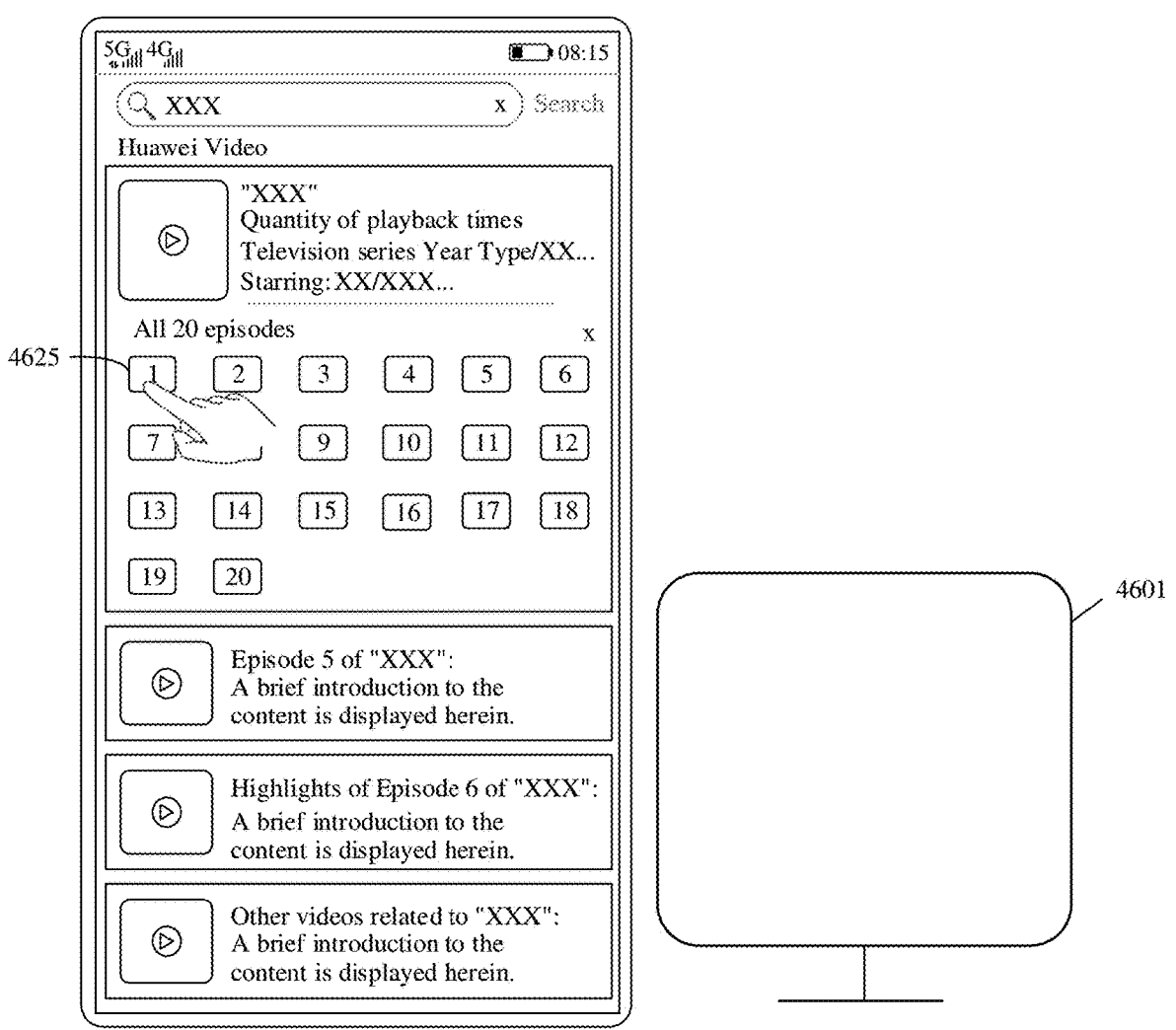

For FIG. 47A and FIG. 47B, refer to related descriptions in FIG. 46A and FIG. 46B.

Figure 47C:
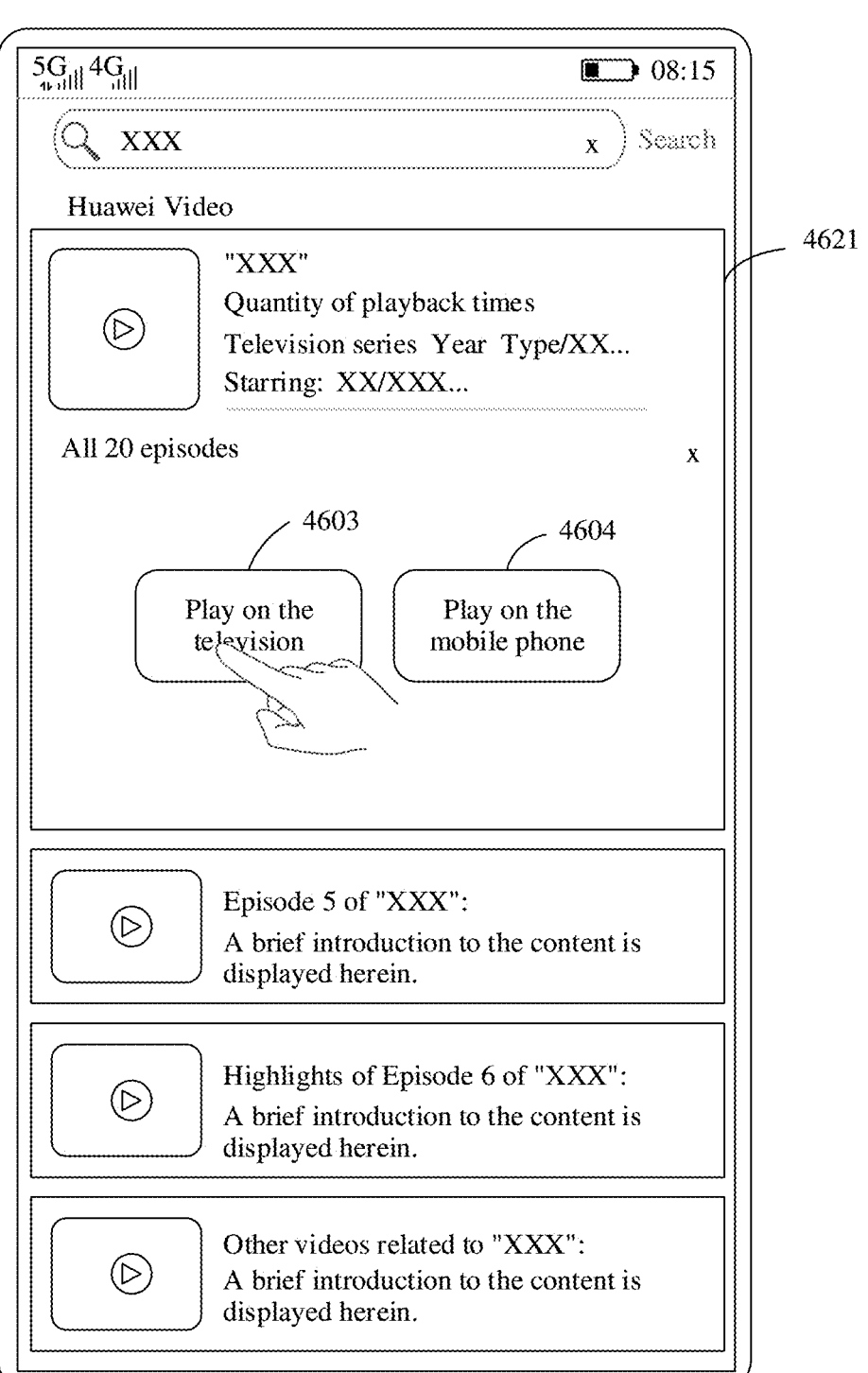

Refer to FIG. 47C. In response to tapping a control of a selected episode by the user, a prompt box 4603 of "Play on the television" and a prompt box 4604 of "Play on the mobile phone" may be displayed in the function card 4621, so that the user chooses to play the selected episode on a specified device. The prompt boxes 4603 and 4604 may be located in an episode selection area in the function card 4621.

Figure 47D:
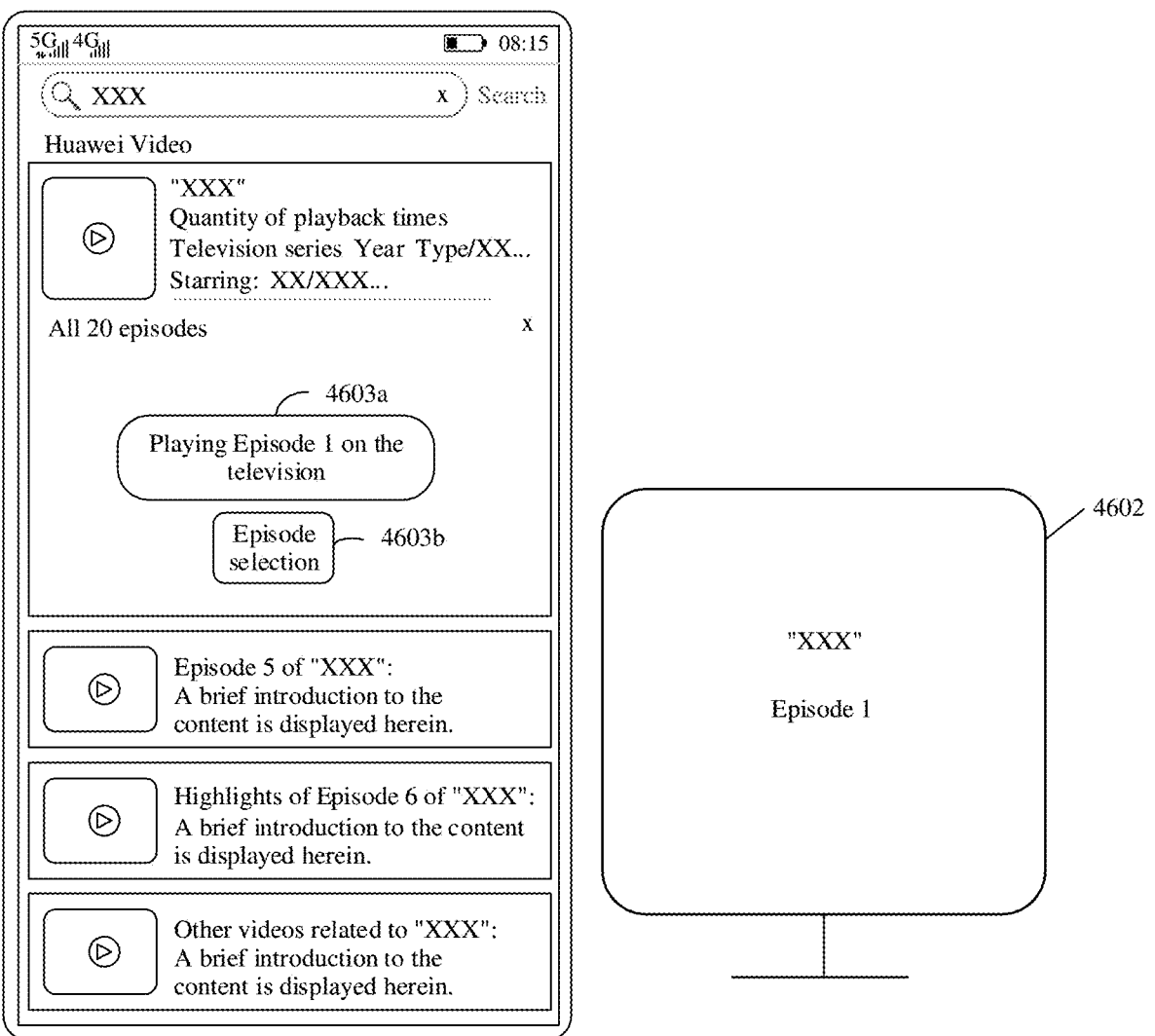

For example, after detecting an operation that the user taps the prompt box 4603 of "Play on the television", the mobile phone may display a GUI shown in FIG. 47D, and the selected episode is played in a display interface 4602 of the smart television.

Refer to FIG. 47D. A prompt box 4603*a* used to prompt the currently played episode selected by the user may be displayed in the interface 4621. For example, the prompt box 4603*a* displays "Playing Episode 1 on the television". The interface 4621 may further include a prompt box 4603*b* used by the user to select an episode. For example, the episode selection prompt box 4603*b* displays "Episode selection".

Optionally, after the user taps the prompt box 4604 of "Play on the mobile phone", the selected episode may be played in the interface 4621.

In this embodiment of this application, after finding a related video in the search interface, the user may flexibly choose to play the video on the mobile phone or the television.

Figure 48A:
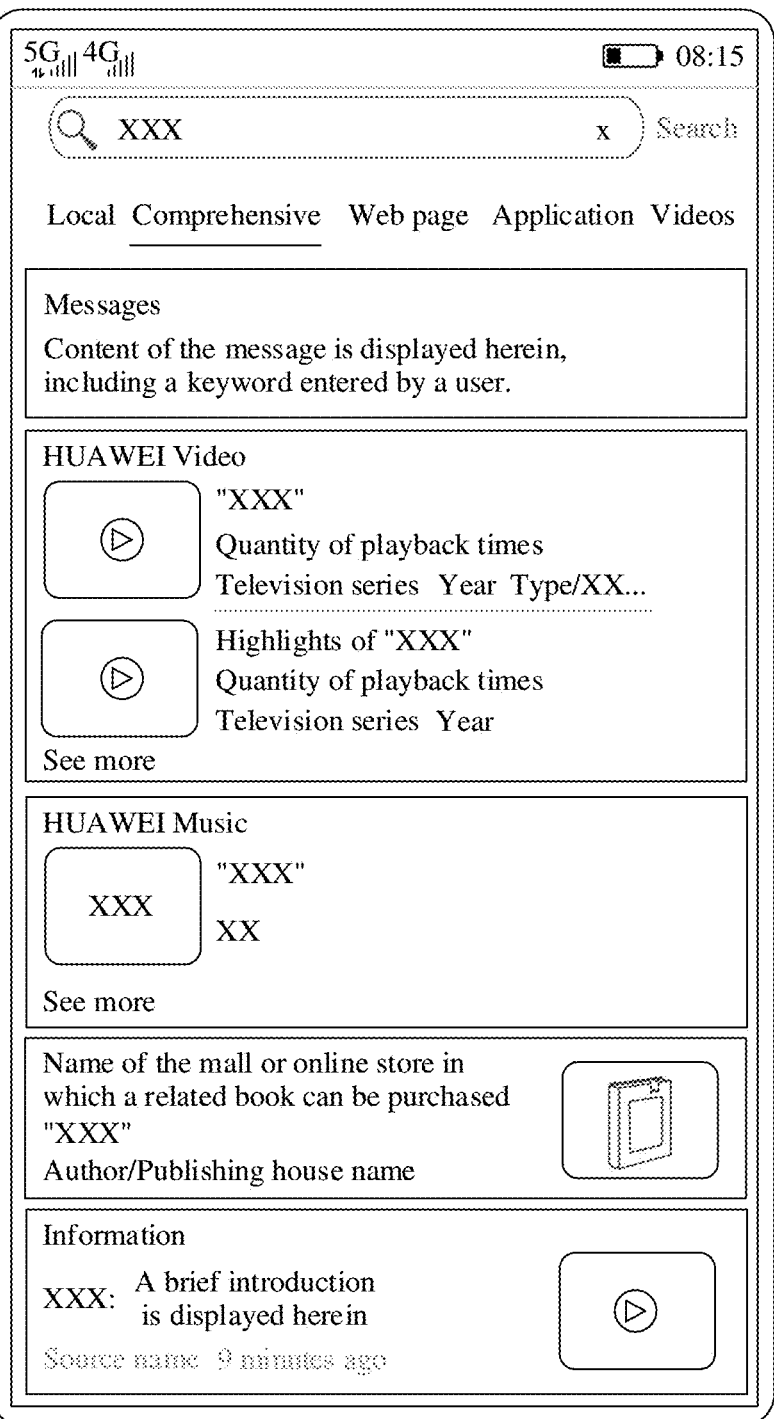
FIG. 48A to FIG. 48C are a schematic diagram of another group of GUIs according to an embodiment of this application.
Figure 48B:
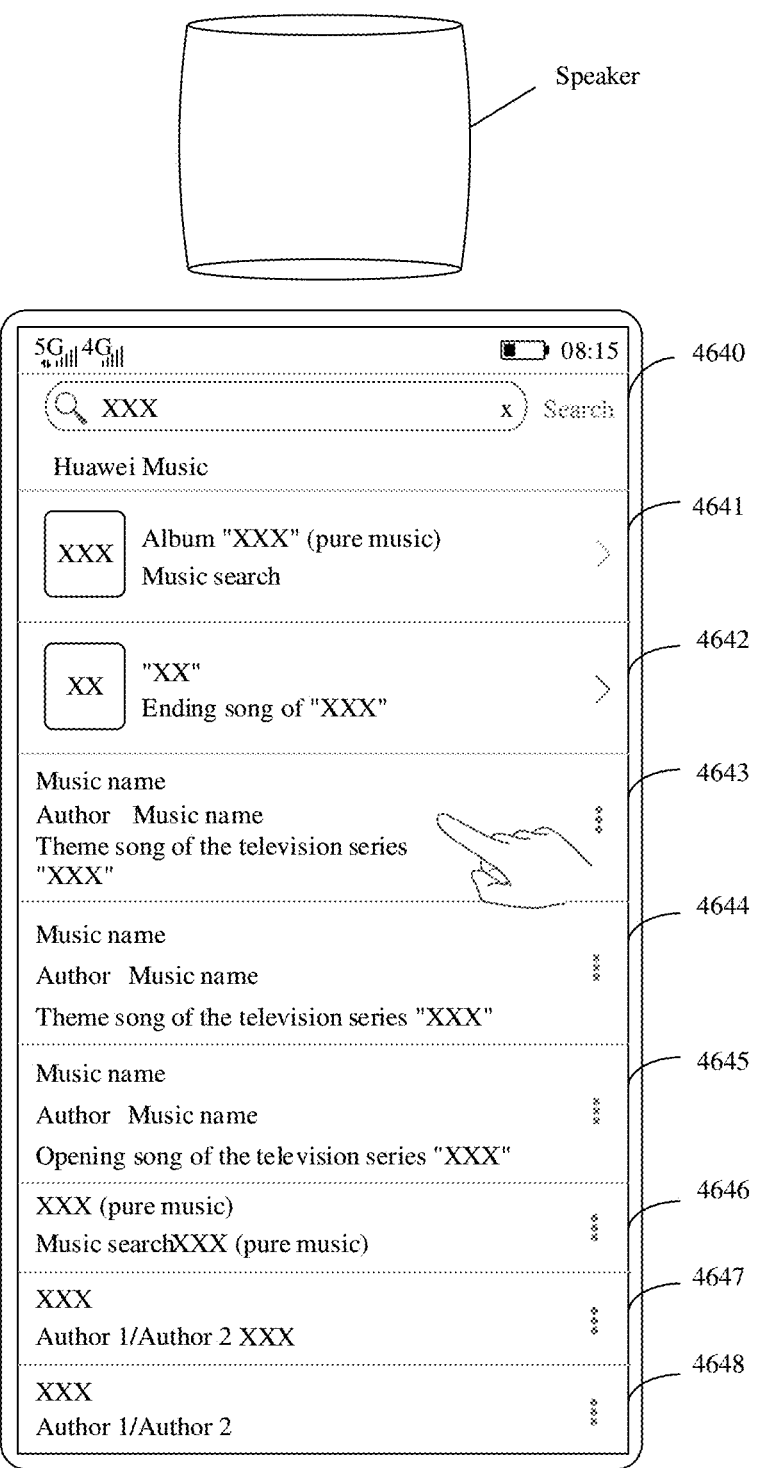
Figure 48C:
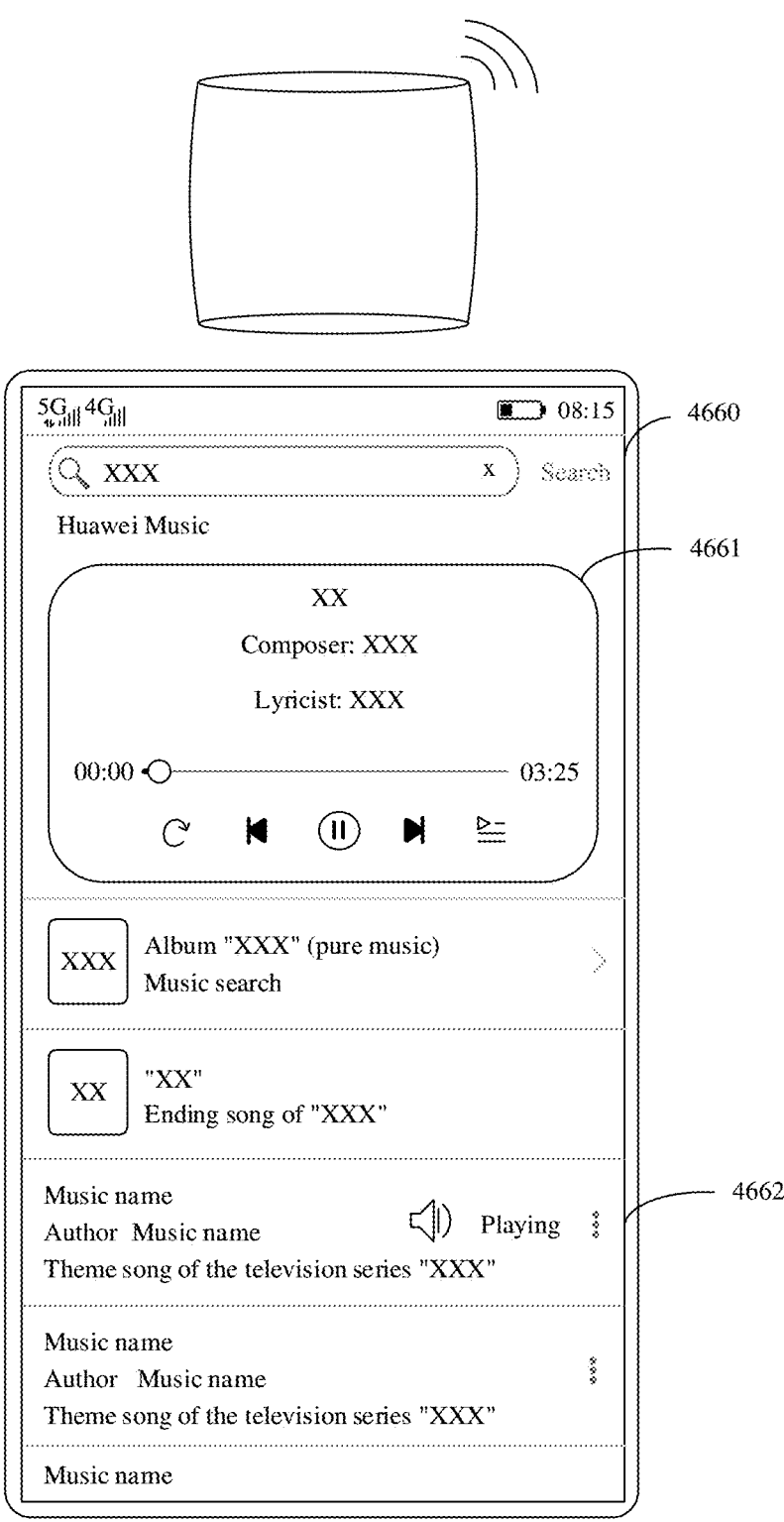

FIG. 48A to FIG. 48C are a schematic diagram of another group of GUIs according to an embodiment of this application. In this embodiment of this application, an intelligent device to which the head of the mobile phone points is a smart speaker.

For FIG. 48A, refer to related descriptions in FIG. 47A.

Refer to FIG. 48B. A GUI is a search result display interface 4640 obtained when the user enters a keyword in a search interface for search when an intelligent device to which the head of the mobile phone points is a smart speaker according to this embodiment of this application. The display interface 4640 may include a plurality of function cards related to a keyword audio. In other words, the function cards displayed in the display interface 4640 are related to a capability of the smart speaker, and the plurality of function cards are located below a search box.

In an example, when the user expects to hear music related to a television series, the user may enter a name of the television series in the search interface, that is, the keyword is the name of the television series. In this case, a plurality of audio content cards 4641, 4642, 4643, 4644, 4645, 4646, 4647, 4648, and the like related to the keyword may be displayed in the display interface 4640, and the audio content cards may include music or pure music whose name is the keyword, a theme song, an opening song, and an ending song of the television series whose name is the keyword, and the like. The plurality of audio content cards may be presented in the display interface 4640 in a list or stacking form, and sources of the plurality of audio content cards may be further displayed above the plurality of audio content cards, for example, Huawei Music.

In another example, if the user enters a name of music in the search interface, a plurality of different versions of the music may be displayed in the display interface 4640 for user selection.

In another example, if the smart speaker is playing music, a control interface of the music currently played on the smart speaker may be preferentially displayed in the display interface 4640. The control interface may display lyrics and a playback progress of the currently played music, and display function controls such as a music playback manner, music switching, pause, and a playlist below the playback progress. The user may tap some controls in the card to control the smart speaker to perform operations such as music playback, switching, and playback manner settings. The display interface 4640 may further display a plurality of audio content cards related to the music.

The user may choose, based on a willingness of the user, to play music. When detecting that the user taps a card, for example, the audio content card 4643, the mobile phone may display a GUI shown in FIG. 48C, and the smart speaker starts to play the music selected by the user.

Refer to FIG. 48C. A display interface 4660 includes a playback display interface 4661 of the selected audio content card 4643. The playback display interface 4661 includes lyrics, playback duration, and the like of the music, and may further include several controls, so that the user can control play/pause, switching to a previous song, switching to a next song, a playback manner, a playlist, and the like. An audio content card 4662 may display an icon and "Playing" used to prompt the user that music is being played, to prompt the user to know the currently played music.

According to this embodiment of this application, when the head of the mobile phone points to another intelligent device, and the user enters a keyword in the search interface for search, a search result in the search interface is related to a capability of the intelligent device. When the user points the mobile phone to a smart speaker, the user may expect to obtain an audio through search. Therefore, in this embodiment of this application, it can be convenient for the user to search for a related audio.

According to this embodiment of this application, when the smart speaker is playing music, the user may enter, in the search interface, a name of the music that is being played. In this case, a control interface of the music that is currently being played is preferentially presented in the search result, to help the user control the music that is being played on the smart speaker.

FIG. 49A to FIG. 49D are a schematic diagram of another group of GUIs according to an embodiment of this application. In this embodiment of this application, an intelligent device to which the head of the mobile phone points is a smart speaker.

Figure 49A:
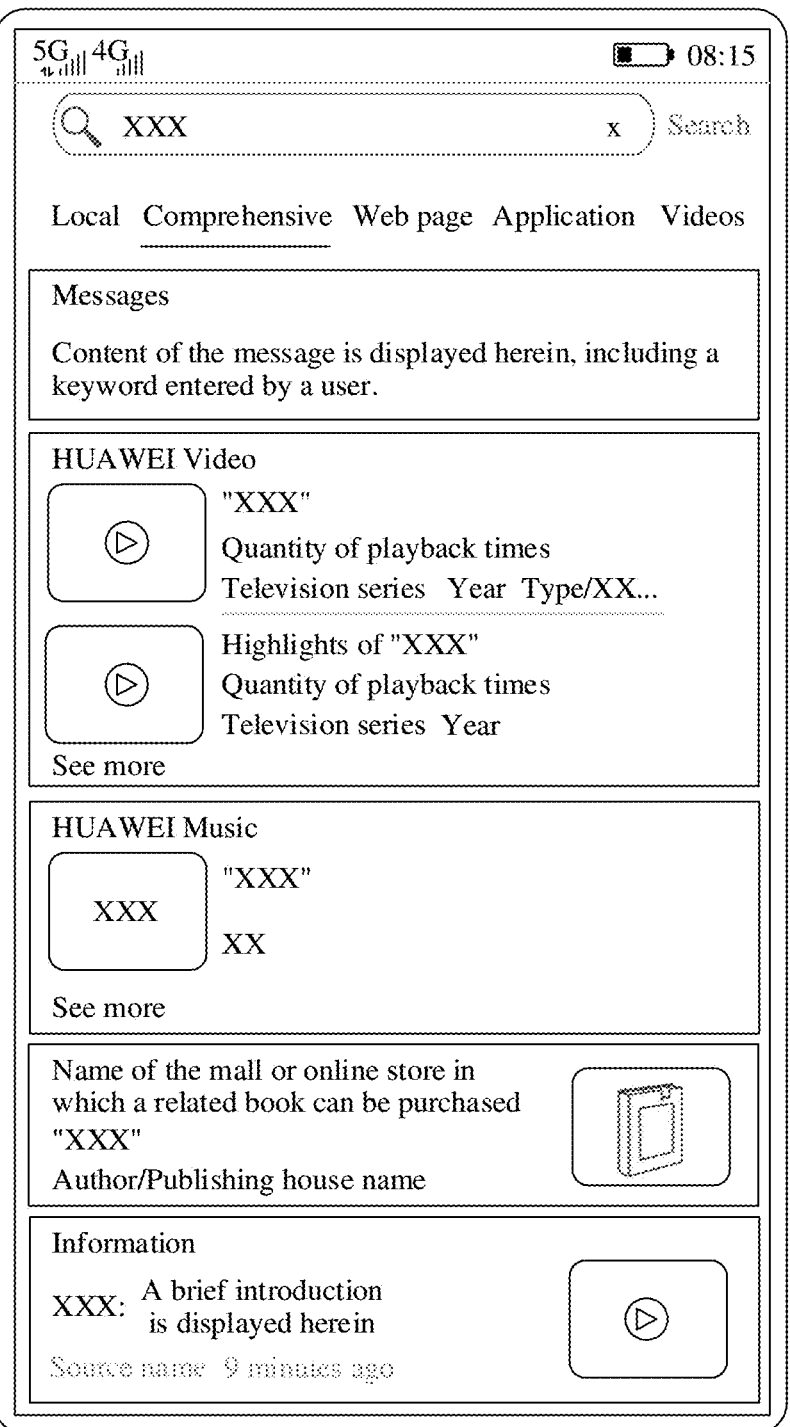
FIG. 49A to FIG. 49D are a schematic diagram of another group of GUIs according to an embodiment of this application.
Figure 49B:
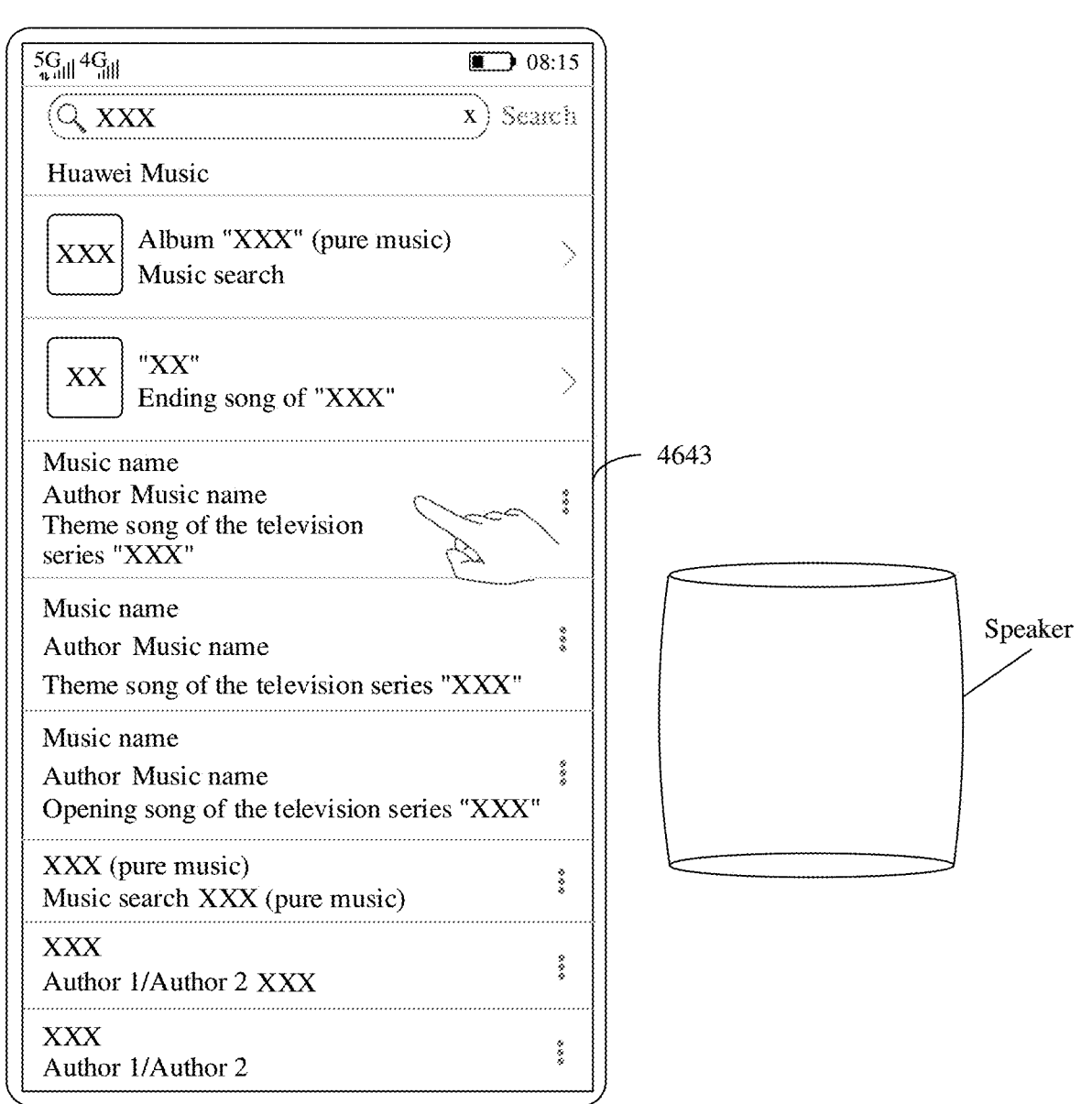

For FIG. 49A, refer to related descriptions in FIG. 47A. For FIG. 49B, refer to related descriptions in FIG. 48B.

Figure 49C:
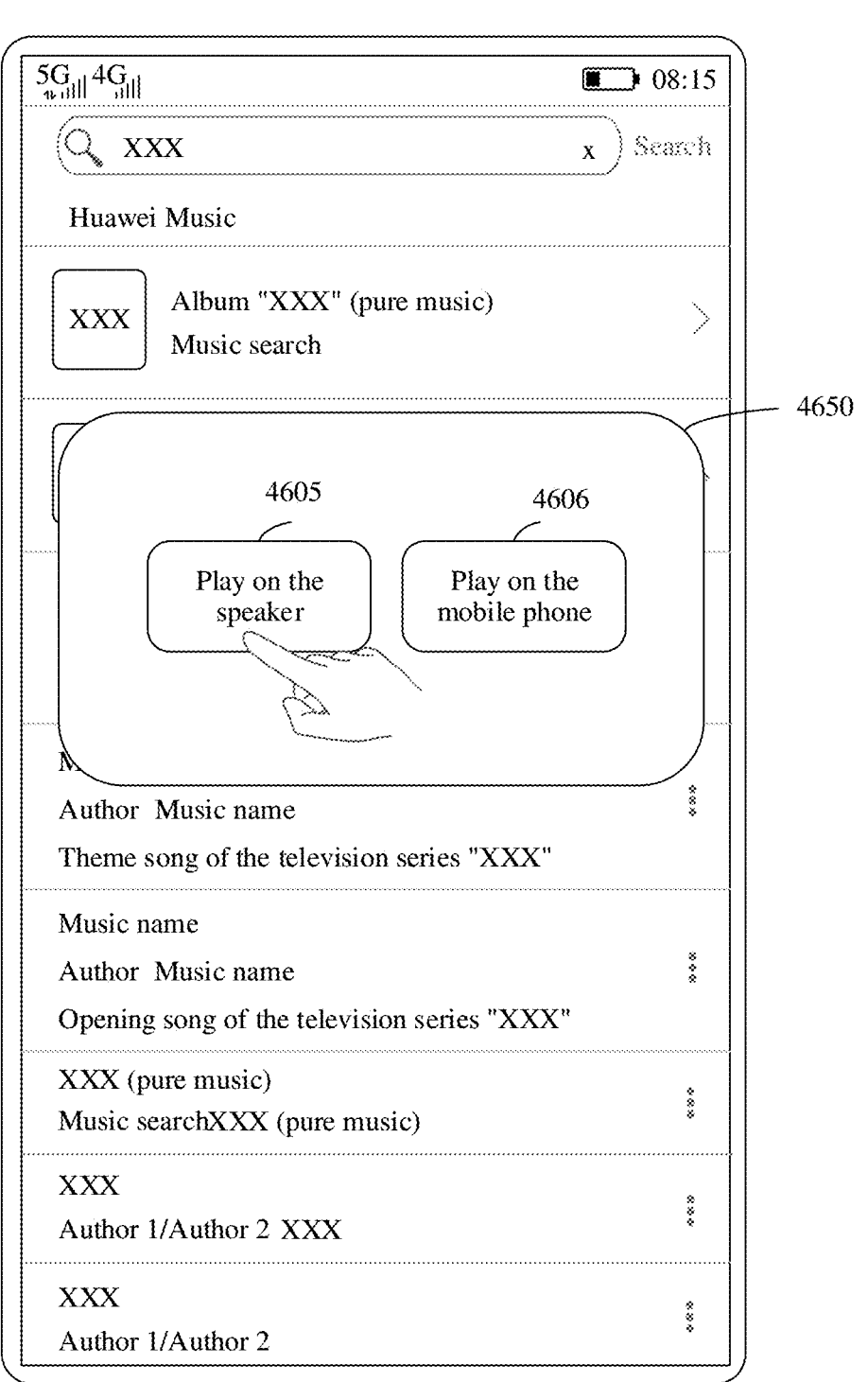

Refer to FIG. 49C. In response to an operation of tapping the audio content card 4643 by the user, the mobile phone pops up a prompt card 4650. The prompt card 4650 may be stacked on the search result interface. The prompt card 4650 may include a prompt box 4605 of "Play on the speaker" and a prompt box 4606 of "Play on the mobile phone", so that the user chooses to play the selected music on a specified device.

It should be understood that the user may freely drag the card 4650 based on a requirement.

For example, after detecting an operation of tapping the prompt box 4605 of "Play on the speaker", the mobile phone may display a GUI shown in FIG. 49(*d*), and the smart speaker starts to play the selected music.

Figure 49D:
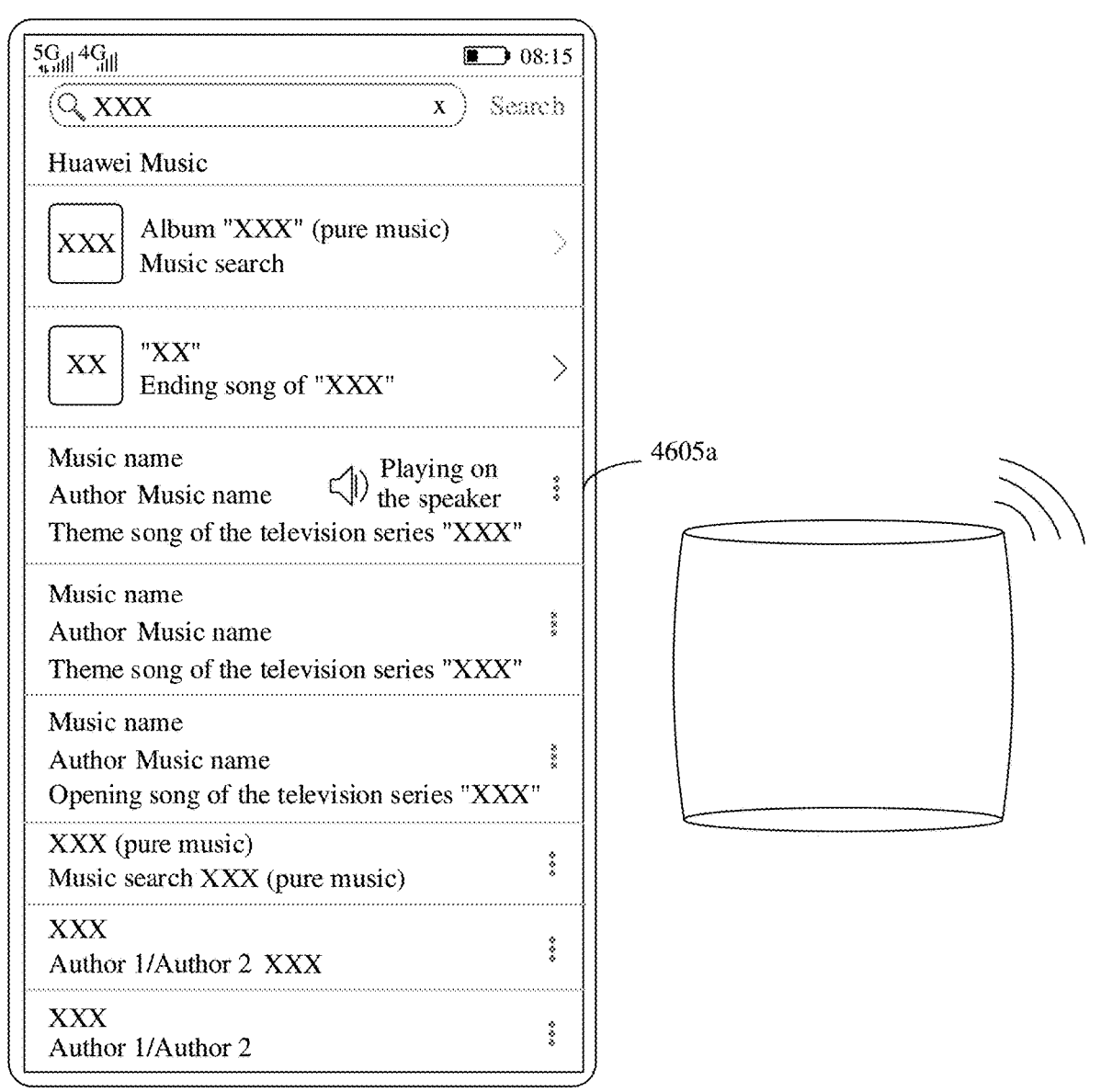

Refer to FIG. 49D. "Playing on the speaker" is displayed on a card 4605*a*, to prompt the user with music that is currently being played.

Optionally, after the user taps the prompt box 4606 of "Play on the mobile phone", "Playing on the mobile phone" may be displayed on the card 4605*a*.

In this embodiment of this application, after finding a related audio in the search interface, the user may flexibly choose to play the audio on the mobile phone or the speaker.

Figure 50A:
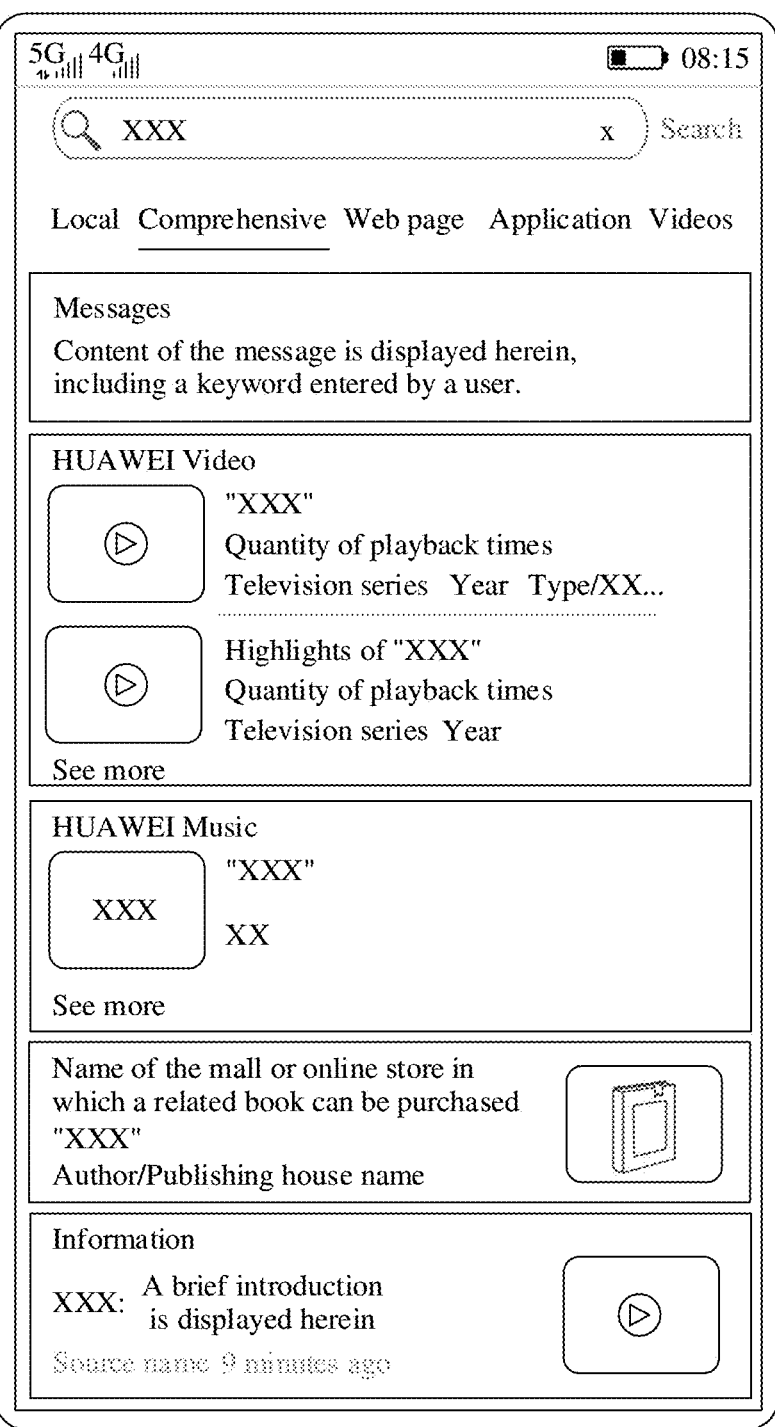
FIG. 50A to FIG. 50C are a schematic diagram of another group of GUIs according to an embodiment of this application.
Figure 50B:
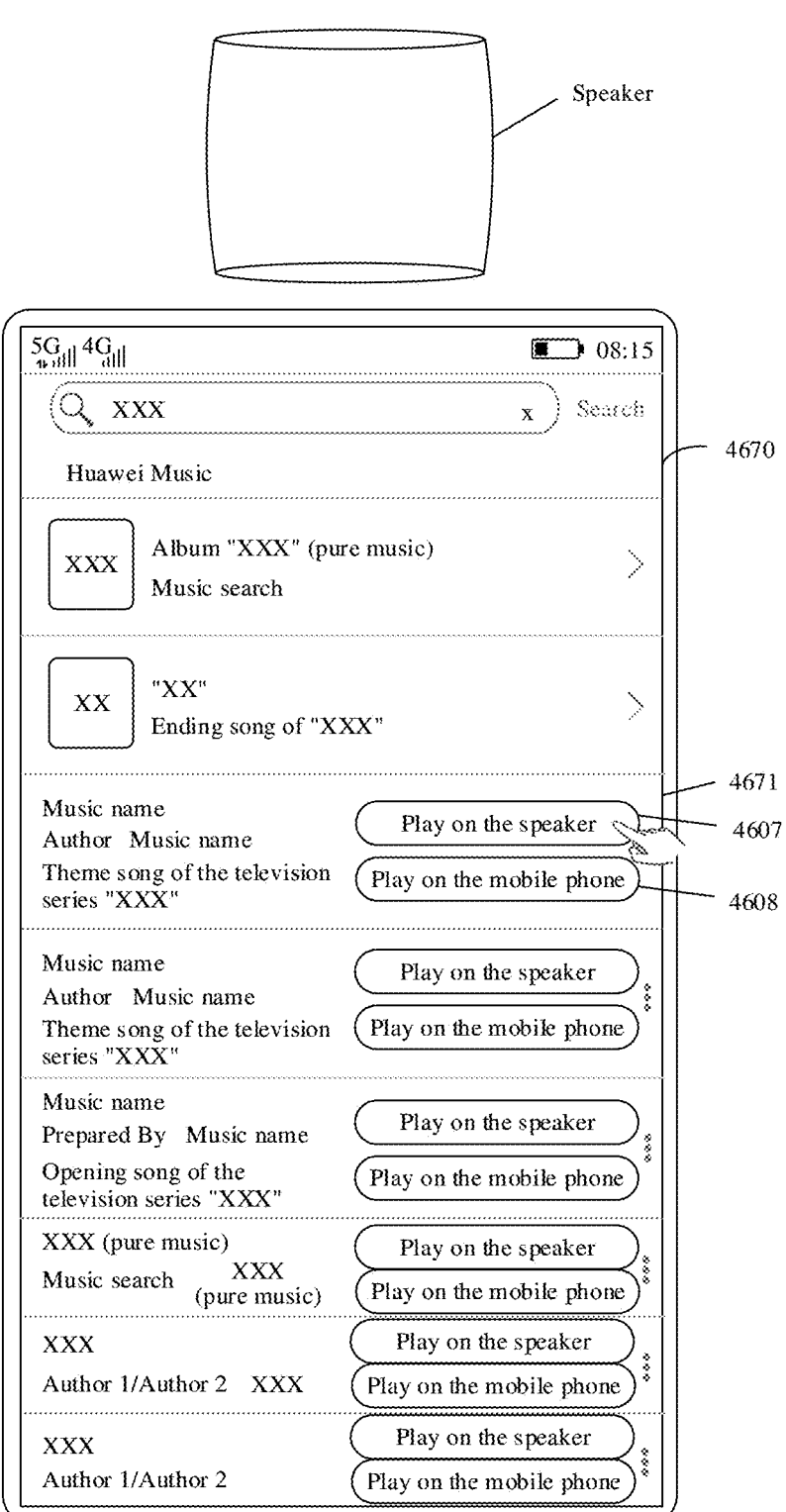
Figure 50C:
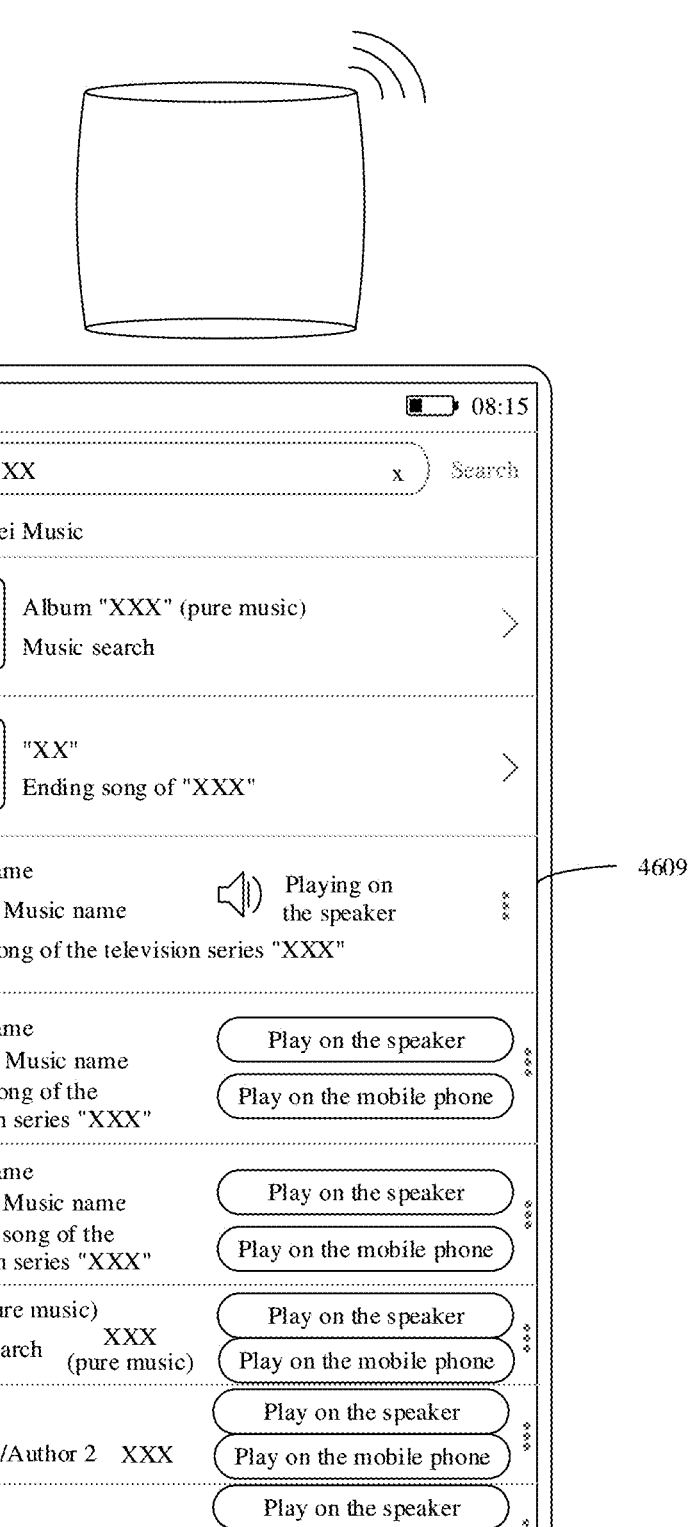

FIG. 50A to FIG. 50C are a schematic diagram of another group of GUIs according to an embodiment of this application. In this embodiment of this application, an intelligent device to which the head of the mobile phone points is a smart speaker.

For FIG. 50A, refer to related descriptions in FIG. 47A.

Refer to FIG. 50B. A GUI is a search result display interface 4670 obtained when the user enters a keyword in a search interface for search when an intelligent device to which the head of the mobile phone points is a smart speaker according to this embodiment of this application. The display interface 4670 may include a plurality of function cards related to a keyword audio. In other words, the function cards displayed in the display interface 4670 are related to a capability of the smart speaker. The function cards are audio content cards, and the plurality of audio content cards are located below the search box.

For example, in addition to information such as a name and an author of the music, an audio content card 4671 further includes a prompt box selected by the user for playback on a specified device, for example, includes a prompt box 4607 of "Play on the speaker" and a prompt box 4608 of "Play on the mobile phone".

The user may choose, based on a willingness of the user, to play music, and may select a specified device for playback. When detecting that the user taps a prompt box that is in a card and that is used for playback on a specified device, for example, when detecting that the user taps the prompt box 4607 of "Play on the speaker" in the audio content card 4671, the mobile phone may display a GUI shown in FIG. 50C, and the smart speaker starts to play the music selected by the user.

Refer to FIG. 50C. An audio content card 4609 may display "Playing on the speaker", to prompt the user with music that is currently being played.

Optionally, after the user taps the prompt box 4608 of "Play on the mobile phone", "Playing on the mobile phone" may be displayed on the card 4609.

In this embodiment of this application, after finding a related audio in the search interface, the user may flexibly choose to play the audio on the mobile phone or the speaker.

Figure 51A:
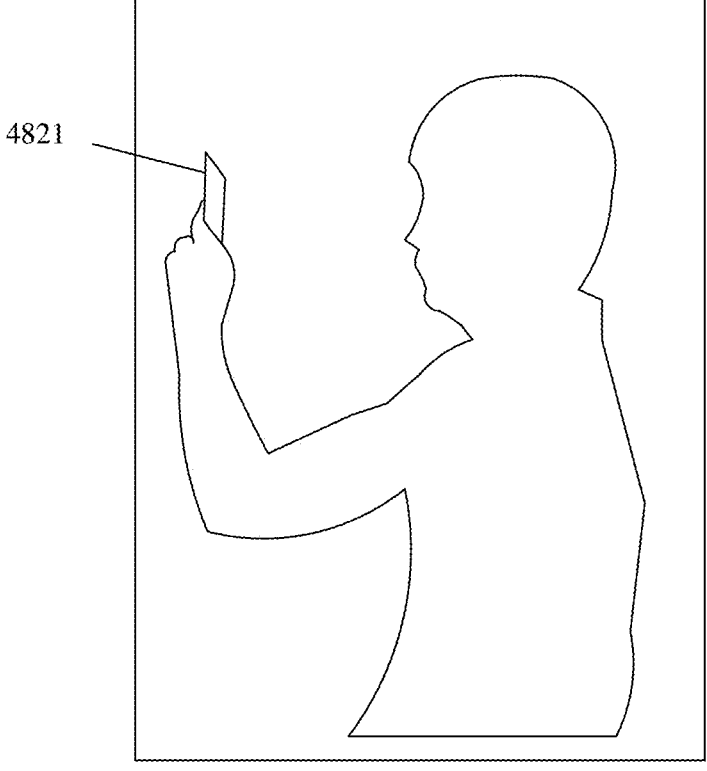
FIG. 51A to FIG. 51C are a schematic diagram of another group of GUIs according to an embodiment of this application.
Figure 51B:
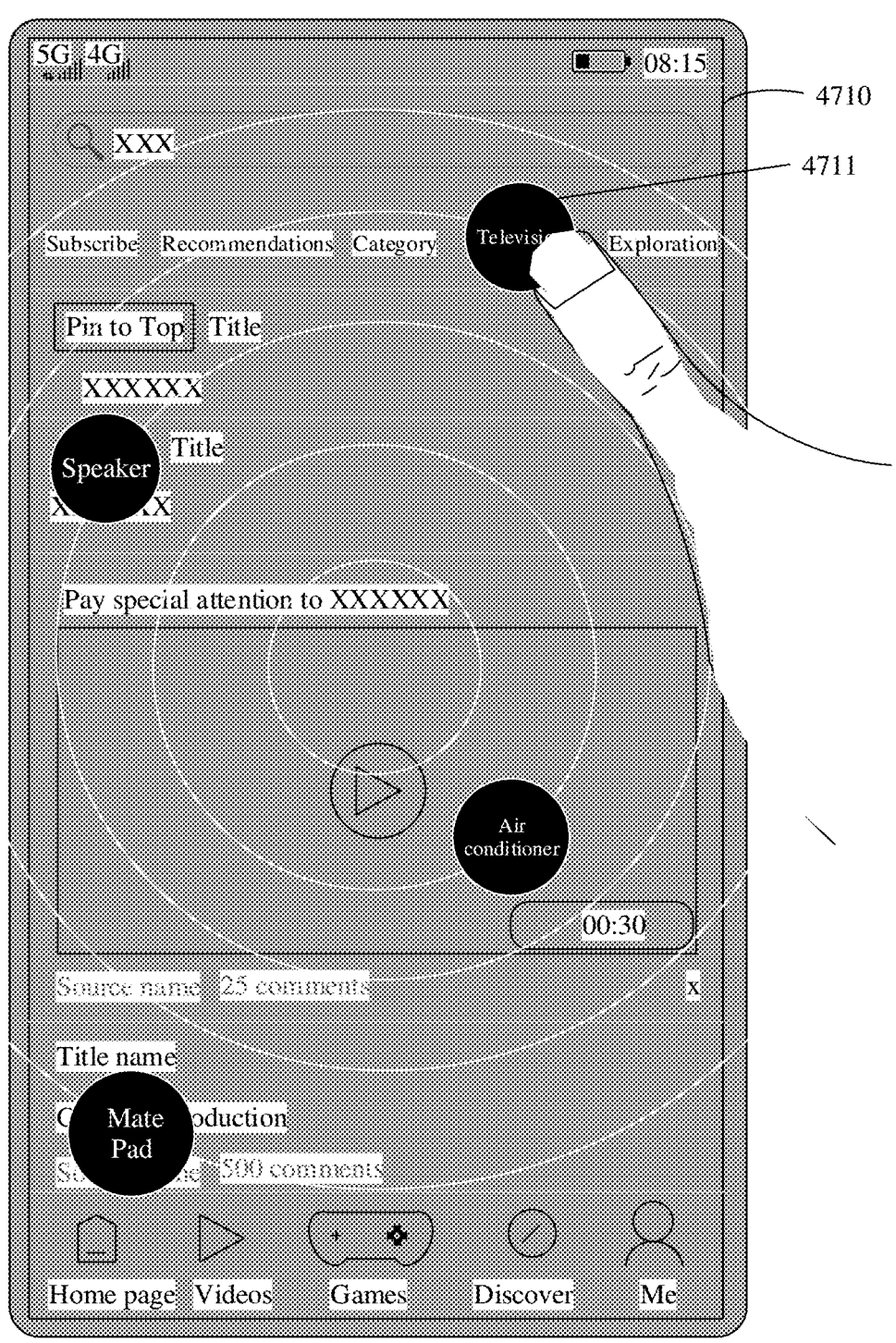
Figure 51C:
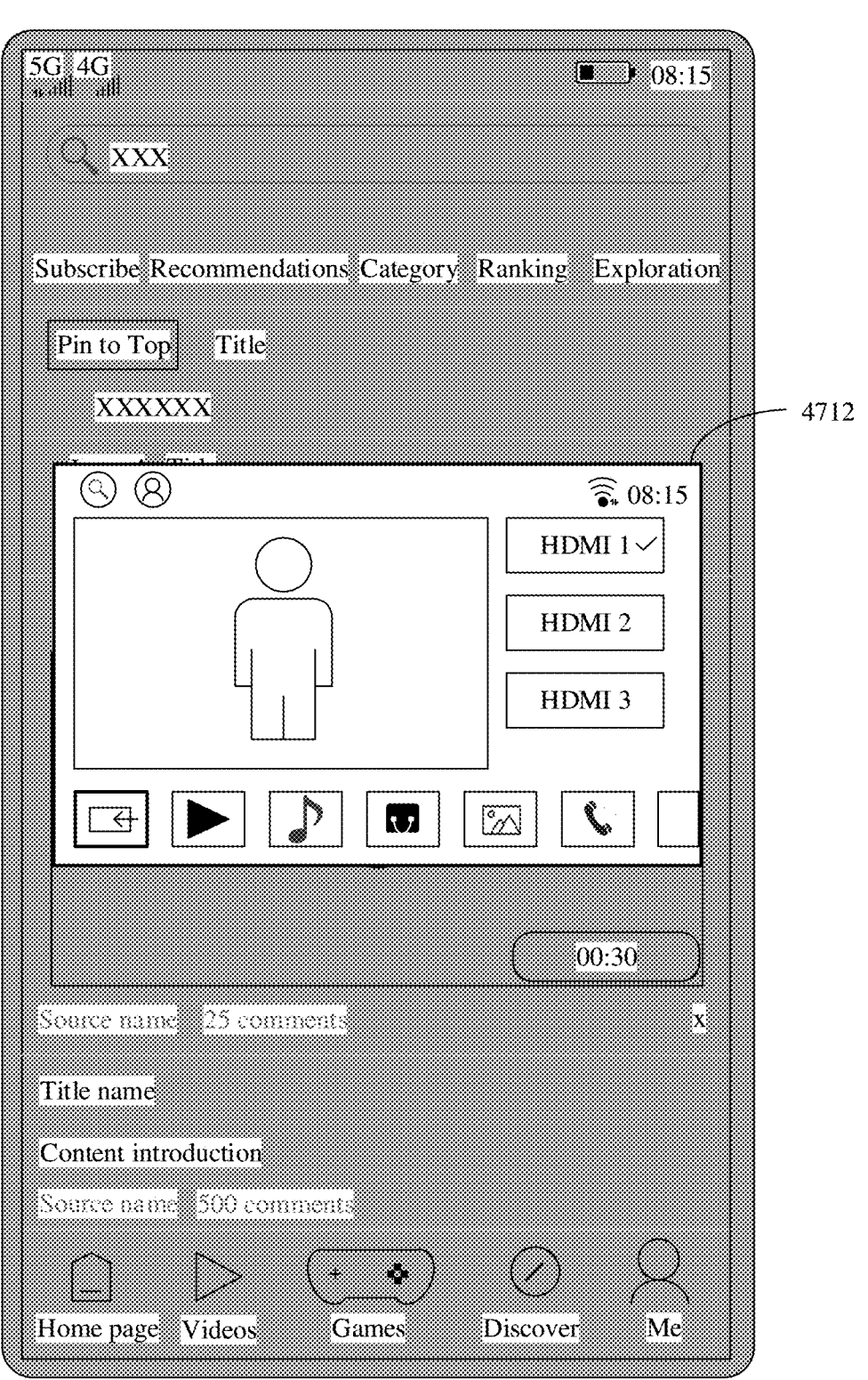

FIG. 51A to FIG. 51C are a schematic diagram of another group of GUIs according to an embodiment of this application.

Refer to FIG. 51A. When detecting that a mobile phone 4821 is picked up by the user and held in a vertical state, the mobile phone 4821 may display a GUI shown in FIG. 51B.

It should be understood that components such as a gravity sensor and a gyro in the mobile phone may determine whether the mobile phone is in a vertical state.

Refer to FIG. 51B. The GUI is a display interface 4710 in an application and a radar distribution interface stacked on the interface 4710. The radar distribution interface represents distribution of all intelligent devices that can be allowed to be identified around the mobile phone 4821, and displays tags of the intelligent devices, for example, a smart television tag 4711, a smart speaker tag, an air conditioner tag, and a tablet computer (mate pad) tag. When detecting that the user taps a tag, for example, the smart television tag 4711, the mobile phone may display a GUI shown in FIG. 51C.

Refer to FIG. 51C. An interface in which a display interface card 4712 of the smart television is located is stacked on the display interface 4710, and the display interface card 4712 is a current display interface of the smart television.

It should be understood that the user may freely drag the card 4712 based on a requirement.

According to this embodiment of this application, in an interface in an application, the user picks up the mobile phone and holds the mobile phone in a vertical state to stack, on the original interface in the application, a radar distribution map of tags of all intelligent device that are allowed to be identified around the mobile phone. Therefore, an original layout form of the page is not affected, and a display interface card or a control interface of an intelligent device is displayed in the interface, so that a plurality of intelligent devices can be easily and conveniently controlled.

Figure 52A:
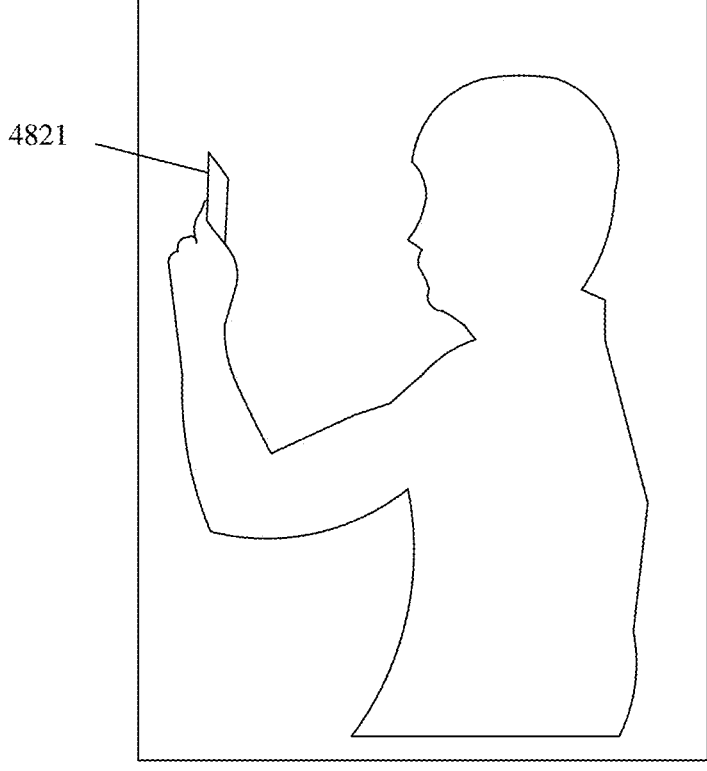
FIG. 52A to FIG. 52C are a schematic diagram of another group of GUIs according to an embodiment of this application.
Figure 52B:
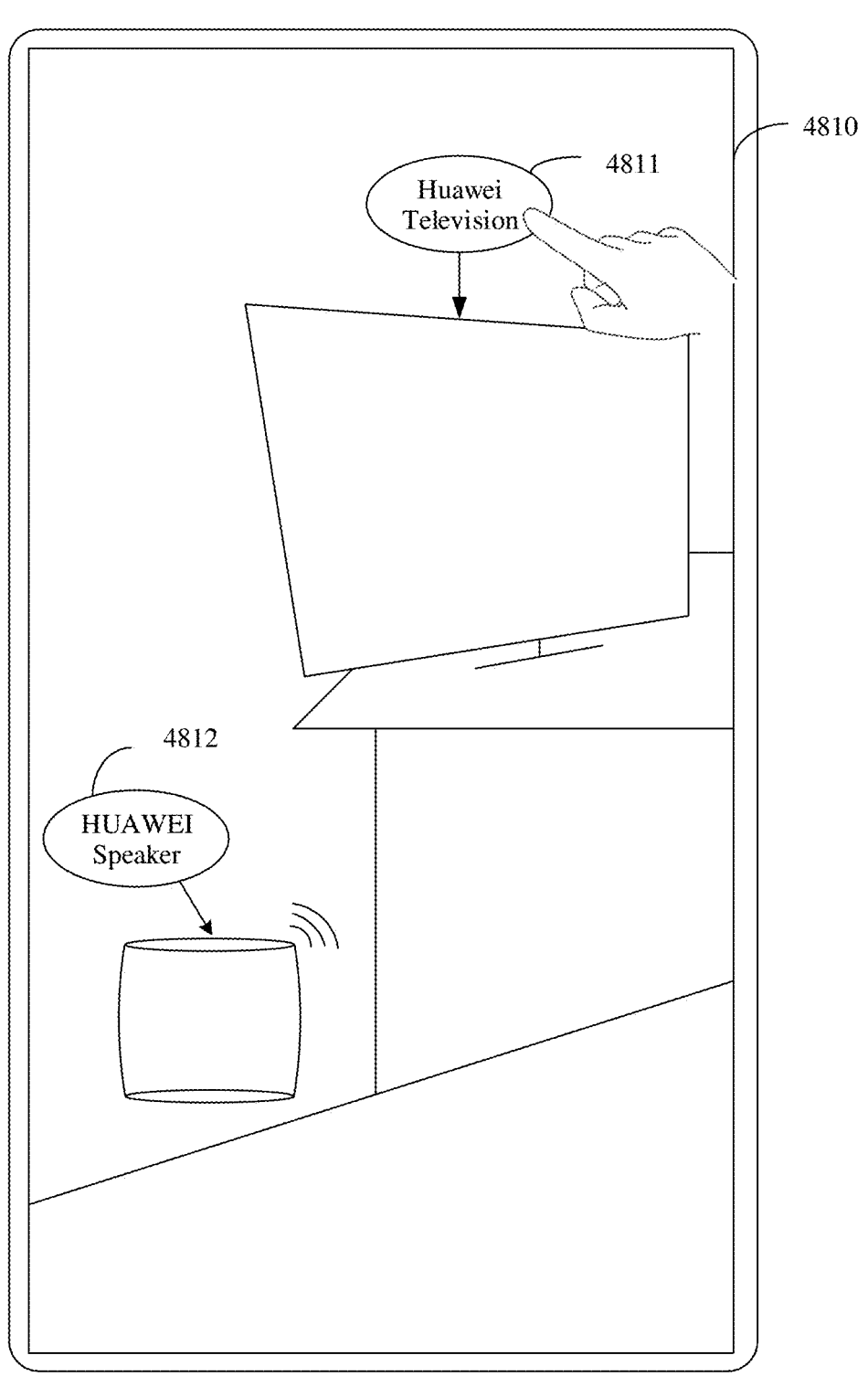
Figure 52C:
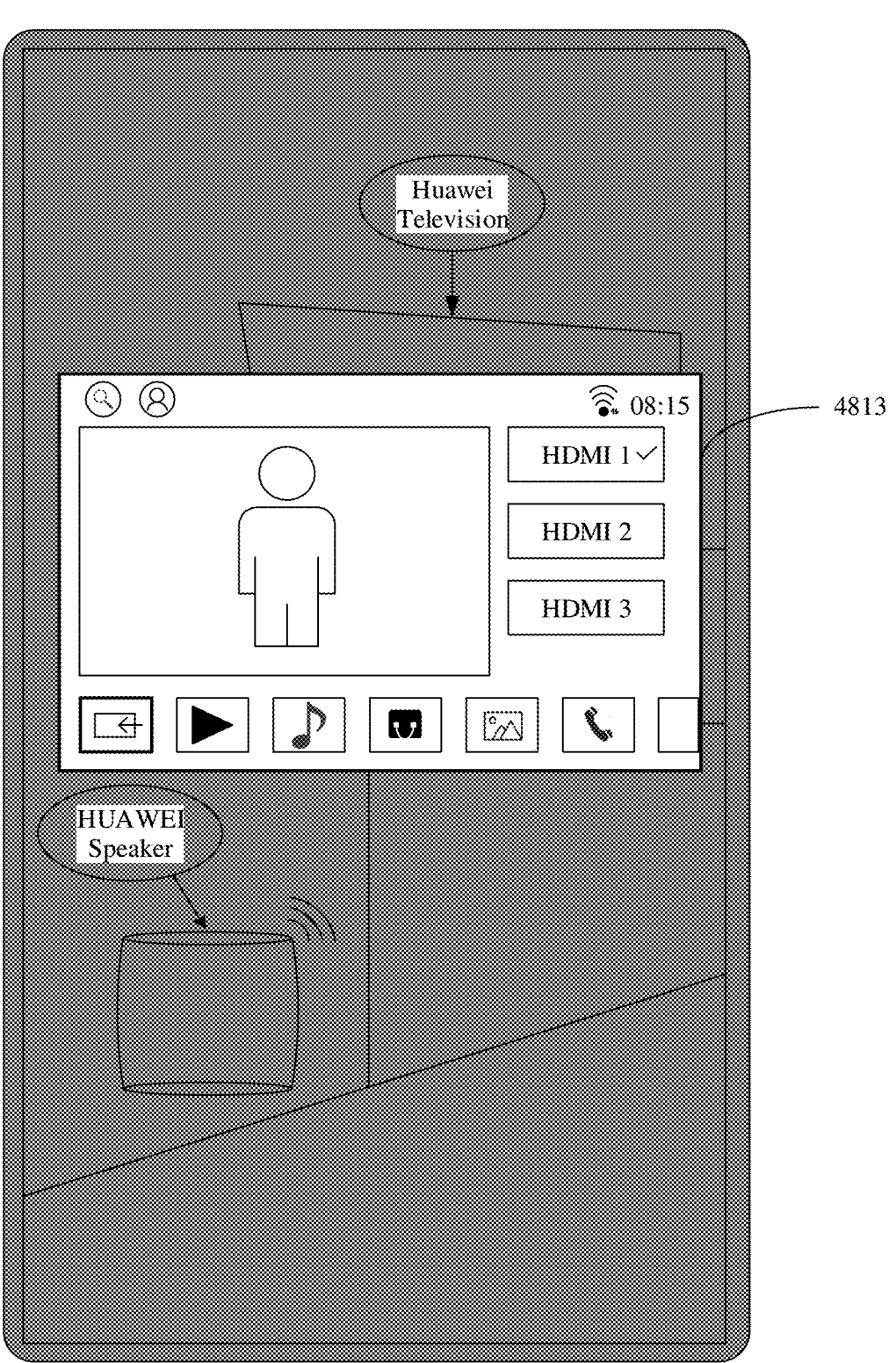

FIG. 52A to FIG. 52C are a schematic diagram of another group of GUIs according to an embodiment of this application.

Refer to FIG. 52A. In a search interface of a mobile phone, when detecting that the user picks up the mobile phone and holds the mobile phone in a vertical state, the mobile phone may open a camera and display an interface shown in FIG. 52B.

Refer to FIG. 52B. The interface is a three-dimensional display interface 4810 in an angle of view of the camera. When the mobile phone opens a camera, an intelligent device in an angle of view of the camera may display a tag of the intelligent device, for example, a Huawei television tag 4811 or a Huawei speaker tag 4812. The user may tap a tag of an intelligent device. When detecting that the user taps a tag, for example, the Huawei television tag 4811, the mobile phone may display an interface shown in FIG. 52C.

It should be understood that, in this embodiment of this application, the mobile phone may automatically identify the intelligent device by using an artificial intelligence (artificial intelligence, AI) object recognition technology, and may generate a positioning tag of the intelligent device by using a UWB or Bluetooth component in the mobile phone.

Refer to FIG. 52C. An interface in which a display interface card 4813 of the smart television is located is stacked on the display interface 4810, and the display interface card 4813 is a current display interface of the smart television.

It should be understood that the user may freely drag the card 4813 based on a requirement.

Optionally, when the user taps the Huawei speaker tag 4812, a playback control interface of a speaker may be displayed and stacked on the display interface 4810.

According to this embodiment of this application, in the search interface of the mobile phone, the user picks up the mobile phone and holds the mobile phone in the vertical state to identify, by opening the camera, a plurality of intelligent devices around the mobile phone. Tags of the plurality of intelligent devices are displayed in an interface of the camera. The user taps a tag to display a display interface card or a control interface of an intelligent device in the interface, so that the plurality of intelligent devices can be easily and conveniently controlled.

Figure 53A:
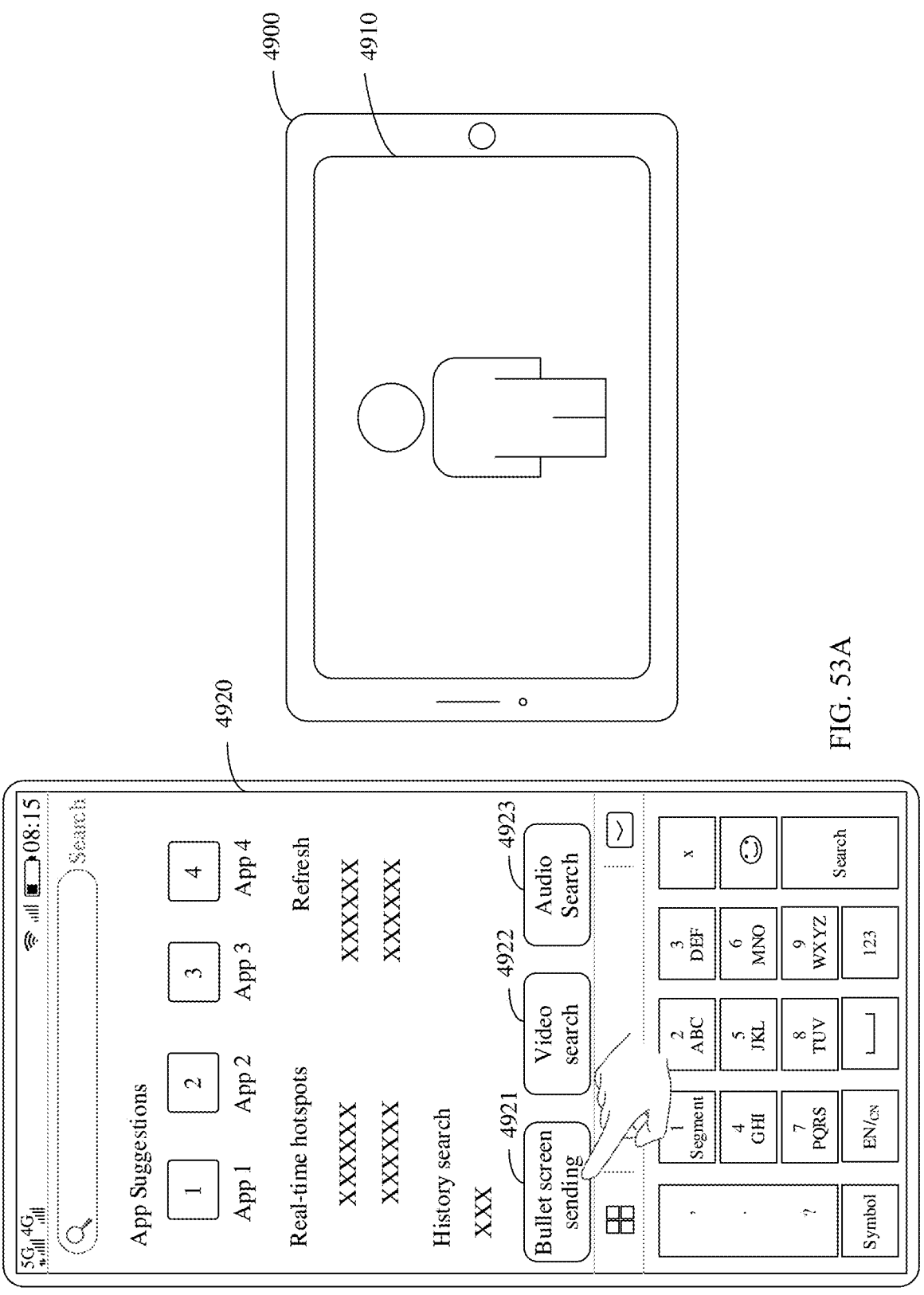
FIG. 53A and FIG. 53B are a schematic diagram of another group of GUIs according to an embodiment of this application.
Figure 53B:
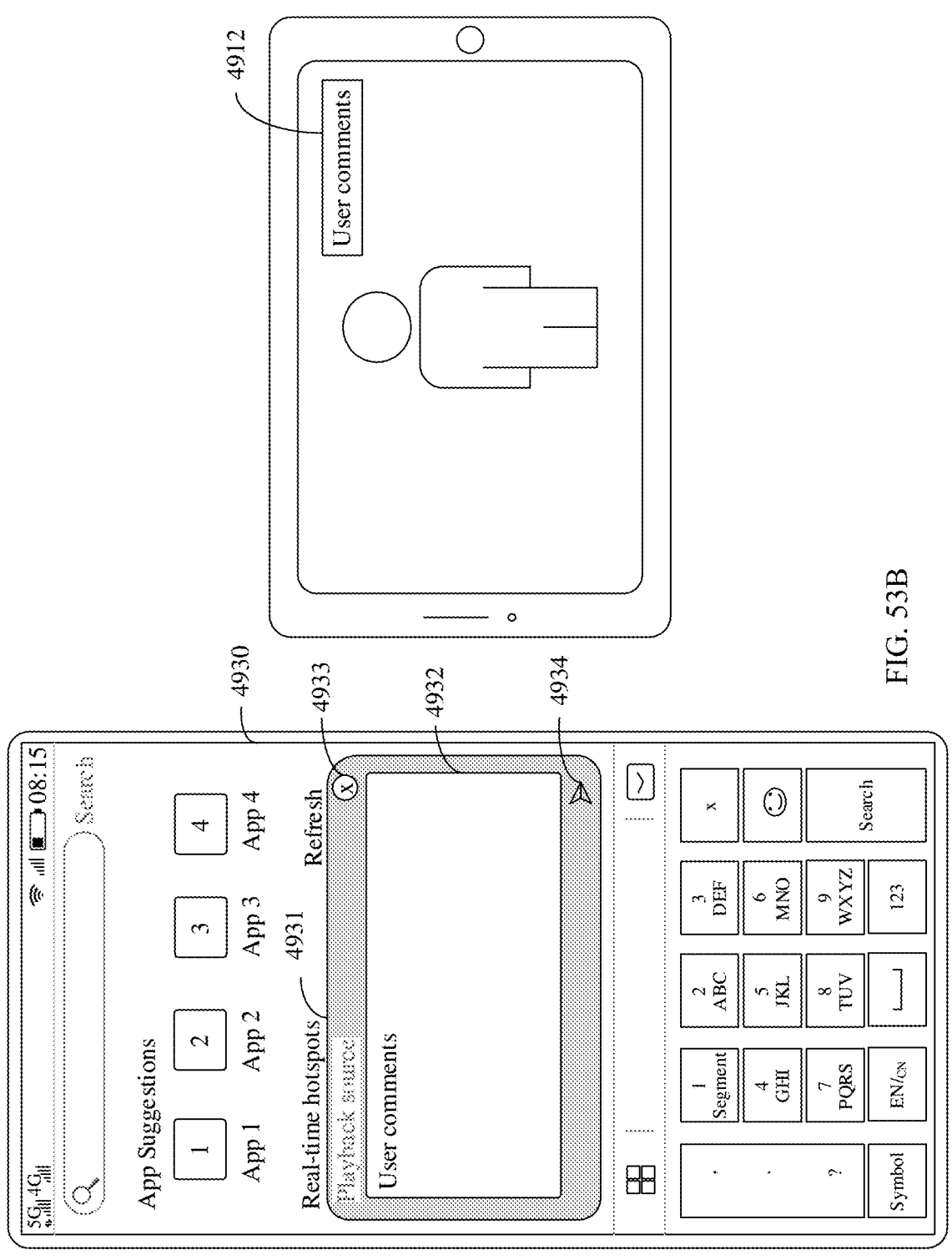

FIG. 53A and FIG. 53B are a schematic diagram of another group of GUIs according to an embodiment of this application. FIG. 53A and FIG. 53B show a process in which a mobile phone interacts with a tablet computer.

Refer to FIG. 53A. A GUI is a search interface 4920 of the mobile phone. The search interface 4920 may include a search box, App Suggestions, real-time hotspots, history search, and the like. In addition, the search interface may further include a plurality of function areas. The plurality of function areas may be bound to a keyboard and located above the keyboard. For example, the function areas may include a "Bullet screen sending" function area 4921, a "Video search" function area 4922, and an "Audio search" function area 4923.

For example, when the user watches a television series on a tablet computer 4900, to improve experience of watching the television series, the user expects to send a bullet screen to communicate with another user who watches the series. Usually, when sending a bullet screen, the user needs to invoke a keyboard for typing. Because the keyboard occupies a part of display space of a screen, viewing experience of the user is affected to some extent.

In this embodiment of this application, after detecting an operation of tapping the "Bullet screen sending" function area 4921 by the user, the mobile phone may display a GUI shown in FIG. 53B.

Refer to FIG. 53B. A search interface 4930 may include a function card 4931 for sending a bullet screen, and the function card 4931 may include a bullet screen text display box 4932, a control 4933 that can be used to close the function card 4931, a bullet screen sending key 4934, and the like.

When sending a bullet screen, the user only needs to point the head of the mobile phone to the tablet computer 4900, and the bullet screen 4912 sent by the user is displayed in a display area 4910 of the tablet computer 4900.

For example, when the user taps Video search 4922, a keyword may be entered in a pop-up input box, and after OK is tapped, a plurality of video-related results may be displayed on a display of the tablet computer. When the user taps Audio search 4923, a keyword may be entered in a pop-up input box, and after OK is tapped, a plurality of audio-related results may be displayed on a display of the tablet computer.

In this embodiment of this application, in the search interface of the mobile phone, text input, video search, audio search, and the like can be implemented on a device in a pointing direction of the head of the mobile phone, to improve cross-device input experience of the user.

FIG. 54A and FIG. 54B each are a schematic flowchart of a control method applied to an electronic device according to an embodiment of this application. As shown in FIG. 54A, the control method applied to the electronic device may specifically include the following steps.

S100 to S104 are a process in which the electronic device sends first content to a target device.

S100: The electronic device displays the first content.

The electronic device may alternatively be a tablet computer, a smartwatch, a smart band, or the like. This is not limited herein. The first content displayed by the electronic device may include a picture, a video, an audio, a food preparation parameter, a motion parameter, and the like.

S101: When the electronic device displays the first content, the electronic device detects a first operation of a user.

The first operation may be the first directional operation described above. For the first directional operation, refer to the foregoing descriptions in FIG. 3D to FIG. 3F. Details are not described herein again. The electronic device may detect the first directional operation of the user. For how the electronic device detects the first directional operation, refer to the descriptions in FIG. 3E to FIG. 3G. Details are not described herein again. The electronic device may be the mobile phone 111 in the multi-device scenario 100 shown in FIG. 1A.

S102: The electronic device obtains a direction of the first operation and a first posture of the electronic device in response to the first operation.

When the electronic device detects the first operation, the electronic device obtains the direction of the first operation. The direction of the first operation is a direction in which a center of gravity of the electronic device moves during the first operation, or a direction in which a user gesture moves during the first operation. As shown in FIG. 3E and FIG. 3F, the direction of the first operation is a direction in which the user moves the mobile phone 111 toward the television 113. As shown in FIG. 3G and FIG. 3H, the direction of the first operation is a direction in which a gesture moves when the user performs the first operation.

The electronic device may determine the posture of the electronic device by using an acceleration sensor and a gyro sensor. The first posture of the electronic device may be that the top of the electronic device is upward and a display of the electronic device faces a target device. As shown in FIG. 3G, the top of the mobile phone shown in FIG. 3G is upward, and a display of the mobile phone faces a target device and faces away from the user.

Optionally, when the electronic device detects that the top of the electronic device is upward and a camera cannot detect the face, the electronic device may determine that the electronic device is in the first posture.

S103: The electronic device determines a target device based on the direction of the first operation and/or the first posture.

The electronic device may send a second request to one or more electronic devices, where the second request is used to obtain location information of the one or more electronic devices.

In a possible implementation, the determining a target device based on the direction of the first operation and/or the first posture specifically includes: sending a second request to one or more intelligent devices, where the second request is used to indicate the one or more intelligent devices to send location information to the electronic device; and determining a first intelligent device as the target device based on the location information sent by the one or more intelligent devices, where a location of the first intelligent device is in the direction of the first operation, and the first intelligent device includes one or more intelligent devices in the one or more intelligent devices. In this way, the electronic device may obtain an intelligent device in the direction of the first operation through calculation based on the location information of the plurality of intelligent devices, to determine the target device with which the user expects the electronic device to exchange data.

The electronic device and the one or more electronic devices may be connected to a same Wi-Fi network. Alternatively, a login account of the electronic device may be the same as one or more login accounts of the one or more electronic devices. The electronic device and the one or more electronic devices may all access the internet. For example, the electronic device and the one or more electronic devices may access the internet through a Wi-Fi network, a 4G network, or a 5G network. The one or more electronic devices may be a television, a speaker, a treadmill, a refrigerator, a tablet computer, or the like. The electronic device may send a request for location information to the one or more devices. The one or more electronic devices may have a positioning module. The one or more electronic devices may obtain three-dimensional location information by using the positioning module.

Optionally, the determining a target device based on the direction of the first operation and/or the first posture specifically includes: sending a third request to a positioning server, where the third request is used to indicate the positioning server to send location information of one or more intelligent devices, and the positioning server is configured to store the location information of the one or more intelligent devices; and determining a first intelligent device as the target device based on the location information of the one or more intelligent devices, where a location of the first intelligent device is in the direction of the first operation, and the first intelligent device includes one or more intelligent devices in the one or more intelligent devices. In this way, when the intelligent device does not have a positioning function, the electronic device can also obtain the location information of the intelligent device. In addition, the electronic device may obtain an intelligent device in the direction of the first operation through calculation based on the location information of the plurality of intelligent devices, to determine the target device with which the user expects the electronic device to exchange data.

Optionally, the electronic device sends, to a positioning system, a request for obtaining the location information of the one or more electronic devices. The one or more electronic devices do not have a positioning module. The one or more electronic devices may be positioned by using a positioning system including a plurality of sensors. The positioning system may determine one or more locations of the one or more electronic devices. It may be understood that when the one or more locations of the one or more electronic devices change, positioning needs to be performed again by using the positioning system.

The one or more electronic devices may have a positioning module. The one or more electronic devices may obtain three-dimensional location information by using the positioning module. Then, the one or more electronic devices send the three-dimensional positioning information to the electronic device.

Optionally, the positioning system may send the location information of the one or more electronic devices to the electronic device.

For step S103, refer to the descriptions that the mobile phone 111 obtains the location information of the television 113 in FIG. 31. Details are not described herein again.

The electronic device may use an electronic device in the direction of the first directional operation as the target device. For example, in the multi-device scenario 100A shown in FIG. 4D, the mobile phone 111 is the electronic device, and the first directional operation may be that the user moves the mobile phone 111 toward the television 113. The television 113 in the direction of the first directional operation. In this case, the television 113 is the target device.

Herein, the electronic device may obtain a specific electronic device in the direction of the first directional operation through calculation based on the detected direction of the first directional operation and the obtained location information of the one or more electronic devices.

In a possible implementation, after the electronic device determines a target device, the electronic device may prompt the user, for example, the electronic device vibrates or rings to prompt the user, or the display is turned on for a plurality of times to prompt the user with a fact that the final target device is determined.

S104: The electronic device sends the first content to the target device when the electronic device detects that the electronic device and the target device log in to a same account.

The electronic device may send the first content to the target device when the electronic device detecting that the electronic device and the target device log in to the same account. The first content may include a picture, a video, an audio, a food preparation parameter, a motion parameter, and the like. For details herein, refer to the foregoing descriptions of the first content. The details are not described herein again.

It may be understood that the location information sent by the target device to the electronic device may carry information about an account to which the target device logs in, for example, an account ID.

In a possible manner, the electronic device sends a first request to the target device when the electronic device and the target device do not log in to a same account, where the first request is used to request the target device to receive the first content. The electronic device receives a first response, where the first response is used to indicate the electronic device to send the first content. The electronic device sends the first content to the target device.

Optionally, if the electronic device has obtained permission of the target device, the electronic device may also directly send the first content to the target device when the electronic device and the target device do not log in to a same account.

The target device may receive the first content. The first content received by the target device may be displayed in a user interface. For example, the television 113 shown in FIG. 41 displays the received picture in the user interface. For details herein, refer to the foregoing descriptions in FIG. 4I. The details are not described herein again.

Optionally, the target device may directly store the first content in the target device. For example, the tablet computer 116 shown in FIG. 3L stores the received picture in an album of the tablet computer 116. For details herein, refer to the foregoing descriptions in FIG. 3L. The details are not described herein again.

Optionally, the user may select, in the target device, whether to receive the first content.

According to the method provided in this embodiment of this application, the user can control, based on the first operation, the electronic device to send data to the target device. For example, the user can send, based on an operation of pushing a mobile phone toward a television, a video played in the mobile phone to the television. In this way, the user can watch the video through the television. Therefore, the user operation is simple, and user experience can be improved.

FIG. 54B is a schematic flowchart of a control method applied to an electronic device according to an embodiment of this application. As shown in FIG. 54B, the control method applied to the electronic device may include the following steps.

S200 to S204: The electronic device obtains data.

S200: The electronic device detects a fifth operation.

The fifth operation is moving the electronic device in a third posture in a direction away from a target device. A direction of the fifth operation is the direction away from the target device.

The fifth operation in this embodiment of this application may be the foregoing second directional operation. The user may perform the second directional operation on the electronic device. For details about the second directional operation, refer to the foregoing descriptions in FIG. 23C to FIG. 23E. The details are not described herein again.

S201: The electronic device obtains the direction of the fifth operation and the third posture of the electronic device in response to the fifth operation.

A direction of the fifth operation is the direction away from the target device. The third posture may be that the head of the electronic device faces the target device. For details, refer to the descriptions in step S102. The details are not described herein again.

S202: The electronic device determines a target device based on the direction of the fifth operation and/or the third posture.

In a possible implementation, the determining a target device based on the direction of the fifth operation and/or the third posture specifically includes: sending a fifth request to one or more intelligent devices, where the fifth request is used to indicate the one or more intelligent devices to send location information to the electronic device; and determining a first intelligent device as the target device based on the location information sent by the one or more intelligent devices, where a location of the first intelligent device is in the direction of the fifth operation, and the first intelligent device includes one or more intelligent devices in the one or more intelligent devices. In this way, the electronic device may obtain an intelligent device in the direction of the first operation through calculation based on the location information of the plurality of intelligent devices, to determine the target device with which the user expects the electronic device to exchange data.

In a possible implementation, the determining a target device based on the direction of the fifth operation and/or the third posture specifically includes: sending a sixth request to a positioning server, where the sixth request is used to indicate the positioning server to send location information of one or more intelligent devices, and the positioning server is configured to store the location information of the one or more intelligent devices; and determining a first intelligent device as the target device based on the location information of the one or more intelligent devices, where a location of the first intelligent device is in the direction of the fifth operation, and the first intelligent device includes one or more intelligent devices in the one or more intelligent devices. In this way, when the intelligent device does not have a positioning function, the electronic device can also obtain the location information of the intelligent device. In addition, the electronic device may obtain an intelligent device in the direction of the first operation through calculation based on the location information of the plurality of intelligent devices, to determine the target device with which the user expects the electronic device to exchange data.

In a possible implementation, the determining a first intelligent device as the target device based on the location information sent by the one or more intelligent devices specifically includes: displaying a first list in a first user interface when the first intelligent device includes a plurality of intelligent devices, where the first list is used to display icons of the plurality of intelligent devices; and in response to a sixth operation of the user, determining, as the target device, an intelligent device that is in the first intelligent device and whose icon is selected from the first list based on the sixth operation. In this way, the electronic device may determine the target device based on the user operation.

Optionally, the determining a first intelligent device as the target device based on the location information sent by the one or more intelligent devices specifically includes: When the first intelligent device includes a plurality of intelligent devices, the electronic device uses, as the target device, an intelligent device that is in the first intelligent device and that is closest to the electronic device.

In a possible implementation, an arrangement sequence of the icons that are of the plurality of intelligent devices and that are displayed in the first list is determined based on distances between the electronic device and the plurality of intelligent devices.

Further, after the determining, as the target device, an intelligent device that is in the first intelligent device and whose icon is selected from the first list based on the sixth operation, the method further includes: performing a first preset action, where the first preset action includes one or more of vibration, ringing, or displaying a prompt box in a user interface.

S203: The electronic device sends a fourth request to the target device, where the fourth request is used to request the target device to send second content.

The electronic device determines the target device, and sends the fourth request to the target device. The fourth request is used to obtain the second content from the target. The second content may include first information and a control instruction of the target device. For details herein, refer to the descriptions in FIG. 23F. The details are not described herein again. It may be understood that the second content varies with a type of the target device. For example, when the target device is a television, the second content may be content shown in FIG. 23J and FIG. 23K, that is, a television program name, actor details, and the like. Details are not described herein again. When the target device is a speaker, the second content may be content shown in FIG. 24A and FIG. 24B, for example, a song name and a song singer. Details are not described herein again.

S204: When the electronic device detects that the electronic device and the target device log in to a same account, the electronic device displays the second content sent by the target device.

After receiving the second content, the electronic device may display the second content in a user interface, for example, a user interface of the mobile phone 111 that is shown in FIG. 23J to FIG. 26B. For details herein, refer to the foregoing descriptions in FIG. 23J to FIG. 26B. The details are not described herein again.

Optionally, in a possible implementation, after the step of sending a fourth request to the target device, the method further includes: When detecting that the electronic device and the target device do not log in to a same account, the electronic device displays third content sent by the target device, where the third content is different from the second content.

The second content includes first information of a first task currently being executed by the target device and/or a first control instruction of the first task, and the third content is used to indicate a current working status of the target device.

That is, when the electronic device and the target device log in to a same account, the electronic device may obtain detailed information about a task that is being executed by the target device. For example, as shown in FIG. 23J, if the target device is playing a video, the electronic device may obtain a name, a cast list, and a download address of the video, and an instruction for controlling the video, for example, to pause playback or stop playback. For details, refer to descriptions in FIG. 23J. The details are not described herein again.

When the electronic device and the target device do not log in to a same account, the electronic device can learn only whether the target is currently busy or idle, of a current task end time, and the like. As shown in FIG. 25B, information that is obtained from the target device and that is displayed in the mobile phone 111 is that the soy milk maker is busy or idle at this time and a remaining time of a current task. For details herein, refer to the descriptions in FIG. 25B. The details are not described herein again.

According to the method provided in this embodiment of this application, the user can control, based on the fifth operation, the electronic device to obtain the second content from the target device. For example, the user may pull a mobile phone in a direction away from a television. Then, in response to the user operation, the mobile phone detects that the mobile phone and the television log in to a same account. In this way, the mobile phone can obtain second content sent by the television. If the television is playing a television, the second content may include a name, a cast list, and a download address of the television series played by the television, and an instruction for controlling the television series to stop playback, pause playback, start playback, adjust volume, and the like. In this way, the user operation is simple, and user experience can be improved.

Figure 54D:
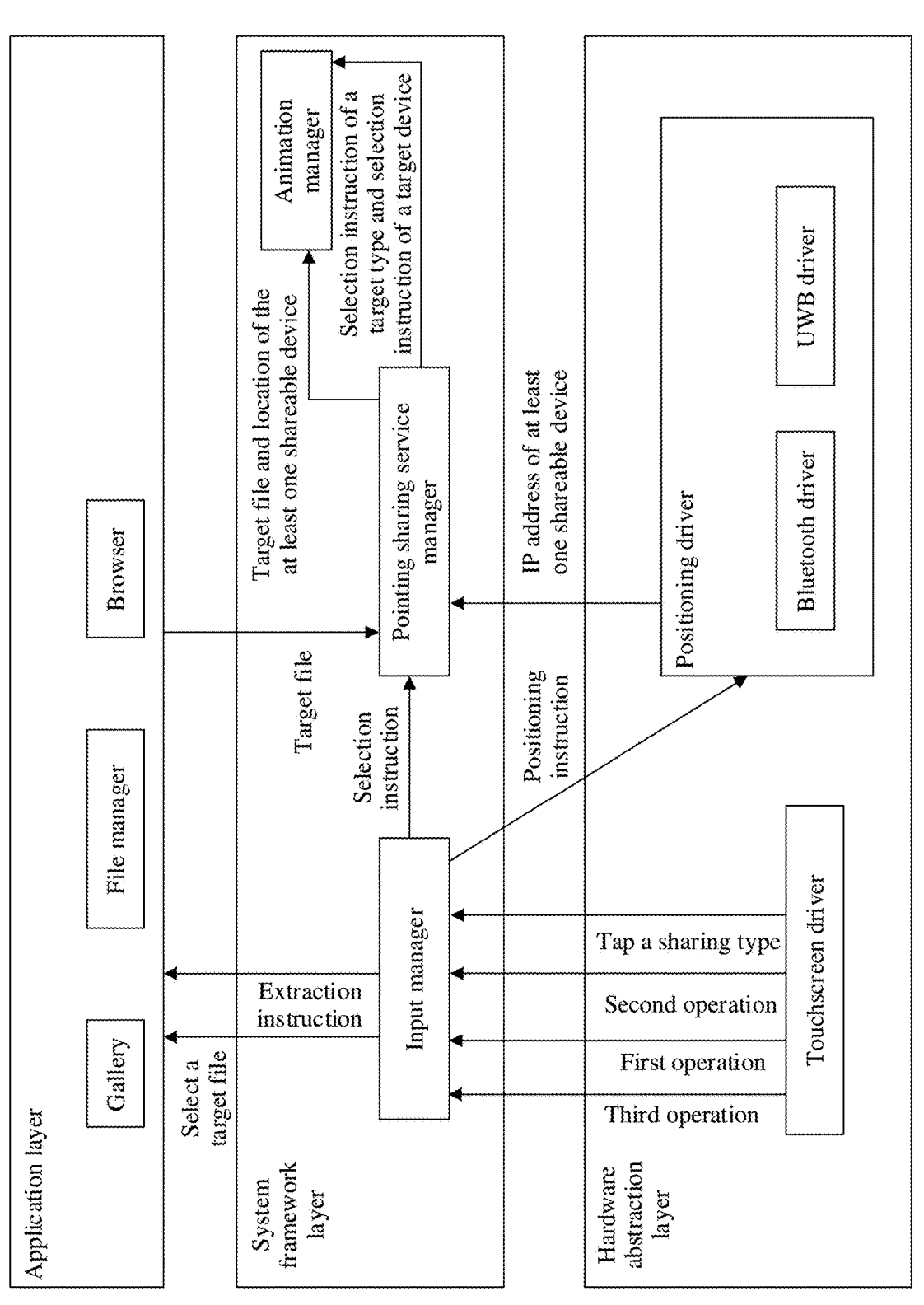
FIG. 54D is a flowchart of another target file sharing method according to an embodiment of the present invention.

FIG. 54C is a flowchart of a target file sharing method according to an embodiment of this application. FIG. 54D is a flowchart of another target file sharing method according to an embodiment of this application. The method is applied to an electronic device. As shown in FIG. 54C and FIG. 54D, the method includes the following steps.

S300: Detect a selection operation, and select a target file.

In this embodiment of this application, a touchscreen driver detects the selection operation, and sends the selection operation to an input manager, and the input manager selects the target file based on the selection operation.

In this embodiment of this application, the selection operation corresponds to the operations shown in FIG. 6 to FIG. 8.

S302: Position, when detecting a first operation on the selected target file and determining that the first operation meets a specified trigger condition, at least one shareable device that the head of the electronic device faces, and displaying a sharing interface of the target file, where the sharing interface includes an icon of the at least one shareable device that the head of the electronic device faces.

In this embodiment of this application, the trigger condition may be preset based on an actual situation.

In an optional solution, the first operation includes a first slide operation and a first press operation, and the trigger condition includes a first trigger condition corresponding to the first slide operation and a second trigger condition corresponding to the first press operation. The first trigger condition includes that sliding is performed in a specified display area, and a sliding direction includes a first specified direction. The second trigger condition includes that press duration is greater than or equal to first specified duration. Both the specified display area and the first specified direction may be set based on an actual situation. In an optional solution, the specified display area is a bottom area of a display of the electronic device, and the first specified direction includes upward. The first specified duration may be set based on an actual situation. In an optional solution, the first specified duration is 700 ms.

In another optional solution, the first operation includes a second slide operation, and the trigger condition includes a third trigger condition corresponding to the second slide operation. The third trigger condition includes that sliding is performed in a specified display area, a sliding direction includes a second specified direction, and a sliding distance is greater than or equal to a specified distance. Both the specified display area and the second specified direction may be set based on an actual situation. In an optional solution, the specified display area is a bottom area of a display of the electronic device, and the second specified direction includes upward. The sliding distance may be set based on an actual situation. In an optional solution, the sliding distance is 3 cm.

In another optional solution, the first operation includes a second press operation, and the trigger condition includes a fourth trigger condition corresponding to the second press operation. The fourth trigger condition includes that a multi-finger press operation is performed, and press duration is greater than or equal to second specified duration. A quantity of fingers that perform the multi-finger press operation may be set based on an actual situation. In an optional solution, the multi-finger press operation includes a three-finger press operation. The second specified duration may be set based on an actual situation. In an optional solution, the second specified duration is 700 ms.

In this embodiment of this application, the touchscreen driver detects the first operation on the target file, and sends the first operation to the input manager. The input manager determines whether the first operation meets the specified trigger condition. If the input manager determines that the first operation meets the specified trigger condition, the input manager sends an extraction instruction to an application layer to which the target file belongs, so that the application layer extracts a shareable target file from an application according to the extraction instruction, and sends the target file to a pointing sharing service manager. The input manager sends a positioning instruction to a positioning driver at a kernel driver layer, so that the positioning driver positions a shareable device around the electronic device, and sends an IP address of at least one positioned shareable device to the pointing sharing service manager. The pointing sharing service manager finds a location of the corresponding shareable device based on the IP address, and sends the target file and the location of the at least one shareable device to an animation manager, so that the animation manager controls a sharing interface of the display of the electronic device to display an icon of the at least one shareable device and an animation effect of the target file based on the location of the at least one shareable device, where the sharing interface includes the icon of the at least one shareable device. The positioning driver includes a UWB driver or a Bluetooth driver.

In this embodiment of this application, the application layer extracts the target file from the application according to the extraction instruction. For example, the extraction instruction is an instruction for extracting a picture selected based on the selection operation, and the application layer extracts, from Gallery, the picture selected based on the selection operation. For example, the extraction instruction is an instruction for extracting a word file selected based on the selection operation, and the application layer extracts the word file from a word application. For example, the extraction instruction is an instruction for extracting a web page selected based on the selection operation, and the application layer extracts the web page from a browser.

In this embodiment of this application, the first operation corresponds to the operation shown in FIG. 9A to FIG. 9D, FIG. 10A to FIG. 10C, FIG. 11A to FIG. 11C, FIG. 12A to FIG. 12C, FIG. 13A to FIG. 13D, FIG. 14A to FIG. 14C, FIG. 15A to FIG. 15D, FIG. 16A to FIG. 16C, or FIG. 17A to FIG. 17C.

S304: Detect a second operation, and select at least one target device from the at least one shareable device.

In this embodiment of this application, the touchscreen driver detects the second operation, and sends the second operation to the input manager. The input manager generates a selection instruction based on the second operation, where the selection instruction includes a device name of the selected target device, and sends the selection instruction to the pointing sharing service manager.

In this embodiment of this application, the user may share the target file with the target device by performing the first operation and the second operation consecutively, to implement one-step sharing of the target file.

In this embodiment of this application, the second operation corresponds to the step shown in FIG. 9A, FIG. 10D, FIG. 11D, FIG. 12D, FIG. 13D and FIG. 13F, FIG. 14D and FIG. 14E, FIG. 15E, FIG. 16D and FIG. 16E, or FIG. 17D.

S306: Determine whether the target device has a capability of displaying an application to which the target file belongs; and perform step S308 if the target device has the capability of displaying the application to which the target file belongs, or perform step S312 if the target device does not have the capability of displaying the application to which the target file belongs.

S308: Display a second pop-up window, where the second pop-up window includes a plurality of sharing types.

S310: Detect an operation of tapping a sharing type, and determine the tapped sharing type as a target type.

In this embodiment of this application, the touchscreen driver detects the operation of tapping the sharing type, and sends the operation to the input manager. The input manager determines the tapped sharing type as the target type. The input manager generates a selection instruction based on the target type, where the selection instruction includes the target type, and sends the selection instruction to the pointing sharing service manager.

In this embodiment of this application, the second pop-up window is set to receive the operation of tapping the sharing type by the user, so that the user can conveniently select the sharing type, and share the target file based on a willingness of the user, to avoid a resource waste caused when the user only needs to share the target file but shares the application to which the target file belongs with the target device.

S312: Share the target file with the at least one target device based on the target type.

In this embodiment of this application, if the target device does not have the capability of displaying the application to which the target file belongs, a file type is determined as the target type, and the target file is shared with the at least one target device based on the file type. If the target device has the capability of displaying the application to which the target file belongs, the target file is shared with the at least one target device based on the target type determined in step S310.

In this embodiment of this application, the application layer sends the target file to the pointing sharing service manager; and the pointing sharing service manager sends a selection instruction of the target type and a selection instruction of the target device to the animation manager, so that the animation manager controls the target file to move to an icon of the target device.

In the technical solution provided in this embodiment of this application, the at least one shareable device that the head of the electronic device faces is positioned when the first operation on the selected target file is detected and it is determined that the first operation meets the specified trigger condition, and the sharing interface of the target file is displayed, where the sharing interface includes the at least one shareable device that the head of the electronic device faces. The second operation is detected, and at least one target device is selected from the at least one shareable device. The target file is shared with the at least one target device based on the determined target type. This simplifies an operation step of sharing the target file with the target device, and improves target file sharing efficiency.

Figure 54E:
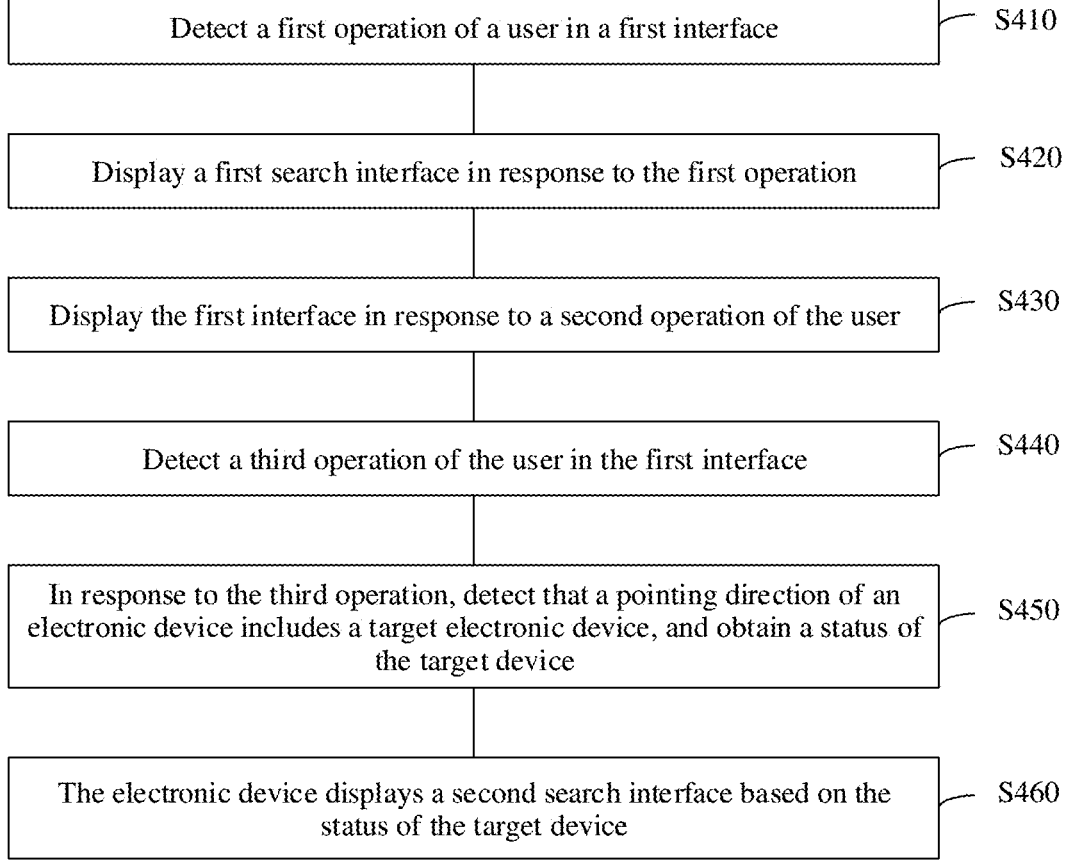
FIG. 54E is a schematic flowchart of a directional search interaction method according to an embodiment of this application.

FIG. 54E is a schematic flowchart of a directional search interaction method according to an embodiment of this application. As shown in FIG. 54E, the method may include step S410 to step S460.

S410: An electronic device detects a first operation of a user in a first interface.

The first interface may be a search interface of a mobile phone, and the first operation may be entering a keyword.

S420: The electronic device displays a first search interface in response to the first operation, where the first search interface includes a search box and first content, and the first content is related to content locally stored in the electronic device.

As shown in FIG. 46A, the first search interface may be the display interface 4610, the search box is 4611, and the first content may be content stored locally, for example, a plurality of function content cards 4612, 4613, 4614, and 4615, or Messages 4616 or a memo stored locally.

S430: The electronic device displays the first interface in response to a second operation of the user.

The second operation may be that the user deletes the entered keyword.

S440: The electronic device detects a third operation of the user in the first interface.

The third operation may be that the user enters a keyword, or may be text input, voice input, scan input, or the like. As shown in FIG. 46B, the user may enter a text.

S450: In response to the third operation, the electronic device detects that a pointing direction of the electronic device includes a target electronic device, and obtains a status of the target device.

As shown in FIG. 46B, the target electronic device in the pointing direction of the mobile phone is a smart television. The status of the target device may be playing a task, off, or the like.

S460: The electronic device displays a second search interface based on the status of the target device, where the second search interface includes a search box and second content, and the second content is related to the status of the target device.

As shown in FIG. 46B, the second search interface includes the search box and the second content, and the second content may include a plurality of video content cards 4621, 4622, 4623, 4624, and the like.

Optionally, the third operation is entering a keyword. When the electronic device determines that the status of the another electronic device is playing first task content of the keyword, the second content includes a plurality of task content cards that are related to the first task content and that have priorities, where the plurality of task content cards are related to a capability of the target electronic device.

As shown in FIG. 46B, the first task content is a task currently being played on the smart television, for example, a task that is being played corresponding to the card 4621. The plurality of task content cards are a plurality of function cards 4621, 4622, 4623, and 4624, and all the plurality of function cards are video content cards.

Optionally, the first card 4621 in the plurality of task content cards is the task currently being played on the television.

Optionally, when determining that the status of the target electronic device is an off state, the electronic device may display a control card of the target electronic device in the second content. The user may tap an on control in the control card to display a third search interface, where the third search interface may include a search box and a plurality of task content cards.

For example, if the smart television is in an off state, when pointing to the smart television for search, the mobile phone may display a control card of the smart television in an interface of the mobile phone. When the user taps an on control in the control card, the smart television may be turned on, and a search result may be displayed in the interface of the mobile phone, where the search result includes a plurality of video content cards related to a capability of the television.

Optionally, when the electronic device determines that the status of the target electronic device is an on state and task content is not played, the second content may include a plurality of task content cards, and the plurality of task content cards are related to a capability of the target electronic device.

For example, if the smart television is in an on state but does not play a program, when pointing to the smart television for search, the mobile phone may display a search result in an interface of the mobile phone, where the search result includes a plurality of video content cards related to a capability of the television.

Optionally, as shown in FIG. 46B, when the target electronic device is the smart television, the plurality of task content cards are video content cards. As shown in FIG. 48B, when the target electronic device is the smart speaker, the plurality of task content cards are audio content cards.

FIG. 54F is a schematic flowchart of a directional search interaction method according to an embodiment of this application. As shown in FIG. 54F, the method may include step S510 to step S550.

S510: An electronic device detects a first operation of a user in a first interface.

For example, as shown in FIG. 43A, the first interface may be an interface in an application.

S520: The electronic device displays a second interface in response to the first operation, where the second interface is an interface displayed after the first interface is refreshed.

For example, as shown in FIG. 43B, the interface 4330 may be an interface displayed after the interface 4320 is refreshed.

S530: The electronic device detects a second operation of the user in the second interface.

For example, as shown in FIG. 44A, the second operation may be touching and holding with a plurality of fingers.

S540: The electronic device identifies another surrounding electronic device in response to the second operation.

S550: The electronic device displays a third interface, where the third interface includes a positioning tag of the another electronic device.

For example, as shown in FIG. 44B, the third interface may display positioning tags of a plurality of electronic devices around the mobile phone.

Optionally, the second operation is that the user picks up the electronic device and holds the electronic device in a vertical state. In this case, the electronic device invokes a camera to obtain the third interface displayed in an angle of view of the camera.

For example, as shown in FIG. 52A to FIG. 52C, when detecting that the user picks up the mobile phone and holds the mobile phone in a vertical state, the mobile phone may invoke the camera to display the third interface. Alternatively, when detecting that the user picks up the mobile phone and holds the mobile phone in a vertical state, the mobile phone directly displays the positioning tags of the plurality of identified devices.

Optionally, the method may further include: The electronic device displays a fourth interface after detecting, in the third interface, an operation of tapping the positioning tag by the user, where the fourth interface includes a display interface card of an electronic device corresponding to the positioning tag, and content of the display interface card is consistent with content of a display of the electronic device corresponding to the positioning tag, or the display interface card is used to control the electronic device corresponding to the positioning tag.

For example, as shown in FIG. 51B and FIG. 51C, the fourth interface may display a display interface card of the television, and the display interface card is a display interface of the smart television.

When the user taps a positioning tag of a smart speaker, the display interface card may be a playback control card.

Optionally, the method may further include: The electronic device displays a fourth interface after detecting, in the third interface, an operation of tapping the positioning tag by the user, where the fourth interface includes a control card of an electronic device corresponding to the positioning tag. The electronic device displays a fifth interface after detecting an operation of tapping an on control in the control card by the user, where the fifth interface includes a display interface card of the electronic device corresponding to the positioning tag, and content of the display interface card is consistent with content of a display of the electronic device corresponding to the positioning tag, or the display interface card is used to control the electronic device corresponding to the positioning tag.

When the television is in an off state, the display interface card may be a control card for controlling the television to be turned on. When the user taps an on control in the control card, the television may be turned on, and a fifth interface is displayed on the mobile phone. As shown in FIG. 44C, the fifth interface may display an interface card.

Optionally, the method further includes: The electronic device detects an operation of a preset gesture in the third interface. The electronic device determines, in response to the operation of the preset gesture, that a device in a pointing direction of the electronic device is a target electronic device. The electronic device displays a fourth interface, where the fourth interface includes a display interface card of the target electronic device, and content of the display interface card is consistent with content of a display of the target electronic device, or the display interface card is used to control the target electronic device.

For example, the preset gesture may be touching and holding with a plurality of fingers. As shown in FIG. 45B, the display interface card may be the card 4524, that is, a display interface of the smart television. When the target device is a smart speaker, the display interface card may be a playback control interface, and the user may control the smart speaker through the playback control interface.

According to this embodiment of this application, when the electronic device determines that a device in the pointing direction of the electronic device is another electronic device, the electronic device displays a search interface in response to an operation of entering search content by the user, where a search result of the search interface is related to a status of the another electronic device. For example, when the user points the electronic device to a smart television for search, a search result that expects to be obtained by the user may be a video. Therefore, in this technical solution, the search result expected by the user can be obtained, to improve user experience.

Figure 55:
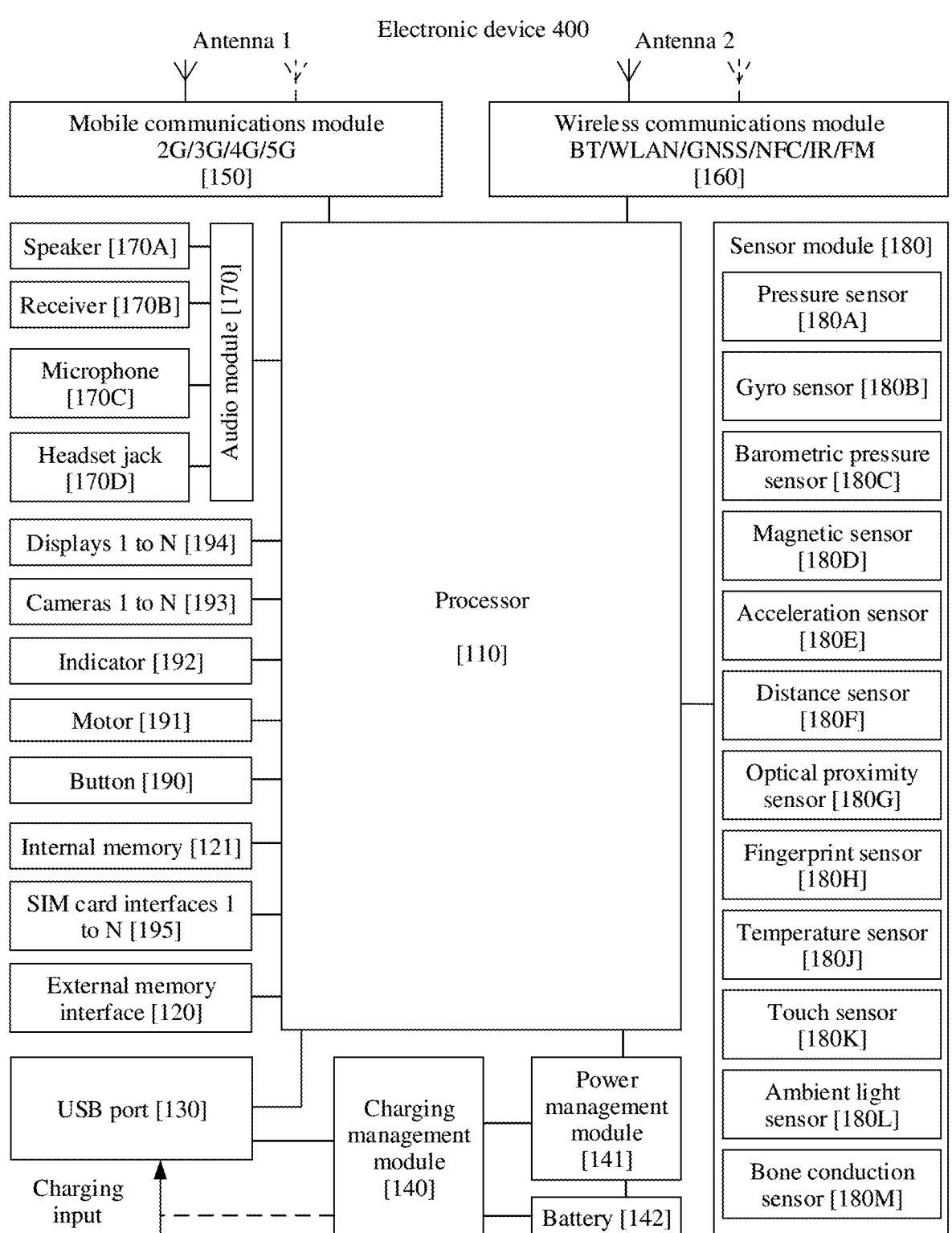
FIG. 55 is a schematic diagram of a hardware structure of an electronic device according to an embodiment of this application.

FIG. 55 is a schematic diagram of a structure of an electronic device 100.

The electronic device 100 is used as an example below to describe the embodiment in detail. It should be understood that the electronic device 100 shown in FIG. 55 is merely an example, and the electronic device 100 may have more or fewer components than those shown in FIG. 55, or may combine two or more components, or may have different component configurations. Components shown in the figure may be implemented by hardware including one or more signal processing and/or application-specific integrated circuits, software, or a combination of hardware and software.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application constitutes no specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a two-way synchronization serial bus, and includes a serial data line (serial data line, SDA) and a serial clock line (serial clock line, SCL). In some embodiments, the processor no may include a plurality of groups of I2C buses. The processor 110 may be separately coupled to the touch sensor 180K, a charger, a flash, the camera 193, and the like through different I2C bus interfaces. For example, the processor no may be coupled to the touch sensor 180K through the I2C interface, so that the processor no communicates with the touch sensor 180K through the I2C bus interface, to implement a touch function of the electronic device 100.

The I2S interface may be used for audio communication. In some embodiments, the processor no may include a plurality of groups of I2S buses. The processor no may be coupled to the audio module 170 through the I2S bus, to implement communication between the processor no and the audio module 170. In some embodiments, the audio module 170 may transmit an audio signal to the wireless communications module 160 through the I2S interface, to implement a function of answering a call through a Bluetooth headset.

The PCM interface may also be used for audio communication, and samples, quantizes, and codes an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor no to the wireless communications module 160. For example, the processor no communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB Type-C port, or the like. The USB port 130 may be configured to connect to a charger to charge the electronic device 100, or may be configured to transmit data between the electronic device 100 and a peripheral device, or may be configured to connect to a headset for playing an audio through the headset. The port may alternatively be configured to connect to another electronic device such as an AR device.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of the wired charger through the USB port 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to: code and decode an audio signal. In some embodiments, the audio module 170 may be disposed in the processor 110, or some functional modules in the audio module 170 are disposed in the processor 110.

The speaker 170A, also referred to as a "horn", is configured to convert an electrical audio signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages application icon, an instruction for viewing an SMS message is performed. When a touch operation whose touch operation intensity is greater than or equal to the first pressure threshold is performed on the Messages application icon, an instruction for creating a new SMS message is performed.

The gyro sensor 180B may be configured to determine a moving posture of the electronic device 100. In some embodiments, an angular velocity of the electronic device 100 around three axes (that is, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 18J. For example, when the temperature reported by the temperature sensor 180J exceeds a threshold, the electronic device 100 lowers performance of a processor near the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen. The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 is compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

Figure 56:
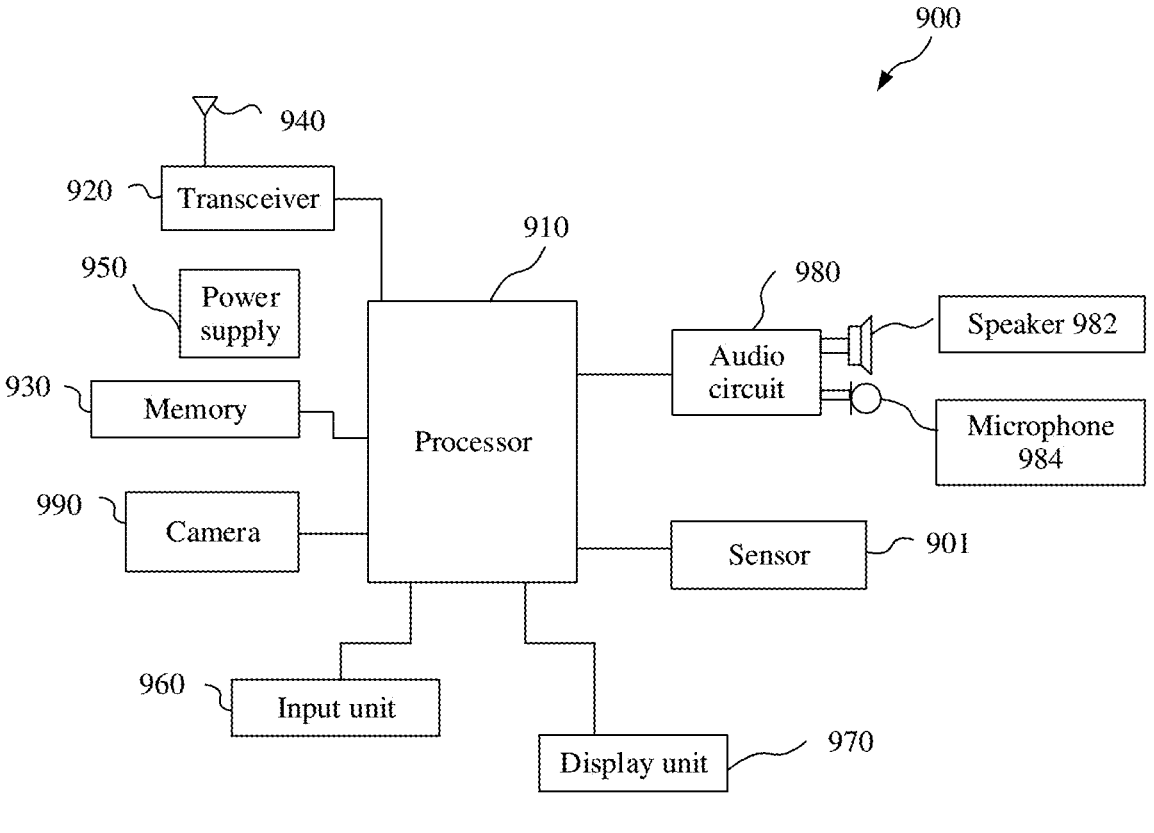
FIG. 56 is a schematic diagram of a hardware structure of an electronic device according to an embodiment of this application.

FIG. 56 is a schematic diagram of a structure of an electronic device according to an embodiment of this application. As shown in FIG. 56, the electronic device 900 includes a processor 910 and a transceiver 920. Optionally, the electronic device 900 may further include a memory 930. The processor 910, the transceiver 920, and the memory 930 may communicate with each other through an internal connection path to transfer a control signal and/or a data signal. The memory 930 is configured to store a computer program. The processor 910 is configured to: invoke the computer program from the memory 930 and run the computer program.

Optionally, the electronic device 900 may further include an antenna 940, configured to send a wireless signal output by the transceiver 920.

The processor 910 and the memory 930 may be integrated into one processing apparatus, or more commonly be components independent of each other. The processor 910 is configured to execute program code stored in the memory 930 to implement the foregoing functions. In a specific implementation, the memory 930 may also be integrated into the processor 910, or may be independent of the processor 910.

In addition, the electronic device 900 may further include one or more of an input unit 960, a display unit 970, an audio circuit 980, a camera 990, a sensor 901, and the like, to improve the functions of the electronic device 900. The audio circuit may further include a speaker 982, a microphone 984, and the like. The display unit 970 may include a display.

Optionally, the electronic device 900 may further include a power supply 950, configured to supply power to various components or circuits in the terminal device.

It should be understood that the electronic device 900 shown in FIG. 56 can implement processes in the method embodiments shown in FIG. 54A to FIG. 54F. Operations and/or functions of the units in the electronic device 900 are separately intended to implement a corresponding procedure in the foregoing method embodiments. For details, refer to the descriptions in the foregoing method embodiments. To avoid repetition, detailed descriptions are properly omitted herein.

It should be understood that the processor 910 in the electronic device 900 shown in FIG. 56 may be a system on a chip (system on a chip, SOC). The processor 910 may include a central processing unit (central processing unit, CPU), and may further include another type of processor. The CPU may be referred to as a host CPU (Host CPU). A neural-network processing unit NPU 30 is mounted to the host CPU as a coprocessor, and the host CPU assigns a task. The processors work together to implement the foregoing method procedure, and each processor may selectively execute a part of a software driver.

In conclusion, some processors or processing units in the processor 910 may cooperate to implement the foregoing method procedure, and software programs corresponding to the processors or processing units may be stored in the memory 930.

The present invention further provides a computer-readable storage medium. The computer-readable storage medium stores instructions. When the instructions are run on a computer, the computer is enabled to perform the steps in the target file sharing method shown in FIG. 54A to FIG. 54F.

In the foregoing embodiments, the processor 910 may include, for example, a central processing unit (central processing unit, CPU), a microprocessor, a microcontroller, or a digital signal processor, and may further include a GPU, an NPU, and an ISP. The processor may further include a necessary hardware accelerator or a logic processing hardware circuit, for example, an application-specific integrated circuit (application-specific integrated circuit, ASIC), or one or more integrated circuits configured to control execution of programs in the technical solutions in the present invention. In addition, the processor may have a function of operating one or more software programs, and the software program may be stored in the memory.

The memory may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact optical disc, a laser disc, an optical disc, a digital versatile optical disc, a Blu-ray disc, and the like), a magnetic disk storage medium or another magnetic storage device, any other medium that can be used to carry or store expected program code in a form of instructions or a data structure and that can be accessed by a computer, or the like.

It may be understood that, to implement functions of any one of the foregoing embodiments, the portable device includes a corresponding hardware structure and/or software module for performing each function. A person skilled in the art should be easily aware that units and algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the portable device may be divided into functional modules. For example, each functional module corresponding to each function may be obtained through division, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 57:
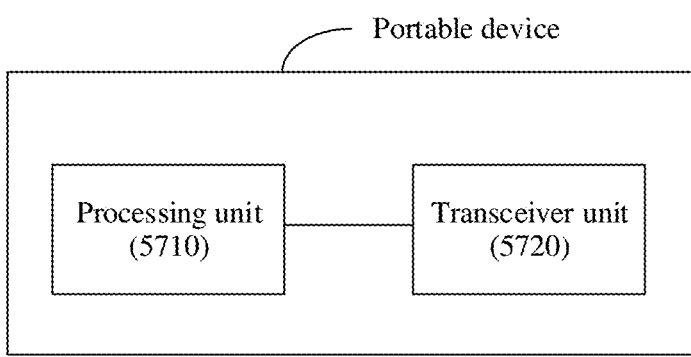
FIG. 57 is a block diagram of a structure of a portable device according to an embodiment of this application.

For example, when each functional module is obtained through division in an integrated manner, FIG. 57 is a block diagram of a structure of a portable device according to an embodiment of this application. The portable device may include a processing unit 5710 and a transceiver unit 5720.

The processing unit 5710 is configured to support the portable device in determining a first smart home device. For example, when the portable device detects that a moving track of the portable device meets a preset moving track, and/or the portable device moves to a preset spatial posture, the processing unit supports the portable device in determining, based on detected relative locations between the smart home device and one or more smart home devices, that a smart home device to which the portable device points is the first smart home device. For another example, the processing unit supports the portable device in determining the first smart home device based on an operation of selecting a virtual "card" of the smart home device by a user in a smart home application interface. The processing unit 5710 may be further configured to perform another process of the technology described in this specification. The transceiver unit 5720 is configured to support the portable device in sending a control instruction to the first smart home device in response to a first operation performed by the user on a button of the portable device, to control the first smart home device to make a first response; and/or configured to perform another process of the technology described in this specification.

Figure 58:
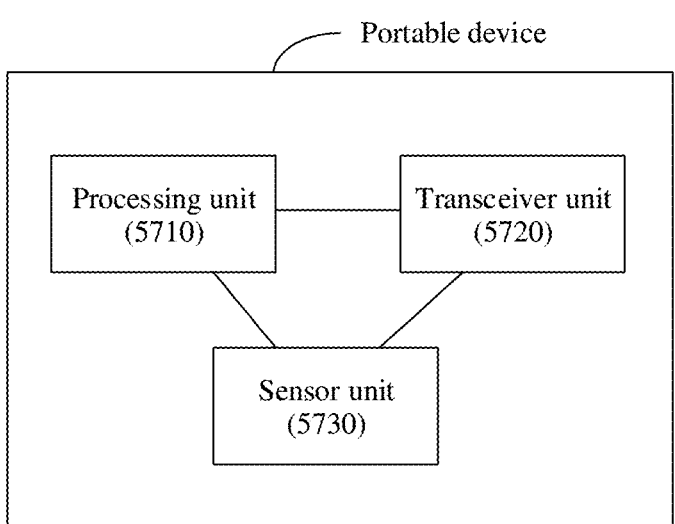
FIG. 58 is a block diagram of a structure of another portable device according to an embodiment of this application.

In a possible structure, as shown in FIG. 58, the portable device may include a sensor unit 5730.

In some embodiments, the sensor unit 5730 includes one or more motion sensors. The one or more motion sensors are configured to measure motion data of the portable device, to obtain a moving track or a spatial posture of the portable device.

In some other embodiments, the sensor unit 5730 includes a touch sensor. The touch sensor is configured to receive a touch operation of the user, for example, receive an operation of selecting a virtual "card" of a smart home device by a user in a smart home application interface.

In a possible structure, the transceiver unit 5720 is further configured to detect signals from one or more smart home devices around the portable device, to obtain relative locations between the smart home device and the one or more smart home devices. In some embodiments, the transceiver unit 5720 includes a Bluetooth module and/or an ultra-wideband UWB module. The Bluetooth module and/or the ultra-wideband UWB module are/is configured to detect signals from one or more smart home devices around the portable device.

It should be noted that the transceiver unit 5720 may include a radio frequency circuit. Specifically, the portable device may receive and send wireless signals through the radio frequency circuit. The radio frequency circuit usually includes but is not limited to an antenna, at least one amplifier, a transceiver, a coupler, a low noise amplifier, a duplexer, and the like. In addition, the radio frequency circuit may further communicate with another device through wireless communication. The wireless communication may use any communication standard or protocol, including but not limited to a global system for mobile communications, a general packet radio service, code division multiple access, wideband code division multiple access, long term evolution, an email, a short message service, and the like.

Figure 59:
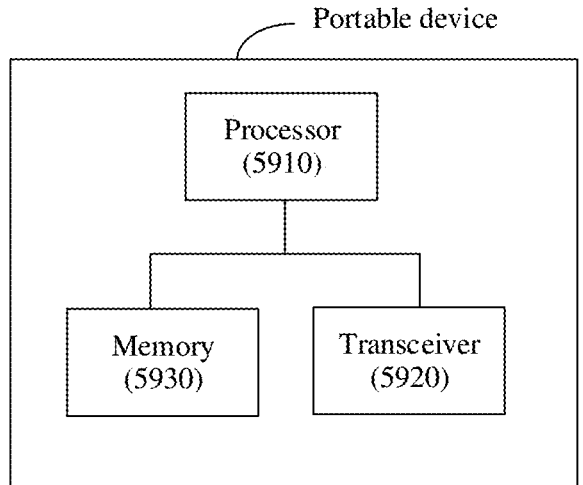
FIG. 59 is a schematic diagram of a structure of a portable device according to an embodiment of this application.

It should be understood that each module in the portable device may be implemented in a form of software and/or hardware. This is not specifically limited herein. In other words, the portable device is presented in a form of a functional module. The "module" herein may be an application-specific integrated circuit ASIC, a circuit, a processor that executes one or more software or firmware programs and a memory, an integrated logic circuit, and/or another component that can provide the foregoing functions. Optionally, in a simple embodiment, a person skilled in the art may figure out that the portable device may be in a form shown in FIG. 59. The processing unit 5710 may be implemented by using a processor 5910 shown in FIG. 59. The transceiver module 5720 may be implemented by using a transceiver 5920 shown in FIG. 59. Specifically, the processor is implemented by executing a computer program stored in a memory. Optionally, the memory is a storage unit in a chip, for example, a register or a cache. Alternatively, the storage unit may be a storage unit that is in a computer device and that is located outside the chip, for example, a memory 5930 shown in FIG. 59.

Figure 60:
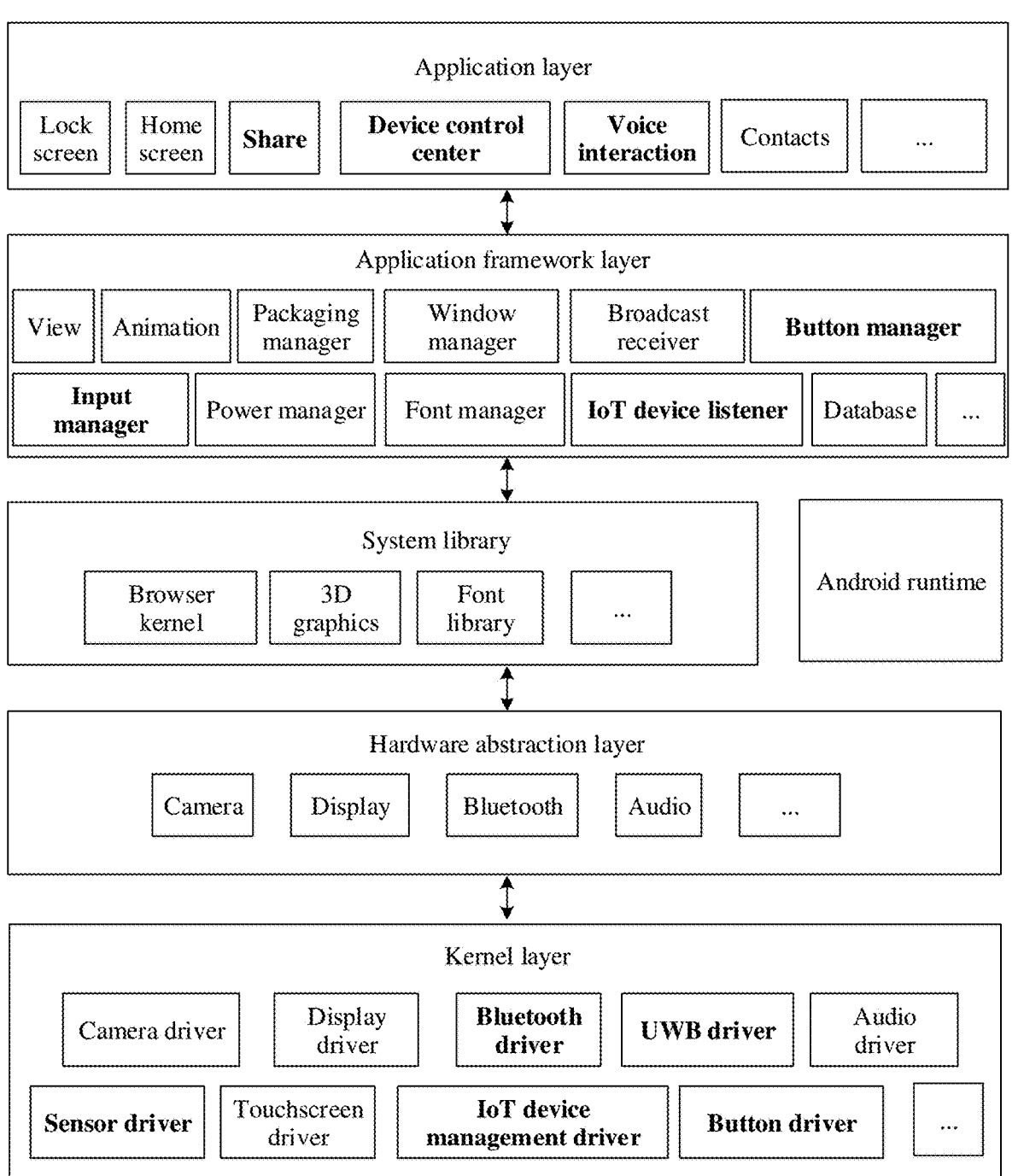
FIG. 60 is a schematic diagram of a software structure of a portable device according to an embodiment of this application.

FIG. 60 is a schematic diagram of a software framework of an electronic device according to an embodiment of this application. As shown in FIG. 60, the software framework of the electronic device in this application may include an application layer, an application framework layer (framework, FWK), a system library, an Android runtime, a hardware abstraction layer (hardware abstraction layer, HAL), and a kernel (kernel) layer.

The application layer may include a series of application packages, for example, applications such as a lock screen application, a home screen application, Share, a device control application (for example, a device control center), a voice interaction application, an address book, a gallery, a file manager, a browser, and contacts. In this application, the device control center is used to manage control interfaces of different smart home devices. For example, the device control center is used to enter, based on an operation of selecting a virtual "card" by the user in an interface of a smart home App, a control interface that is of a smart home device and that corresponds to the virtual "card". The voice interaction application is used to process a detected voice instruction. For other applications at the application layer, refer to descriptions in the conventional technology. Details are not described in this application. In this application, an application on a portable device may be a native application (for example, an application installed in the portable device when an operating system is installed on the portable device before the portable device is delivered from a factory), or may be a third-party application (for example, an application downloaded and installed by a user from App Store). This is not limited in this embodiment of this application.

The application framework layer provides an application programming interface (application programming interface, API) and a programming framework for an application at the application layer. As shown in FIG. 60, the application framework layer may include a window manager, a packaging management server, a view, an animation, a broadcast receiver, a power manager, a font manager, a database, an input manager, a button manager, an internet of things (internet of things, IoT) device listener, and the like. In this application, the smart home device is an IoT device. The button manager and the IoT device listener are newly added parts in this application. The button manager is configured to: determine a smart home device matching a button of the portable device, and switch a control object of the button of the portable device to the determined smart home device matching the button of the portable device. The button manager is further configured to: receive a button event detected by a button driver, and send, to the IoT device listener, a control parameter corresponding to the button event and corresponding smart home device information. The IoT device listener is configured to indicate an IoT device management driver to control a specific smart home device based on the control parameter received from the button manager.

The application framework layer may further include a sharing-only service manager (not shown in the figure). A pointing sharing service manager is configured to obtain a selection instruction, a target file, and an internet protocol (Internet Protocol, IP for short) address of a positioned shareable device.

The system library and Android runtime include functions that need to be invoked by the FWK, an Android core library, and an Android virtual machine. The system library may include a plurality of functional modules, for example, a browser kernel, three-dimensional (3 dimensional, 3D) graphics, and a font library.

The hardware abstraction layer is an abstract interface of a device kernel driver, and is configured to provide, for a higher-level Java API framework, an application programming interface for accessing an underlying device. The HAL includes a plurality of library modules, such as a camera, a display, Bluetooth, and an audio. Each of the library modules implements an interface for a particular type of hardware component. When an API at a system framework layer requires access to hardware of the portable device, an Android operating system loads a library module for the hardware component.

The kernel layer is the basis of the Android operating system. Final functions of the Android operating system are implemented at the kernel layer. The kernel layer may include a camera driver, a display driver, a Bluetooth driver, an ultra-wideband (Ultra-Wideband, UWB) driver, an audio driver, a sensor driver, a touchscreen driver, an IoT device management driver, a button driver, and the like. For example, a language of an interface between the kernel layer and the hardware abstraction layer is a hardware abstraction layer interface definition language (HAL interface definition language, HIDL). The sensor driver is configured to collect motion data of the portable device, to determine a moving direction, a moving speed, a spatial posture, and the like of the portable device, so that when the portable device meets a preset moving track and/or a preset spatial posture, the Bluetooth driver or the UWB driver is triggered to measure and identify a smart home device to which the portable device points. The IoT device management driver is configured to control a specific smart home device based on the control parameter received from the button manager. The button driver is configured to detect a button event, for example, configured to detect an operation event of pressing a power button, a volume up button, or a volume down button of the portable device.

It should be noted that the schematic diagram of the software structure of the portable device with the structure shown in FIG. 60 provided in this application is merely used as an example, and division into specific modules in different layers of the Android operating system is not limited. For details, refer to descriptions of a software structure of an Android operating system in the conventional technology. In addition, the smart home device control method provided in this application may be further implemented based on another operating system. Examples are not described one by one in this application. In the following embodiments, the software structure of the portable device with the structure shown in FIG. 60 is used as an example to describe in detail the technical solutions provided in embodiments of this application.

In some embodiments, the button manager shown in FIG. 60 includes a physical button management module, and the button driver includes a physical button driver. When the physical button driver of the portable device detects a physical button event, the physical button management module sends, to the IoT device listener, a control parameter corresponding to the physical button event and corresponding smart home device information.

In some other embodiments, the button manager shown in FIG. 60 includes a virtual button management module, and the button driver includes a virtual button driver. When the virtual button driver of the portable device detects a virtual button event, the virtual button management module sends, to the IoT device listener, a control parameter corresponding to the virtual button event and corresponding smart home device information.

In some examples, when the portable device detects that the portable device meets a preset moving track, and/or the portable device moves to a preset spatial posture, the portable device may specifically determine, in step 1 and step 2, a smart home device (that is, a smart home device to which the portable device points) (for example, a first smart home device) that expects to be controlled by the user.

Step 1: The portable device detects and identifies a surrounding smart home device.

For example, the portable device may trigger a UWB driver or a Bluetooth driver to detect and identify the surrounding smart home device.

It may be understood that after accessing a network (for example, Wi-Fi), the smart home device and the portable device may obtain access information of the smart home device and the portable device. For example, the access information may include a network access manner, a communication address (such as an IP address), a received signal strength indication (received signal strength indication, RSSI) parameter, and the like. As shown in FIG. 33, because signal strength gradually attenuates with a propagation distance, a UWB or Bluetooth sensor may receive, through a plurality of antennas, signals sent by a plurality of transmit devices (for example, a smart home device). A transmission time difference between different received signals is calculated based on strength of the different received signals, to calculate azimuths and distances of different transmit devices (for example, a smart home device) relative to a receive device (for example, a portable device), so as to identify the smart home device by the portable device.

Figure 61:
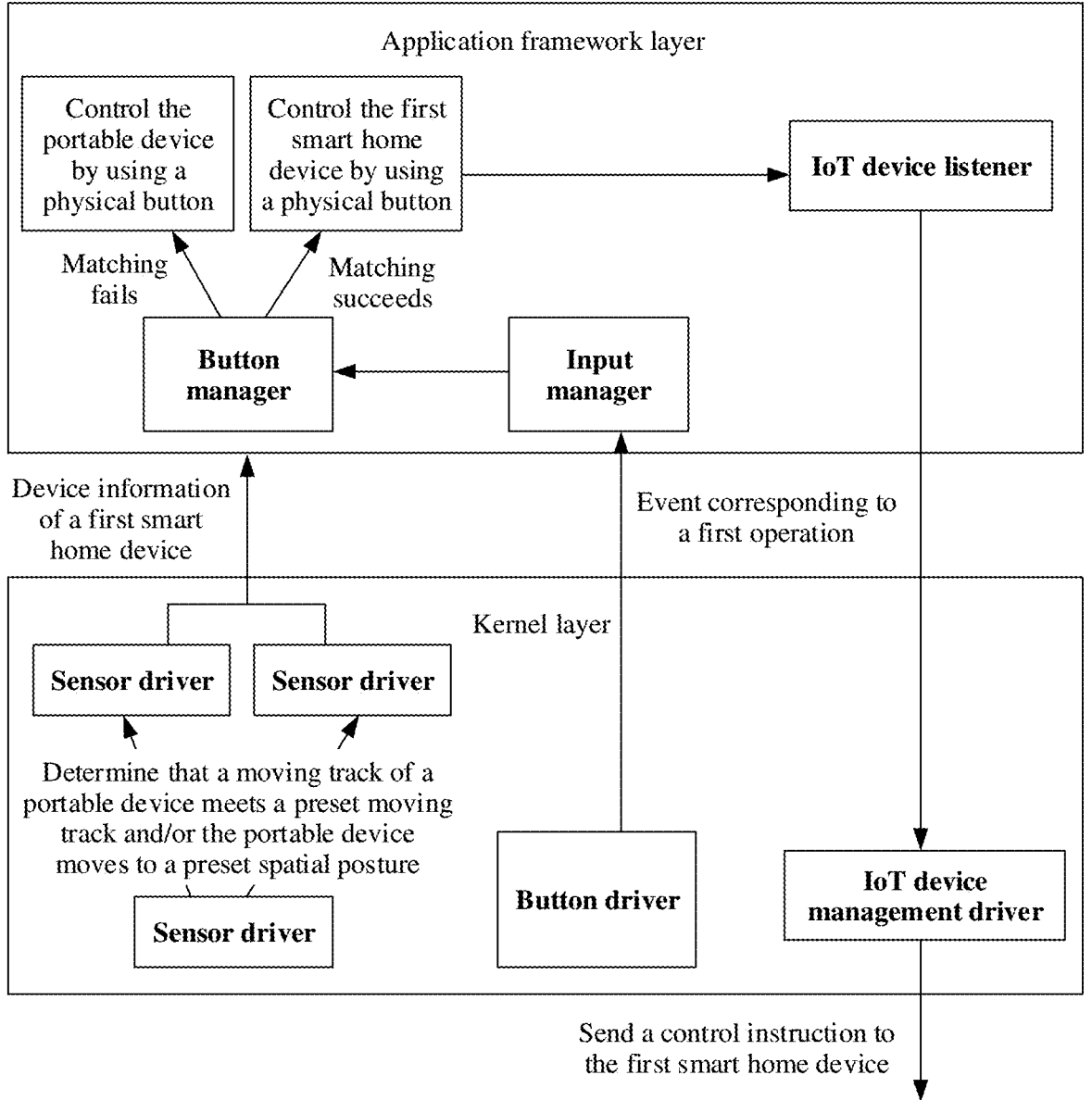
FIG. 61 is a schematic diagram of a control process in which a portable device controls a smart home device according to an embodiment of this application.

FIG. 61 is a schematic diagram of a control process in which a portable device controls a smart home device according to an embodiment of this application by using an example in which the portable device determines, based on a moving track and/or a spatial posture of the portable device, the smart home device that expects to be controlled by a user. As shown in FIG. 61, in response to determining, by a sensor driver based on collected motion data of the portable device, that the moving track of the portable device meets a preset moving track and/or the portable device moves to a preset spatial posture, the sensor driver triggers a UWB driver or a Bluetooth sensor to detect and identify a surrounding smart home device.

Step 2: The portable device determines a first smart home device based on azimuths and distances of a plurality of smart home devices relative to the portable device and the spatial posture of the portable device.

In this application, the smart home device to which the portable device points may include but is not limited to a smart home device to which the back of the portable device points or a smart home device to which the portable device axially points.

In some embodiments, the smart home device to which the back of the portable device points is a smart home device through which a perpendicular line of a plane on which the portable device is located passes. For example, when the portable device moves to the preset spatial posture (that is, at an included angle of 90° or close to 90° with a horizontal plane) shown in (a) in FIG. 31, the smart home device to which the portable device points is a television through which the perpendicular line of the plane on which the portable device is located passes.

In some embodiments, the smart home device to which the portable device axially points is a smart home device through which an extension line in a long side direction of the portable device passes. For example, when the portable device moves to the preset spatial posture (that is, at an included angle of a with a horizontal plane) shown in (b) in FIG. 31, the smart home device to which the portable device points is a television through which the extension line in the long side direction of the portable device passes.

It should be noted that, a manner of determining whether the smart home device to which the portable device points is based on a direction to which the back of the portable device points or an axial direction of the portable device is preset in the portable device, for example, is set in an operating system of the portable device before delivery.

After the portable device determines a smart home device (that is, a smart home device to which the portable device points) (for example, a first smart home device) that expects to be controlled by the user, in some embodiments, to control the first smart home device by using a button of the portable device, the portable device sets the first smart home device as a device matching the button (for example, a physical button) of the portable device.

That the button of the portable device matches the first smart home device means that an operation performed on the button of the portable device is used to directly control the first smart home device, instead of the portable device or another smart home device. In other words, the device matching the button of the portable device refers to a control object of the button of the portable device.

For example, the smart home device is controlled by using the physical button of the portable device. In some embodiments, after determining a smart home device (that is, a first smart home device) that expects to be controlled by the user, the portable device may report device information (for example, a device identifier) of the first smart home device to the physical button manager at the application framework layer in the software structure shown in FIG. 60. The physical button manager configures the control object of the physical button based on the device information, that is, sets the first smart home device as the device matching the physical button of the portable device.

As shown in FIG. 61, after the UWB driver or the Bluetooth driver determines the first smart home device based on the azimuths and distances of the plurality of smart home devices relative to the portable device and the spatial posture of the portable device, the button manager sets, based on the device information (for example, a device identifier) of the first smart home device from the UWB driver or the Bluetooth driver, the device matching the button of the portable device as the first smart home device.

Figure 62:
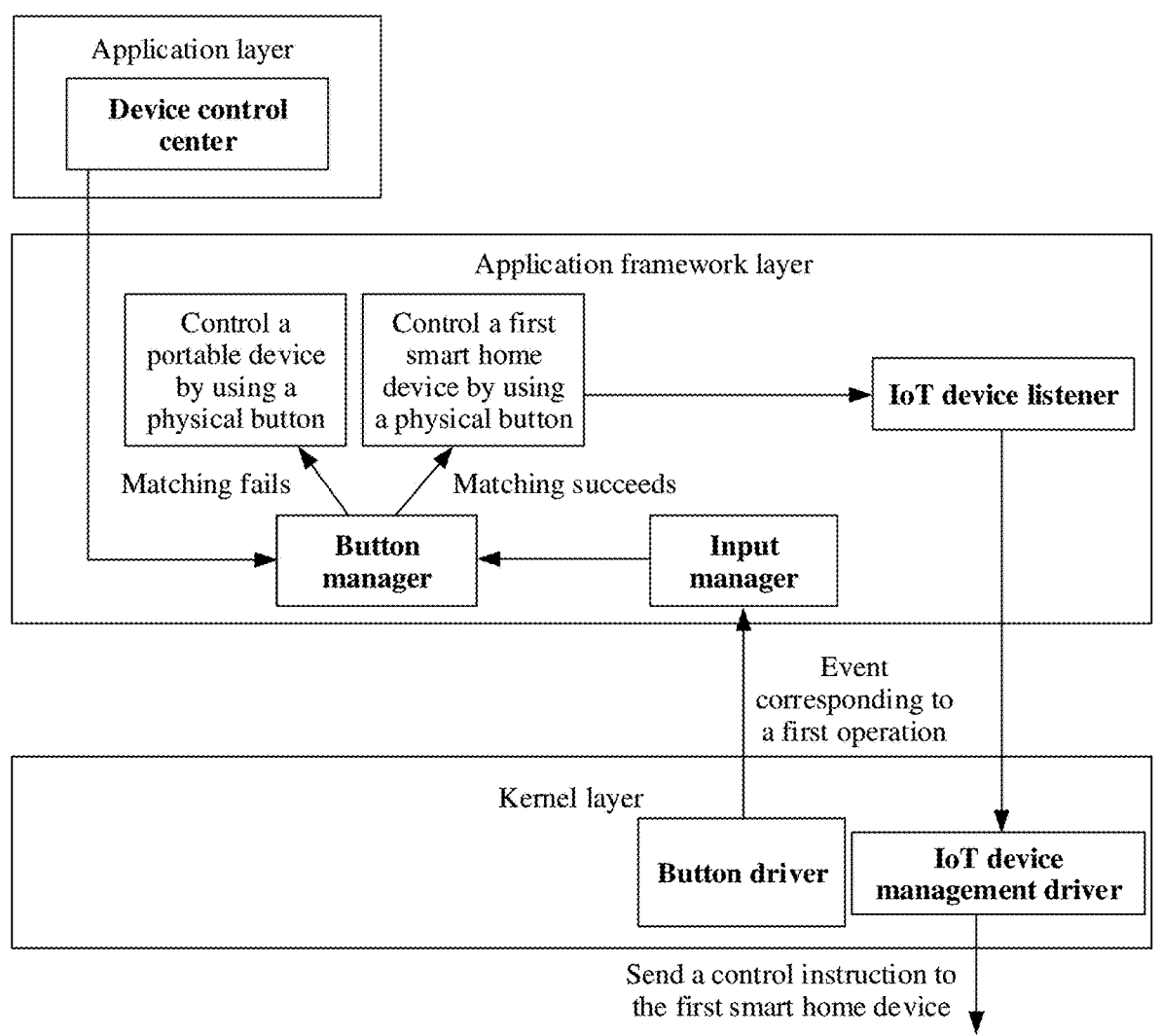
FIG. 62 is a schematic diagram of another control process in which a portable device controls a smart home device according to an embodiment of this application.

For another example, FIG. 62 is a schematic diagram of another control process in which a portable device controls a smart home device according to an embodiment of this application by using an example in which the portable device determines, based on an operation of selecting a virtual "card" by a user in an interface of a smart home App, the smart home device that expects to be controlled by the user. As shown in FIG. 62, after receiving an operation of selecting a virtual "card" by the user in an interface of a smart home App, a device control center at an application layer indicates a button manager to set, based on device information (for example, a device identifier) of a first smart home device from the device control center, a device matching a button of the portable device as the first smart home device.

After the portable device sets the first smart home device as the device matching the button of the portable device, the portable device may control, based on a received button operation, the first smart home device to make a response.

For example, the smart home device is controlled by using a physical button of the portable device. In some embodiments, in response to a first operation performed by the user on the physical button of the portable device, the portable device controls the first smart home device to make a first response.

The first operation performed by the user on the physical button of the portable device may include but is not limited to the foregoing operation performed by the user on the single physical button and the foregoing multiplexing operation performed by the user on the plurality of physical buttons. For example, the first operation performed by the user on the physical button of the portable device may be a press operation performed by the user on a power button, a volume up button ("+"), a volume down button ("−"), or a fingerprint button of the portable device. For another example, the first operation performed by the user on the physical button of the portable device may be a simultaneous press operation performed by the user on a plurality of buttons in a power button, a volume up button ("+"), a volume down button ("−"), and a fingerprint button of the portable device.

In some embodiments, as shown in FIG. 61 or FIG. 62, after the button manager receives, by using an input manager, an event that corresponds to the first operation of the user and that is detected by a button driver, the button manager sends, to an IoT device listener based on the control object (that is, the first smart home device) of the button, a control parameter corresponding to the first operation and device information, so that the IoT device listener indicates an IoT device management driver to control, based on the received control parameter, a smart home device (that is, the first smart home device) indicated by the device information.

In some embodiments, the portable device may send a control instruction to the first smart home device, to indicate the first smart home device to make a response (that is, the first response) to the first operation of the user. As shown in FIG. 61 or FIG. 62, the IoT device management driver sends, based on an indication of the IoT device listener, the control instruction to the smart home device (that is, the first smart home device) indicated by the device information. The control instruction includes a control parameter, and the control instruction is used to indicate the first smart home device to make a response to the first operation of the user to adjust the received control parameter.

Figure 63:
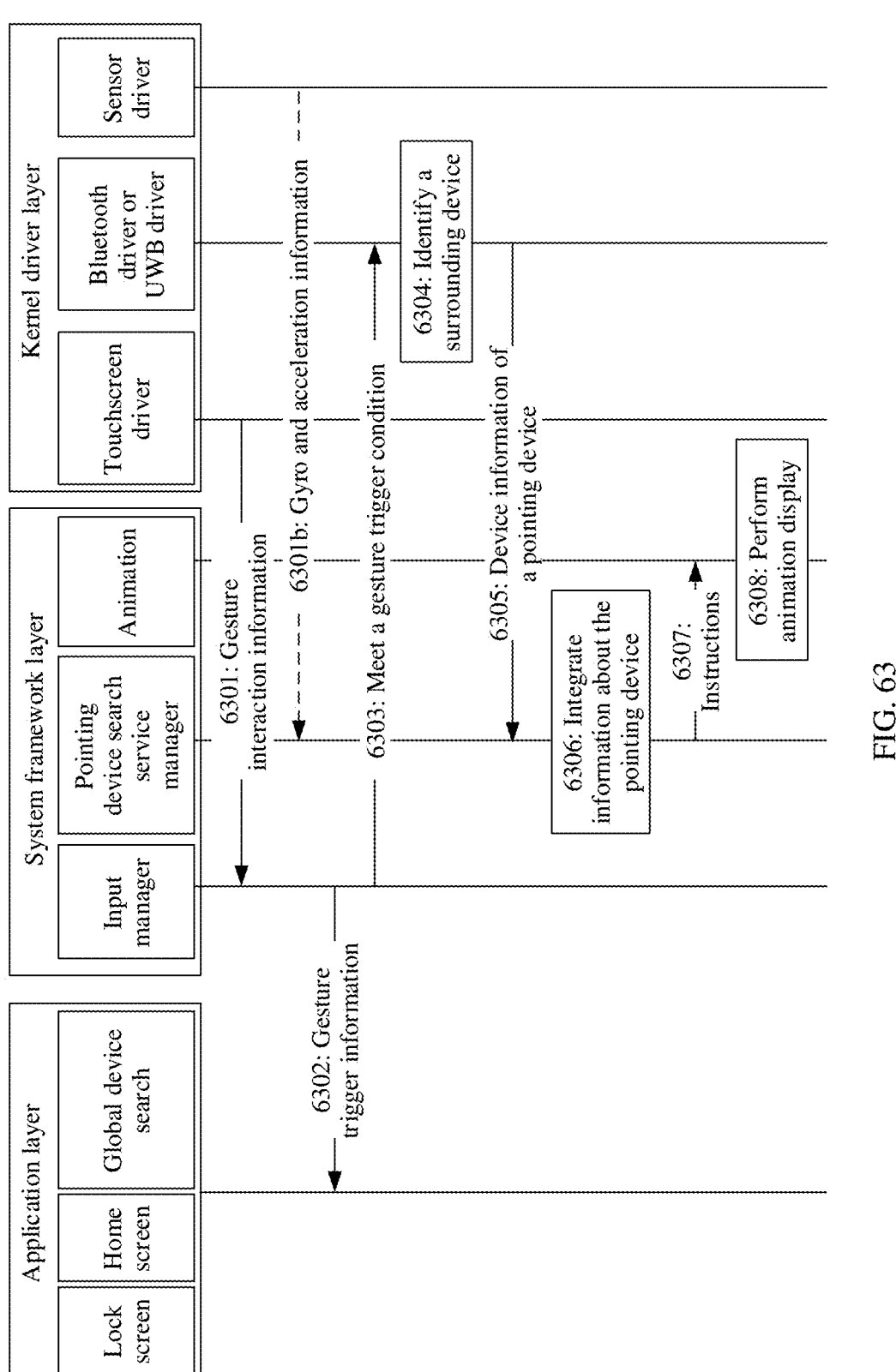
FIG. 63 is a schematic flowchart of a framework of a directional search interaction method according to an embodiment of this application.

With reference to the schematic diagram of the software framework of the electronic device shown in FIG. 60, FIG. 63 is a schematic flowchart of a directional search interaction method. The method may include step 6301 to step 6308.

6301: A touchscreen driver at a kernel driver layer sends detected gesture information to an input manager.

The touchscreen driver detects gesture information on a screen of a mobile phone in real time, and sends the gesture information to the input manager at a system framework layer.

6302: The input manager determines whether a current gesture meets a preset condition for triggering device search, and when the gesture information meets the preset condition for triggering device search, sends the gesture trigger information to a module corresponding to the gesture trigger information at an application layer.

For example, if the input manager determines that the gesture information meets single-finger trigger information, the input manager sends the single-finger trigger information to a lock screen module or a home screen module at the application layer. For example, as shown in FIG. 37B, if the mobile phone is in a lock screen state, the input manager sends the single-finger trigger information to the lock screen module. As shown in FIG. 36B, if the mobile phone is in a home screen state, the input manager sends the single-finger trigger information to the home screen module.

For example, as shown in FIG. 43D or FIG. 44A, if the input manager determines that the gesture information meets multi-finger trigger information, the input manager sends the multi-finger trigger information to a global device search module at the application layer.

6303: The input manager sends, to a UWB driver or a Bluetooth driver at the kernel driver layer, information that the gesture trigger information meets a gesture trigger condition for searching for a pointing device.

6304: The UWB driver or the Bluetooth driver identifies information about a surrounding device.

6305: The UWB driver or the Bluetooth driver sends the information about the surrounding device to a pointing device search service manager.

6306: The pointing device search service manager integrates an icon of the pointing device, device card content, and the like.

6307: The pointing device search service manager sends the integrated information about the pointing device to an animation module.

6308: The animation module performs animation display.

The animation module performs animation display. As shown in FIG. 36D, the animation module displays, in an interface of the mobile phone, a display interface card of a device to which the mobile phone points.

Figure 64:
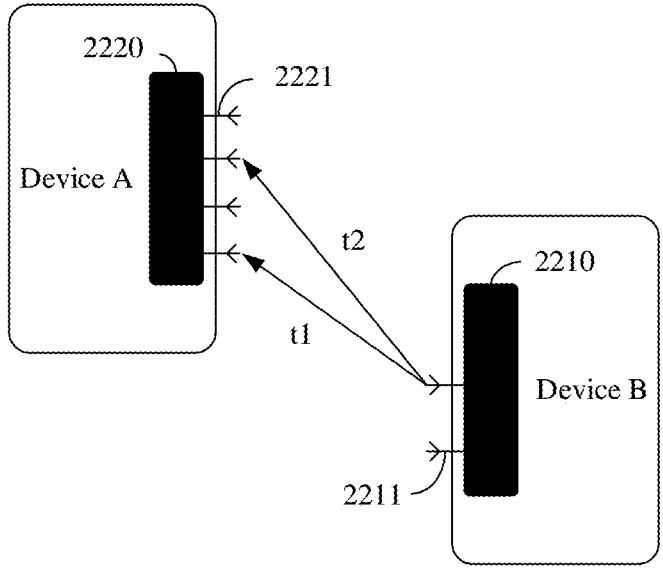
FIG. 64 is a schematic diagram of identifying an orientation and a distance by a UWB or Bluetooth component according to an embodiment of this application.

FIG. 64 is a schematic diagram of identifying an orientation and a distance by a UWB or Bluetooth component according to an embodiment of this application.

As shown in FIG. 64, a device A may include a UWB or Bluetooth component 2220, and the UWB or Bluetooth component 2220 includes a plurality of antennas 2221 and 2222. A device B may include a UWB or Bluetooth component 2210, and the UWB or Bluetooth component 2210 includes a plurality of antennas 2211 and 2212.

In this embodiment of this application, an example in which the components 2220 and 2210 are UWB chips is used for description.

For example, the device A and the device B each have a UWB chip. The antenna 2211 of the UWB chip 2210 in the device B may send a UWB signal, and the antennas 2221 and 2222 of the UWB chip 2220 in the device A may separately receive the UWB signal. However, because distribution locations of the antennas 2221 and 2222 on the device 2220 are different, time points at which the UWB signal is received are also different. For example, the UWB signal arrives at the antenna 2222 after a time t1, and arrives at the antenna 2221 after a time t2. Therefore, a distance between the antenna 2211 and each of the antennas 2222 and 2221 may be calculated based on time of arrival of the signal, so that a phase difference of the signal that is caused by different distances can be obtained, and an angle of the received signal can be determined based on information about the phase difference. In this way, the device B can learn of an orientation and a distance between the device B and the device A.

In this embodiment of this application, the device B (for example, a mobile phone) may identify, by using the UWB chip, all surrounding intelligent devices that are allowed to be identified, and learn of location distribution of the intelligent devices, to help display, on a screen of the mobile phone, a control card or a display interface card of an intelligent device in a pointing direction of the head of the mobile phone in the foregoing embodiment.

According to the method provided in this embodiment of this application, when determining an operation intention of the user, that is, when determining a smart home device that expects to be controlled by the user, the portable device may switch a control object of a button of the portable device to the smart home device, to directly control the smart home device based on the operation on the button of the portable device. According to the method, a problem of poor user experience caused by a complex and time-consuming control process of the smart home device in the conventional technology can be resolved.

In conclusion, the foregoing embodiments are merely intended for describing the technical solutions of this application, but not for limiting this application. Although this application is described in detail with reference to the foregoing embodiments, a person of ordinary skill in the art should understand that the person may still make modifications to the technical solutions described in the foregoing embodiments or make equivalent replacements to some technical features thereof, without departing from the scope of the technical solutions of embodiments of this application.

What is claimed is:

1. A method applied to an electronic device, comprising:
displaying first content;
detecting a first operation of a user, wherein the first operation comprises a third operation and a fourth operation, and wherein detecting the first operation of the user comprises detecting the third operation of the user;
obtaining a direction of the first operation and a first posture of the electronic device in response to detecting the first operation, wherein obtaining the direction of the first operation and the first posture of the electronic device in response to the first operation comprises:
obtaining a direction of the third operation and the first posture of the electronic device in response to the third operation;
determining a target device based on the direction of the first operation or the first posture, wherein determining the target device based on the direction of the first operation or the first posture comprises:
determining the target device based on the direction of the third operation or the first posture; and
sending, by the electronic device, the first content to the target device when it is detected that the electronic device and the target device log in to a same account, wherein sending, by the electronic device, the first content to the target device when detecting that the electronic device and the target device log in to the same account comprises:
obtaining the fourth operation, wherein the fourth operation is changing the electronic device from the first posture to a second posture; and
in response to the fourth operation, sending, by the electronic device, the first content to the target device when detecting that the electronic device and the target device log in to the same account;
wherein the third operation is moving the electronic device in the first posture in a direction towards the target device, and the first posture is that the top of the electronic device faces the target device; and
wherein fourth operation is changing the first posture of the electronic device to the second posture, and the second posture is that the top of the electronic device is upward and a display of the electronic device faces the target device.

2. The method according to claim 1, wherein after determining the target device based on the direction of the first operation or the first posture, the method further comprises:
sending, by the electronic device, a first request to the target device when detecting that the electronic device and the target device do not log in to a same account, wherein the first request requests the target device to receive the first content;
receiving a first response, wherein the first response indicates to the electronic device to send the first content; and
sending, by the electronic device, the first content to the target device.

3. The method according to claim 1, wherein:
the direction of the first operation is a direction in which a center of gravity of the electronic device moves during the first operation; or
the direction of the first operation is a direction in which a user gesture moves during the first operation.

4. The method according to claim 1, wherein determining the target device based on the direction of the first operation or the first posture further comprises:
sending a second request to one or more intelligent devices, wherein the second request indicates to the one or more intelligent devices to send location information to the electronic device; and
determining a first intelligent device as the target device based on the location information sent by the one or more intelligent devices, wherein a location of the first intelligent device is in the direction of the first operation, and the first intelligent device comprises at least one intelligent device in the one or more intelligent devices.

5. The method according to claim 4, wherein determining the first intelligent device as the target device based on the location information sent by the one or more intelligent devices comprises:

displaying a first list in a first user interface when the first intelligent device comprises a plurality of intelligent devices, wherein the displayed first list comprises icons of the plurality of intelligent devices; and in response to a second operation of the user, determining, as the target device, an intelligent device that is in the first intelligent device and whose icon is selected from the first list by the second operation.

6. The method according to claim 5, wherein an arrangement sequence of the icons of the plurality of intelligent devices that are displayed in the first list is determined based on distances between the electronic device and intelligent devices of the plurality of intelligent devices.

7. The method according to claim 5, wherein after determining, as the target device, the intelligent device that is in the first intelligent device and whose icon is selected from the first list by the second operation, the method further comprises:

performing a first preset action, wherein the first preset action comprises one or more of vibration, ringing, or displaying a prompt box in a user interface.

8. The method according to claim 1, wherein determining the target device based on the direction of the first operation or the first posture further comprises:

sending a third request to a positioning server, wherein the third request indicates to the positioning server to send location information of one or more intelligent devices, and the positioning server stores the location information of the one or more intelligent devices; and determining a first intelligent device as the target device based on the location information of the one or more intelligent devices, wherein a location of the first intelligent device is in the direction of the first operation, and the first intelligent device comprises at least one intelligent device in the one or more intelligent devices.

9. The method according to claim 1, wherein the first posture is that the top of the electronic device is upward and a display of the electronic device faces the target device.

10. An electronic device, comprising:

a non-transitory memory; and one or more processors, wherein the non-transitory memory is configured to store computer instructions, and when the computer instructions are executed by the one or more processors, the electronic device is enabled to perform the following steps:

displaying first content;

detecting a first operation of a user;

obtaining a direction of the first operation and a first posture of the electronic device in response to the first operation;

determining a target device based on the direction of the first operation or the first posture; and sending the first content to the target device when detecting that the electronic device and the target device log in to a same account; and wherein the first operation is moving the electronic device in the first posture in a direction towards the target device, and the first posture is that the top of the electronic device is upward and a display of the electronic device faces the target device.

11. The electronic device according to claim 10, wherein when the computer instructions are executed by the one or more processors, the electronic device is enabled to further perform the following steps:

after determining the target device based on the direction of the first operation or the first posture, sending a first request to the target device when detecting that the electronic device and the target device do not log in to a same account, wherein the first request requests the target device to receive the first content;

receiving a first response, wherein the first response indicates to the electronic device to send the first content; and sending the first content to the target device.

12. The electronic device according to claim 10, wherein the direction of the first operation is a direction in which a center of gravity of the electronic device moves during the first operation, or a direction in which a user gesture moves during the first operation.

13. The electronic device according to claim 10, wherein determining the target device based on the direction of the first operation or the first posture comprises:

sending a second request to one or more intelligent devices, wherein the second request indicates to the one or more intelligent devices to send location information to the electronic device; and determining a first intelligent device as the target device based on the location information sent by the one or more intelligent devices, wherein a location of the first intelligent device is in the direction of the first operation, and the first intelligent device comprises at least one intelligent device in the one or more intelligent devices.

14. The electronic device according to claim 13, wherein determining the first intelligent device as the target device based on the location information sent by the one or more intelligent devices comprises:

displaying a first list in a first user interface when the first intelligent device comprises a plurality of intelligent devices, wherein the displayed first list comprises icons of the plurality of intelligent devices; and in response to a second operation of the user, determining, as the target device, an intelligent device that is in the first intelligent device and whose icon is selected from the first list by the second operation.

15. The electronic device according to claim 14, wherein when the computer instructions are executed by the one or more processors, the electronic device is enabled to further perform the following steps:

after determining, as the target device, the intelligent device that is in the first intelligent device and whose icon is selected from the first list by the second operation, performing a first preset action, wherein the first preset action comprises one or more of vibration, ringing, or displaying a prompt box in a user interface.

16. The electronic device according to claim 10, wherein determining the target device based on the direction of the first operation or the first posture comprises:

sending a third request to a positioning server, wherein the third request indicates to the positioning server to send location information of one or more intelligent devices, and the positioning server stores the location information of the one or more intelligent devices; and determining a first intelligent device as the target device based on the location information of the one or more intelligent devices, wherein a location of the first intelligent device is in the direction of the first operation, and the first intelligent device comprises at least one intelligent device in the one or more intelligent devices.

17. The electronic device according to claim 10, wherein the first operation comprises a third operation and a fourth operation;

wherein detecting the first operation of the user comprises:

detecting the third operation of the user;

wherein obtaining the direction of the first operation and the first posture of the electronic device in response to the first operation comprises:

obtaining a direction of the third operation and the first posture of the electronic device in response to the third operation;

wherein determining the target device based on the direction of the first operation or the first posture comprises:

determining the target device based on the direction of the third operation or the first posture; and wherein sending the first content to the target device when detecting that the electronic device and the target device log in to a same account comprises:

obtaining the fourth operation, wherein the fourth operation is changing the electronic device from the first posture to a second posture; and in response to the fourth operation, sending the first content to the target device when detecting that the electronic device and the target device log in to the same account.

18. A non-transitory computer storage medium, storing computer instructions, wherein when the computer instructions are run on an electronic device, the electronic device is enabled to perform displaying first content;

detecting a first operation of a user;

obtaining a direction of the first operation and a first posture of the electronic device in response to the first operation;

determining a target device based on the direction of the first operation or the first posture; and sending the first content to the target device when detecting that the electronic device and the target device log in to a same account; and wherein the first operation is moving the electronic device in the first posture in a direction towards the target device, and the first posture is that the top of the electronic device is upward and a display of the electronic device faces the target device.

\* \* \* \* \*